US010327213B1

(12) United States Patent
Han et al.

(10) Patent No.: US 10,327,213 B1
(45) Date of Patent: Jun. 18, 2019

(54) TIME-REVERSAL COMMUNICATION SYSTEMS

(71) Applicant: Origin Wireless, Inc., Greenbelt, MD (US)

(72) Inventors: Yi Han, Greenbelt, MD (US); Yu-Han Yang, Santa Clara, CA (US); Yan Chen, ChengDu (CN); K. J. Ray Liu, Potomac, MD (US); Hang Ma, Greenbelt, MD (US); Beibei Wang, Clarksville, MD (US); Hung-Quoc Duc Lai, Parkville, MD (US); Zoltan Safar, Ellicott City, MD (US); Qinyi Xu, Greenbelt, MD (US); Chen Chen, College Park, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 82 days.

(21) Appl. No.: 15/284,496

(22) Filed: Oct. 3, 2016

Related U.S. Application Data

(60) Provisional application No. 62/235,958, filed on Oct. 1, 2015.

(51) Int. Cl.
*H04W 56/00* (2009.01)
*H04L 25/02* (2006.01)
(Continued)

(52) U.S. Cl.
CPC ........ *H04W 56/001* (2013.01); *H04B 17/336* (2015.01); *H04L 7/007* (2013.01);
(Continued)

(58) Field of Classification Search
USPC ........................................................ 370/311
See application file for complete search history.

(56) References Cited

U.S. PATENT DOCUMENTS 2,933,702 A   4/1960   Bogert
3,767,855 A   10/1973  Ueno et al.
(Continued)

FOREIGN PATENT DOCUMENTS

EP      2 571 214 A1    11/2012
WO   WO 2007/031088    3/2007
(Continued)

OTHER PUBLICATIONS

U.S. Appl. No. 15/004,314, filed Jan. 22, 2016, Chen et al.
(Continued)

*Primary Examiner* — Gregory B Sefcheck
*Assistant Examiner* — Majid Esmaelian
(74) *Attorney, Agent, or Firm* — Fish & Richardson P.C.

(57) ABSTRACT

An apparatus for determining symbol timing in a communication system is provided. The apparatus includes a memory communicatively coupled to at least one processor. The at least one processor is configured to receive a first signal that includes a preamble sent at a first sampling rate with a first modulation through a channel and a data frame sent at a second sampling rate with a second modulation through the channel. The preamble includes a received code sequence, and the data frame includes a plurality of data symbols. The at least one processor is configured to compute a second signal that represents an estimate of an equivalent channel response using at least one of a known code sequence and the received first signal, down-sample the second signal and compute signal-to-interference-plus-noise ratios at a plurality of candidate timing offsets, and determine a symbol timing based on a particular timing offset associated with one of the computed signal-to-interference-plus-noise ratios.

19 Claims, 70 Drawing Sheets

(51) Int. Cl.
  *H04L 7/04* (2006.01)
  *H04L 7/00* (2006.01)
  *H04B 17/336* (2015.01)
  *H04W 52/02* (2009.01)
  *H04W 84/12* (2009.01)

(52) U.S. Cl.
  CPC .............. *H04L 7/042* (2013.01); *H04L 7/043* (2013.01); *H04L 25/025* (2013.01); *H04W 52/0206* (2013.01); *H04W 52/0229* (2013.01); *H04W 84/12* (2013.01)

(56) References Cited

U.S. PATENT DOCUMENTS

| | | |
|---|---|---|
| 5,092,336 A | 3/1992 | Fink |
| 5,155,742 A | 10/1992 | Ariyavisitakul et al. |
| 5,428,999 A | 7/1995 | Fink |
| 5,641,927 A * | 6/1997 | Pawate ............... G10H 1/366 434/307 A |
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,010,116 B2 | 8/2011 | Scheinert |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |
| 8,457,217 B2 | 6/2013 | Huy et al. |
| 8,498,658 B2 | 7/2013 | Smith et al. |
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 9,226,304 B2 | 12/2015 | Chen et al. |
| 9,313,020 B2 | 4/2016 | Ma et al. |
| 9,402,245 B2 | 7/2016 | Chen et al. |
| 9,407,306 B2 | 8/2016 | Yang et al. |
| 9,559,874 B2 | 1/2017 | Han et al. |
| 9,794,156 B2 * | 10/2017 | Ma ..................... H04L 7/042 |
| 9,825,838 B2 * | 11/2017 | Ma ..................... H04L 7/042 |
| 9,883,511 B1 | 1/2018 | Yang et al. |
| 2003/0138053 A1 | 7/2003 | Candy et al. |
| 2004/0131109 A1 * | 7/2004 | Kim ..................... H04B 1/7097 375/148 |
| 2004/0156443 A1 | 8/2004 | Dent |
| 2005/0275963 A1 * | 12/2005 | Ehrlich .............. G11B 5/59655 360/48 |
| 2006/0098746 A1 | 5/2006 | Candy et al. |
| 2006/0115031 A1 | 6/2006 | Lindskog et al. |
| 2006/0171493 A1 * | 8/2006 | Kim ................... H04L 27/2662 375/343 |
| 2007/0153930 A1 * | 7/2007 | Reid ................... H04L 25/0228 375/260 |
| 2008/0298515 A1 * | 12/2008 | Peyla ..................... H04L 1/20 375/343 |
| 2010/0302977 A1 | 12/2010 | Huy et al. |
| 2010/0309829 A1 | 12/2010 | Huy et al. |
| 2012/0155515 A1 | 6/2012 | Smith et al. |
| 2012/0183037 A1 | 7/2012 | Allpress et al. |
| 2012/0207234 A1 | 8/2012 | De Rosny et al. |
| 2012/0257660 A1 | 10/2012 | Smith et al. |
| 2012/0263056 A1 | 10/2012 | Smith et al. |
| 2012/0328037 A1 | 12/2012 | Hsu et al. |
| 2013/0201958 A1 | 8/2013 | Huy et al. |
| 2013/0208768 A1 * | 8/2013 | Song ..................... H04B 11/00 375/218 |
| 2013/0223503 A1 | 8/2013 | Smith et al. |
| 2013/0279561 A1 * | 10/2013 | Jin ..................... H04L 25/4902 375/239 |
| 2014/0022128 A1 | 1/2014 | Smith |
| 2014/0072071 A1 | 3/2014 | Berlin et al. |
| 2014/0126567 A1 | 5/2014 | Husain et al. |
| 2014/0169502 A1 * | 6/2014 | Lovell .................. H04L 5/0007 375/324 |
| 2014/0185596 A1 * | 7/2014 | Han ..................... H04B 1/7163 370/337 |
| 2015/0049745 A1 | 2/2015 | Han et al. |
| 2015/0195670 A1 * | 7/2015 | Agee ..................... H04W 4/70 375/133 |
| 2015/0236848 A1 * | 8/2015 | Ma ......................... H04L 7/042 370/328 |
| 2016/0013961 A1 * | 1/2016 | Dore .................... H04L 27/264 375/316 |
| 2016/0018508 A1 | 1/2016 | Chen et al. |
| 2016/0021670 A1 | 1/2016 | Yang et al. |
| 2016/0164669 A1 | 6/2016 | Ma et al. |
| 2016/0164767 A1 | 6/2016 | Ma et al. |
| 2016/0205569 A1 | 7/2016 | Han et al. |
| 2016/0315797 A1 | 10/2016 | Yang et al. |
| 2016/0316454 A1 | 10/2016 | Chen et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/052692 | 4/2012 |
| WO | WO 2012/151316 | 11/2012 |
| WO | WO 2013/126054 | 8/2013 |
| WO | WO 2016/011433 | 1/2016 |

OTHER PUBLICATIONS

Abbasi-Moghadam, D. et al., "A SIMO one-bit time reversal for UWB communication systems", EURASIP J. Wireless Comm. and Networking, 2012:113, 2012.
Albert, D. G. et al., "Time Reversal processing for source location in an urban environment (L)", J. Acoust. Soc. Am., vol. 118(2):616-619, Aug. 2005.
Alpcan, T. et al., "CDMA uplink power control as a noncooperative game", Wireless Networks, vol. 8(6):659-670, 2002.
Amoroso, F., "Optimum realizable transmitter waveforms for high-speed data transmission", Communication Technology, IEEE Transactions, vol. 14:8-13, Feb. 1966.
Andrews, J. et al., "What will 5g be?" IEEE J. Sel. Areas Commun., vol. 32, No. 6, pp. 1065-1082, 2014.
Artiga, X. et al., "Mutual coupling effects in multi-user massive MIMO base stations," in Proc. IEEE APSURSI, pp. 1-2, 2012.
Asadi, A. et al., "A survey on device-to-device communication in cellular networks", IEEE Communication Surveys & Tutorials, vol. 16(4):1801-1819, 2014.
Azzam, I. et al., "Linear Precoding for Multiuser MIMO Systems with Multiple Base Stations," in Proc. IEEE ICC, pp. 1-6, 2009.
Beyene, Y. et al., "Cloud-RAN architecture for indoor das," IEEE Access, vol. 2:1205-1212, 2014.
Boccardi, F., et al., "Five disruptive technology directions for 5g," IEEE Commun. Mag., vol. 52, No. 2, pp. 74-80, 2014.
Boche, H. and Schubert, M., "A general duality theory for uplink and downlink beamforming", IEEE Vehicular Technology Conference (VTC 2002-Fall), pp. 87-91, 2002.
Bogert, "Demonstration of Delay Distortion Correction by Time-Reversal Techniques," IRE Transactions on Communications Systems, Dec. 1957, pp. 2-7.
Brysev, A. P. et al., "Wave phase conjugation in ultrasonic beams", Physics-Uspekhi, vol. 41(8):793-805, 1998.
Cai, D. W. et al., "Coordinated max-min SIR optimization in multicell downlink-duality and algorithm", IEEE International Conference on Communications (ICC), Jan. 6, 2011.
Cai D. W. et al., Optimal max-min fairness rate control in wireless networks: Perron-frobenius characterization and algorithms, INFOCOM, pp. 648-656, 2012.

(56) References Cited

OTHER PUBLICATIONS

Cai, D. W. et al., "A unified analysis of max-min weighted SINR for MIMO downlink system", IEEE Transactions on Signal Processing, vol. 59(8):3850-3862, 2011.

Cai, D. W. et al., "Max-min SINR coordinated multipoint downlink transmissionduality and algorithms", IEEE Transactions on Signal Processing, vol. 60(1):5384-5395, 2010.

Chang, Y.-H. et al., "Ultrawideband Transceiver Design Using Channel Phase Precoding", IEEE Trans. Sig. Proc., vol. 55(7):3807-3822, Jul. 2007.

Chen, Y. et al., "Time-reversal wideband communications," IEEE Signal Processing Letters, vol. 20(12):1219-1222, Dec. 2013.

Chen, Y. et al., "Time-Reversal Wireless Paradigm for Green Internet of Things: An Overview", IEEE Internet of Things Journal, vol. 1(1):81-98, Feb. 2014.

Chen, C. et al., "Accurate sampling timing acquisition for baseband OFDM power-line communication in Non-Gaussian noise", Communications, IEEE Translations, vol. 61:1608-1620, Apr. 2013.

ChinaMobile, "C-ran: The road towards green ran," White Paper, Oct. 2011.

Chulajata, T. et al., "Coherent slot detection under frequency offset for W-CDMA", Vehicular Technology Conference, 2001, VTC 2001 Spring, IEEE VTS 53rd, vol. 3:119-1723, 2001.

Dai, B. et al., "Sparse beamforming and user-centric clustering for downlink cloud radio access network," IEEE Access, vol. 2, pp. 1326-1339, 2014.

Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.

Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.

de Lacerda Neto, R. et al., "Asymptotic analysis of channel division multiple access schemes for ultra-wideband systems," in Proc. IEEE SPAWC, pp. 186-190, 2008.

de Lacerda Neto, R. et al., "Channel division multiple access: The access solution for uwb networks," in Proc. IEEE ICUWB, pp. 309-314, 2014.

de Rosny, J. et al., "Theory of Electromagnetic Time-Reversal Mirrors", IEEE Trans. Antennas Propag., vol. 58(10):3139-3149, Oct. 2010.

Derode, A. et al., "Ultrasonic pulse compression with one-bit time reversal through multiple scattering", J. Appl. Phys., vol. 85(9):6343-6352, May 1999.

Derode, A. et al., "Taking Advantage of Multiple Scattering to Communicate with Time-Reversal Antennas", Phys. Rev. Lett., vol. 90(1): 014301-1-4, Jan. 2003.

Derode, A. et al., "Robust Acoustic Time Reversal and High-Order Multiple Scattering", Phys. Rev. Lett., vol. 75(23):4206-4210, Dec. 1995.

Doppler, K., "Device-to-device communication as an underlay to LTE-advanced networks", Communications Magazine, vol. 47(12):42-59, 2009.

Dorme, C. et al., "Focusing in transmit-receive mode through inhomogeneous media: The time reversal matched filter approach", J. Acoust. Soc. Am., vol. 98(2):1155-1162, Pt. 1, Aug. 1995.

Dubois, T. et al., "Performance of Time Reversal precoding technique for MISO OFDM systems", EURASIP Journal on Wireless Communications and Networking, 2013, doi: 10.1186/1687-1499-2013-260.

Edelmann, G.F. et al., "An Initial Demonstration of Underwater Acoustic Communication Using Time Reversal", IEEE Journal of Oceanic Engineering, vol. 27(3):602-609, Jul. 2002.

Emami, M. et al., "Matched Filtering with Rate Back-off for Low Complexity Communications in Very Large Delay Spread Channels," 38th Asilomar Conference on Signals, Systems and Computers, pp. 218-222, 2004.

Emami, S.M. et al., "Predicted Time Reversal Performance in Wireless Communications using Channel Measurements", publication details unknown, 2002.

Fannjiang, A. and Solna, K., "Superresolution and duality for time-reversal of waves in random media", Physics Letters A, vol. 342:22-29, Jul. 2005.

Fink, M. et al., "Acoustic Time-Reversal Minors", Inverse Problems, vol. 17:R1-R38, 2001.

Fink, M., "Time Reversal of Ultrasonic Fields—Part I: Basic Principals", IEEE Trans. Ultrasonics, Ferroelectrics and Freq. Contr., vol. 39(5):555-566, Sep. 1992.

Fink, M., "Time-Reversal Minors", J. Phys. D: Appl. Phys., vol. 26:1333-1350, 1993.

Fink, M., "Time-Reversed Acoustics", Scientific American, pp. 91-97, Nov. 1999.

Fink, M. et al., "Self focusing in inhomogeneous media with time reversal acoustic minors," IEEE Ultrasonics Symposium, vol. 1:681-686, 1989.

Fontana, R.J. et al., "Ultra-Wideband Precision Asset Location System", Proc. of the IEEE Conf. on UWB Sys. and Tech., pp. 147-150, 2002.

Gerlach, D. et al., "Base station transmitting antenna arrays for multipath environments", Signal Processing, vol. 54(1):59-73, 1996.

Guo, N. et al., "Reduced-Complexity UWB Time-Reversal Techniques and Experimental Results", IEEE Trans. on Wireless Comm., vol. 6(12):4221-4226, Dec. 2007.

Grandhi, S. A. et al., "Centralized power control in cellular radio systems," IEEE Transactions on Vehicular Technology, vol. 42(4):466-468, 1993.

Han, F. et al., "A multiuser TRDMA uplink system with 2D parallel interference cancellation," IEEE Transactions on Communications, vol. 62(3):1011-1022, Mar. 2014.

Han, F. et al., "An Interference Cancellation Scheme for the Multiuser TRDMA Uplink System," Global Telecommunications Conference, pp. 3583-3588, 2013.

Han, F., "Energy Efficient Optimization in Green Wireless Networks", University of Maryland Ph. D. Dissertation, 2013.

Han, F., et al., "Time-reversal division multiple access in multi-path channels," Global Telecommunications Conference, pp. 1-5, Dec. 2011.

Han, F. et al. "Time-reversal division multiple access over multi-path channels," IEEE Transactions on Communications, vol. 60(7):1953-1965, Jul. 2012.

Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.

Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.

Huang, Y. et al., "Joint beamforming and power control in coordinated multicell: Max-min duality, effective network and large system transition", IEEE Transactions on Wireless Communications, vol. 12(6):2730-2742, 2013.

Hunger, R. et al., "A General Rate Duality of the MIMO Multiple Access Channel and the MIMO Broadcast Channel," in Proc. IEEE Global Telecommun. Conf., 2008.

I, Chih-Lin et al., "Recent Progress on C-RAN Centralization and Cloudification," IEEE Access, vol. 2:1030-1039, 2014.

Janis, P. et al., "Interference-aware resource allocation for device-to-device radio underlaying cellular networks", VTC Spring 2009—IEEE 69th Vehicular Technology Conference, 2009, 5 pages.

Jin, Y. et al., "Time-Reversal Detection Using Antenna Arrays", IEEE Trans. Signal Processing, vol. 57(4):1396-1414, Apr. 2009.

Jin, Y. et al., "Adaptive time reversal beamforming in dense multipath communication networks," 2008 42nd Asilomar Conference on Signals, Systems and Computers, pp. 2027-2031, Oct. 2008.

Jin, Y. et al., "Multiple Antenna Time Reversal Transmission in Ultra-Wideband Communications," in Proc. IEEE GLOBECOM, pp. 26-30, 2007.

Keller, T. and Hanzo, L., "Orthogonal Frequency Division Multiplex Synchronisation Techniques for Wireless Local Area Net-

(56) References Cited

OTHER PUBLICATIONS works," Personal, Indoor and Mobile Radio Communications, PIMRC'96., Seventh IEEE International Symposium, vol. 3:963-967, Oct. 1996.

Kewen, L. et al., "A Novel TR-STBC-OFDM Scheme for Mobile WiMAX System," in Proc. IEEE ISAPE, pp. 1365-1368, 2008.

Khalegi, A. et al., "Demonstration of Time-Reversal in Indoor Ultra-Wideband Communication: Time Domain Measurement", IEEE Proc. of ISWCS, pp. 465-468, 2007.

Kim, J. et al., "Robust timing frequency synchronization techniques for OFDM-FDMA systems", Signal Processing Systems Design and Implementation, IEEE Workshop, pp. 716-719, Nov. 2005.

Kormylo, J. and Jain, V., "Two-pass recursive digital filter with zero phase shift", Acoustics, Speech and Signal Processing, IEEE Transactions, vol. 22:384-387, Oct. 1974.

Kuperman, W.A. et al., "Phase conjugation in the ocean: Experimental demonstration of an acoustic time-reversal mirror", J. Acoust. Soc. Am., vol. 103(1), pp. 25-40, Jan. 1998.

Kyritsi, P. et al., "One-bit Time Reversal for WLAN Applications", IEEE 16$^{th}$ Intern. Symp. on Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301, 2005.

Kyritsi, P. et al., "Time reversal techniques for wireless communications," IEEE Vehicular Technology Conference, vol. 1:47-51, 2004.

Lehman, S. et al., "Transmission mode time-reversal super-resolution imaging," J. Acoust. Soc. Amer., vol. 113(5):2742-2753, 2003.

Lemoult, F. et al., "Manipulating Spatiotemporal Degrees of Freedom in Waves of Random Media", Phys. Rev. Lett., vol. 103, 173902, Oct. 2009.

Lemoult, F. et al., "Resonant Metalenses for Breaking the Diffraction Barrier", Phys. Rev. Lett., vol. 104, 203901, May 2010.

Lerosey, G. et al., "Time Reversal of Electromagnetic Waves and Telecommunication", Radio Science, vol. 40, RS6S12, 2005.

Lerosey, G. et al., "Time Reversal of Electromagnetic Waves", Phys. Rev. Lett., vol. 92(19), 193904, May 2004.

Lerosey, G. et al., "Time Reversal of Wideband Microwaves", Appl. Phys. Lett., vol. 88, 154101, Apr. 2006.

Lerosey, G. et al., "Focusing beyond the diffraction limit with far-field time reversal", Science, vol. 315:1120-1122, Feb. 2007.

Lienard, M. et al., "Focusing gain model of time-reversed signals in dense multipath channels," IEEE Antennas and Wireless Propagation Letters, vol. 11:1064-1067, 2012.

Liu, D. et al., "Electromagnetic Time-Reversal Imaging of a Target in a Cluttered Environment," IEEE Transactions on Antennas and Propagation, AP-53, Sep. 9, 2005, pp. 3058-3066.

Liu, J. et al., "The Death of 5G part 2: Will analog be the death of Massive MIMO?" http://http://www.comsoc.org/ctn/death-5g-part-2-will-analog-be-death-massive-mimo, Jun. 2015.

Lorca, J. et al., "Lossless Compression Technique for the Fronthaul of LTE/LTE-Advanced Cloud-RAN Architectures," in 2013 IEEE 14th International Symposium and Workshops on a World of Wireless, Mobile and Multimedia Networks (WoWMoM), pp. 1-9, Jun. 2013.

Luo, S. et al., "Downlink and Uplink Energy Minimization Through User Association and Beamforming in C-RAN," Wireless Communications, IEEE Transactions on, vol. 14, No. 1, pp. 494-508, Jan. 2015.

Ma, H. et al., "Interference-Mitigating Broadband Secondary User Downlink System: A Time-Reversal Solution", Global Telecommunications Conference, pp. 884-889, 2013.

Ma, H. et al., "Time-reversal tunneling effect for cloud radio access network," IEEE Transactions on Wireless Communications, vol. 15(4):3030, Apr. 2016.

Maaz, M. et al., "Performance Analysis of Time-Reversal Based Precoding Schemes in MISO-OFDM Systems," in Proc. IEEE VTC, pp. 1-6, 2015.

Marzetta, T., "Noncooperative cellular wireless with unlimited numbers of base station antennas," IEEE Trans. Wireless Commun., vol. 9, No. 11, pp. 3590-3600, 2010.

Masouros, C. et al., "Large-scale MIMO transmitters in fixed physical spaces: the effect of transmit correlation and mutual coupling," IEEE Trans. Commun., vol. 61, No. 7, pp. 2794-2804, 2013.

Minn, H. et al., "On timing offset estimation for OFDM systems", Communications Letters, IEEE, vol. 4:242-244, Jul. 2000.

Montaldo, G. et al., "Telecommunication in a disordered environment with iterative time reversal", Waves Random Media, vol. 14:287-302, 2004.

Moura, J.M.F. and Y. Jin, "Detection by Time Reversal: Single Antenna", IEEE Trans. on Signal Process., vol. 55(1):187-201, Jan. 2007.

Moura, J.M.F. and Y. Jin, "Time Reversal Imaging by Adaptive Interference Canceling", IEEE Trans. on Signal Process., vol. 56(1):233-247, Jan. 2008.

Naqvi, I.H., et al., "Performance Enhancement of Multiuser Time Reversal UWB Communication System", Proc. of IEEE ISWCS, pp. 567-571, 2007.

Naqvi, I.H. et al., "Experimental validation of time reversal ultra wide-band communication system for high data rates", IET Microw. Antennas Propag., vol. 4(Iss. 5):643-650, 2010.

Naqvi, I.H. et al., "Effects of Time Variant Channel on a Time Reversal UWB System", Global Telecommunications Conference, 2009.

Ngo, H. et al., "Energy and Spectral Efficiency of Very Large Multiuser MIMO Systems," IEEE Trans. Commun., vol. 61, No. 4, pp. 1436-1449, 2013.

Nguyen, H. T., "On the performance of one bit time reversal for multi-user wireless communications", IEEE Proc. of ISWCS, pp. 672-676, 2007.

Nguyen, H. et al., "Antenna Selection for Time Reversal MIMO UWB Systems", IEEE Vehicle Technology Conference, pp. 1-5, 2009.

Nguyen, H. et al. "On the MSI Mitigation for MIMO UWB Time Reversal Systems", Proc. of IEEE International Conference on Ultra-Wideband, pp. 295-299, 2009.

Nguyen, H. et al., "Preequalizer Design for Spatial Multiplexing SIMO-UWB TR Systems", IEEE Trans. on Vehicular Tech., vol. 59(8):3798-3805, Oct. 2010.

Nguyen, H.T., "Partial one bit time reversal for UWB impulse radio multi-user communications", IEEE Proc. of ICCE, 2008.

Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.

Nguyen, T.K., H. Nguyen, F. Zheng and T. Kaiser, "Spatial Correlation in SM-MIMO UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Nguyen, H., et al., "The potential of time reversal techniques in multiple element antenna systems," IEEE Commun. Lett., vol. 9(1):40-42, 2005.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

Oestges, C. et al., "Time reversal techniques for broadband wireless communication systems," in European Microwave Conference (Workshop), Amsterdam, The Netherlands, pp. 49-66, 2004.

Parvulescu, A. and Clay, C. S., "Reproducibility of Signal Transmissions in the Ocean", The Radio and Electronic Engineer, pp. 223-228, Apr. 1965.

Pekka, J. et al., "Device-to-device communication underlaying cellular communications systems", Int'l J. of Communications, Network and System Sciences, vol. 2009.

(56) References Cited

OTHER PUBLICATIONS

Phan-Huy, D. T., S.B. Halima, M. Helard, "Frequency Division Duplex Time Reversal", Global Telecommunications Conference, (2011).

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Preis, D., "Phase equalization for magnetic recording", Acoustics, Speech, and signal Processing, IEEE International Conference on ICASSP, vol. 6:790-795, Apr. 1981.

Price, R., "A Communication Technique for Multipath Channels", Proceeding of the IRE, pp. 555-570, 1958.

Qiu, R. C. et al., "Time reversal with miso for ultra-wideband communications: Experimental results," IEEE Antenna and Wireless Propagation Letters, vol. 5:269-273 (2006).

Rao, X. et al., "Distributed fronthaul compression and joint signal recovery in cloud-ran," IEEE Transactions on Signal Processing, vol. 63(4):1056-1065, Feb. 2015.

Rappaport, T. et al., "Millimeter wave mobile communications for 5g cellular: It will work!" IEEE Access, vol. 1, pp. 335-349, 2013.

Rashid-Farrokhi, F. et al., "Transmit beamforming and power control for cellular wireless systems", IEEE Journal on Selected Areas in Communication, vol. 16(8):1437-1450, 1998.

Rode, J. P., M.J. Hsu, D. Smith and a. Hussain, "Collaborative Beamfocusing Radio (COBRA)", Proc. of SPIE, vol. 8753, pp. 87530J-1-87530J-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May, 2009.

Sampath, A. et al., "Power control and resource management for a multimedia Cdma wireless system", PIMRC, pp. 21-25, 1995.

Schmidl, T. and Cox, D., "Robust frequency and timing synchronization for OFDM", Communications, IEEE Translations, vol. 45:1613-1621, Dec. 1997.

Schubert, M. and Boche, H., "Solution of the multiuser downlink beamforming problem with individual SINR constraints", IEEE Transactions on Vehicular Technology, vol. 53(1):18-28, 2004.

Shen, Z. et al., "Adaptive resource allocation in multiuser OFDM systems with proportional rate constraints", IEEE Transactions on Wireless Communications, vol. 4(6):2726-2737, 2005.

Simeone, O., et al., "Downlink multicell processing with limited-backhaul capacity," EURASIP Journal on Advances in Signal Processing, vol. 2009, pp. 3:1-3:10, Feb. 2009.

Smulders, P. et al., "Characterisation of propagation in 60 GHz radio channels," Electron Commun. Eng. J., vol. 9, No. 2, pp. 73-80, Apr. 1997.

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Speth, M. et al., "Optimum receiver design for wireless broad-band systems using OFDM—Part I", IEEE Trans. Commun., vol. 47:1668-1677, Nov. 1999.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Tan, C. W. et al., "Maximizing sum rate and minimizing MSE on multiuser downlink: Optimality, fast algorithms and equivalence via max-min SINR", IEEE Transactions on Signal Processing, vol. 59(12):6127-6143, 2011.

Tehrani, M. N. et al., "Device-to-device communication in 5g cellular networks: challenges, solutions, and future directions", IEEE Communications Magazine, vol. 52(5):86-92, 2014.

Tse, D. N. And Viswanath, P., "Downlink-uplink duality and effective bandwidths", IEEE International Symposium on Information Theory, p. 52, 2002.

Telatar, E. et al., "Capacity of Multiple-antenna Gaussian Channels," European Trans. Telecommun., vol. 10(6):585-595, 1999.

van de Beek, J. et al., "ML estimation of time and frequency offset in OFDM systems", IEEE Trans. Signal Processing, vol. 45:1800-1805, Jul. 1997.

Visotsky, E. and Madhow, U., "Optimum beamforming using transmit antenna arrays", IEEE 49th Vehicular Technology Conference, pp. 851-856, 1999.

Vieira, S. Malkowsky, K. Nieman, Z. Miers, N. Kundargi, L. Liu, I. Wong, V. Owall, O. Edfors, and F. Tufvesson, "A flexible 100-antenna testbed for Massive MIMO," in Proc. IEEE GC Wkshps, pp. 287-293, 2014.

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wang, Y. et al., "Full Rate Orthogonal Space-Time Block Coding in OFDM Transmission Using Time Reversal". WCNC 2009.

Wang, B. et al., "Green wireless communications: A time-reversal paradigm," IEEE Journal of Selected Areas in Communications, vol. 29:1698-1710, 2011.

Wang, R. et al., "Potentials and Challenges of C-RAN Supporting Multi-RATs Toward 5G Mobile Networks," IEEE Access, vol. 2, pp. 1187-1195, 2014.

Webb, M. et al. "Future evolution in wireless network architectures: Towards a 'cloud of antennas'," in Vehicular Technology Conference (VTC Fall), IEEE, Sep. 2012, pp. 1-5, 2012.

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39(5):567-578, Sep. 1992.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Xu, Q. et al., "Joint power control and signature design for time-reversal uplinks", in IEEE China SIP, 2015.

Xu, S. et al., "Effective interference cancellation scheme for device-to-device communication underlaying cellular networks," in Vehicular Technology Conference Fall (VTC 2010-Fall), 2010 IEEE 72nd. IEEE, 2010, pp. 1-5.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Y.-H., Wang, B., Lin, W.S., Liu, K.J.R., "Near-Optimal Waveform Design for Sum Rate Optimization in Time-Reversal Multiuser Downlink Systems," IEEE Trans Wireless Communications, vol. 12(1):346-357, Jan. 2013.

Yang, W. et al., "Optimal downlink power assignment for smart antenna systems," IEEE International Conference on Acoustics, Speech and Signal Processing, pp. 3337-3340, 1998.

Yates, R. D., "A framework for uplink power control in cellular radio systems", IEEE Journal on Selected Areas in Communications, vol. 13(7):1341-1347, 1995.

Ye, Q. et al., "Distributed resource allocation in device-to-device enhanced cellular networks," 2014.

(56) References Cited

OTHER PUBLICATIONS

Yoon, E. et al., "a time-reversal-based transmission using predistortion for intersymbol interference alignment," IEEE Trans. Commun., vol. 63(2) 455-465, 2014.

Yu, C.-H. et al., "Resource sharing optimization for device-to-device communication underlaying cellular networks", IEEE Transactions on Wireless Communications, vol. 10(8):2752-2763, 2011.

Zakhour, R. et al., "Optimized data sharing in multicell MIMO with finite backhaul capacity," IEEE Transactions on Signal Processing, vol. 59(12):6102-6111, Dec. 2011.

Zander, J. "Performance of optimum transmitter power control in cellular radio systems," IEEE Transactions on Vehicular Technology, vol. 41(1):57-62, 1992.

Zhou, X., P.C.F. Eggers, P. Kyritsi, J.B. Andersen, G.F. Pedersen and J.O. Nilsen, "Spatial Focusing and Interference Reduction using Miso Time Reversal in an Indoor Application", IEEE Proc. of SSP, pp. 307-311, 2007.

Zhou, C. et al., "Performance Study on Time Reversed Impulse MIMO for UWB Communications Based on Measured Spatial Uwb Channels," in Proc. IEEE MILCOM, pp. 1-6, 2007.

Zhou, Y. et al., "Optimized backhaul compression for uplink cloud radio access network," IEEE Journal on Selected Areas in Communications, vol. 32(6):1295-1307, Jun. 2014.

\* cited by examiner

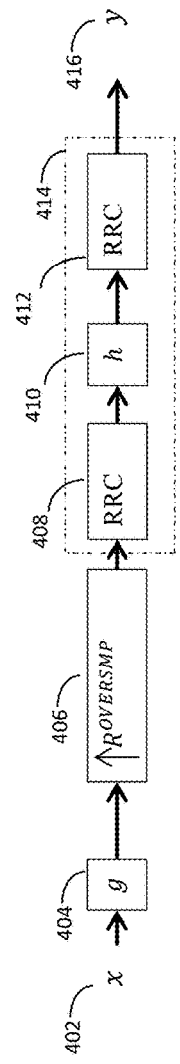
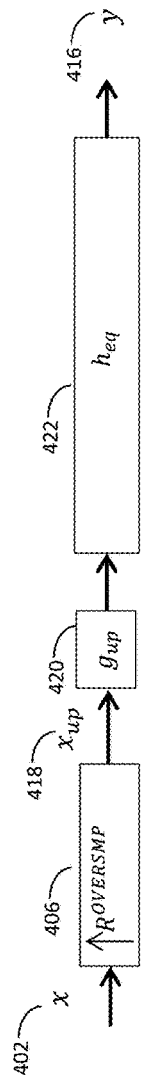
FIG. 13A
FIG. 13B

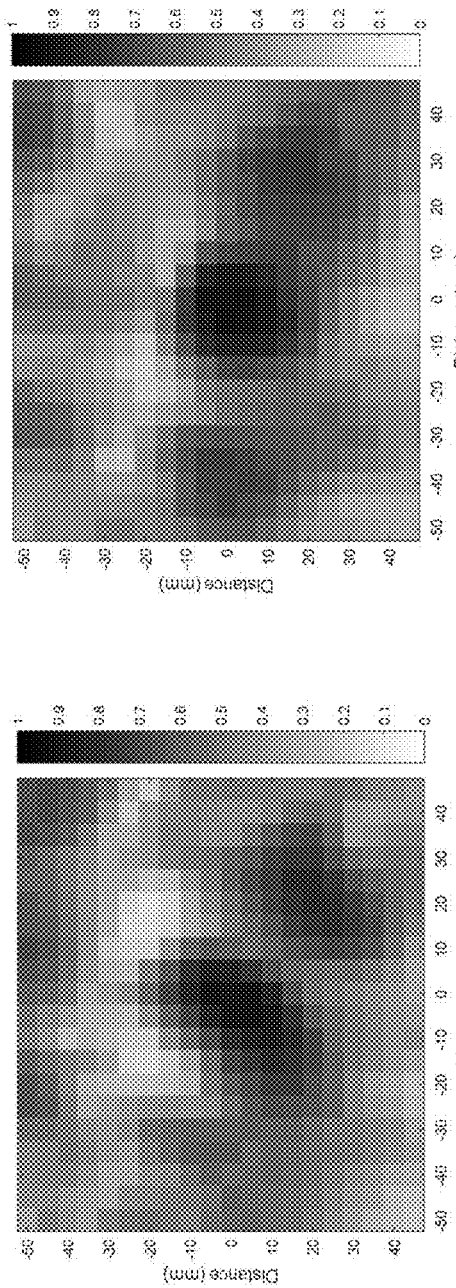
FIG. 18D 120MHz bandwidth
FIG. 18C 40MHz bandwidth
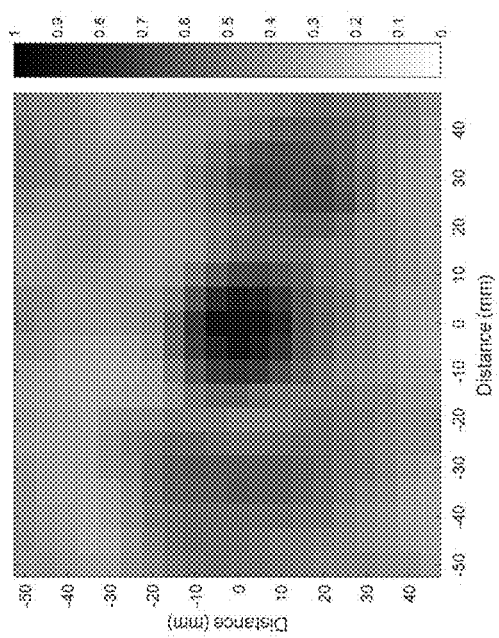
FIG. 18E 360MHz bandwidth

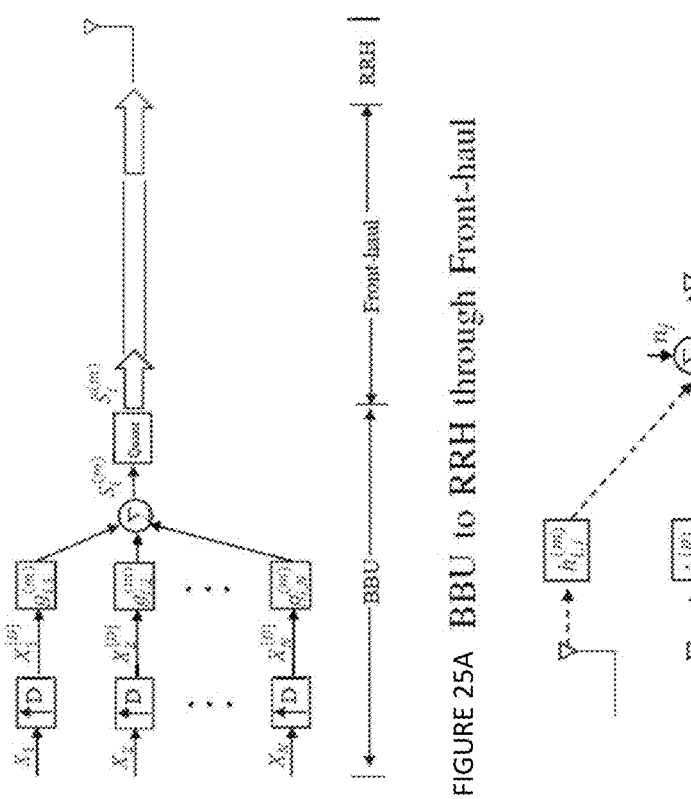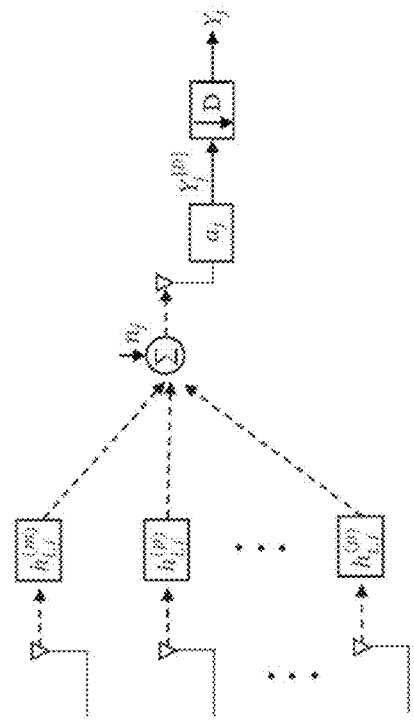
FIGURE 25A  BBU to RRH through Front-haul
FIGURE 25B  RRHs to Subscribed TD $j$ RRHs to BBUs through front-haul link TD j to All Corresponding RRHs TR-CDMA Transmitter, downlink TR-CDMA Transmitter, uplink TR-CDMA Receiver, Uplink Performance comparison between the TR, the CDMA and the TR-CDMA systems

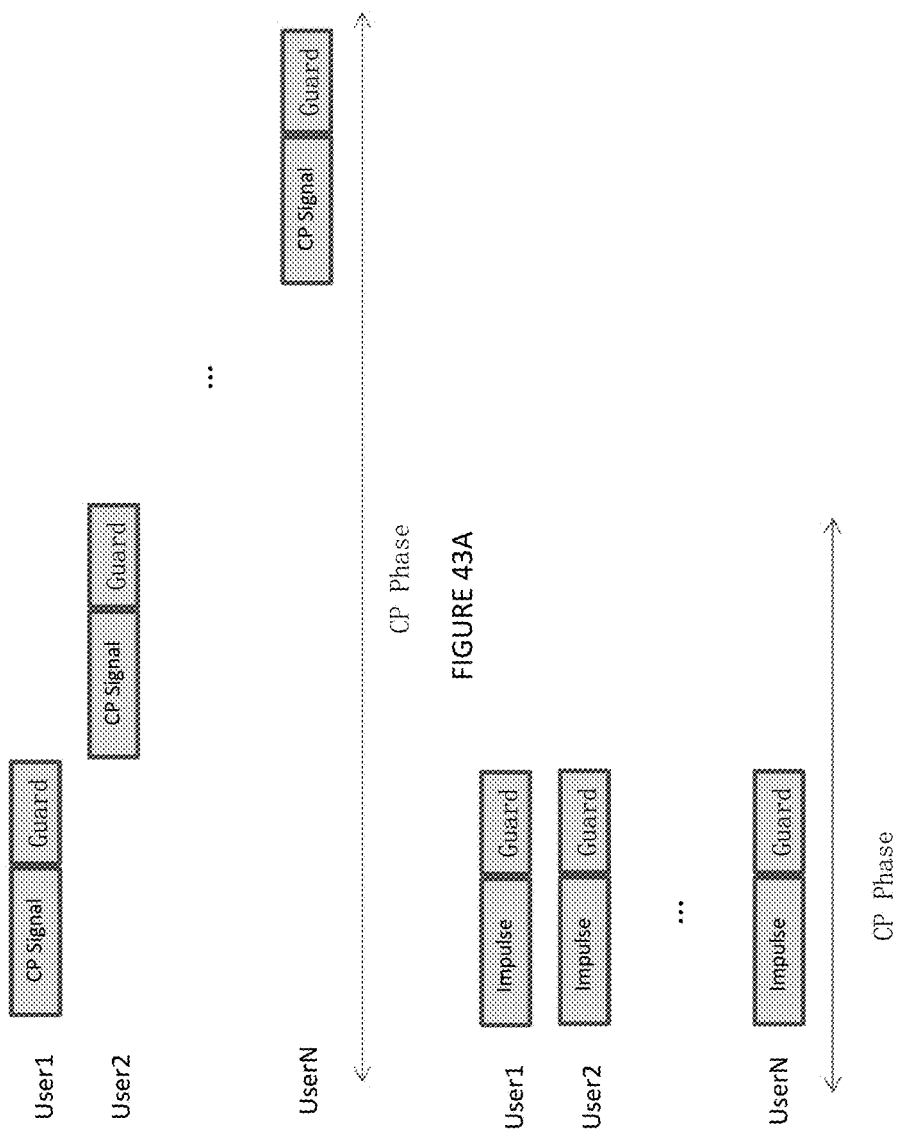

TIME-REVERSAL COMMUNICATION SYSTEMS

CROSS-REFERENCE TO RELATED APPLICATIONS

This application claims priority to U.S. application Ser. No. 62/235,958, filed on Oct. 1, 2015, the entire contents of which are herein incorporated by reference.

TECHNICAL FIELD

This disclosure relates to collecting and processing location-specific wireless waveforms for use in wireless communication, components, methods and apparatuses.

BACKGROUND

One challenge that may be addressed in the future using novel wireless signaling protocols is high-speed and efficient wireless data transfer to and from huge numbers of potentially closely spaced devices. The demand for high-speed and low-latency wireless communication capabilities has increased dramatically in recent years. It has been projected that by the year 2020, the volume of wireless traffic will rise to about one thousand times that of the year 2010. Supporting these traffic demands will be a challenge for future wireless networks. One challenge will be supporting the huge number of wireless devices with ever-growing demands for higher data rates within the allocated spectrum. Another will be the scheduling delay that is expected to accompany large numbers of coexisting wireless devices competing for network service and the significant deterioration of the user experience in many delay-sensitive applications. Some network users have already started to feel the impact of such delays in places such as airports, conference halls, and stadiums where it is difficult to access the wireless network with hundreds of other devices around. Such poor user experiences may become the norm if new technologies are not introduced to deal with the predicted growth of wireless traffic.

Several technologies have been proposed to tackle this challenge. One straightforward approach is to install more access points (APs) in a given coverage area such that each AP can service a smaller number of terminal devices (TDs) and therefore more traffic can be offloaded to the wired backhaul networks. However, APs that utilize the widely adopted and deployed OFDM protocols can interfere with each other when they are deployed too close together. Sophisticated interference mitigation and resource allocation algorithms may be used to enable the closely spaced APs to accommodate multiple users. For instance, in the IEEE 802.11 (WiFi) standard, the overall available spectrum is 72 MHz in the 2.4 GHz band but adjacent APs may be restricted to utilizing 22 MHz or less of the available spectrum because they may each need to operate in different spectral bands to reduce interference with each other and with the TDs. But this kind of frequency division multiplexing may hinder closely-spaced APs from fully utilizing the available spectrum and therefore supporting the predicted user demands of the future. Moreover, in such schemes, channel planning can be time-consuming and may fail altogether, either because of a lack of communication among multiple APs, or a lack of enough independent spectral bands to support the traffic demands. The system may suffer when APs are added or removed from the network because the channel planning may need to be done all over again.

Femtocell networks or device-to-device (D2D) communication networks may suffer from similar issues since the interference between macro- and/or femto-base stations or among multiple femto-base stations or among multiple D2D links need to be coordinated and mitigated by division of the network resources, which may result in reducing the spectral allocation to individual users or cells. Therefore, while installing more OFDM (or similar existing protocol) based access points in a given wireless coverage area may be straightforward and a suitable solution for some applications, this solution alone does not appear to scale well enough to meet the predicted growth in traffic demands of future wireless network capabilities.

Another possible approach is to use multiple-input-multiple-output (MIMO) techniques such as have been incorporated in some existing OFDM based schemes such as WiFi and LTE (Long Term Evolution) to improve the spectral efficiency and/or reduce the scheduling delay of wireless networks. For example, multi-user multiple-input-multiple-output (MU-MIMO) techniques are able to support multiple simultaneous transmissions. However, in addition to the difficulty in operating multiple antennas, the number of supported simultaneous transmissions may be limited. Therefore, this solution alone may not be sufficient for the high network densification challenge described above. Recently, researchers have begun to investigate so-called massive MIMO techniques that use many more antennas than active terminals so that the extra antennas can help focus the wireless signal energy into smaller regions and support some level of spatial multiplexing in addition to frequency multiplexing. While the massive MIMO technique brings some unique benefits beyond the traditional MIMO system, the cost and complexity of implementing these schemes scales up with the number of antennas, which may hinder it from being widely adopted. The principle of utilizing extra antennas can also be applied in distributed antenna systems where some additional antennas are placed close to the users. The wireless signal energy can be focused into a small area through the coordination of the local antennas and thus the system may be able to provide high data rates for certain terminal devices. However, the complexity of the system and of coordinating the antennas grows with the system size, which may limit the scalability of this solution. Therefore, there is a need for wireless communication technologies that can efficiently and cost-effectively meet the ever increasing demands for wireless access to the internet.

Another candidate solution is the cloud-based radio access networks (C-RAN), where all baseband processing is carried out through high performance computing in a centralized structure, which transforms the evolution of the wireless networks from today's cell-centric architecture into a device-centric architecture. Nevertheless, as with networks densification, the limited front-haul link capacity may prevent the C-RAN from fully utilizing the benefits made possible by concentrating the processing intelligence at the cloud.

Moreover, the operation of a large number of base stations and heterogeneous devices will consume a lot of energy. Therefore, the next generation networks should focus on achieving better energy efficiency and reduce the complexity of user devices as much as possible.

SUMMARY

In a general aspect, an apparatus for determining symbol timing in a communication system is provided, the apparatus comprises: a memory communicatively coupled to at least one processor; and the at least one processor configured to: receive a first signal that comprises a preamble sent at a first sampling rate with a first modulation through a channel and a data frame sent at a second sampling rate with a second modulation through the channel, wherein the preamble comprises a received code sequence, and the data frame comprises a plurality of data symbols, compute a second signal that represents an estimate of an equivalent channel response using at least one of a known code sequence and the received first signal, wherein the received code sequence in the preamble sent at the first sampling rate with the first modulation through the channel is based on the known code sequence, down-sample the second signal and compute signal-to-interference-plus-noise ratios at a plurality of candidate timing offsets, determine a symbol timing based on a particular timing offset associated with a largest computed signal-to-interference-plus-noise ratio, and determine the data symbols in the data frame sent at the second sampling rate with the second modulation through the channel based on the determined symbol timing.

In another general aspect, an apparatus includes a memory communicatively coupled to at least one processor; and the at least one processor configured to: receive a first signal that comprises: a preamble sent at a first sampling rate with a first modulation through a channel and a data frame sent at a second sampling rate with a second modulation through the channel, wherein the preamble to comprise a first up-sampled version of a known code sequence, and wherein the data frame to comprise a second up-sampled version of a plurality of data symbols, compute a second signal that represents an estimate of an equivalent channel response using the received first signal and the first up-sampled version of the known code sequence, wherein the second signal to comprise a plurality of samples, down-sample the second signal and compute values of a parameter based on information about signal power and interference power at a plurality of candidate timing offsets, and determine a symbol timing based on a particular timing offset associated with a largest computed value of the parameter.

In another general aspect, a method for determining symbol timing in a communication system is provided. The method includes receiving a first signal that comprises a preamble sent at a first sampling rate with a first modulation through a channel and a data frame sent at a second sampling rate with a second modulation through the channel, wherein the preamble to comprise a known pseudo-random sequence, and the data frame to comprise a plurality of data symbols; computing a second signal that represents an estimate of an equivalent channel response using the received first signal and the known pseudo-random sequence; down-sampling the second signal and computing signal-to-interference-plus-noise ratios at a plurality of candidate timing offsets; and determining a symbol timing based on a particular timing offset associated with a largest computed signal-to-interference-plus-noise ratio.

In another general aspect, a method for estimating carrier frequency offset (CFO) in a communication system is provided. The method includes receiving a first signal comprising a series of data blocks and pilot blocks arranged in an alternating order such that at least one data block is positioned between each pair of adjacent pilot blocks, wherein the first signal comprises a carrier frequency mismatch between a transmitter and a receiver to be compensated, wherein each pilot block comprises a plurality of pilot symbols, wherein each data block comprises a plurality of data symbols, and wherein all pilot blocks comprise the same plurality of pilot symbols; determining pairwise auto-correlations of a plurality of pairs of pilot blocks, wherein each of a subset of the pilot blocks is used in the determination of more than one pairwise auto-correlations; and estimating a carrier frequency offset associated with the carrier frequency mismatch based on the pairwise auto-correlations of the plurality of pairs of pilot blocks.

In another general aspect, an apparatus for estimating carrier frequency offset (CFO) in a communication system is provided. The apparatus includes a memory communicatively coupled with at least one processor; and the at least one processor configured to: receive a first signal comprising a series of data blocks and pilot blocks arranged in an alternating order such that at least one data block is positioned between each pair of adjacent pilot blocks, wherein the first signal comprises a carrier frequency mismatch between a transmitter and a receiver to be compensated, wherein each pilot block comprises a plurality of pilot symbols, wherein each data block comprises a plurality of data symbols, and wherein all pilot blocks comprise the same plurality of pilot symbols; determine pairwise auto-correlations of a plurality of pairs of pilot blocks, wherein each of a subset of the pilot blocks is used in the determination of more than one pairwise auto-correlations; and estimate a carrier frequency offset associated with the carrier frequency mismatch based on the pairwise auto-correlations of the plurality of pairs of pilot blocks.

In another general aspect, a method includes generating a first data frame comprising a series of data blocks and pilot blocks arranged in an alternating order such that at least one data block is positioned between each pair of adjacent pilot blocks, wherein a first signal generated from the first data frame is transmitted from a transmitter to a terminal device through a wireless multipath channel, whereas the first signal received by the terminal device comprises a carrier frequency mismatch between the transmitter and the terminal device to be compensated in the terminal device, wherein each data block comprises a plurality of data symbols, wherein the data symbols are intended to be received by the terminal device, wherein each pilot block comprises a plurality of pilot symbols, wherein all pilot blocks comprise the same plurality of pilot symbols, wherein the pilot blocks are configured to facilitate the terminal device to determine a carrier frequency offset associated with the carrier frequency mismatch; up-sampling the first data frame by a rate back-off factor to generate a second data frame; generating the first signal that comprises a preamble and the second data frame; generating a second signal based on the first signal and a location-specific signature waveform associated with a location of the terminal device; and transmitting at least one of the second signal and a processed version of the second signal from the transmitter to the terminal device through the wireless multipath channel using: a first modulation for a first part of the second signal associated with the preamble, and a second modulation for a second part of the second signal associated with the second data frame.

In another general aspect, an apparatus includes a memory communicatively coupled with at least one processor; the at least one processor configured to: generate a first data frame comprising a series of data blocks and pilot blocks arranged in an alternating order such that at least one data block is positioned between each pair of adjacent pilot blocks, wherein a first signal generated from the first data frame is transmitted from a transmitter to a terminal device through a wireless multipath channel, whereas the first signal received by the terminal device comprises a carrier frequency mismatch between the transmitter and the terminal device to be compensated in the terminal device, wherein each data block comprises a plurality of data symbols, wherein the data symbols are intended to be received by the terminal device, wherein each pilot block comprises a plurality of pilot symbols, wherein all pilot blocks comprise the same plurality of pilot symbols, wherein the pilot blocks are configured to facilitate the terminal device to determine a carrier frequency offset associated with the carrier frequency mismatch, up-sample the first data frame by a rate back-off factor to generate a second data frame, generate the first signal that comprises a preamble and the second data frame, and generate a second signal based on the first signal and a location-specific signature waveform associated with a location of the terminal device; and a transmitter to transmit at least one of the second signal and a processed version of the second signal to the terminal device through the wireless multipath channel using: a first modulation for a first part of the second signal associated with the preamble, and a second modulation for a second part of the second signal associated with the second data frame.

In another general aspect, a time-reversal based wireless broadband base station includes an input broadband module configured, in a channel probing mode, to receive asynchronously a respective wireless broadband probe signal from each of at least one heterogeneous wireless broadband terminal device at a respective location in a rich scattering environment through a broadband multipath channel with a respective set of multiple wireless propagation paths and an effective passband with effective bandwidth W0, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, wherein L is not smaller than 10; at least one processor configured to, for each of the at least one heterogeneous wireless broadband terminal device: determine asynchronously, in the channel probing mode, a respective location-specific signature for a respective heterogeneous wireless broadband terminal device based on the respective wireless broadband probe signal from the respective heterogeneous wireless broadband terminal device at the respective location, wherein the respective location-specific signature depends on the respective location of the respective heterogeneous wireless broadband terminal device and the respective set of multiple wireless propagation paths in the rich scattering environment, store and update the respective location-specific signature for the respective heterogeneous wireless broadband terminal device asynchronously in the channel probing mode, generate asynchronously, in a data transmission mode, a respective data signal based on the respective stored and updated location-specific signature and a respective digital data to be sent to the respective heterogeneous wireless broadband terminal device, and add the respective data signal asynchronously to a first signal in the data transmission mode; wherein the at least one processor further configured to: generate, in the data transmission mode, the first signal which is an asynchronous combination of all respective data signals for the at least one heterogeneous wireless broadband terminal device comprising all respective digital data to be sent to the at least one heterogeneous wireless broadband terminal device, and generate, in the data transmission mode, a second signal by filtering the first signal with a first filter; and an output broadband module configured, in the data transmission mode, to transmit a wireless broadband downlink signal with bandwidth W1 comprising the second signal to the at least one heterogeneous wireless broadband terminal device.

In another general aspect, a time-reversal based wireless broadband base station includes an input broadband module configured to receive asynchronously N wireless broadband probe signals from N heterogeneous wireless broadband terminal devices located at N respective locations in a rich scattering environment through a wireless broadband multipath channel with N respective sets of multiple wireless propagation paths and an effective passband with effective bandwidth W0, wherein N is a positive integer greater than 1, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, and wherein L is not smaller than 10; at least one processor configured to: determine asynchronously, based on the N wireless broadband probe signals, N location-specific signatures each being associated with a respective location of a respective heterogeneous wireless broadband terminal device, store and update asynchronously the N location-specific signatures, generate N data signals asynchronously based on the N stored and updated location-specific signatures respectively, with each data signal associated with a respective set of digital data symbols intended for respective heterogeneous wireless broadband terminal device, wherein the respective set of digital data symbols intended for the respective heterogeneous wireless broadband terminal device are up-sampled asynchronously by respective rate back-off factor D, generate a composite signal by combining the N data signals asynchronously, and generate a filtered composite signal by applying a filter with filter bandwidth not smaller than a lower bound B, wherein B is not larger than W0; an output broadband module configured to transmit a wireless broadband downlink signal with bandwidth F1 comprising the filtered composite signal, wherein the N location-specific signatures in the wireless broadband downlink signal to enable respective portions of the wireless broadband downlink signal to converge and focus at the N heterogeneous wireless broadband terminal devices respectively to cause respective data signals comprising respective digital data symbols to be received by respective heterogeneous wireless broadband terminal devices such that each heterogeneous wireless broadband terminal device primarily receives only the digital data symbols intended for the heterogeneous wireless broadband terminal device, and wherein the lower bound B of the filter bandwidth is determined based on the number N of heterogeneous wireless broadband terminal devices.

In another general aspect, a time-reversal based heterogeneous wireless broadband terminal device at a location in a rich scattering environment configured to: transmit asynchronously, in a channel probing mode, a wireless broadband probe signal to an input broadband module of a wireless broadband base station through a broadband multipath channel with a set of multiple wireless propagation paths and an effective passband with effective bandwidth W0, wherein another N−1 time-reversal based heterogeneous wireless broadband terminal device to transmit asynchronously, in the channel probing mode, another N−1 wireless broadband probe signals to the input broadband module of the wireless broadband base station through the broadband multipath channel with another N−1 set of multiple wireless propagation paths and the effective passband with effective bandwidth W0, wherein W0 is not smaller than 20 MHz, wherein a sampling frequency F0 of an analog-to-digital conversion unit of the input broadband module of the wireless broadband base station is high enough such that L multipaths are resolvable by the input broadband module, wherein F0 is dependent on effective bandwidth W0 of the broadband multipath channel and F0 is not smaller than 2*W0, wherein L is not smaller than 10; wherein at least one processor of the wireless broadband base station is configured to, for the time-reversal based heterogeneous wireless broadband terminal device and the another N−1 time-reversal based heterogeneous wireless broadband terminal device: determine asynchronously, in the channel probing mode, a respective location-specific signature for a respectively one of the N terminal devices based on a respective probe signal from the respective one of the N terminal devices at a respective location, wherein the respective location-specific signature depends on the respective location of the respective one of the N terminal devices and the respective set of multiple wireless propagation paths in the rich scattering environment, store and update the respective location-specific signature for the respective one of the N terminal devices asynchronously in the channel probing mode, generate asynchronously, in a data transmission mode, a respective data signal based on the respective stored and updated location-specific signature and a respective digital data to be sent to the respective one of the N terminal devices, and add the respective data signal asynchronously to a first signal in the data transmission mode; wherein the at least one processor of the wireless broadband base station is further configured to: generate, in the data transmission mode, the first signal which is an asynchronous combination of all respective data signals for the N terminal devices comprising all respective digital data to be sent to the N terminal devices, and generate, in the data transmission mode, a second signal by filtering the first signal with a first filter with filter bandwidth not smaller than a lower bound B, wherein B is not larger than W0; and wherein an output broadband module of the wireless broadband base station configured, in the data transmission mode, to transmit a wireless broadband downlink signal with bandwidth W1 comprising the second signal to the two terminal devices such that a respective portion of the wireless broadband downlink signal converges and focuses at the respective one of the N terminal devices carrying the respective data signal; and receive the wireless broadband downlink signal comprising the second signal which in turn comprises the digital data to be sent from the wireless broadband base station to the time-reversal based heterogeneous wireless broadband terminal device.

In another general aspect, a method of a time-reversal based wireless broadband base station includes receiving asynchronously using an input broadband module of the time-reversal based broadband base station, in a channel probing mode, a respective wireless broadband probe signal from each of at least one heterogeneous wireless broadband terminal device at a respective location in a rich scattering environment through a broadband multipath channel with a respective set of multiple wireless propagation paths and an effective passband with effective bandwidth W0, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, wherein L is not smaller than 10; configuring at least one processor of the time-reversal based broadband base station to, for each of the at least one heterogeneous wireless broadband terminal device: determine asynchronously, in the channel probing mode, a respective location-specific signature for a respective heterogeneous wireless broadband terminal device based on the respective wireless broadband probe signal from the respective heterogeneous wireless broadband terminal device at the respective location, wherein the respective location-specific signature depends on the respective location of the respective heterogeneous wireless broadband terminal device and the respective set of multiple wireless propagation paths in the rich scattering environment, store and update the respective location-specific signature for the respective heterogeneous wireless broadband terminal device asynchronously in the channel probing mode, generate asynchronously, in a data transmission mode, a respective data signal based on the respective stored and updated location-specific signature and a respective digital data to be sent to the respective heterogeneous wireless broadband terminal device, and add the respective data signal asynchronously to a first signal in the data transmission mode; configuring the at least one processor further to: generate, in the data transmission mode, the first signal which is an asynchronous combination of all respective data signals for the at least one heterogeneous wireless broadband terminal device comprising all respective digital data to be sent to the at least one heterogeneous wireless broadband terminal device, and generate, in the data transmission mode, a second signal by filtering the first signal with a first filter; and transmitting using an output broadband module of the time-reversal based broadband base station, in the data transmission mode, a wireless broadband downlink signal with bandwidth W1 comprising the second signal to the at least one heterogeneous wireless broadband terminal device.

In another general aspect, a method of a time-reversal based wireless broadband base station includes receiving asynchronously using an input broadband module of the time-reversal based wireless broadband base station, in a channel probing mode, N wireless broadband probe signals from N heterogeneous wireless broadband terminal devices located at N respective locations in a rich scattering environment through a wireless broadband multipath channel with N respective sets of multiple wireless propagation paths and an effective passband with effective bandwidth W0, wherein N is a positive integer greater than 1, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, and wherein L is not smaller than 10; configuring at least one processor to: determine asynchronously, in the channel probing mode, based on the N wireless broadband probe signals, N location-specific signatures each being associated with a respective location of a respective heterogeneous wireless broadband terminal device, store and update asynchronously the N location-specific signatures in the channel probing mode, generate, in a data transmission mode, N data signals asynchronously based on the N stored and updated location-specific signatures respectively, with each data signal associated with a respective set of digital data symbols intended for respective heterogeneous wireless broadband terminal device, wherein the respective set of digital data symbols intended for the respective heterogeneous wireless broadband terminal device are up-sampled asynchronously by respective rate back-off factor D, generate, in the data transmission mode, a composite signal by combining the N data signals asynchronously, and generate, in the data transmission mode, a filtered composite signal by applying a filter with filter bandwidth not smaller than a lower bound B, wherein B is not larger than W0; transmitting using an output broadband module, in the data transmission mode, a wireless broadband downlink signal with bandwidth F1 comprising the filtered composite signal, wherein the N location-specific signatures in the wireless broadband downlink signal to enable respective portions of the wireless broadband downlink signal to converge and focus at the N heterogeneous wireless broadband terminal devices respectively to cause respective data signals comprising respective digital data symbols to be received by respective heterogeneous wireless broadband terminal devices such that each heterogeneous wireless broadband terminal device primarily receives only the digital data symbols intended for the heterogeneous wireless broadband terminal device, and wherein the lower bound B of the filter bandwidth is determined based on the number N of heterogeneous wireless broadband terminal devices.

In another general aspect, a method of a time-reversal based heterogeneous wireless broadband terminal device at a location in a rich scattering environment includes transmitting asynchronously, in a channel probing mode, a wireless broadband probe signal from each of N time-reversal based heterogeneous wireless broadband terminal devices to an input broadband module of a wireless broadband base station through a broadband multipath channel with a respective set of multiple wireless propagation paths and an effective passband with effective bandwidth W0, wherein W0 is not smaller than 20 MHz, wherein a sampling frequency F0 of an analog-to-digital conversion unit of the input broadband module of the wireless broadband base station is high enough such that L multipaths are resolvable by the input broadband module, wherein F0 is dependent on effective bandwidth W0 of the broadband multipath channel and F0 is not smaller than 2*W0, and wherein L is not smaller than 10; configuring at least one processor of the wireless broadband base station to, for the time-reversal based heterogeneous wireless broadband terminal device and the another N−1 time-reversal based heterogeneous wireless broadband terminal device: determine asynchronously, in the channel probing mode, a respective location-specific signature for a respectively one of the N terminal devices based on a respective probe signal from the respective one of the N terminal devices at a respective location, wherein the respective location-specific signature depends on the respective location of the respective one of the N terminal devices and the respective set of multiple wireless propagation paths in the rich scattering environment, store and update the respective location-specific signature for the respective one of the N terminal devices asynchronously in the channel probing mode, generate asynchronously, in a data transmission mode, a respective data signal based on the respective stored and updated location-specific signature and a respective digital data to be sent to the respective one of the N terminal devices, and add the respective data signal asynchronously to a first signal in the data transmission mode; configuring the at least one processor of the wireless broadband base station further to: generate, in the data transmission mode, the first signal which is an asynchronous combination of all respective data signals for the N terminal devices comprising all respective digital data to be sent to the N terminal devices, and generate, in the data transmission mode, a second signal by filtering the first signal with a first filter with filter bandwidth not smaller than a lower bound B, wherein B is not larger than W0; transmitting, in the data transmission mode, a wireless broadband downlink signal with bandwidth W1 comprising the second signal from an output broadband module of the wireless broadband base station to the N terminal devices such that a respective portion of the wireless broadband downlink signal converges and focuses at the respective one of the N terminal devices carrying the respective data signal; and receiving by the respective one of the N terminal devices, in the data transmission mode, the wireless broadband downlink signal comprising the second signal which in turn comprises the respective digital data to be sent from the wireless broadband base station to the respective one of the N terminal devices.

In another general aspect, a system of time-reversal based wireless communication system, comprising: at least one heterogeneous wireless broadband terminal device each at a respective location in a rich scattering environment wirelessly coupled with a wireless broadband base station through a broadband multipath channel to receive respective digital data from the wireless broadband base station through the broadband multipath channel; the wireless broadband base station comprising: an input broadband module configured, in a channel probing mode, to receive asynchronously a respective wireless broadband probe signal from each of the at least one heterogeneous wireless broadband terminal device at the respective location in the rich scattering environment through the broadband multipath channel with a respective set of multiple wireless propagation paths and an effective passband with effective bandwidth W0, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, wherein L is not smaller than 10; at least one processor configured to, for each of the at least one heterogeneous wireless broadband terminal device: determine asynchronously, in the channel probing mode, a respective location-specific signature for a respective heterogeneous wireless broadband terminal device based on the respective wireless broadband probe signal from the respective heterogeneous wireless broadband terminal device at the respective location, wherein the respective location-specific signature depends on the respective location of the respective heterogeneous wireless broadband terminal device and the respective set of multiple wireless propagation paths in the rich scattering environment, store and update the respective location-specific signature for the respective heterogeneous wireless broadband terminal device asynchronously in the channel probing mode, generate asynchronously, in a data transmission mode, a respective data signal based on the respective stored and updated location-specific signature and the respective digital data to be sent to the respective heterogeneous wireless broadband terminal device, and add the respective data signal asynchronously to a first signal in the data transmission mode; wherein the at least one processor further configured to: generate, in the data transmission mode, the first signal which is an asynchronous combination of all respective data signals for the at least one heterogeneous wireless broadband terminal device comprising all respective digital data to be sent to the at least one heterogeneous wireless broadband terminal device, and generate, in the data transmission mode, a second signal by filtering the first signal with a first filter; and an output broadband module configured, in the data transmission mode, to transmit a wireless broadband downlink signal with bandwidth W1 comprising the second signal which in turn comprises the respective digital data to the respective heterogeneous wireless broadband terminal device.

In another general aspect, a system of a time-reversal based wireless communication system, including: N heterogeneous wireless broadband terminal devices each at a respective location in a rich scattering environment wirelessly coupled with a time-reversal based wireless broadband base station through a broadband multipath channel to receive a respective set of digital data symbols from the wireless broadband base station through the broadband multipath channel; and the time-reversal based wireless broadband base station comprising: an input broadband module configured to receive asynchronously N wireless broadband probe signals from the N heterogeneous wireless broadband terminal devices located at N respective locations in the rich scattering environment through the wireless broadband multipath channel with N respective sets of multiple wireless propagation paths and an effective passband with effective bandwidth W0, wherein N is a positive integer greater than 1, wherein W0 is not smaller than 20 MHz, wherein a sampling frequency F0 of an analog-to-digital conversion unit of the input broadband module is high enough such that L multipaths are resolvable by the input broadband module, wherein F0 is dependent on effective bandwidth W0 of the broadband multipath channel and F0 is not smaller than 2*W0, and wherein L is not smaller than 10; at least one processor configured to: determine asynchronously, based on the N wireless broadband probe signals, N location-specific signatures each being associated with a respective location of a respective heterogeneous wireless broadband terminal device, store and update asynchronously the N location-specific signatures, generate N data signals asynchronously based on the N stored and updated location-specific signatures respectively, with each data signal associated with the respective set of digital data symbols intended for respective heterogeneous wireless broadband terminal device, wherein the respective set of digital data symbols intended for the respective heterogeneous wireless broadband terminal device are up-sampled asynchronously by respective rate back-off factor D, generate a composite signal by combining the N data signals asynchronously, and generate a filtered composite signal by applying a filter with filter bandwidth not smaller than a lower bound B, wherein B is not larger than W0; and an output broadband module configured to transmit a wireless broadband downlink signal with bandwidth F1 comprising the filtered composite signal, wherein the N location-specific signatures in the wireless broadband downlink signal to enable respective portions of the wireless broadband downlink signal to converge and focus at the N heterogeneous wireless broadband terminal devices respectively to cause respective data signals comprising respective digital data symbols to be received by respective heterogeneous wireless broadband terminal devices such that each heterogeneous wireless broadband terminal device primarily receives only the digital data symbols intended for the heterogeneous wireless broadband terminal device, and wherein the lower bound B of the filter bandwidth is determined based on the number N of heterogeneous wireless broadband terminal devices.

In another general aspect, a system of time-reversal based wireless communication system, including: a wireless broadband base station wirelessly coupled with each of N heterogeneous wireless broadband terminal devices at a respective location in a rich scattering environment through a broadband multipath channel to transmit a respective set of digital data symbols to the respective heterogeneous wireless broadband terminal device through the broadband multipath channel; and the N time-reversal based heterogeneous wireless broadband terminal devices each at the respective location in the rich scattering environment to: transmit asynchronously, in a channel probing mode, a respective wireless broadband probe signal to an input broadband module of the wireless broadband base station through the broadband multipath channel with a respective set of multiple wireless propagation paths and an effective passband with effective bandwidth W0, wherein W0 is not smaller than 20 MHz, wherein a sampling frequency F0 of an analog-to-digital conversion unit of the input broadband module of the wireless broadband base station is high enough such that L multipaths are resolvable by the input broadband module, wherein F0 is dependent on effective bandwidth W0 of the broadband multipath channel and F0 is not smaller than 2*W0, wherein L is not smaller than 10; wherein at least one processor of the wireless broadband base station is configured to, for the N time-reversal based heterogeneous wireless broadband terminal devices: determine asynchronously, in the channel probing mode, a respective location-specific signature for a respectively one of the N terminal devices based on a respective probe signal from the respective one of the N terminal devices at a respective location, wherein the respective location-specific signature depends on the respective location of the respective one of the N terminal devices and the respective set of multiple wireless propagation paths in the rich scattering environment, store and update the respective location-specific signature for the respective one of the N terminal devices asynchronously in the channel probing mode, generate asynchronously, in a data transmission mode, a respective data signal based on the respective stored and updated location-specific signature and a respective digital data to be sent to the respective one of the N terminal devices, and add the respective data signal asynchronously to a first signal in the data transmission mode; wherein the at least one processor of the wireless broadband base station is further configured to: generate, in the data transmission mode, the first signal which is an asynchronous combination of all respective data signals for the N terminal devices comprising all respective digital data to be sent to the N terminal devices, and generate, in the data transmission mode, a second signal by filtering the first signal with a first filter with filter bandwidth not smaller than a lower bound B, wherein B is not larger than W0; and wherein an output broadband module of the wireless broadband base station configured, in the data transmission mode, to transmit a wireless broadband downlink signal with bandwidth W1 comprising the second signal to the two terminal devices such that a respective portion of the wireless broadband downlink signal converges and focuses at the respective one of the N terminal devices carrying the respective data signal; and receive the wireless broadband downlink signal comprising the second signal which in turn comprises the respectively digital data to be sent from the wireless broadband base station to the respective time-reversal based heterogeneous wireless broadband terminal device.

Other aspects include other combinations of the features recited above and other features, expressed as methods, apparatus, systems, program products, and in other ways.

BRIEF DESCRIPTION OF DRAWINGS

FIGS. 13A and 13B are diagrams illustrating exemplary channels that may be treated as equivalent channels.

FIGS. 18C to 18E are graphs showing exemplary spatial focusing in time-reversal systems with 40 MHz, 120 MHz, and 360 MHz bandwidths, respectively.

FIGS. 25A and 25B are diagrams showing the two exemplary steps in the downlink data transmission phase of a time-reversal based cloud radio access network.

FIGS. 43A and 43B are diagrams showing examples of the channel probing phase.

DETAILED DESCRIPTION

Figure 1:
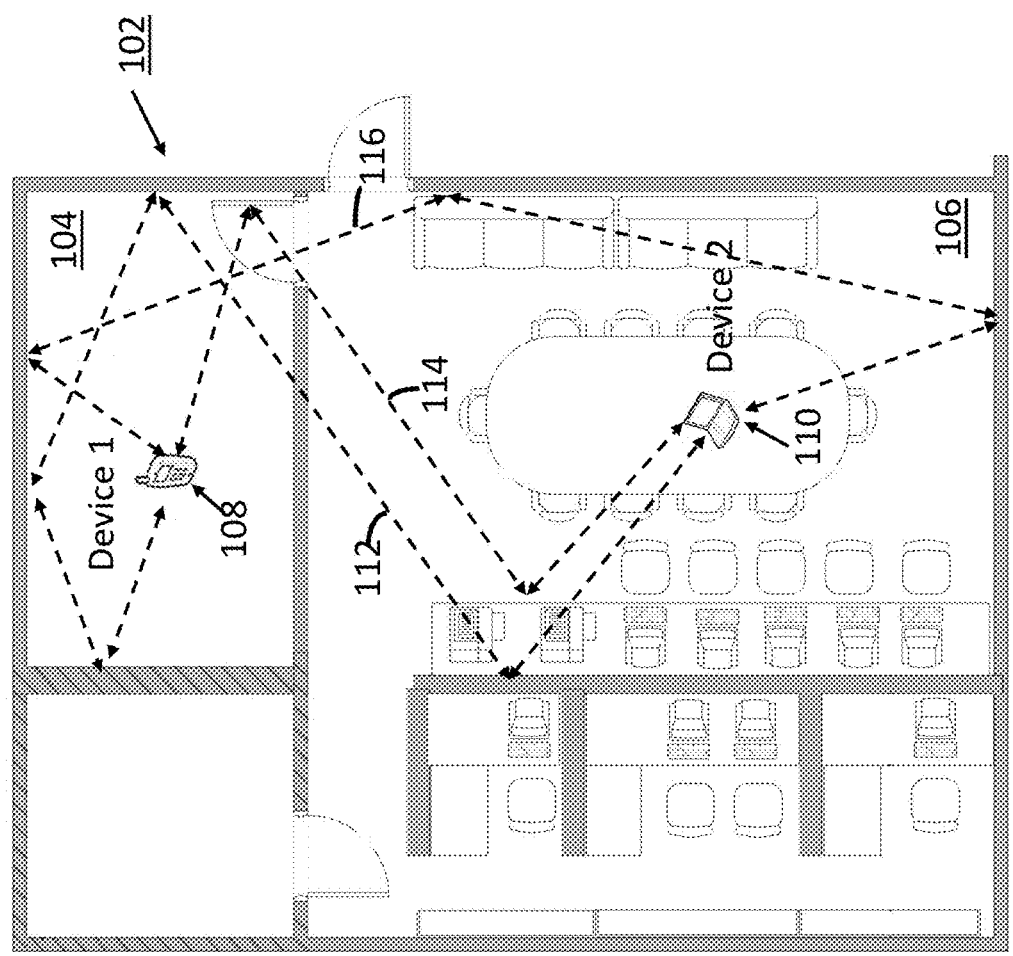
FIG. 1 is a diagram showing an exemplary environment for operating a time-reversal system.

This invention relates to wireless systems, devices, and methods that may take advantage of location-specific wireless signatures to improve communication. The technology takes advantage of unavoidable but rich multi-paths in wireless signal propagation and may also take advantage of the physics of reciprocal responses that resonate with the environment to focus signal energy to specific positions. The technologies and techniques described herein may improve the spectrum sharing performance because of reduced mutual interference, as well as energy efficiency and physical layer security.

Location specific signatures may be generated when a wireless signal launched by an antenna is scattered and/or reflected and/or diffused by the physical environment through which it travels. Multi-path propagation may occur when portions of the launched signal are scattered away from the line-of-sight propagation path. These scattered components of the signal may eventually make their way to a given receiver antenna and/or back to the transmitting antenna but may arrive at different times and with varying amplitudes. In traditional wireless networks, such signal reflections, diffractions, echoes, or "multi-paths" may be viewed as a problem because if left uncorrected, they may reduce the range and reliability of a communication link. In this disclosure, we describe systems, technologies and techniques that may take advantage of multipath wireless signal propagation and be used in communication.

In this disclosure, the term "user" may refer to a device and/or an antenna. For example, in a system that has multiple devices communicating with a base station, the term "multi-user uplink" may refer to the uplink from multiple devices or from a device with multiple antennas, the term "multi-user downlink" may refer to the downlink to multiple devices or to a device with multiple antennas, and the term "inter-user interference" may refer to the interference among various devices.

In this disclosure, wireless signals may propagate between two devices and they may propagate away from one device and then back to it after being reflected and/or scattered. In some embodiments, a device may also be referred to as a base station, an access point, a locator, a transmitter, a receiver, a transceiver, a source, a router, a time reversal machine, an origin, a computer, a node, a gateway, a bridge, an antenna, and the like. In some embodiments, a device may also be referred to as a user, a terminal device, a mobile device, a phone, a computer, a tablet, a wearable electronic device such as a watch, a band, a wristband, an ankle band, a belt, a sensor, a piece of clothing and the like, an electronic card, fob, dongle, and the like, a "pinger", a bot, an antenna, and the like. In some embodiments that include more than one device and/or more than one antenna, the described roles of one device may be exchanged with the described roles of another device. In embodiments described as having two devices, or an access point and a terminal device, or similar descriptions, it should be understood that those embodiments may also include more than two devices. For example, embodiments described as having an access point and a device may have multiple devices and/or may have multiple access points. Likewise, embodiments may have multiple base stations, locators, routers, transceivers, sources, transmitters, receivers, mobile devices, phones, tablets, computers, wearable electronic components, cards, fobs, dongles, pingers, devices, antennas, time reversal machines, origins, bots, and the like.

Time Reversal Technology

The following provides an overview of a time-reversal system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travels through the propagation paths, the signal may become distorted. The multipath signal received by the second device 110 can be quite different from the signal transmitted by the first device 108.

Figure 2A:
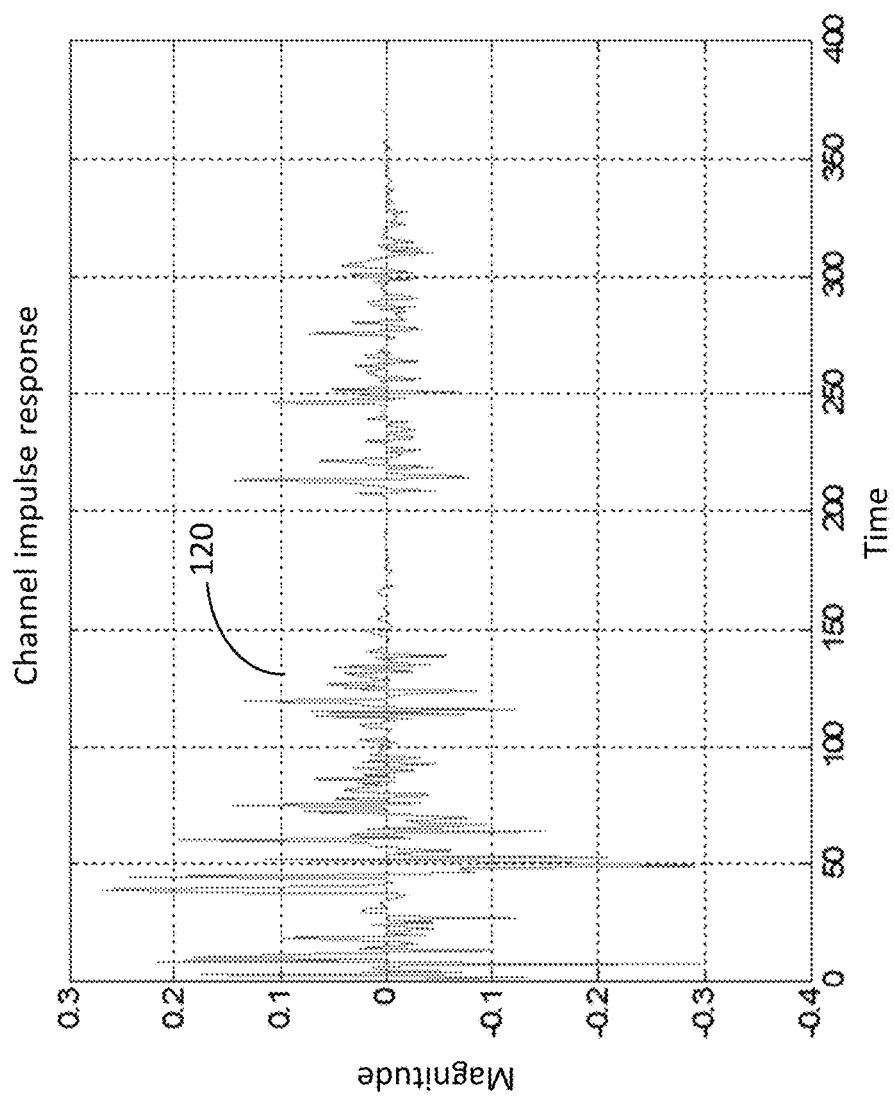
FIG. 2A is a graph of an exemplary recorded channel response waveform.

For example, referring to FIG. 2A, when the first device 108 sends a pulse signal, the signal received by the second device 110 may have a waveform 120. The waveform 120 is referred to as the channel impulse response (CIR) signal.

Figure 2B:
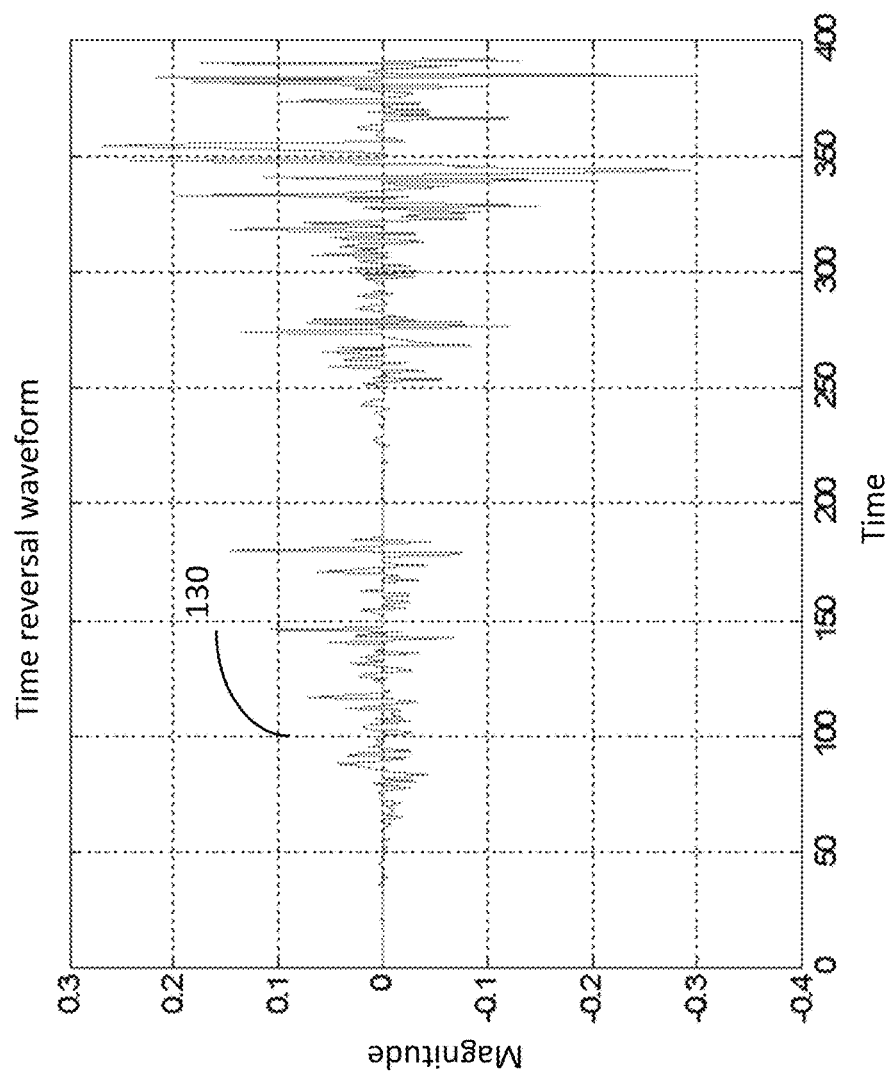
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagate in various directions, including through propagation paths 112, 114, and 116 (in reverse direction relative to the propagation direction of the impulse signal), and reach the first device 108. The multipath signal received at the first device 108 may form an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted. In addition, the initial signal sent from the first device 108 can be any sort of signal, of which an impulse is just one example. The initial signal can be any waveform.

When the second device 110 intends to transmit a data stream to the first device 108, the second device 110 may use a normalized time-reversed conjugate of the signal received from the device 108 as a basic transmission waveform. The second device 110 may encode the data stream on the basic waveform and transmit the signal through the wireless channel. The signal received at the device 108 may be described as the convolution of the transmitted signal and the channel impulse response, plus additive white Gaussian noise. Because the transmitted signal has been designed based on a time reversed version of the channel impulse response, the first device 108 may only need to perform a simple adjustment to the received signal and down-sample it to recover the data stream transmitted by the second device 110.

In some examples, a transmitting device or base station or access point may send signals to two or more receiving devices at the same time. The transmitted signals travel through multiple propagation paths to each receiver. Because the receivers are positioned at different locations, the multipath signals travel through different propagation paths to reach the receivers. By carefully constructing the waveform of the signal sent from the transmitter, it is possible to allow each receiver to receive data intended for the receiver with sufficiently high quality.

Figure 3:
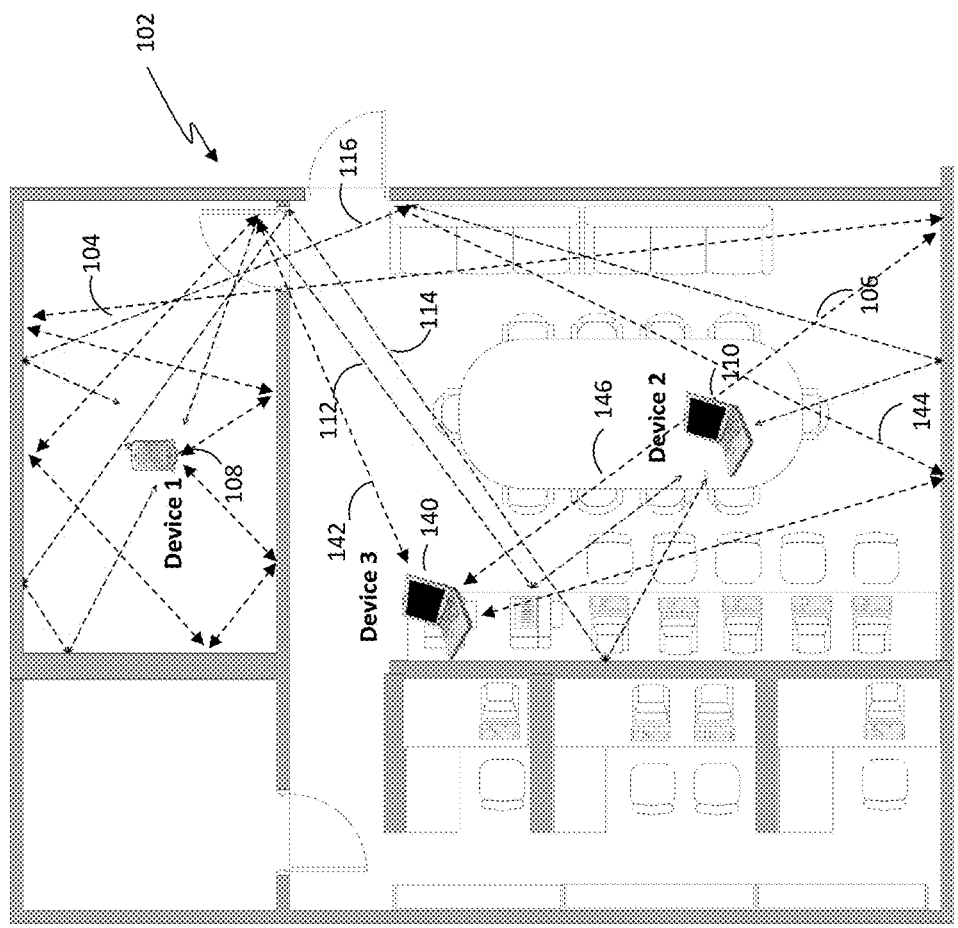
FIG. 3 is a diagram showing an exemplary environment for operating a time-reversal system having multiple receivers.

Referring to FIG. 3, the first device 108 may communicate with the second device 110 and a third device 140. The second device 110 may send a probe signal that travels through propagation paths 112, 114, and 116 to the first device 108. The probe signal can be, e.g., a pulse signal, a signal that has a predetermined waveform, or a signal that includes symbols. The first device 108 may record the received waveform representing the channel response for a first multipath channel. The third device 140 may send a probe signal that travels through propagation paths 142, 144, and 146 to the first device 108. The first device 108 may record the received waveform representing the channel response for the second multipath channel.

The first device 108 constructs a downlink signal based on a first time-reversed multipath channel response, a second time-reversed multipath channel response, a first data stream intended for the second device receiver 110, and a second data stream intended for the third device receiver 140. The first device 108 may transmit the downlink signal so that a first portion of the downlink signal travels through propagation paths 112, 114, and 116 to reach the second device 110. A second portion of the downlink signal may travel through propagation paths 142, 144, and 146 to reach the third device 140. The first signal portion received at the second device 110 may form a first data stream. The second signal portion received at the third device 140 may form a second data stream.

In the example of FIG. 3, the first device 108 transmits two data streams simultaneously to the second device 110 and the third device 140. Using the same principle, the second device 110 can receive channel impulse response signals from the first device 108 and the third device 140, and then transmit two data streams simultaneously to the first device 108 and the third device 140 using waveforms that are determined according to time-reversed channel impulse response signals. The third device 140 can also receive channel impulse response signals from the first device 108 and the second device 110, and then transmit two data streams simultaneously to the first device 108 and the second device 110 using waveforms that are determined according to time-reversed channel impulse response signals. In general, when there are three or more devices, each device can transmit two or more data streams simultaneously to two or more other devices.

In the example of FIG. 3, the device operating as a transmitter may use either an omnidirectional antenna or a directional antenna for broadcasting the downlink signal, as long as the downlink signal reaches each of the receivers through multiple propagation paths. In some systems, the transmitting antenna may use beam-forming techniques to launch a signal that undergoes a large number of reflections. That is, the transmitter may launch a wireless signal that preferentially experiences multiple transmission paths.

In exemplary embodiments, at least one antenna may launch at least one wireless signal into a channel and at least one antenna may receive a signal from the wireless channel. In embodiments, the transmitting and receiving antennas may be placed apart from each other and in other embodiments they may be co-located. For example, a device, computer, mobile device, access point and the like may comprise more than one antenna and the antennas may be operated as either or both transmit and receive antennas. In some embodiments, the at least one antenna may be a single antenna that may be used to both launch wireless signals into a channel and to receive multi-path signals from the channel. In embodiments, antennas may transmit and receive signals in different time slots, in different frequency bands, in different directions, and/or in different polarizations or they may transmit and receive signals at the same or similar times, in the same or similar frequency bands, in the same or similar directions and/or in the same or similar polarizations. In other embodiments, antennas and/or devices comprising antennas may adjust the timing, carrier frequency, direction and/or polarization of signal transmissions and signal receptions.

Throughout this disclosure, where systems, techniques and/or methods are described as using a transmit antenna and a receive antenna, it should be understood that in some embodiments, the transmit antenna and receive antenna may be physically the same antenna or may be antennas that are physically very close together.

In embodiments, electrical signals may be applied to one or more antennas for wireless transmission and may be received from one or more antennas for processing. In embodiments, wireless signals may be radio waves or microwaves. In embodiments, wireless signals may have carrier frequencies anywhere in the range from kilohertz to terahertz. In embodiments, antennas may comprise at least one of a filter, amplifier, switch, monitor port, impedance matching network, and the like. In embodiments, electrical signals may be generated using analog and/or digital circuitry and may be used to drive at least one antenna. In embodiments, electrical signals received from at least one antenna may be processed using analog and/or digital circuitry. In exemplary embodiments of the inventions disclosed herein, electrical signals may be sampled, digitized, stored, compared, correlated, time reversed, amplified, attenuated, adjusted, compensated, integrated, processed and the like.

In the time domain, the channel impulse response (CIR) of a communication link can be modeled as $$h_i[k] = \sum_{l=0}^{L-1} h_{i,l}\delta[k-l], \quad (1)$$

where $h_i[k]$ is the k-th tap of the CIR with length L, and $\delta[\ ]$ is the Dirac delta function. Note that the time domain representation of the channel response, h, and the frequency domain representation of the channel response, H, are related by the Fourier Transform. Note that channel impulse responses (CIRs) may also be referred to in this document as channel responses (CRs), CR signals, CIR signals, channel probe signal responses, and estimated channel responses. Channel responses may be measured and/or computed and/ or may be generated by a combination of measurement and computation. In this disclosure we may also refer to channel responses and received probe waveforms as location-specific signatures.

In some embodiments, a time-averaging scheme may not provide a reliable measure of the channel response. To improve the channel response estimation, a longer sequence of pulses can be used to suppress the noise. To further improve the performance of the system, a short pseudo-random sequence of pulses can be used as the channel probing signal. In such a case, the received probe waveform can be the convolution of the pseudo-random sequence with the channel response.

In embodiments, the pseudo-random sequence used as the probing signal may be known by a receiver. Then the channel response can be estimated using a correlation-based method where the received signal is convolved with the pseudo-random sequence. In general, the auto-correlation of the pseudo-random sequence may not be an ideal delta function because there can be inter-symbol interference and thus error in the estimated channel response. In embodiments, such kinds of channel estimation error due to inter-symbol interference may be minimized or avoided by using orthogonal Golay complementary sequences, which may have an ideal delta shape for auto-correlation function, rather than a pseudo-random sequence.

Spatial and Temporal Focusing of Time-Reversal Signals

Figure 4A:
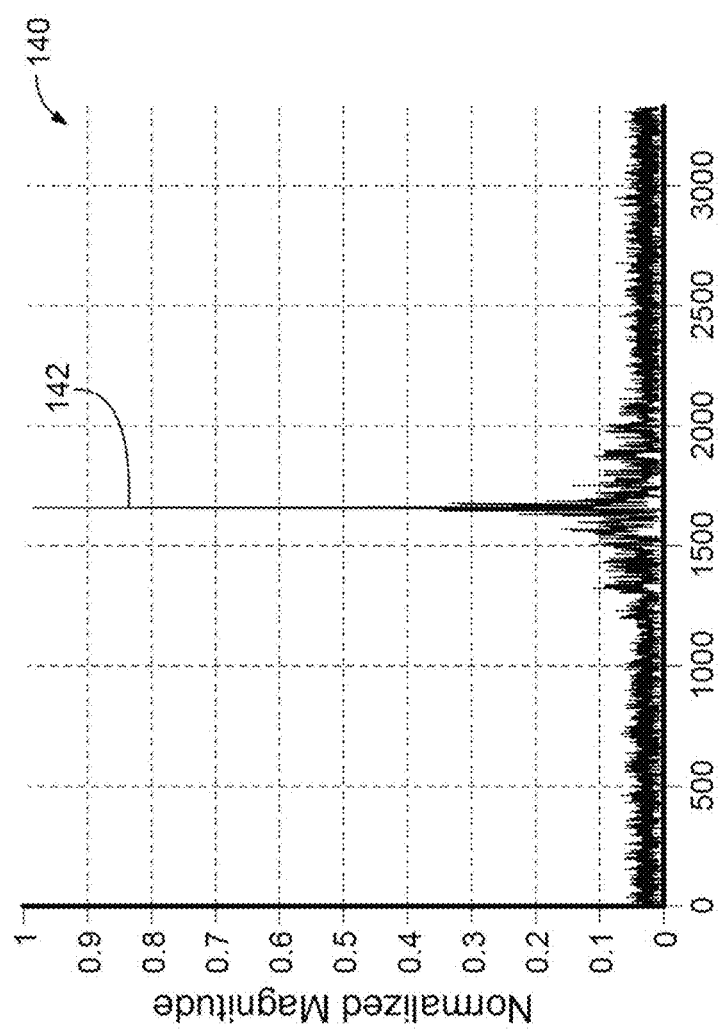
FIG. 4A is a graph showing the temporal focusing effect of time-reversal signals.
Figure 4B:
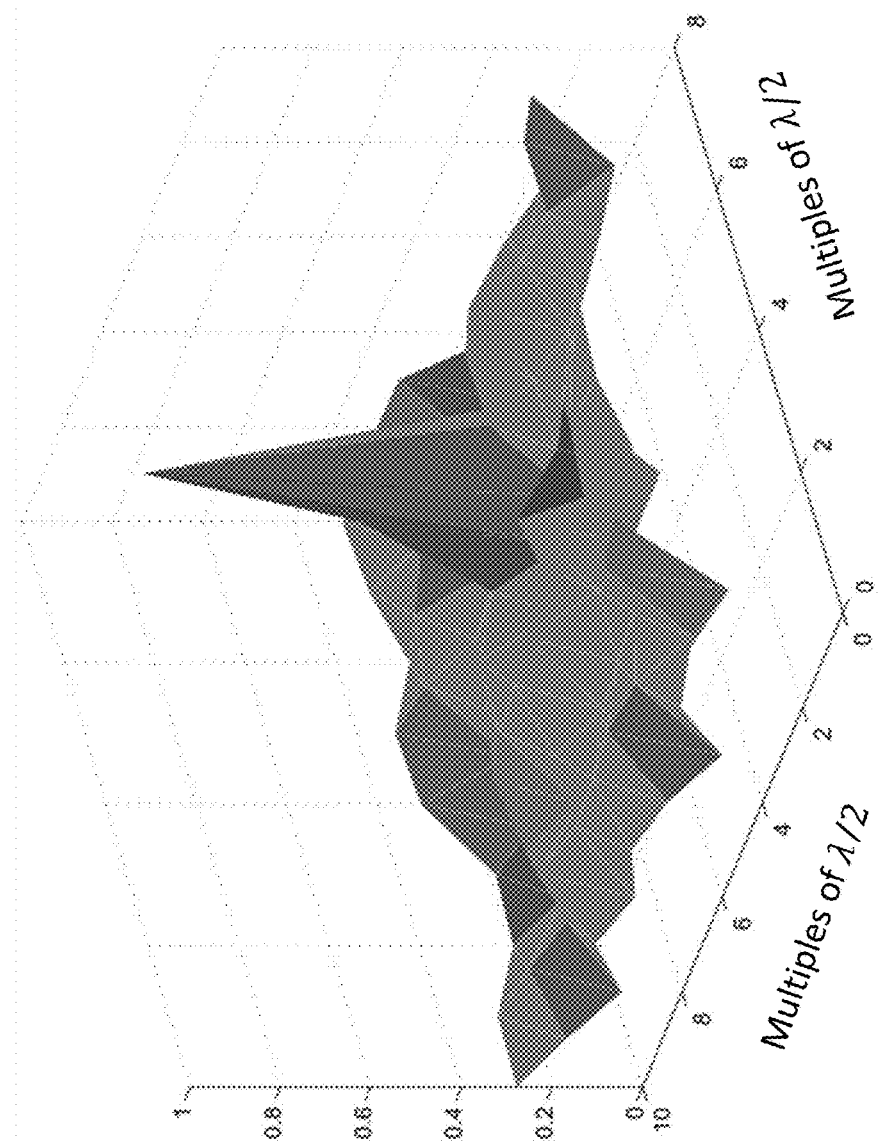
FIG. 4B is a graph showing the spatial focusing effect of time-reversal signals.

In an exemplary time-reversal (TR) system as shown in FIG. 1, when channel reciprocity and stationarity are fairly well maintained, an emitted time-reversal signal may retrace the incoming paths and form a constructive sum of signals at the intended location (i.e., the location of the device 110), resulting in a peak in the signal-power distribution over the space, i.e., spatial focusing effect, as shown in FIG. 4B. Because time-reversal uses the multipaths as a matched filter, the transmitted signal may be focused in the time domain as well, which is referred to as the temporal focusing effect, as shown in FIG. 4A. Moreover, by using the environment as matched filters, the transceiver design complexity can be significantly reduced.

Referring again to FIGS. 1, 2A, and 2B, a time-reversed waveform 130 can be generated by reversing the channel response waveform 120 with respect to time. If the second device 110 sends a signal having the waveform 130, the signal will propagate in various directions, including through propagation paths 112, 114, and 116 (in reverse direction relative to the propagation direction of the probe pulse signal), and reach the first device 108. In an idealized situation, the multipath signal received at the first device 108 would form a pulse signal that is similar to the pulse signal previously sent from the first device 108 to the second device 110.

Note that in exemplary embodiments, devices may have single input antennas or receivers and/or single output antennas or transmitters. In embodiments, devices may have multiple input antennas or receivers and/or multiple output antennas or transmitters. In this disclosure, it should be understood that first and second devices may include single or multiple input and/or output antennas and/or single or multiple receivers and/or transmitters. Different antennas, transmitters, and/or receivers may be designed to operate at similar carrier frequencies or in similar regions of the electromagnetic spectrum or they may be designed to operate at different carrier frequencies or in different regions of the electromagnetic spectrum. Antennas, transmitters and/or receivers may have different bandwidths and may comprise different hardware components, circuits, processors, software, firmware and the like.

In multiple antenna, transmitter and/or receiver embodiments, the multiple antennas, transmitters and/or receivers may operate completely independently of each other or they may operate in conjunction with each other. In embodiments, a subset of antennas, transmitters and/or receivers in a device may operate independently of others or in conjunction with others. In multiple antenna, transmitter and/or receiver embodiments, the multiple antennas, transmitters and/or receivers may share certain hardware components and/or software code. In multiple antenna, transmitter and/or receiver embodiments, the multiple antennas, transmitters and/or receivers may operate simultaneously, independently or in a synchronized manner. For example, some or all of the antennas, transmitter and/or receivers may utilize frequency hopping techniques and the frequency hopping may be coordinated amongst the various antennas, transmitters and or receivers.

For example, the same probe signal can be sent on each frequency band and a channel frequency response (CFR) is obtained on each frequency band. For each frequency band, the channel frequency response can be viewed as a vector and the respective channel frequency response vector for each frequency band is concatenated one after another to form a long vector, which can be viewed as the channel frequency response for the entire band. For example, if 100 channels are involved, the terminal device can send the same probe signal 100 times to probe the 100 channels, and the 100 channel frequency responses can be concatenated to provide information about the channel frequency response for the entire band that includes the 100 channels.

In this disclosure, the use of the term device and/or terminal device may mean a device with single or multiple transmitters and with single or multiple receivers and with single or multiple antennas. The term receiver may mean a single receiver or multiple receivers and a single antenna or multiple antennas. The term transmitter may mean a single transmitter or multiple transmitters and a single antenna or multiple antennas. In some cases, a device may be any of a transmitter, a receiver and a transceiver (a combination of a transmitter and a receiver).

In all of the disclosed embodiments, it is envisioned that wireless networks using the disclosed technology may comprise at least two devices and such networks may comprise three or more devices. For the sake of explanation and in certain embodiments, devices may be identified as transmitters or receivers, but it should be understood that the devices could also be transceivers, radios, software radios, handsets, mobile devices, computers, routers, modems, and the like. Devices may be fully bi-directional or they may be configured to have more functionality as transmitters or as receivers or to support different data rates, protocols, power levels and the like in the transmit and receive modes. Multiple access points may communicate back and forth with each other and multiple terminal devices may communicate back and forth with each other. In some embodiments, an access point may be a fixed module that allows wireless devices to be connected to a wired or another wireless network. Access points may support a wide variety of networking protocols and/or transmission protocols and may include or may be connected to additional computing engines and/or devices to achieve enhanced performance. Access points may be routers, modems, transmitters, repeaters, and the like and may be the signal source to support hot spots, local area networks, cells, microcells, nanocells, picocells, femtocells, and the like. Access points may support multiple wireless transmission standards, formats and protocols including, but not limited to time-reversal protocols, WiFi, IEEE 802.11xx, Bluetooth, Bluetooth LE, Zigbee, Near Field Communications (NFC), infrared communications, orthogonal frequency division multiple access (OFDMA), code division multiple access (CDMA), Long Term Evolution (LTE), Third Generation (3G), and Fourth Generation (4G), and the like, protocols.

The terminal device can be any movable device, such as a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart. The terminal device can also be a module that is attached to any of the movable devices described above. For example, the terminal device can be a dongle attached to a movable electronic device.

In some embodiments, the basic waveform may be altered to improve or change system operation. In embodiments, the basic waveform may be altered by altering the time delay window or channel length of the channel impulse response signal. In embodiments, the basic waveform may be altered by altering the digitization resolution or rate of the channel response signal. In embodiments, the basic waveform may be altered by applying additional processing steps to enhance or optimize the waveform. In embodiments, any combination of alterations may be used to alter the basic waveform.

System Architecture of Multi-User Time-Reversal Communication System

Figure 5:
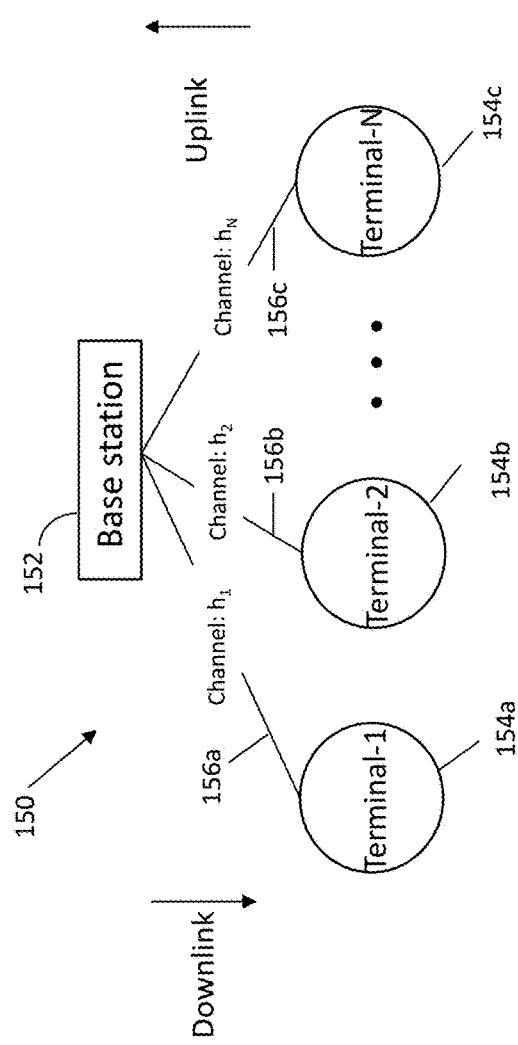
FIG. 5 is a diagram of an exemplary multi-user time reversal communication system.

Referring to FIG. 5, an exemplary multi-user time reversal communication system (or Time Reversal Division Multiple Access (TRDMA) System) 150 includes a base station (BS) 152 and multiple terminal devices (e.g., 154a, 154b, 154c, collectively 154). Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band, and the system operates in multi-path environments. For the downlink, the base station 152 can send multiple messages (either independent or non-independent) simultaneously to multiple selected terminals 154. For the uplink, multiple terminals 154 can send their own messages to the base station 152 simultaneously.

Hand-Shake Process

Figure 6:
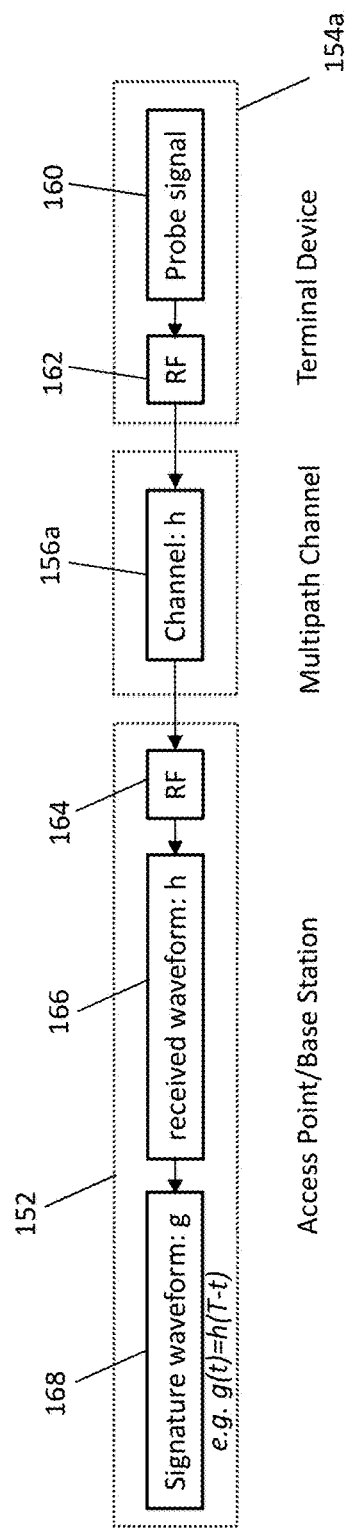
FIG. 6 is a diagram showing a hand-shaking process.

The following describes a hand-shaking process between the base station 152 and the terminals 154. Referring to FIG. 6, in some implementations, after each terminal device 154 registers with the base station 152, a hand-shaking process occurs periodically in a round-robin manner among the registered terminal devices 154 to maintain an up-to-date record of the channel responses associated with the terminal devices 154 at the base station 152.

In some implementations, during the hand-shaking process, at a given time, only one selected terminal, e.g., 154a, sends a probe signal 160, and performs radio frequency modulation 162 to produce a radio frequency signal that propagates through the associated multi-path channel 156a to the base station 152. The probe signal 160 can be, e.g., a pulse signal, a signal that has a predetermined waveform, or a signal that includes symbols to enable the base station to perform synchronization and/or other functions. In the examples below, the probe signal is a pulse signal. However, other types of probe signals can be used in the system 150. The base station 152 receives the transmitted radio frequency signal, performs radio frequency demodulation 164 to recover the unique channel response (waveform) 166 and records it. When the selected terminal, e.g., 154a, is performing the hand-shaking process with the base station 152, the other terminals, e.g., 154b and 154c, remain silent. Upon receiving the channel response 166 associated with the terminal 154a, the base station 152 calculates a signature waveform g 168 for the terminal 154a based on the associated channel response received at the base station 152.

For example, one of the basic signature waveforms for a terminal associated with a channel response h(t) can be h*(T−t), which is a time-reversed waveform of the channel response, with T representing the delay spread of the multi-path channel. If h(t) is a complex value, h*(T−t) is the time reverse and conjugation of the channel response h(t). In discrete time domain, the channel response can be represented as h[k], and the corresponding signature waveform can be h*[L−k], in which L represents the delay spread of the multi-path channel.

The delay spread is a measure of the multipath richness of a communications channel. In general, it can be interpreted as the difference between the time of arrival of the earliest significant multipath component (typically the line-of-sight component) and the time of arrival of the latest multipath component. For the discrete time model, by the definition of delay spread, when the delay spread is L, the total channel length is L+1.

The system 150 can use any type of waveform design that is optimized for a variety of performance metrics, such as optimized for minimum inter-symbol interference and minimum inter-user interference.

After the hand-shaking process, the calculated signature waveforms can be used for data transmissions during both the downlink and the uplink processes.

Downlink Transmission

Figure 7:
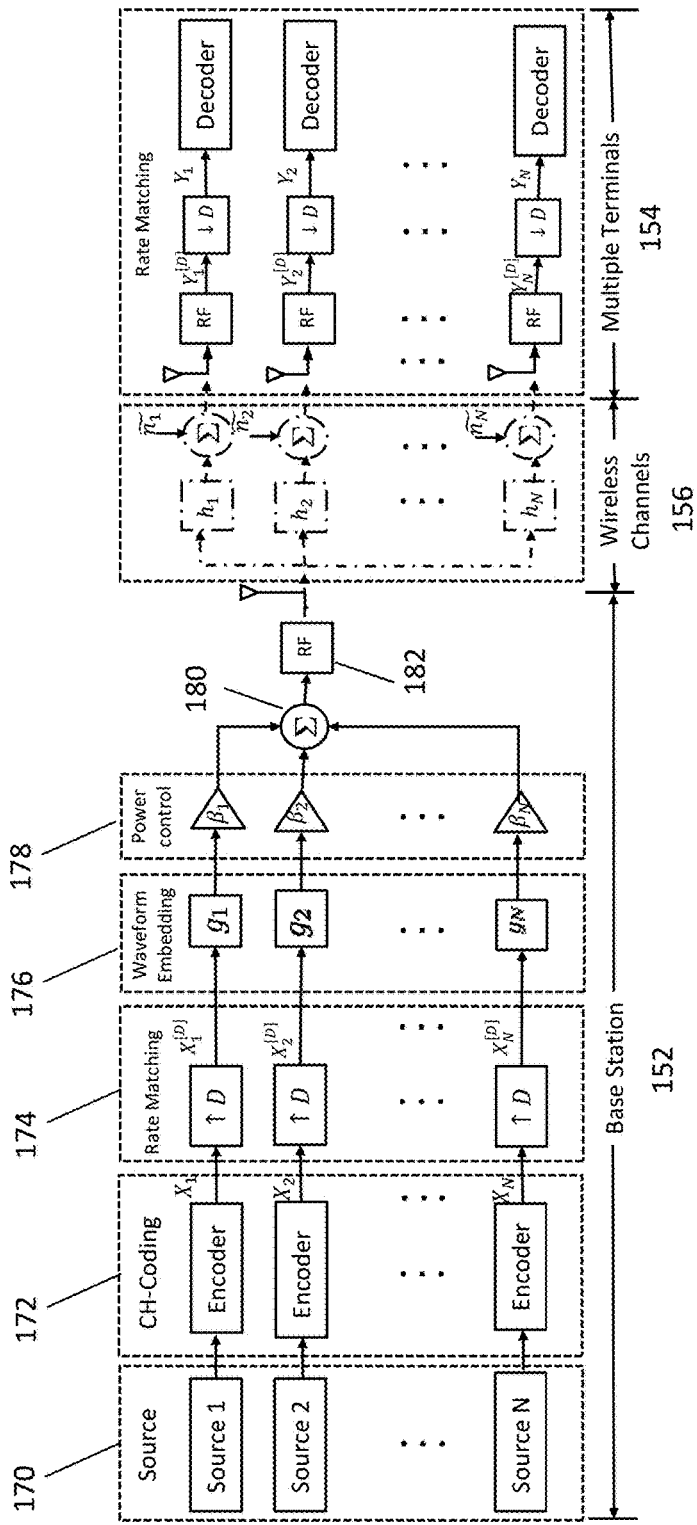
FIG. 7 is a diagram showing a down-link transmission process.

The following describes the downlink transmission process. Referring to FIG. 7, assume that there are N active terminal devices 154 receiving data from the base station 152 concurrently. In some implementations, at the base station 152, there are N independent information sources 170, each generating information bits to a corresponding terminal device 154. The information bits from the sources are first encoded by channel-coding using encoders 172. The channel-coding process is optional and may be omitted in some implementations. The encoded bit-stream for any given terminal i∈{1, 2, . . . N} is represented by a sequence of symbols $\{X_i[k]\}$.

A parameter referred to as the rate back-off factor D is used to match the symbol rate (signal bandwidth) with the higher system's sampling rate (channel bandwidth). For any terminal's symbol sequence $\{X_i[k]\}$, ∀i∈{1, 2, . . . N}, the rate matching process at the base station 152 is performed by up-sampling the sequence of symbols by the factor D. The rate matching processes may be performed at rate matching modules 174. The up-sampled sequence of $\{X_i[k]\}$, ∀i∈{1, 2, . . . N} can be expressed as $$X_i^{[D]} = \begin{cases} X_i[k/D], & \text{if } k \bmod D = 0, \\ 0, & \text{if } k \bmod D \neq 0. \end{cases} \quad (2)$$

At waveform embedding modules 176, the up-sampled sequences are embedded with the calculated (based on the channel responses obtained in the hand-shaking process) signature waveform $g_i$, $\forall i \in \{1, 2, \ldots N\}$ based on the convolution of the up-sampled symbol sequence and the corresponding signature waveform. As described above, one of the basic signature waveforms is the time-reversed (and conjugated if the channel response is of complex values) channel response, i.e., $$g_i[k] = \frac{1}{\sqrt{\sum_{l=0}^{L} |h_i[l]|^2}} h_i^*[L-k]. \quad (3)$$

The output of the signature embedding block 176 for the i-th terminal is the convolution of $\{X_i^{[D]}[k]\}$ and $\{g_i[k]\}$, i.e.

$$(X_i^{[D]} * g_i)[k] = \sum_{l=0}^{L} g_i[l] X_i^{[D]}[k-l], \quad (4)$$

where (*) is the linear convolution.

After the signature embedding, each of the streams is multiplied by a scalar power gain β to implement the power control mechanism at the power control module 178. All the streams (embedded with signature waveforms) are multiplexed together by a summation module 180 to obtain a combined signal S[k]:

$$S[k] = \sum_{i=0}^{N} \beta_i (X_i^{[D]} * g_i)[k]. \quad (5)$$

The combined signal S[k] is transmitted through radio frequency by the RF module 182 and propagates through different multi-path channels $\{h_i[k]\}$ 156, for all $i \in \{1, 2, \ldots N\}$.

The signal received at the i-th terminal 154 is the multi-path channel output plus additive noise $\tilde{n}_i$.

$$Y_i^{[D]}[k] = (S * h_i)[k] + \tilde{n}_i[k] = \sum_{j=1}^{N} \beta_j (X_j^{[D]} * g_j * h_i)[k] + \tilde{n}_i[k]. \quad (6)$$

Due to the temporal focusing effect, the signal energy is concentrated in a single time sample (in ideal situations). The i-th terminal 154 does not need to apply complicated equalization to the received signal to recover the signal. The i-th terminal 154 down-samples the received signal with the same factor D (to recover the signal's rate from the system's sampling rate to the symbol rate), producing $Y_i[k]$, represented as follows:

$$Y_i[k] = \sum_{j=1}^{N} \sum_{l=-\lfloor L/D \rfloor}^{\lfloor L/D \rfloor} \beta_j (g_j * h_i)[L + Dl] X_j[k-l] + n_i[k], \quad (7)$$

where $Y_i[k]$ is used to estimate $X_i[k]$ and $n_i[k] = \tilde{n}_i[Dk]$.

Upon obtaining $Y_i[k]$ at the i-th terminal ($\forall i \in \{1, 2, \ldots N\}$) 154, an estimation $\hat{X}_i[k]$ about $X_i[k]$ is made based on the value of $Y_i[k]$. Then, the estimated/reconstructed symbol sequence $\{\hat{X}_i[k]\}$ is fed into the decoder (which corresponds to the encoder) to recover the information bits at each individual terminal device.

Uplink Transmission

Figure 8:
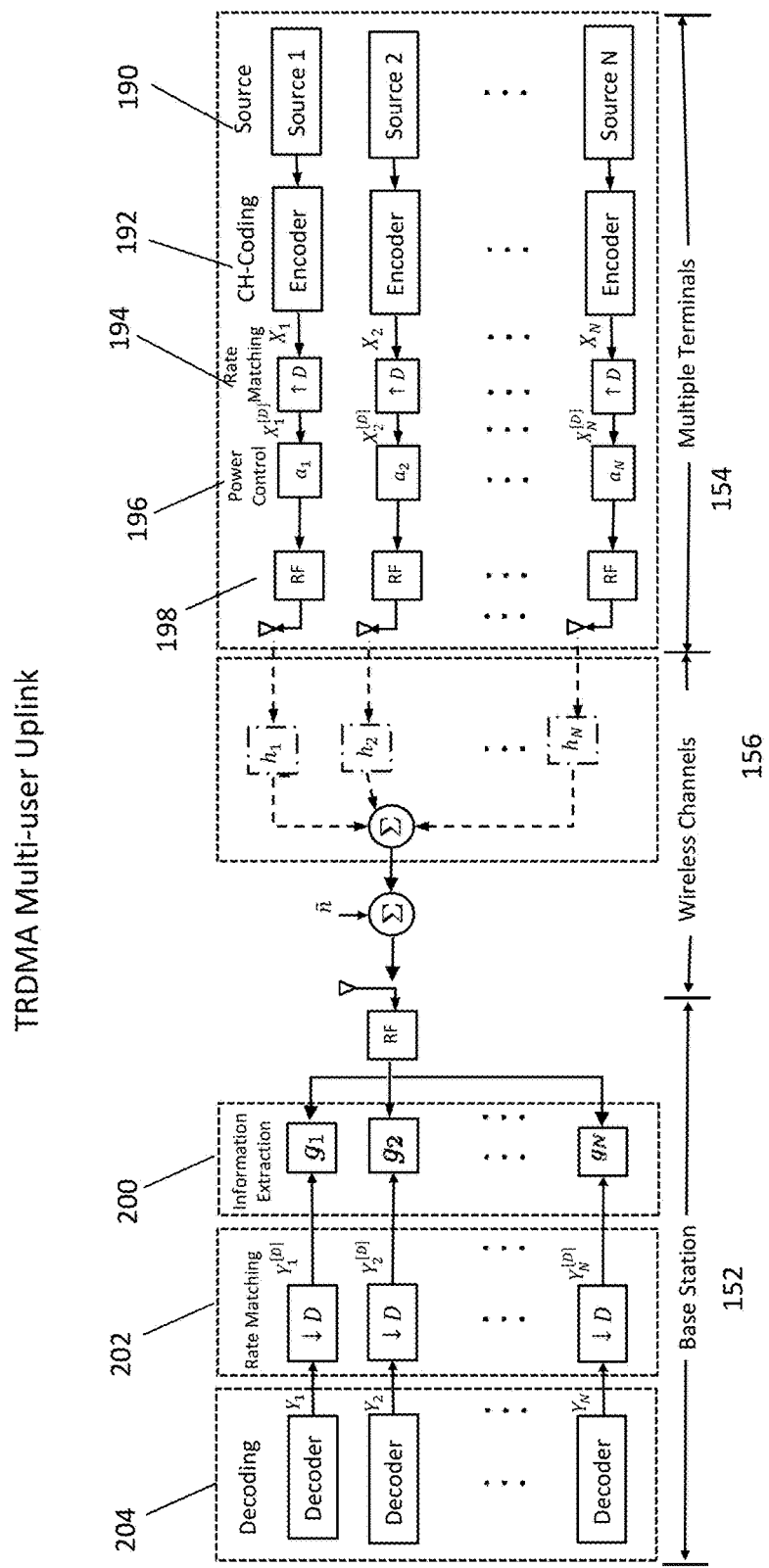
FIG. 8 is a diagram showing an up-link transmission process.
Figure 9:
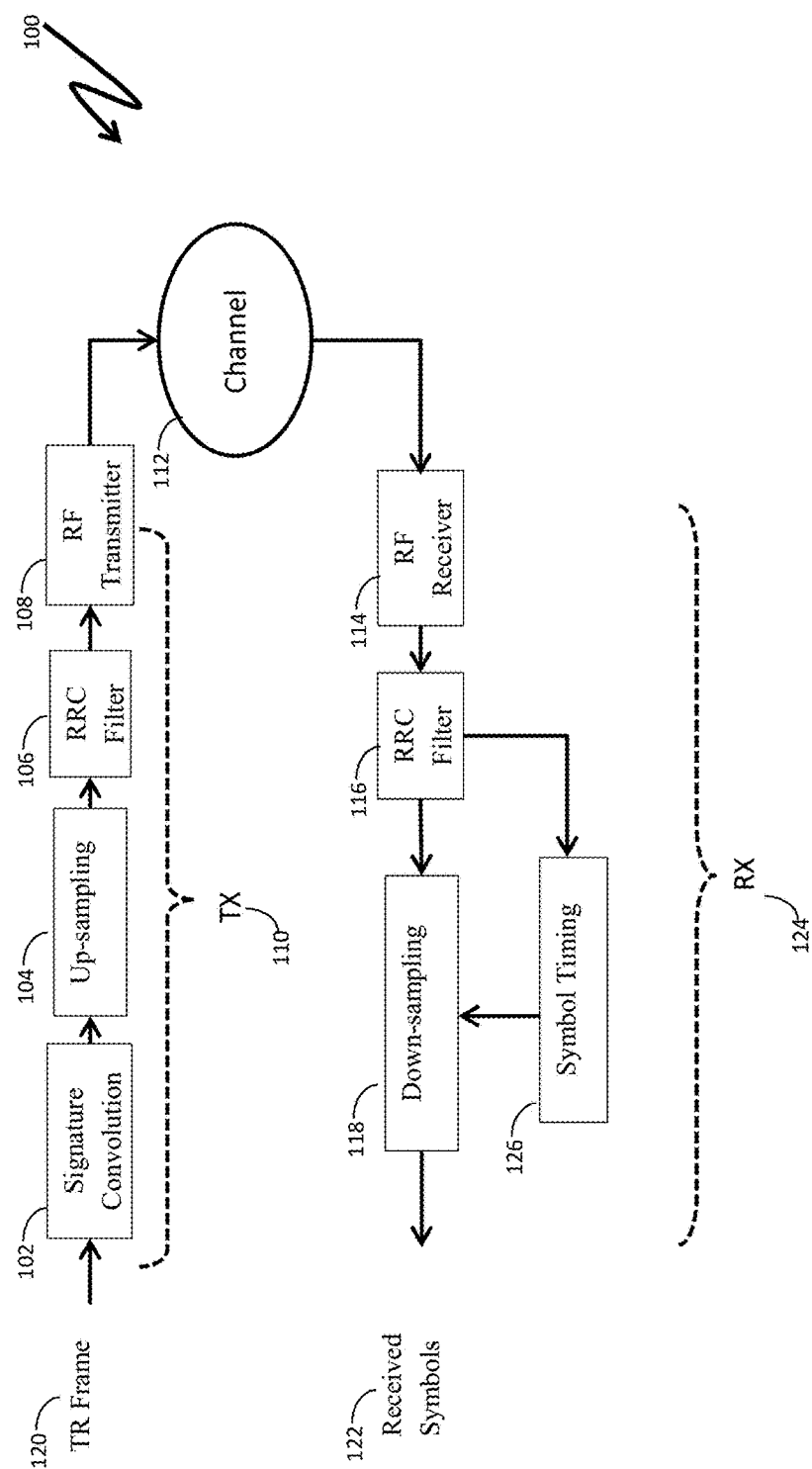
FIGS. 9 and 10 are diagrams of an exemplary transmitter (TX) and receiver (RX) architecture for time-reversal systems with signature design (SD).

The following describes the uplink transmission process. Referring to FIG. 8, for the uplink, assume that there are N active terminal devices 154 transmitting their own data to the base station 152 concurrently. Each terminal device 154 has its own information source 190 which is independent of others.

At each terminal device 154, the information bits are first encoded by the channel coding block 192. Then, the coded symbols $\{X_i[k]\}$ ($\forall i \in \{1, 2, \ldots N\}$) are up-sampled by the rate back-off factor D for rate matching at the rate matching module 194.

The up-sampled symbol sequence for the i-th terminal can be expressed as $$X_i^{[D]} = \begin{cases} X_i[k/D], & \text{if } k \bmod D = 0, \\ 0, & \text{if } k \bmod D \neq 0. \end{cases} \quad (8)$$

The scaling factors $\{a_i\}$ are used to implement the power control at the power control module 196. After multiplying with scaling factor, the sequence of $a_i\{X_i^{[D]}[k]\}$, for all $i \in \{1, 2, \ldots N\}$, is transmitted by the RF module 198.

When the sequence $a_i \{X_i^{[D]}[k]\}$ propagates through its wireless channel $\{h_i[k]\}$156, the convolution between the sequence $a_i \{X_i^{[D]}[k]\}$ and the channel impulse response $\{h_i[k]\}$ is automatically taken as the channel output for the i-th terminal. Since each terminal's multi-path channel response is unique, the automatic convolution between the sequence $a_i\{X_i^{[D]}[k]\}$ and the channel impulse response $\{h_i[k]\}$ is mathematically equivalent to the base station's signature embedding process in the downlink.

All of the channel outputs for the N terminal devices 154 are mixed together in the air plus the additive noise at the base station 152. As a result, the mixed signal received at the base station 152 can be written as $$Z[k] = \sum_{i=0}^{N} a_i (X_i^{[D]} * h_i)[k] + \tilde{n}[k]. \quad (9)$$

Upon receiving the mixed signal as shown above, the base station 152 passes this mixed signal through an information extraction module that includes a filter bank 200 of the calculated signature waveforms $g_i$, $\forall i \in \{1, 2, \ldots N\}$, each of which performs the convolution between its input signal Z[k] and the corresponding terminal device's signature waveform $\{(g_i[k]\}$. Such a convolution using the signature waveform extracts the useful signal component and suppresses the signals of other terminal devices. At the output of the i-th filter, the convolution can be represented as $$Y_i^{[D]}[k] = \sum_{j=1}^{N} a_j (X_j^{[D]} * h_j * g_i)[k] + (g_i * \tilde{n})[k] = \quad (10)$$

$$\sum_{j=1}^{N} \sum_{l=0}^{2L} a_j (h_j * g_i)[l] X_j^{[D]}[k-l] + (g_i * \tilde{n})[k].$$

If the time reversal waveform is used for $\{g_i[k]\}$, in the above equation, the highest gain for the i-th terminal's symbol is achieved at the temporal focusing time l=L, with $$(h_i * g_i)[L] = \sqrt{\sum_{l=0}^{L} |h_i[l]|^2}. \tag{11}$$

The rate matching is performed by down-sampling (with the same factor D) the filter bank's output signal at the rate matching module 202 to recover the original symbol rate of each terminal 154.

After the rate matching, the down-sampled symbol sequence $\{Y_i[k]\}$ can be obtained as $$Y_i[k] = \sum_{j=1}^{N} \sum_{l=-\lfloor L/D \rfloor}^{\lfloor L/D \rfloor} a_j(g_i * h_j)[L + Dl]X_j[k-l] + n_i[k] \tag{12}$$

where the colored noise $n_i[k] = \sum_{l=0}^{L} g_i[l]\tilde{n}_i[Dk-l]$.

Based on $Y_i[k]$ ($\forall i \in \{1, 2, \ldots N\}$), an estimation $\hat{X}_i[k]$ about $X_i[k]$ is made. Then, the estimated/reconstructed symbol sequence $\{\hat{X}_i[k]\}$ is fed into the corresponding decoder 204 to recover the information bits from each terminal device at the base station 152.

Symbol Timing with Signature Design

A TR receiver may use symbol timing to determine when it should sample the received signal in order to accurately determine the symbols that have been sent to it by a transmitter. In traditional (non-TR) communication systems, symbol timing is usually determined by comparing two symbol sequences at different timing offsets and locating the sample with the maximum power among all the samples in the equivalent channel. Typically, the symbol timing may be estimated by the convolution of two pseudorandom (PN) sequences, two root-raised-cosine (RRC) filters and a single-tap channel, since in this case the sample with the maximum power is the correct timing. However, in TR systems, symbol timing estimation may be more complicated because the equivalent channel may include not only the convolution of two PN sequences and two RRC filters, but also the transmit signature and the multipath channel with a large delay spread. Therefore, simply locating the peak power sample of the equivalent channel may lead to inaccurate symbol timing estimates in TR systems, especially when the transmit signature is designed according to a certain performance metric other than the signal-to-noise-ratio (SNR). Symbol timing in a TR system with signature design (SD) may use new symbol timing estimation methods in order to acquire the full benefit of SD. Without the proper timing of symbols, the receiver may estimate the symbols based on wrong samples and result in high bit error rates (BERs) for the received data. In some scenarios, the predicted benefits of TR systems, especially TR systems using SD, may not be realized without more reliable symbol timing estimation techniques. Examples of designing signature waveforms that optimize sum rate in time-reversal multiuser downlink systems are described in U.S. patent application Ser. No. 13/706,342, filed on Dec. 5, 2012, the entire contents of which are incorporated by reference. The signature waveforms can also be designed to optimize other criteria, such as to maximize the signal-to-interference-and-noise ratios of users, or maximize the minimum data rate of the users.

In this disclosure, we describe exemplary implementations and procedures for improved symbol timing estimation in TR systems using SD. Rather than estimating symbol timing based on a determined sample that yields the maximum power, we describe a technique that estimates symbol timing based on the sample that yields a high signal-to-interference-plus-noise ratio (SINR). Thus, the optimal symbol timing in these types of TR communication systems may be determined by the timing sample with the maximum SINR among all the samples in the equivalent channel.

The described symbol timing estimation technique takes into account both the rate back-off factor, D, and the pulse shaping by filters in exemplary transmitters and receivers. A larger rate back-off factor may result in less ISI but at the expense of data rate. In some examples, the purpose of pulse shaping is to limit the effective bandwidth of the transmitted signal. In exemplary embodiments, a root raised-cosine (RRC) filter may be used to shape the transmitted signal. Exemplary procedures may include two steps: a first step to estimate the equivalent channel, and a second step to locate the symbol timing with the maximum SINR.

Figure 10:
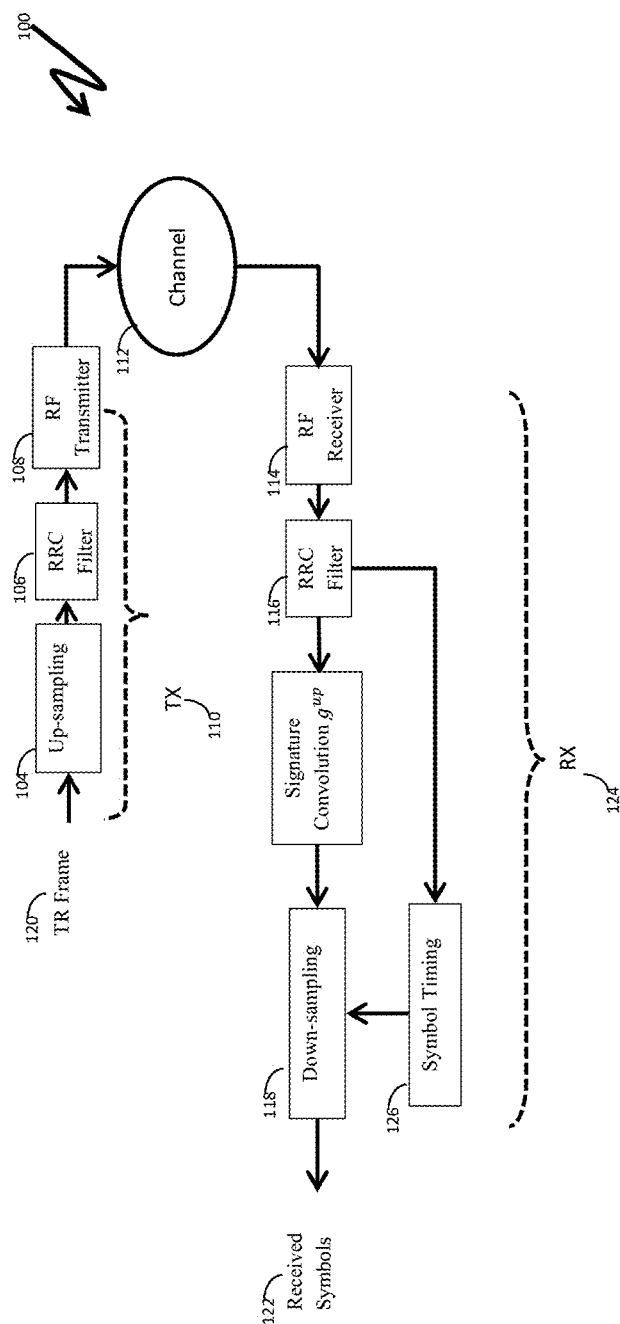

FIG. 10 shows exemplary functions performed by a transmitter 110 and a receiver 124 in an exemplary TR system using SD 100. In the exemplary TX architecture 110, a TR frame 120 may be convolved with the designed signature (e.g., signature waveform described in U.S. patent application Ser. No. 13/706,342) at a signature convolution unit 102, up-sampled at an up-sampling unit 104, and RRC filtered at an RRC filter 106. The TR frame 120 is described in more detail in FIG. 12. The up-sampling and RRC filtering may be used to limit the transmitting bandwidth of the transmission signal. The transmission signal may be delivered to a radio frequency (RF) transmitter 108 that modulates the transmission signal onto a wireless carrier signal. The wireless signal transmitted by the RF transmitter 108 may propagate over a wireless channel 112 to a radio frequency receiver 114 of the receiver 124. The RX signal may be demodulated, sampled by an analog-to-digital converter (not shown in the figure), and passed through another RRC filter 116 that matches the RRC filter 106 at the transmitter (as a matched filter). The effects of the combination of the RRC filters 106 and 116 is equivalent to a raised cosine filter. The filtered signal may be input to a symbol timing component 126 and used to acquire the correct symbol timing to be used in a down-sampling stage 118 to produce received symbols 122.

Figure 12:
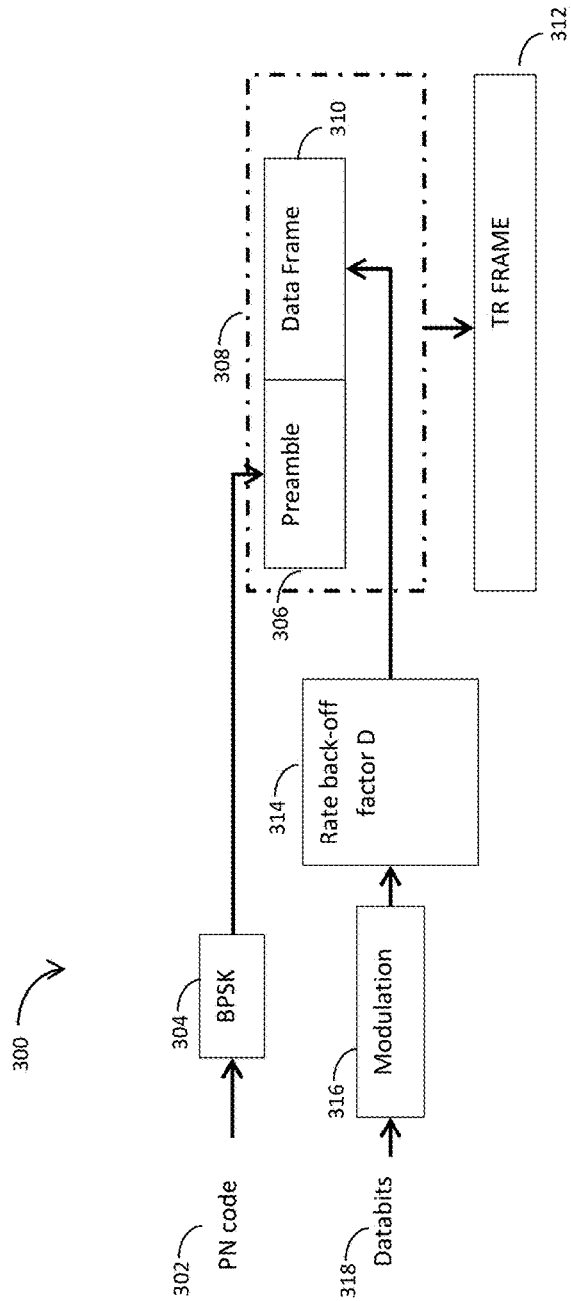
FIG. 12 is a diagram illustrating an exemplary time-reversal frame generation process.

FIG. 12 shows a diagram of exemplary functions that may be used to generate a TR frame. An exemplary TR frame 308 may include two sets of symbols, a preamble 306 and a data set (included in a data frame 310). In some implementations, to generate the preamble 306, a pseudo-random code (PN code) 302 is binary phase shift keying (BPSK) modulated at a BPSK module 304. For example, x may be a PN code with length N. The sequence may be generated by a series of discrete random variables with probability mass function (pmf) shown in the equation below.

$$x(i) = \begin{cases} 1 & \text{with probality } 0.5 \\ -1 & \text{with probality } 0.5 \end{cases}, i = 1, 2, \ldots N \tag{13}$$

Figure 11:
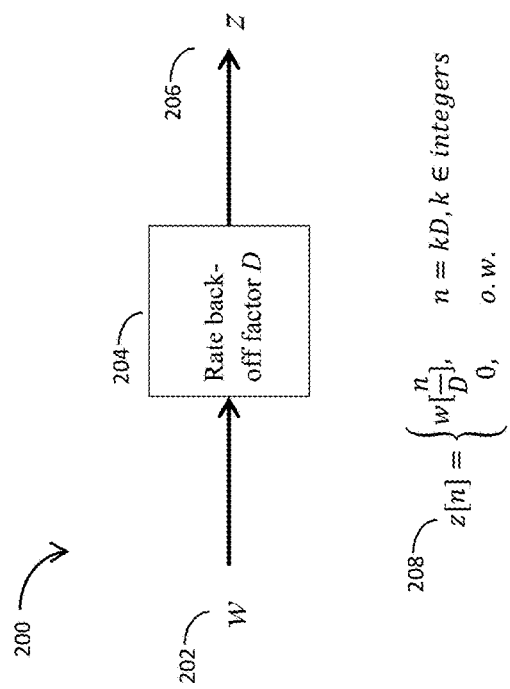
FIG. 11 is a diagram showing an exemplary relationship between symbol sequence w and the up-sampled version of w, denoted as z.

In some implementations, an exemplary data set in the data frame 310 may be generated by modulating data symbols 318 at a modulation unit 316, and up-sampled with a rate back-off rate of D at an up-sampling unit 314, which inserts D−1 zeros between every other symbol. In some examples, a data frame 310 may include several thousand (e.g., about ten thousand) data symbols. FIG. 11 shows an exemplary relationship between symbol sequence w and z, where z is an exemplary rate back-off sequence of sequence w, i.e., z is the up-sampled version of w. In some embodiments, the modulation format of data symbols is not restricted to any particular modulation constellation. For example, BPSK, quadrature phase shift keying (QPSK), or quadrature amplitude modulation (QAM) formats can be applied to modulate the databits 318.

In some examples, BPSK is used to modulate the PN code 302, while QPSK or QAM (or some other modulation method that results in a higher data rate compared to BPSK) is used to modulate the databits 318. This allows the preamble to be reliably estimated while also allowing a higher data rate for the data frame 310. In this example, the rate back-off factor D is applied to the databits 318 but not applied to the PN code 302.

In some communications protocols (e.g., WiFi, GSM, CDMA), an autocorrelation process is applied to the preamble to determine timing information indicating the start and end of the preamble, and the timing information is then used to determine the start of the payload. In a time-reversal communication system, because there may be inter-symbol interference, it may be difficult to accurately determine the start of a data symbol in the data frame 310 using only the timing information determined based on autocorrelation of the preamble. In some implementations, the preamble is processed to estimate a signal-to-interference-and-noise ratio of the data symbols in the data frame 310, and a sample index that results in the highest signal-to-interference-and-noise ratio is used to determine the start of the data symbol, as described below.

FIG. 13A shows an alternate description of portions of the exemplary TR system in FIG. 10. In FIG. 13A, x 402 denotes the TR frame 120 at the transmitter 110 and y 416 denotes the received signal before down-sampling at the receiver 124. In FIG. 13A, the TR frame, x 402, is convolved with the designed signature g 404 and up-sampled 406. The signal then travels through a RRC filter 408 before being transmitted through a multipath channel 410 and received at a receiver. After the received signal travels through another RRC filter 412 it is denoted as y 416, the received signal that has yet to be down-sampled. A block 414 (in dashed lines) represents the equivalent channel h_eq to a practical system with limited bandwidth. The reason that h_eq does not equal to actual channel h is due to the limited system bandwidth, which is limited by the RRC filters 408, 412. The signal transformations described by the block diagram in FIG. 13A may also be described by the block diagram FIG. 13B. In the example shown in FIG. 13B, we describe an equivalent channel $h_{eq}$=RRC*h*RRC. The signal y 416 can be represented as the convolution of the up-sampled version of the preamble $x_{up}$, the up-sampled version of g ($g_{up}$), and $h_{eq}$. Thus, y is computed as $$y[n] = \sum_{i=0}^{L} (g_{up} * h_{eq})[i] x_{up}[n-i], \quad (14)$$

where $g_{up}*h_{eq}$ is the convolution of $g_{up}$ and $h_{eq}$.

Figure 14:
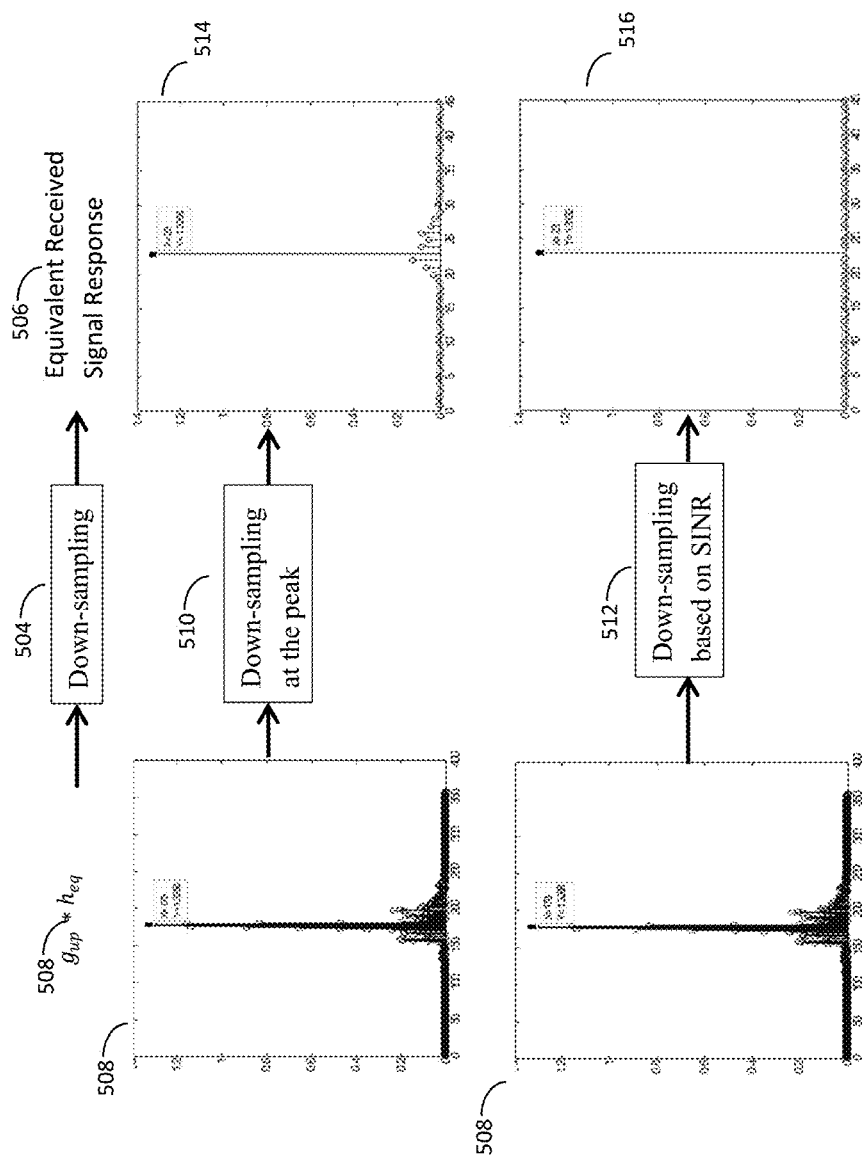
FIG. 14 is a graph showing exemplary results of down-sampling in a time-reversal system using symbol timing determined using a peak power criteria and using a maximum SINR criteria.

An exemplary accurate symbol timing estimate may be determined by finding the correct sample index of $g_{up}*h_{eq}$ using the preamble part 306 of the TR frame. Using the knowledge of the PN sequence $x_{up}$, we can obtain an estimated $g_{up}*h_{eq}$. Next, with the estimated $g_{up}*h_{eq}$, we can search for the sample that yields the highest SINR. That is, the down-sampled version of $g_{up}*h_{eq}$ may have largest SINR under correct symbol timing compared to other possible symbol timings. This property may be understood by considering the data and description in FIG. 14. FIG. 14 shows simulations of an exemplary received signal, y 508, being down-sampled 504 using timing signals to yield an equivalent received signal response 506. In one case, y 508 is down-sampled using a timing signal that is determined by the conventional peak-power technique 510 to yield the equivalent received signal response 514. In the other case, y 508 is down-sampled using timing signals that are determined by the SINR to yield the equivalent received signal response 516. Note that timing signal determined from the conventional peak power technique may not be correct in a TR system using SD and may cause higher ISI, as is shown in 514 compared to sampling at the correct symbol timing as shown in 516. Therefore, in exemplary TR systems, system performance may be improved by determining the correct symbol timing based on the SINR technique rather than the conventional peak power technique.

We can summarize the proposed symbol timing algorithm in two steps:

A. Find the estimation of $g_{up}*h_{eq}$ using a known PN sequence;

B. Find the correct timing based on the SINR criterion using the estimated $g_{up}*h_{eq}$.

In order to find the estimation of $g_{up}*h_{eq}$ using a known PN sequence, one exemplary technique is Least-Square (LS) estimation formulated as $$\min_{z} \|y - Xz\|_2 \quad (15)$$

where X is the Toeplitz matrix with $x_{up}$ as its first column, and z is the vector to estimate the equivalent channel $g_{up}*h_{eq}$. The solution to the above problem can be given by $$z = (X^H X)^{-1} X^H y \quad (16)$$

Using equation z=$(X^H X)$ −1XHy (16), we can approximate $g_{up}*h_{eq}$ by the least square solution z given the received signal y during the preamble.

Another exemplary technique is cross-correlation estimation. One important property of the PN preamble is that its autocorrelation may approximate a Dirac delta function. Moreover, it is expected that the PN preamble may have very low correlation values with any sequence other than its own. The autocorrelation function of a sequence may be defined as in $$r_{x_{up}}(m) = \sum_{i=0}^{N-1} x_{up}(i) x_{up}(i+m). \quad (17)$$

The cross correlation function $r_{yx}(n)$ of sequence y and x may be defined as in equation $$r_{yx_{up}}(n) = \sum_{i=0}^{N} x_{up}(i) y(i+n). \quad (18)$$

The cross correlation between y and $x_{up}$ can be computed using the definition in equation (18), which turns out to be the convolution of $r_{x_{up}}$, $g_{up}$ and $h_{eq}$, i.e., $$r_{yx_{up}}(n) = (r_{x_{up}} * g_{up} * h_{eq})(n) \approx (g_{up} * h_{eq})(n) \quad (19)$$

As mentioned above, $r_{x_{up}}$ may be a delta-like function. Therefore, $g_{up} * h_{eq}$ can be approximated by the cross-correlation of y and $x_{up}$.

In exemplary embodiments, the estimate of $g_{up} * h_{eq}$ may be used to derive the correct symbol timing in a TR system. As discussed in previous section, $g_{up} * h_{eq}$ may be estimated using the LS estimation z in Equation (16) or the cross-correlation function $r_{yx_{up}}$. In an exemplary embodiments, a cross-correlation method may be used to estimate $r_{yx_{up}}$ in Equation (18). The exemplary embodiments using LS estimation may have similar steps. Then the SINR of down-sampled $r_{yx_{up}}$ may be evaluated at different timing offsets. The timing offset that yields the highest SINR may be determined to be the correct timing signal. An exemplary algorithm for determining the symbol timing in a TR system is summarized in Table 1.

TABLE 1

Exemplary TR Symbol Timing Algorithm for Signature Design Systems

1. Compute the estimated equivalent channel $g_{up} * h_{eq}$ as $r_{yx_{up}}$.
2. Down-sample $r_{yx_{up}}$ by $R^{OVERSMP} \times D$ with different offset i, denoted as $r_{yx_{up},i}$ i.e., $r_{yx_{up},i}$ = downsample ($r_{yx_{up}}$, $R^{OVERSMP} \times D$, i), i = 1, . . . , $R^{OVERSMP} \times D$
3. For each $r_{yx_{up},i}$, calculate
   a) The power signal power:
   b) Sync index: $Sync_i = \mathrm{argmax}_n |r_{yx_{up},i}(n)|^2$
   c) ISI power: $P_{ISI,i} = \|r_{yx_{up},i}\|^2 - P_{sig,i}$
   d) SINR:
   $$SINR_i = \frac{P_{sig,i}}{P_{ISI,i} + P_N}$$
4. The correct symbol timing is determined as
   $sync = sync_{i_{opt}} \times R^{OVERSMP} \times D + i_{opt}$ The down-sampling rate is $R^{OVERSMP} \times D$, and thus there are $R^{OVERSMP} \times D$ different offsets to consider. For each offset i, we down-sample $r_{yx_{up}}$ to obtain the downsampled version $r_{yx_{up},i}$. For each downsampled version $r_{yx_{up},i}$, its SINR is computed by first calculating the peak power $P_{sig,i}$, and then the ISI power $P_{ISI,i}$. The SINR can be computed by dividing the peak power with the ISI power plus the noise power. The index of the peak sample for each down-sampled version is recorded as $Sync_i$. Finally, we find out the optimal offset $i_{opt}$ with the maximum SINR, and translate $Sync_{i_{opt}}$ in the down-sampling domain to the index in the up-sampling domain.

In another exemplary embodiment, we down-sample $r_{yx_{up}}$ with the factor of $R^{OVERSMP}$ to obtain the downsampled version. For each downsampled version, we find the peak index and compute the ISI power by computing the off-peak signal power with the backoff D. The correct symbol timing is the peak index with the minimal ISI power.

Figure 15:
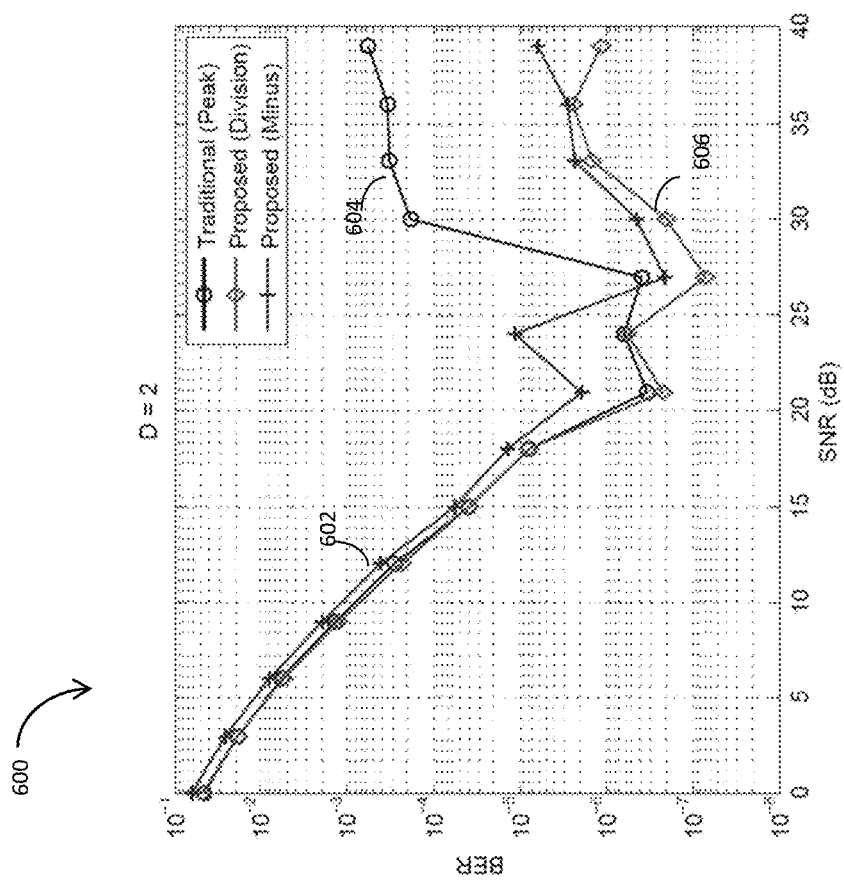
FIG. 15 is a graph showing the exemplary results of the predicted bit error rate (BER) performance for a time-reversal system using three different symbol timing estimation methods.

In exemplary embodiments, an alternate definition for $SINR_i$, namely, $SINR_i^{minus} = P_{sig,i} - P_{ISI,i}$ may be utilized. Utilizing the alternate definition, which replaces the more computationally complex operation of division with the less computationally complex operation of subtraction may yield some advantages in exemplary hardware implementations. In the following discussion, the 'division' label denotes the SINR as described in Table 1 and the 'minus' label denotes this approach using alternate definition for SINR. The 'peak' label denotes using traditional symbol timing that has been determined by locating the sample in the sequence with the peak power. FIG. 15 shows the results of the BER calculations described above. It can be seen that using the traditional symbol timing method, at high power and high signal-to-noise-ratio (SNR), the BER performance is much worse than when using either of the SINR timing methods described in this disclosure. In the data shown in FIG. 15, the predicted BERs for the SINR 'division' and SINR 'minus' timing methods are similar. In embodiments, the SINR minus technique may be accurate enough and may be used in system designs that seek to reduce computational complexity.

Carrier Frequency Offset (CFO) Estimation in TR Wideband Communications

CFO occurs when the local oscillator for down conversion at the receiver does not synchronize with the local oscillator for up conversion at the transmitter, which degrades the performance of wireless communication systems.

In addition to the linear phase rotation, CFO also destroys the orthogonality between different users and undermines the accuracy of the initial cell search in direct-sequence code division multiple access (DS-CDMA) systems. In the orthogonal frequency-division modulation (OFDM) multi-carrier systems, CFO introduces attenuation onto the useful signals and damages the orthogonality between different subcarriers.

Like other wireless communication systems, TR systems also suffer from CFO. In this disclosure, we propose methods to estimate and mitigate CFO in the TR wideband communication systems. We insert pilot blocks into data frames. Using the time-domain pilots, we propose four different CFO estimation methods, i.e., angle-of-mean/mean-of-angle with/without reusing.

Figure 16A:
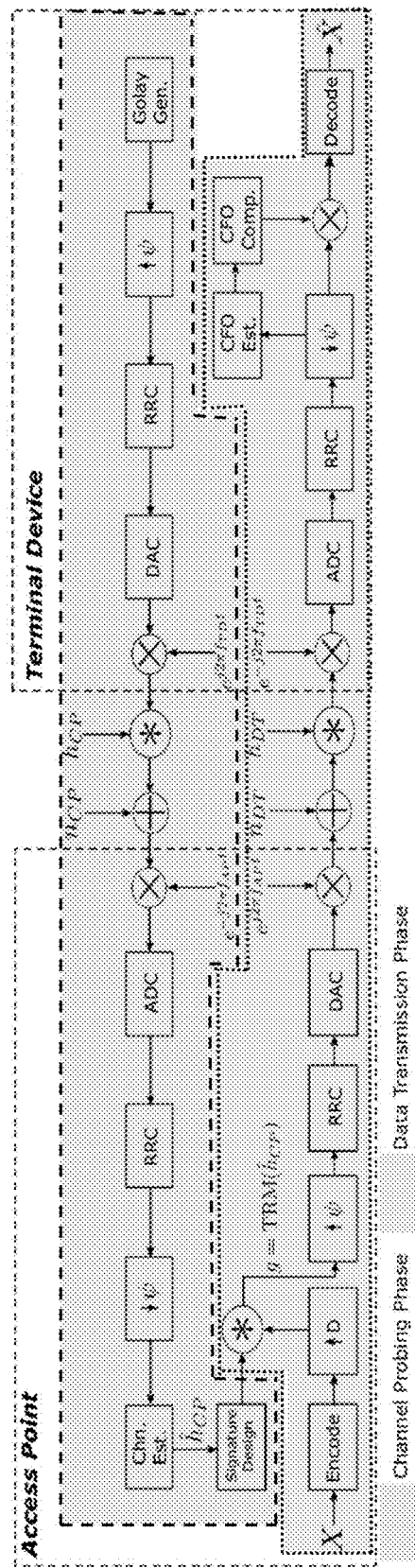
FIG. 16A is a graph showing an exemplary architecture of a time-reversal communication system.

As shown in FIG. 16A, a TR transmission cycle consists of two phases: channel probing (CP) and data transmission (DT). (i) In the CP phase, the terminal device (TD) sends a Golay sequence to the access point (AP) for channel impulse response (CIR) estimation. Then, AP generates a signature g based on the estimated CIR. (ii) In the DT phase, AP convolves the signal with the signature g. The transmitted signal convolves with the channel naturally, which is mathematically equivalent to the matched filtering. TD estimates and mitigates CFO, and decodes the signal using a Viterbi decoder.

TR wireless communication relies on two basic assumptions: channel reciprocity and channel stationarity. Channel reciprocity requires the CIRs in the forward and backward link to be highly correlated, whereas channel stationarity requires that CIR does not change much for at least one TR transmission cycle.

Due to the asymmetric structure, the complexity of TDs can be driven down dramatically, since the channel estimator and equalizer are not required at TDs. Nevertheless, CFO disturbs the performance of TR systems which must be dealt with at the TD. CFO affects the TR system in the CP and DT phases differently, as (i) CFO introduces phase distortion into the signature g at the AP in the CP phase. (ii) CFO leads to a time varying phase shift at TD in the DT phase. In the CP phase, TD constructs a Golay sequence of length $L_{GS}$, given as $\{G[k]\}_{k=0, 1, \ldots, L_{GS}-1}$, for channel estimation, which has the following property:

$$(G * G)[k] = \sum_{k=0}^{L_{GS}-1} G[m]G[k-m] = L_{GS}\delta[k - (L_{GS} - 1)], \quad (20)$$

where δ is the Dirac function, and * stands for linear convolution. The received signal at AP after decimation is $$Y_{CP}[k]=(G*h_{CP})[k]e^{j2\pi\Delta fT_s\psi k}+n_{CP}[k], \quad (21)$$

where $\{h_{CP}[\ell]\}_{\ell=0,1,\cdots,L-1}$ is the L-tap CIR between the AP and the TD in the CP phase. Assume that the CIR reciprocity and stationarity hold, we could rewrite $h_{CP}[\ell]$ as $h[\ell]$. $\Delta f=f_{AP}-f_{TD}$ is the CFO, i.e., the difference between the LO frequencies the TD and that at the AP, ψ the decimation ratio shown in FIG. 1, and $n_{CP}[k]\sim\mathcal{CN}(0,\sigma^2)$ is the channel noise in the CP phase. $T_s$ is the sampling interval before decimation, and $T_b=\psi T_s$ the baseband sampling interval after decimation.

The CIR can be estimated by convolving the received signal in (21) with the Golay sequence as $$\hat{h}[\ell] = \frac{1}{L_{GS}}(G*Y_{CP})[\ell+L_{GS}-1] = \quad (22)$$

$$\frac{1}{L_{GS}}\sum_{\ell'=0}^{L-1}h[\ell']\sum_{m=0}^{L_{GS}-1}G[m]G[\ell+L_{GS}-1-\ell'-m]\times$$

$$e^{j2\pi\Delta fT_s\psi(\ell+L_{GS}-1-m)}+n'[\ell+L_{GS}-1],$$

where $$n'[k]=\frac{1}{L_{GS}}(G*n_{CP})[k]$$

is the summation of many zero mean complex Gaussian noises scaled by $1/L_{GS}$ and thus can be ignored since $L_{GS}$ is large in general.

Since $\Delta fT_s$ is typically very small for wideband TR systems, $e^{j2\pi\Delta fT_s\psi(l+L_{GS}-1-m)}$ can be approximated as $e^{j2\pi\Delta fT_s\psi(l+L_{GS}-1-m)}$ for all m. Then, according to equation (1), the above equation can be rewritten as $$\hat{h}[l]=h[l]e^{j\Delta\omega\psi l}e^{j\theta}+n'[l+L_{GS}-1], \quad (23)$$

where $\Delta\omega=2\pi\Delta fT_s$ is the normalized CFO (NCFO), and $\theta=2\pi\Delta fT_s\psi(L_{GS}-1)$ is the common phase error.

In the DT phase, we assume that the CIR reciprocity and stationarity hold which again leads to $h_{DT}[l]=h[l]$. The received baseband signal after decimation is given by $$Y[k]=S[k]e^{j\Delta\omega D\psi k}e^{-j\theta}+n_{DT}[k], \quad (24)$$

where $$S[k] = \underbrace{(h*g)[L-1]X\left[k-\frac{L-1}{D}\right]}_{s_1[k]} + \underbrace{\sum_{l=0,l\neq(L-1)/D}^{(2L-2)/D}(h*g)[Dl]X[k-l]}_{s_2[k]}. \quad (25)$$

In equation (25), X[k] is the k-th transmitted symbol with X[k]=0, ∀k<0, D is the back-off rate to reduce inter-symbol-interference, $n_{DT}[k]$ the zero-mean complex Gaussian noise with variance $\sigma^2$, $S_1[k]$ is the useful part which carries the transmitted symbol, $S_2[k]$ the inter-symbol-interference (ISI), and g[k] the signature given by $$g[k] = TRM(\hat{h}) = \frac{\hat{h}^*[L-1-k]}{\sqrt{\sum_{\ell=0}^{L-1}|\hat{h}[\ell]|^2}} = \frac{h^*[L-1-k]e^{-j\Delta\omega(L-1-k)\psi}}{\sqrt{\sum_{\ell=0}^{L-1}|h[\ell]|^2}}. \quad (26)$$

Substituting g[k] in (7) into S[k] in (6) yields $$S[k] = \beta(\Delta\omega)X\left[k-\frac{L-1}{D}\right]e^{-j\theta}+\eta[k], \quad (27)$$

where $$\eta[k] = \sum_{l=0,l\neq(L-1)/D}^{(2L-2)/D}\sum_{\ell'=0}^{L-1}\frac{1}{\sqrt{\sum_{\ell=0}^{L-1}|h[\ell]|^2}}h[\ell'] \quad (28)$$

$$h^*(L-1-Dl+\ell')e^{-j\Delta\omega\psi(L-1-Dl+\ell')}e^{-j\theta}X[k-l]$$

is the ISI, and $$\beta(\Delta\omega) = \frac{\sum_{\ell=0}^{L-1}|h[\ell]|^2 e^{-j\Delta\omega\psi\ell}}{\sqrt{\sum_{\ell=0}^{L-1}|h[\ell]|^2}} \quad (29)$$

is the amplification of the signal by virtue of the waveform g[k] in (7) in presence of Δω, denoted as the TR focusing gain. When Δω=0, the TR focusing gain is given by $$\beta(0) = \sqrt{\sum_{\ell=0}^{L-1}|h[\ell]|^2}, \quad (30)$$

which implies that the TR technique could fully utilize the rich-scattering environment to improve the transmission signal amplitude and thus enhance the signal-to-noise ratio.

Figure 16B:
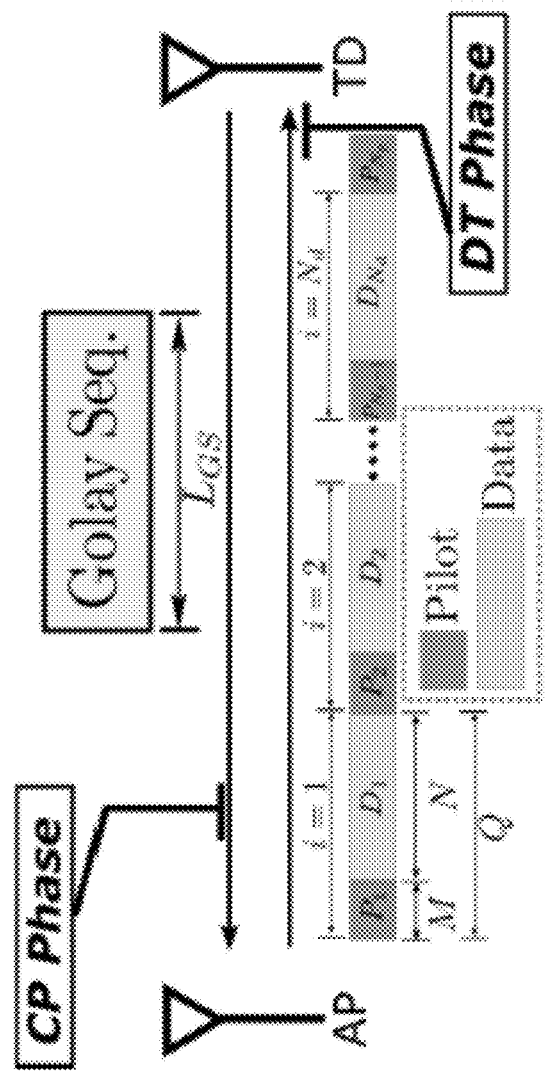
FIG. 16B is a graph showing an exemplary frame structure for TR systems and OFDM systems.

It can be shown that the CFO has very limited effect on the signature g[k]. Therefore, CFO estimation is unnecessary in the CP phase. To estimate the CFO in the DT phase, as shown in FIG. 16B, we place identical pilot blocks $P_1, P_2, \ldots, P_{N_p-1}$ into data blocks $D_1, D_2, \ldots, D_{N_d}$. Here $N_p$ and $N_d$ represent the total number of pilot and data blocks. An additional pilot block $P_{N_p}$ is appended after the last data block indexed by $D_{N_d}$, making $N_p=N_d+1$. The length for each pilot block is M and that of each data block is N. The length of one transmission block is thus Q=M+N. The block index is denoted as i.

Given the frame structure in FIG. 16B, the normalized CFO Δω can be estimated by calculating Φ[k, k+Q] as $$\Phi[k,k+Q]=Y[k]Y^*[k+Q]=|S[k]|^2e^{j\Delta\omega D\psi Q}+n[k]S^*$$
$$[k+Q]e^{j\Delta\omega D\psi(k+Q)}+n^*[k+Q]S[k]e^{-j\Delta\omega D\psi k}+n[k]n^*$$
$$[k+Q], k=iQ+j, 0\leq j\leq M-1, \quad (31)$$

with Y[k] being the received baseband signal after decimation, n[k] the zero-mean complex Gaussian noise with variance $\sigma^2$, $\psi$ the decimation ratio and D the rate back-off factor as shown in FIG. 16A. Note that $\Phi[k, k+Q]$ is the correlation between the received symbol Y[k] and Y[k+Q] defined as Y[k]Y*[k+Q]. The notation $n_{DT}[k]$ is written as n[k] for convenience. Given i and j, $\Delta\omega$ can be estimated by $$\widehat{\Delta\omega} = \frac{\angle\left[\frac{\Phi[iQ+j,(i+1)Q+j]}{M}\right]}{QD\psi},$$

where $\angle[X]$ denotes the angle of the complex argument X.

We propose four estimators based on the above equation:

$$\widehat{\Delta\omega} = \tag{32}$$

$$\begin{cases} \dfrac{\angle\left[\dfrac{2}{MN_p}\sum_{i=1}^{N_p/2}\sum_{k=0}^{M-1}\Phi[2Qi-2Q+k,2Qi-Q+k]\right]}{QD\psi}, & AOM-NR \\[2ex] \dfrac{2\sum_{i=1}^{N_p/2}\angle\left[\dfrac{1}{M}\sum_{k=0}^{M-1}\Phi[2Qi-2Q+k,2Qi-Q+k]\right]}{N_pQD\psi}, & MOA-NR \\[2ex] \dfrac{\angle\left[\dfrac{1}{M(N_p'-1)}\sum_{i=1}^{N_p'-1}\sum_{k=0}^{M-1}\Phi[Qi-Q+k,Qi+k]\right]}{QD\psi}, & AOM-R \\[2ex] \dfrac{\sum_{i=1}^{N_p'-1}\angle\left[\dfrac{1}{M}\sum_{k=0}^{M-1}\Phi[Qi-Q+k,Qi+k]\right]}{(N_p'-1)QD\psi}, & MOA-R \end{cases}$$

where AOM stands for angle-of-mean, MOA for mean-of-angle, R for reusing, and NR for non-reusing. $N_p$ is the number of pilot blocks for non-reusing schemes, while $N_p'$ the counterpart for reusing schemes.

Figure 16C:
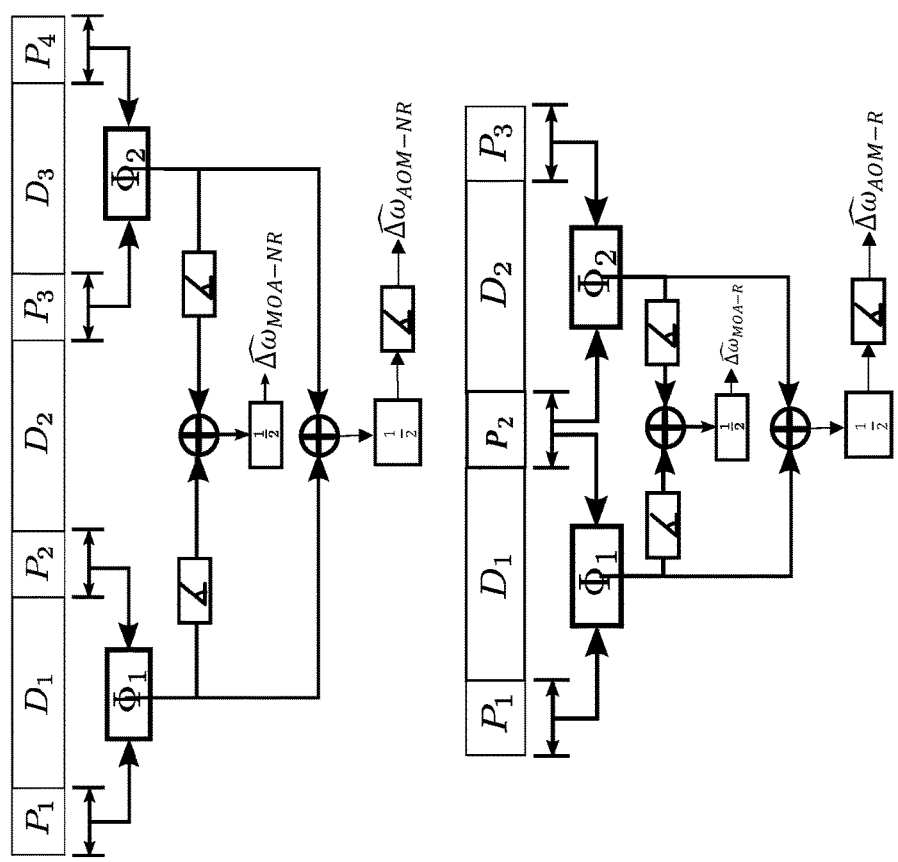
FIG. 16C is a graph showing an exemplary architecture of the CFO estimation (a) for without reusing pilot block and (b) for reusing pilot block $P_2$.
Figure 16D:
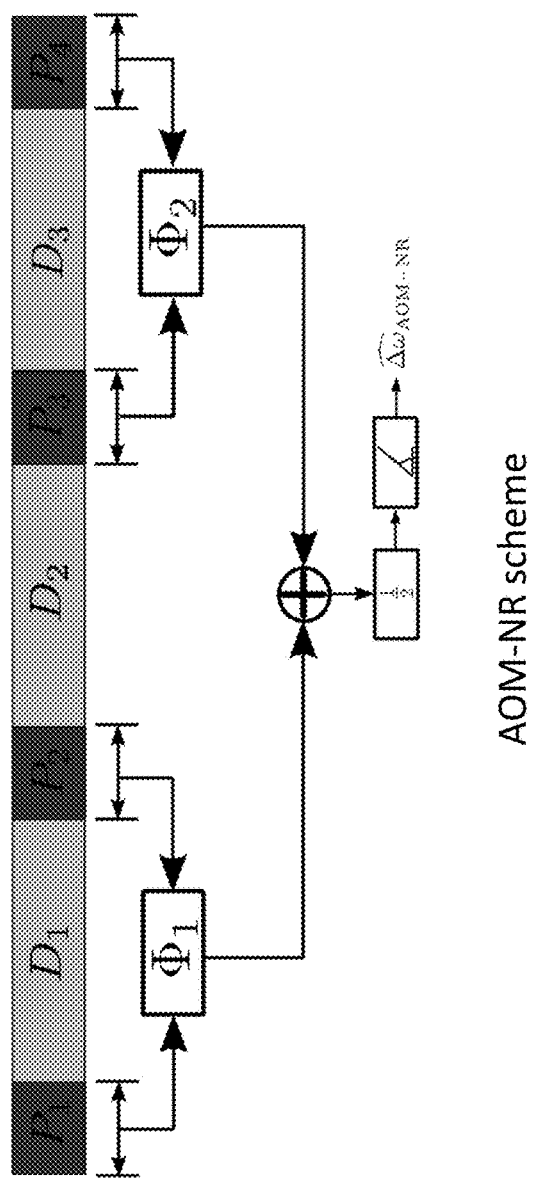
FIGS. 16D to 16G are diagrams showing exemplary architectures of the CFO estimation.
Figure 16E:
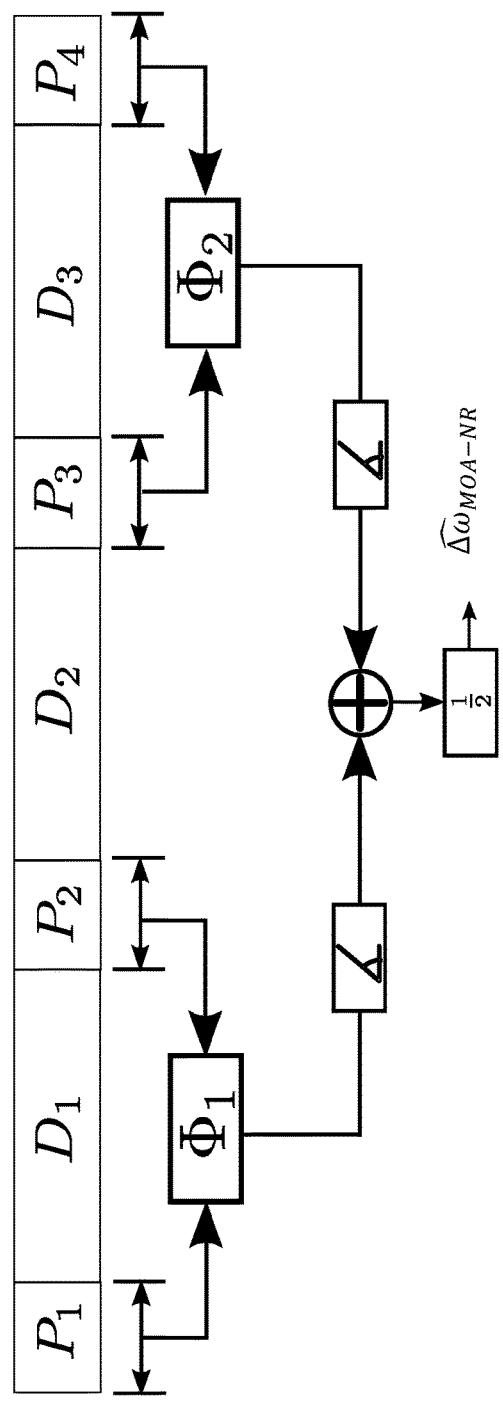

We illustrate the proposed schemes in FIG. 16C. In the non-reusing schemes, we calculate $\Phi_1$ from $P_1$ and $P_2$, and $\Phi_2$ from $P_3$ and $P_4$, while in the reusing schemes, we reuse the same pilot block $P_2$ to calculate $\Phi_1$ and $\Phi_2$. On the other hand, for AOM, we take average of the correlations between two adjacent pilot blocks and then calculate the angle, while for MOA, the operations are reversed. Therefore, referring to FIG. 16D, estimator "AOM-NR" means first taking the average of the auto-correlations between two adjacent pilot blocks and then calculating the angle, and the CFO is estimated once for every two pilot blocks. Referring to FIG. 16E, estimator "MOA-NR" means first calculating the angle from the auto-correlation averaged over all pilot symbols in a pilot block and then taking the average of the angles over all data blocks, and the CFO is estimated once for every two pilot blocks. For example, one pilot block may include 32 pilot symbols. The number of pilot symbols per pilot block can be increased to improve the estimation performance, but may decrease transmission efficiency.

Figure 16F:
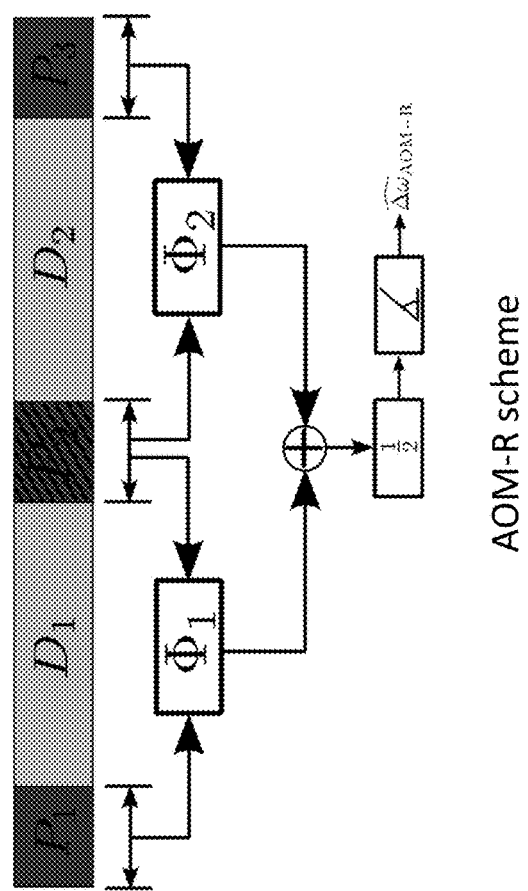
Figure 16G:
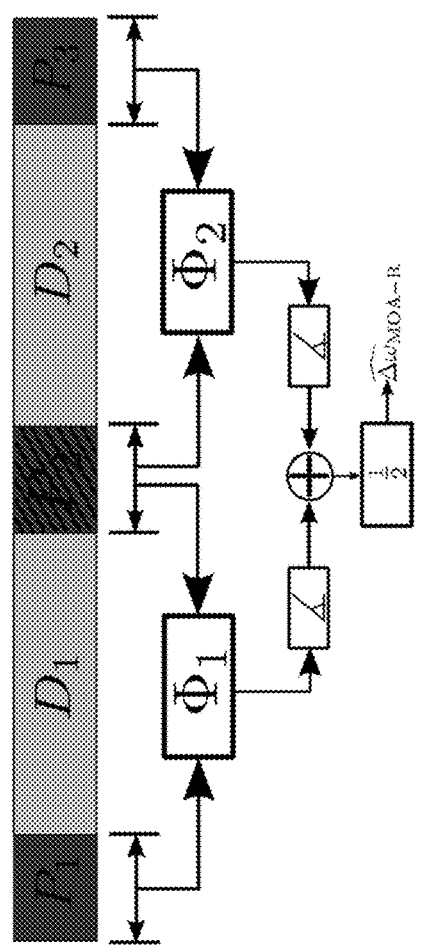

Referring to FIG. 16F, estimator "AOM-R" means first taking the average of the auto-correlations between two adjacent pilot blocks and then calculating the angle, and the CFO is estimated with utilizing one common pilot block. Referring to FIG. 16G, estimator "MOA-R" means first calculating the angle from the auto-correlation averaged over all pilot symbols in a pilot block and then taking the average of the angles over all data blocks, and the CFO is estimated with utilizing one common pilot block.

Using $\widehat{\phantom{x}}$, the phase of the received data Y[k] in data block i should be corrected as $$\tilde{Y}[k]=Y[k]e^{-j(\widehat{\phantom{x}}\psi D(O+k))}, k=(i-1)Q+M+j, 0\leq j\leq N-1, \tag{33}$$

where O compensates the additional delay of hardware due to filtering. Here, we assume that the initial phase $\theta$ in equation (24) has been removed. Then, $\hat{Y}[k]$ is decoded by a Viterbi decoder, yielding the decoded symbols $\hat{X}[k]$.

By investigating the MSE, defined as $MSE(\widehat{\phantom{x}})=\mathbb{E}[(\widehat{\phantom{x}}-\Delta\omega)^2]$ it is know that the MSE improves when Q becomes larger. However, when Q exceeds a certain boundary, phase wrapping occurs due to that fact that phase different cannot exceed $2\pi$, which introduces bias and degrades the MSE performances in estimation. So it is important to choose Q appropriately in system design to avoid phase wrapping.

First of all, consider the noiseless case, where n[k] and n[k+Q] are 0, we have $$\Phi[k,k+Q]=|S[k]|^2 e^{j\Delta\omega Q\psi D}. \tag{34}$$

When $|\Delta\omega Q\psi D|<\pi$, $\Delta\omega$ can be perfectly estimated using equation (13). On the other hand, when $|\Delta\omega Q\psi D|<\pi$, the estimation of $\Delta\omega$ is biased by $$\frac{2z\pi}{Q\psi D}.$$

Thus, we must ensure that $|\Delta\omega Q\psi D|<\pi$. In presence of noise, the condition can be written as $$Q<\lambda Q^+ = \frac{\lambda\pi}{|\Delta\omega|D\psi}, \tag{35}$$

where $\lambda\in(0,1]$ is introduced for robustness. Therefore, one should choose a large Q to improve the MSE performance, but not beyond the limitation posed by equation (35).

Time Reversal for Future 5G Wireless

As the demand for wireless voice and data services has continued to grow dramatically, operators struggle to satisfy this demand with acceptable quality of service. The main approach until now was to increase the system bandwidth and spectral efficiency. For instance, there was an almost tenfold increase for each new generation of cellular technology [the first generation (1G) technology can support up to 30 kHz, second generation (2G) around 200 kHz, third generation (3G) around 1.25-5 MHz, and fourth generation (4G) up to 20 MHz]. Meanwhile, technologists have begun seeking more innovative and efficient communication technologies to meet the ever-increasing demand for data traffic with advanced signal processing capabilities for the 5G wireless communication systems. It is expected that 95% of data traffic will come from indoor locations in a few years. Compared to outdoor propagation, wireless medium in an indoor environment often exhibits richer multipath propagation mostly without a strong line-of-sight (LOS) component, which makes the design of 5G indoor communication systems even more challenging.

Several key ideas have received attention as promising candidates for future 5G wireless communication systems in recent years. The first candidate solution is the massive multiple-input, multiple output (MIMO) technique. The massive MIMO effect, in essence, makes the channels to different users quasi-orthogonal with very simple spatial multiplexing/de-multiplexing procedures and achieves large spectral efficiency gains. A straightforward approach to implement this technique is to mount hundreds of antennas on the transmitter and/or the receiver. However, challenges such as pilot contamination, hardware implementation complexity, antenna correlation, and mutual coupling due to the large number of antennas have to be carefully addressed. In addition, the requirement of deploying a large number of antennas at the base station in massive MIMO systems may not be feasible in indoor scenarios.

The second candidate solution is network densification by more heterogeneous network deployment, such as the small cell technique and device-to-device (D2D) communication technique. These techniques can improve the link efficiency by replacing longer links with shorter ones. However, coordination and interference management among the small cells (or D2D links) may become challenging. Ideally, the network should be easily scalable so that when additional cells/links are needed, little interference will be introduced, requiring only low-complexity interference management.

Another candidate solution is the cloud-based radio access networks (C-RAN), where all the baseband processing is carried out through high-performance computing in a centralized structure, which transforms the evolution of the wireless networks from today's cell-centric architecture into a device-centric architecture. Nevertheless, as with network densification, the limited fronthaul link capacity may prevent the C-RAN from fully utilizing the benefits made possible by concentrating the processing intelligence at the cloud.

Besides the aforementioned challenges of the candidate techniques, the operation of a large number of base stations and heterogeneous devices will consume a lot of energy. Therefore, the next-generation networks should focus on achieving better energy efficiency and reduce the complexity of user devices as much as possible. From the aforementioned discussion, we can see that most of the existing solutions for 5G have their inherent limitations, which may make them either difficult to implement as a collectively cohesive solution or not as efficient as expected. Moreover, these solutions may not work well in indoor environments, where the vast majority of current and future data traffic will come from. In this disclosure, we will show that TR communication possesses many outstanding characteristics to address most of the previously mentioned challenges and, therefore, is an ideal candidate platform for 5G indoor systems.

Figure 17:
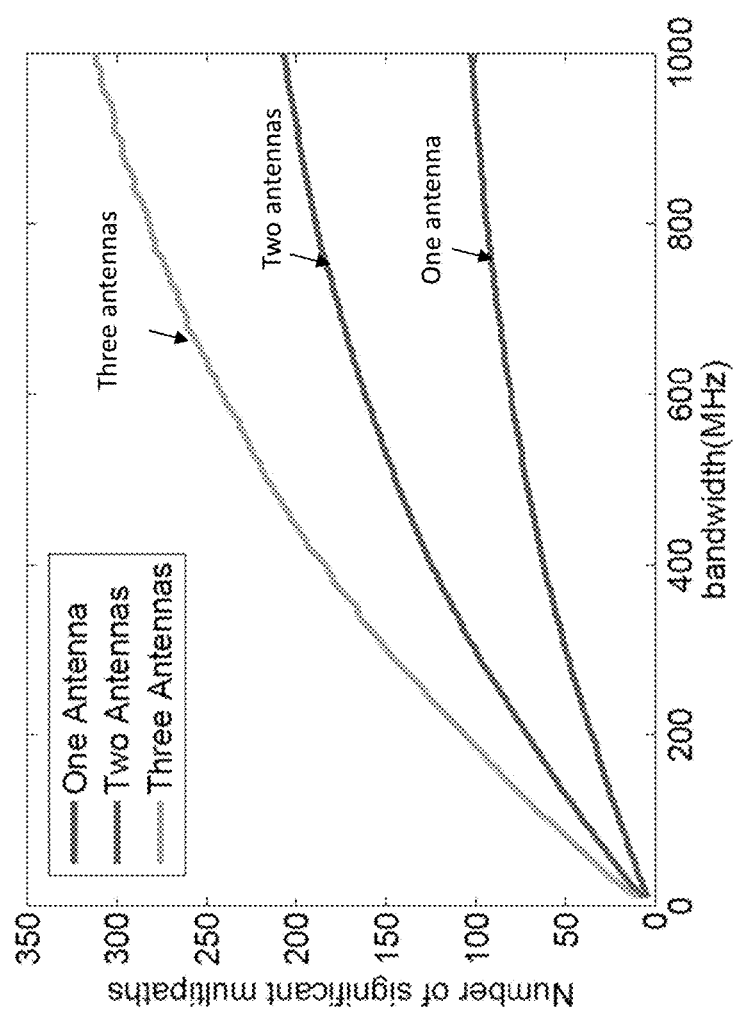
FIG. 17 is a graph showing the exemplary number of significant multipaths at different bandwidths.

First, TR is a single-antenna realization of the massive MIMO effect. In a typical indoor environment, the reflection, diffraction, and scattering in the wireless medium due to the various obstacles and reflectors-such as walls, windows, and furniture-often create a large number of multipath components. As new spectrum and larger bandwidth become available, more rich-scattering multipaths can be revealed. We used two universal software radio peripherals (USRPs) as channel sounders to probe the real channel in an office environment. Specifically, we scanned the spectrum from 4.9 to 5.9 GHz to acquire the channel impulse response with a bandwidth of 10 MHz-1 GHz using transmission power of 100 mW. Based on these experiments, we show in FIG. 17 the number of significant multipaths in an indoor environment versus the channel bandwidth. It can be seen that, with a single antenna, the number of multipaths can approach approximately 100 as the bandwidth increases to 1 GHz. Such degrees of freedom can be further scaled up by deploying more antennas.

Figure 18A:
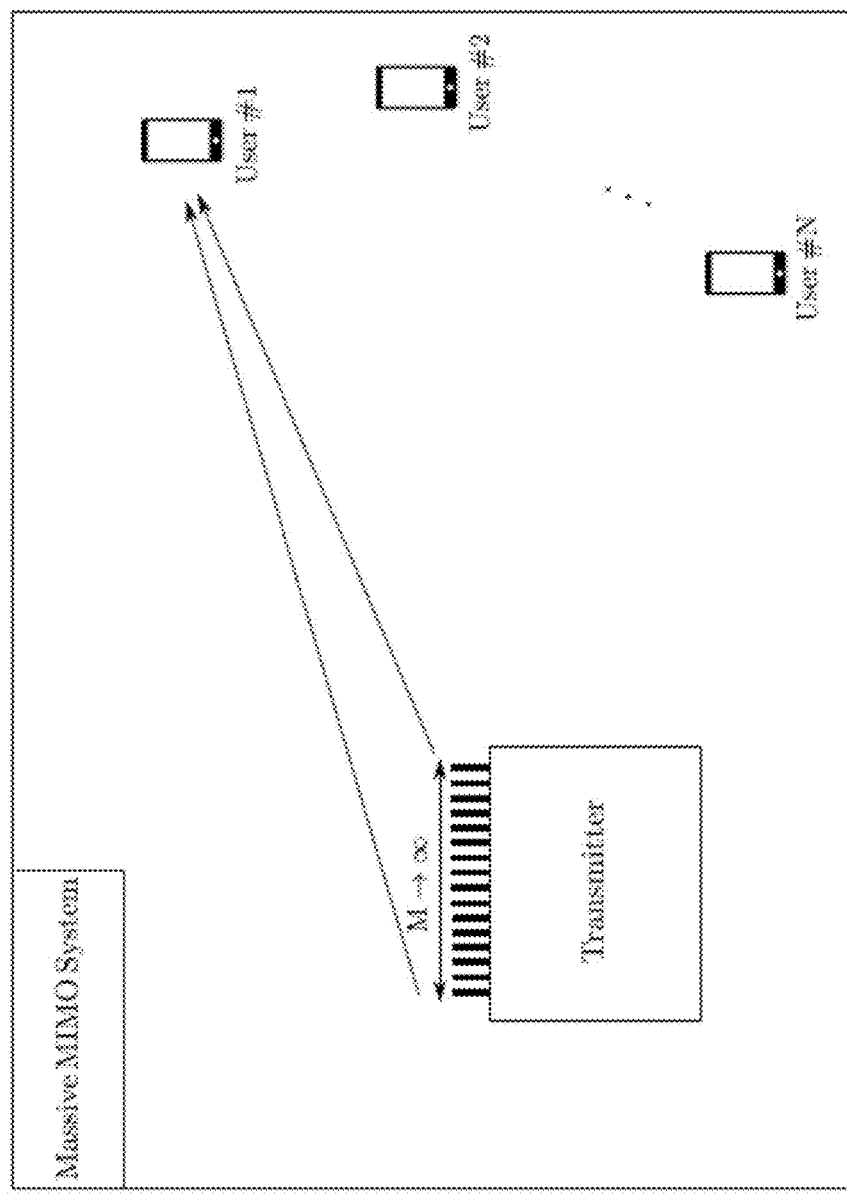
FIG. 18A is a graph showing an exemplary realization of the massive MIMO effect by the multi-antenna approach.
Figure 18B:
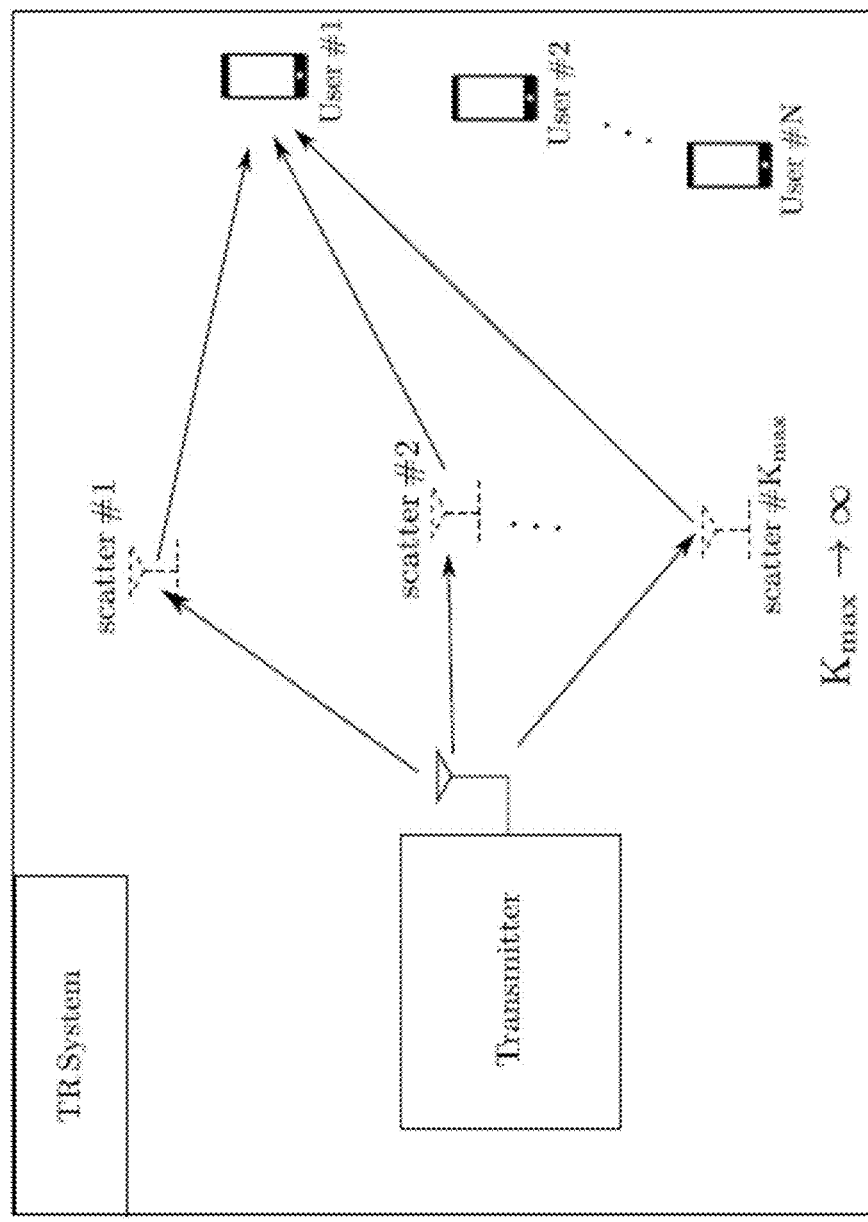
FIG. 18B is a graph showing an exemplary realization of the massive MIMO effect by the time-reversal approach.

Different from the way conventional techniques exploit the multipath propagation environment, the TR technique can take advantage of the multipath propagation without the need for deploying complicated receivers or a large number of antennas if sufficiently large bandwidth can be used. The larger the bandwidth, the better the resolution of individual multipath components. As shown in FIGS. 18A and 18B, there are two ways to realize the massive MIMO effect. One is to use a large number of real antennas to straightforwardly build a massive antenna system. And the other is to leverage TR that inherently treats the multipaths in the environment as virtual antennas. Both can achieve the spatial-temporal resonance at a particular space and time that we now commonly term as the massive MIMO effect. Basically, it is a small focusing ball of energy that takes place due to the very high degree of freedom. By exploiting a large number of virtual antennas, a single-antenna TR system can achieve superior focusing effect in both time and spatial domains, resulting in similar promising performance as massive MIMO systems.

Suppose that there are totally $K_{max}$ independent multipath components from the transmitter to the $j^{th}$ receiver and the delay spread of the channel is given by $\tau_C$. Then there are $L = \text{round}(\tau_C W)$ taps in the channel impulse response denoted by $h_j = [h_j(1), h_j(2), \ldots, h_j(L)]^T$. In TRDMA downlink communication, the signal received by the $j^{th}$ receiver is $$Y_j[k] = H_j^{(\frac{L}{D})} g_j X_j \left[k - \frac{L}{D}\right] + \sum_{l=1, l \neq L/D}^{(2L-1)/D} H_j^{(l)} g_j X_j[k-l] + \sum_{l=1}^{(2L-1)/D} H_j^{(l)} \sum_{i=1, i \neq j}^{N} g_j X_i[k-l] + n_j[k], \quad (36)$$

where L is the number of the channel taps, $X_j$ denotes the information to be transmitted to the $j^{th}$ receiver, $g_j$ denotes the signature waveform, $n_j$ is the additive noise, and $H_j^{(m)}$ is the $m^{th}$ row of the $$\frac{2L-1}{D} \times L \text{ matrix } H_j$$

decimated by rows of Toeplitz matrix which can be written as $$H_j = \begin{pmatrix} h_j[D] & h_j[D-1] & \ldots & h_j[1] & 0 & \ldots \ldots & 0 \\ h_j[2D] & h_j[2D-1] & \ldots & \ldots & h_j[1] & 0 & \ldots & 0 \\ \ddots & \ddots & \ddots & & \ddots & \ddots & \ddots & \ddots & \vdots \\ h_j[L] & h_j[L-1] & \ldots & \ldots & \ldots & \ldots \ldots & h_j[1] \\ \vdots & \vdots & \ddots & & \ddots & \ddots & \ddots & \ddots & \vdots \\ 0 & \ldots & 0 & h_j[L] & \ldots & \ldots & h_j[L-D+1] & h_j[L-2D] \\ 0 & \ldots \ldots & & 0 & h_j[L] & \ldots & h_j[L-D+1] & h_j[L-D] \end{pmatrix}, \quad (37)$$

and thus $$H_j^{(\frac{L}{D})}$$

is the time-reversal channel $$H_j^{(\frac{L}{D})} = [h_j(L), h_j(L-1), \ldots, h_j(1)].$$

When the bandwidth W is small, all elements in $h_j$ are generally non-zero, i.e., K=L. On the other hand, when W is sufficiently large, there are at most $K=K_{max}<L$ non-zero elements. Similar to the quasi-orthogonal property in massive MIMO, given an excessive amount of antennas, the multipath profile of different users in the TR system will also be orthogonalized given massive independent multipaths, i.e., when K becomes very large. In other words, let $Q=[H_1^T, H_2^T, \ldots, H_N^T]^T$, which is the combination of CSIs from the transmitter to the N receivers. Then, the term $QQ^\dagger$ represents the correlation matrix of the N CSIs. When $K=K_{max}\to\infty$, the off-diagonal elements of $QQ^\dagger$ converge to zero in distribution, and the diagonal elements converge to $\|h_j\|^2$ in distribution, meaning that the CSIs of the N receivers become orthogonal to each other under the rich-multipath setting. FIGS. 18C to 18E are graphs showing exemplary spatial focusing in time-reversal systems with 40 MHz, 120 MHz, and 360 MHz bandwidths, respectively. Based on the indoor measurements with the TR prototype, TR with 125 MHz bandwidth is capable of forming a spatial focusing ball, similar to that shown in FIG. 18E, and the focusing ball of TR naturally shrinks to a pinpoint in a rich-scattering environment with a sufficiently large bandwidth. In practice, we only need that $K_{max}$ is large enough to achieve massive multipath effect. Even though $K_{max}$ is a fixed value given the power and environment, there still exists other method to realize massive multipaths.

In a massive MIMO system, when the number of antennas grows large, the random channel vectors between the users and the base station become pairwisely orthogonal. Similarly, in a TR system when the number of multipaths grows large, a pairwisely orthogonal property among the random channel vectors between the receivers and the transmitter exists.

In addition, the implementation complexity of a TR system is much lower since it utilizes the environment as a virtual antenna array and a computing resource. If cooperation of users, e.g., cooperative communications, is a distributed way of achieving the MIMO effect of high diversity, then TR is similarly a cooperation of virtual antennas to achieve the massive MIMO effect. The TR waveform is used to control each multipath (virtual antenna), in which the spectral efficiency is lowered as a trade-off for the diversity effect.

Figure 19A:
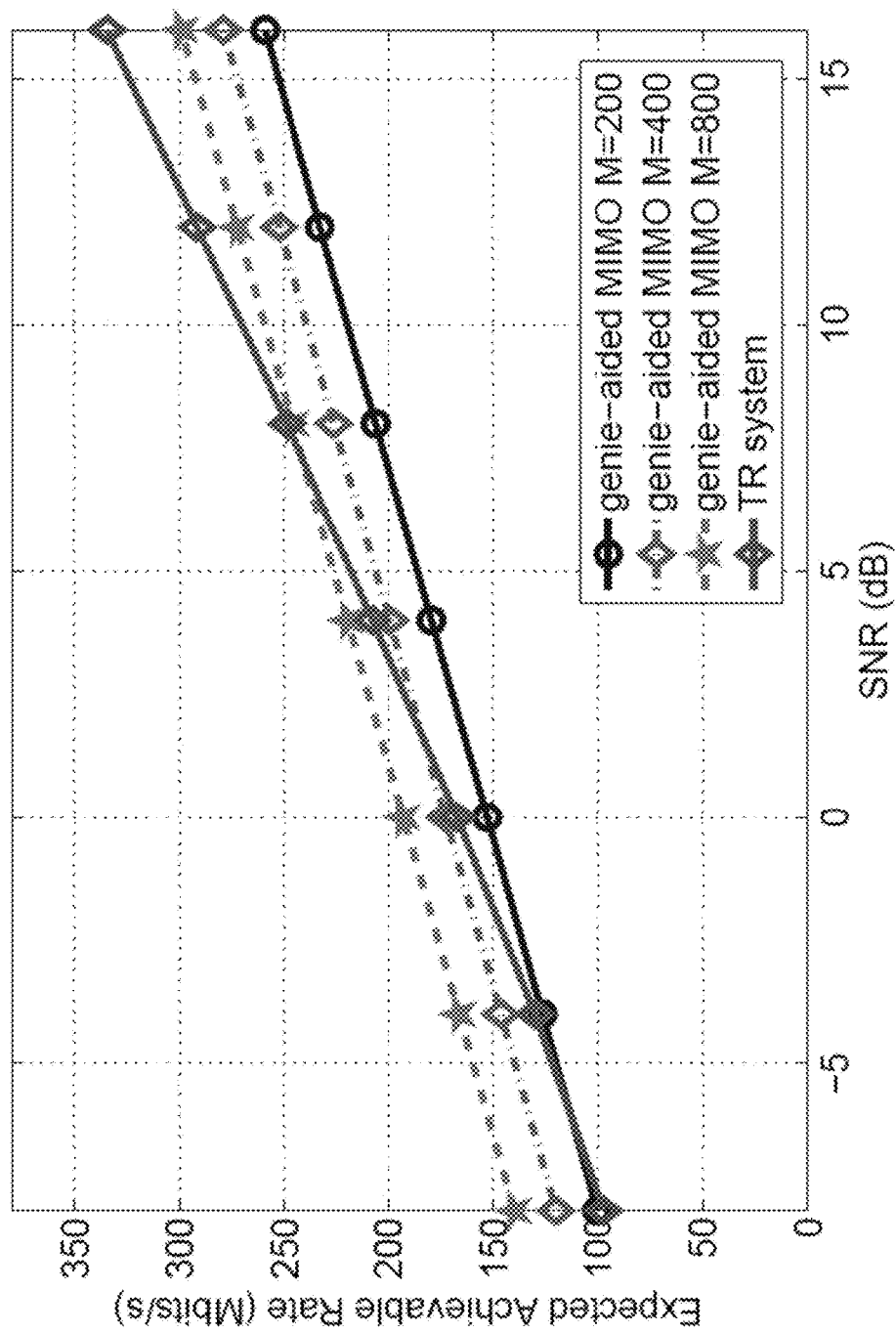
FIG. 19A is a graph showing the exemplary results of the comparison of the expected achievable rate between a TR system and a massive MIMO system.
Figure 19B:
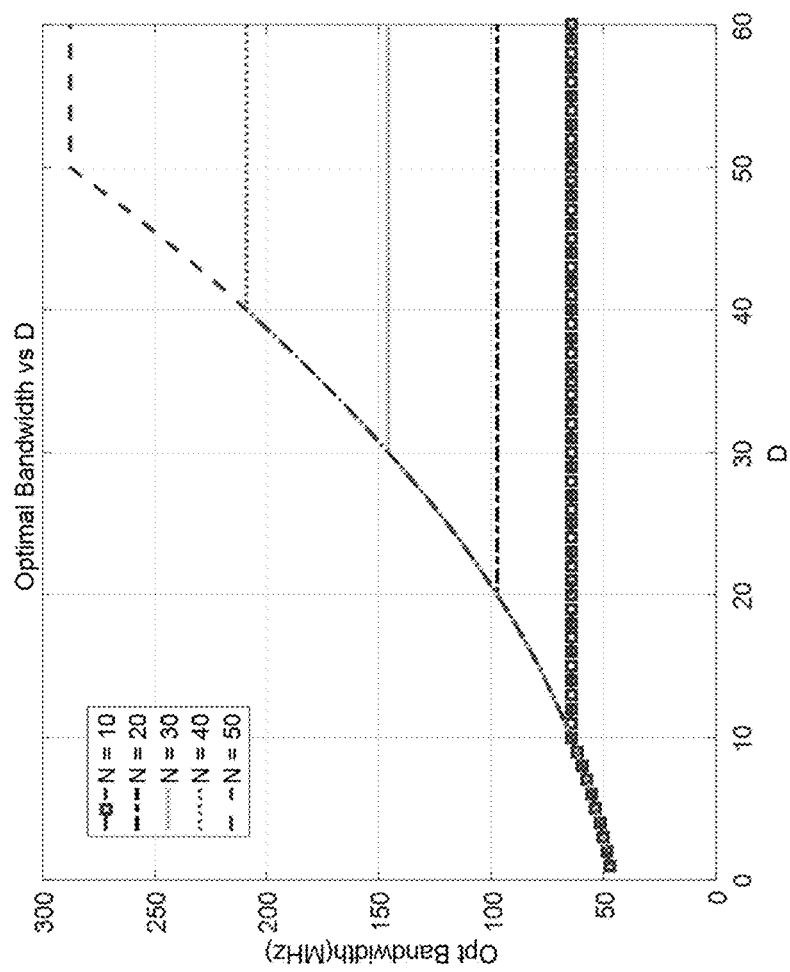
FIG. 19B is a graph showing the optimal bandwidth that maximizes the spectrum efficiency under certain conditions.
Figure 19C:
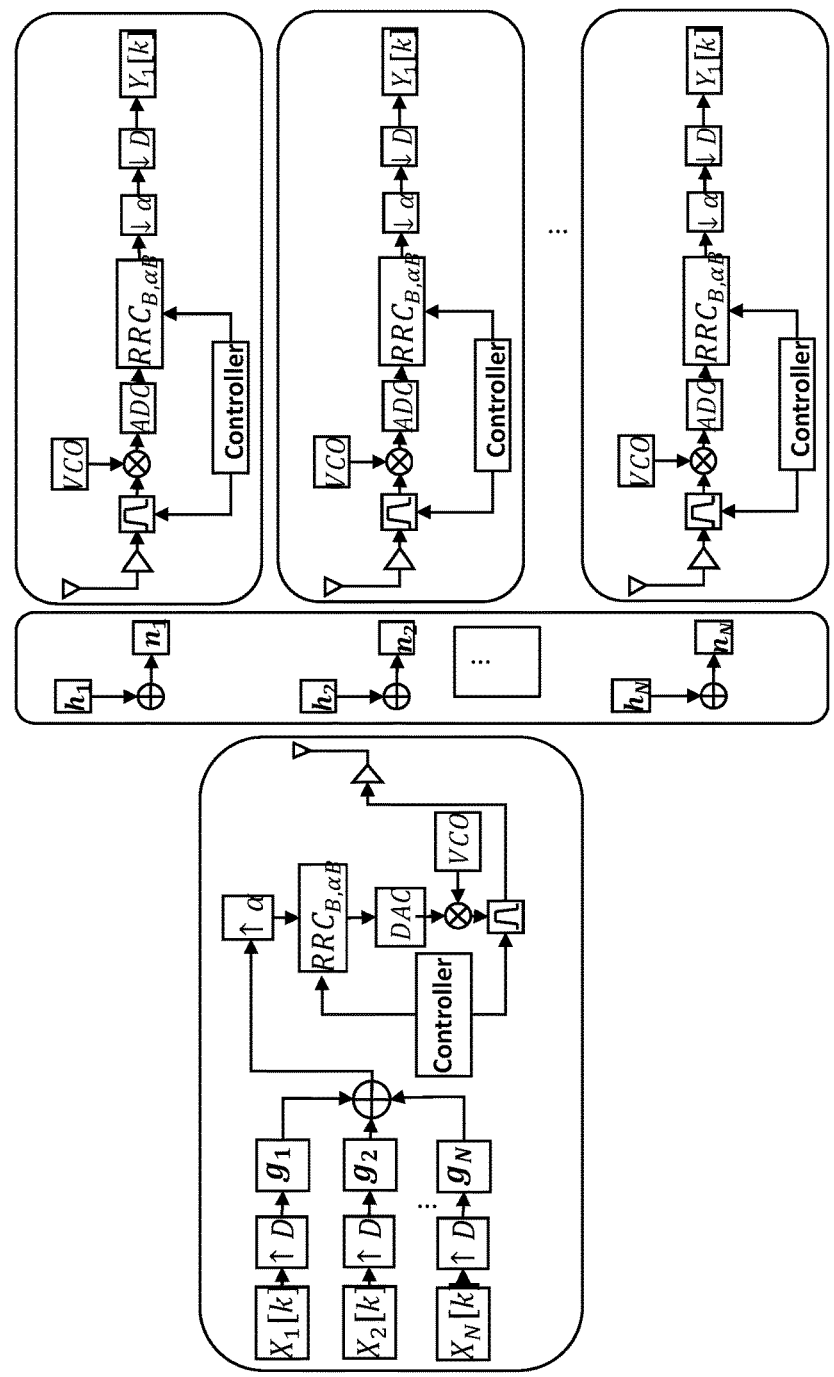
FIGS. 19C and 19D are diagrams of wireless communication systems.
Figure 19D:
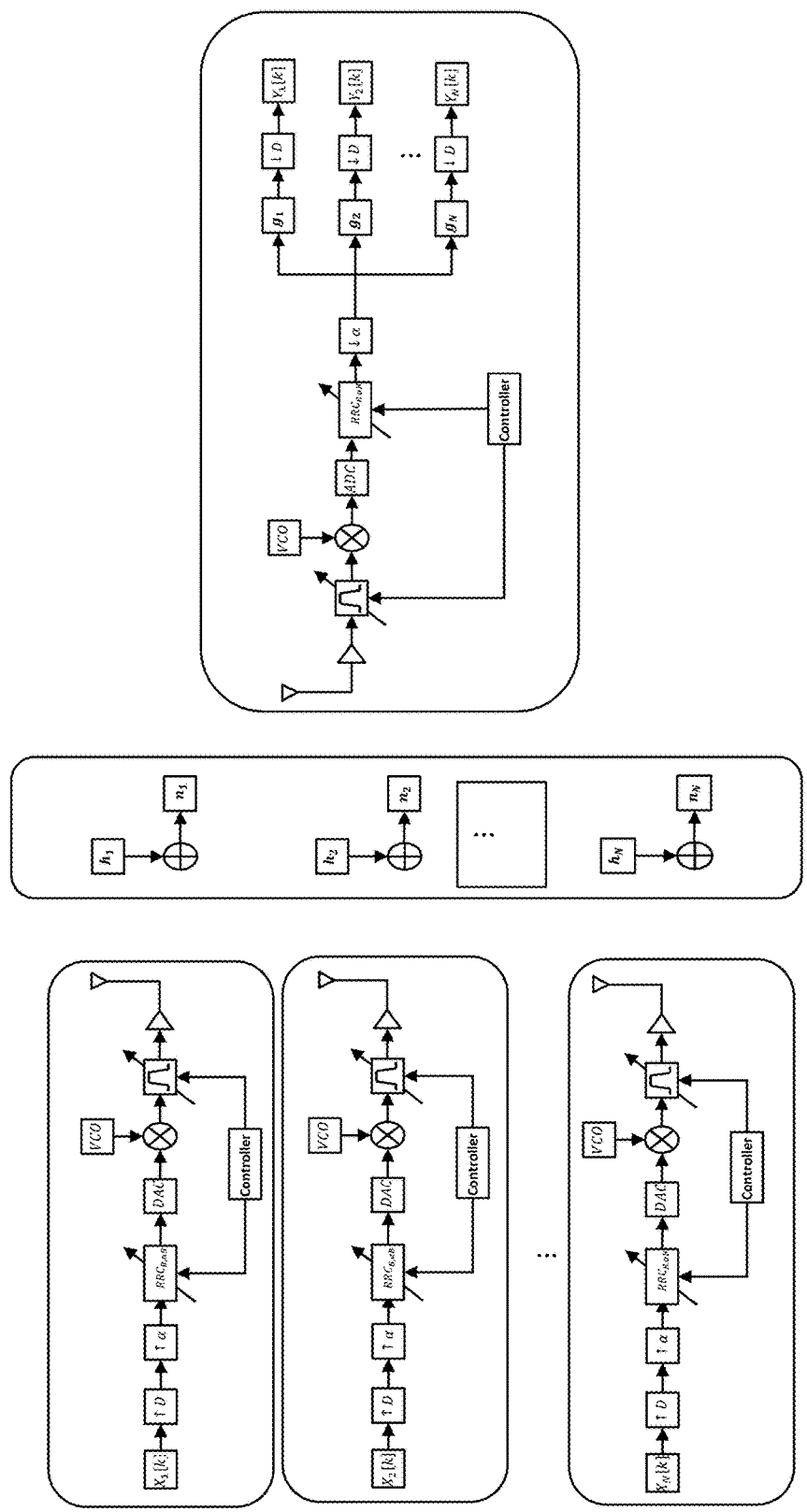

In FIG. 19A the performance comparison is shown in terms of the expected achievable rate between a practical TR system and an ideal genie-aided massive MIMO system. The expected achievable rate is computed by averaging the achievable rate over different channel realizations. By genie-aided, we mean an ideal condition that the interference and antenna coupling effects in the massive MIMO system can be completely eliminated with optimal beamforming. The genie-aided massive MIMO system has M transmit antennas with 20 MHz bandwidth where M is in the order of hundreds, while the TR system has a single transmit antenna with 1 GHz bandwidth. It is assumed that there are ten users in both systems, each equipped with a single antenna. In other words, the massive MIMO system we consider here is a multiuser MIMO system. The total transmit power is set to be the same for both systems. The overhead of both systems mainly comes from the channel acquisition, and thus is similar. From FIG. 19A, it can be seen that at the cost of a larger bandwidth, the TR system can achieve comparable if not better rates with the genie-aided massive MIMO system by using only a single antenna. This is achieved through exploiting a large number of virtual antennas that naturally exist in the environment. Note that the performance of the TR system was obtained from real data, while that of massive MIMO is the best case scenario. Also note that the massive MIMO system requires a large number of antennas that is suited for high-power outdoor base stations, while the TR system leverages large bandwidth to harvest naturally existing multipaths, ideal for low-power indoor applications. As seen from FIG. 17, the number of resolvable multipaths is an increasing function of the bandwidth. In FIG. 19B, we show the optimal bandwidth that maximizes the spectrum efficiency in order to support N users given a certain backoff factor D, assuming there is only a single antenna at the base station. Spectrum efficiency is defined as the aggregated achievable rate of the system divided by the system bandwidth. In order to support more users simultaneously, the number of resolvable multipaths and thus the bandwidth need to be increased. Meanwhile, as the backoff factor increases, the ISI and IUI will be smaller, and there is no need to keep increasing the bandwidth.

In addition, TR technology can take advantage of the multipath propagation and achieve good energy efficiency. The temporal focusing effect concentrates a large portion of the useful signal energy of each symbol within a short time interval, which effectively reduces the ISI for high-speed broadband communications. The spatial focusing effect allows the signal energy to be harvested at the intended location and reduces leakage to other locations, leading to a reduction in both the required transmit power consumption and cochannel interference to other locations.

Figure 20:
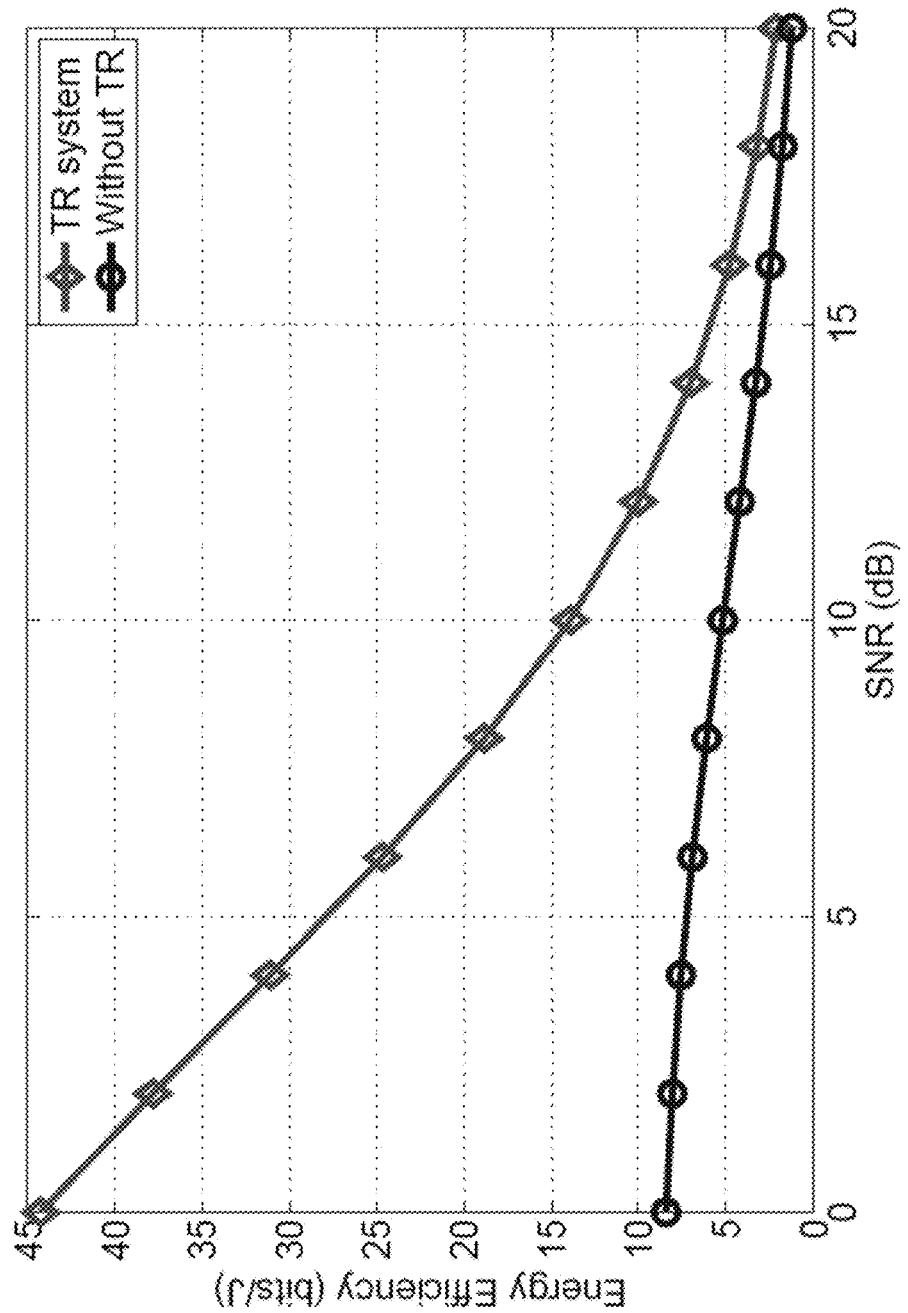
FIG. 20 is a graph showing the exemplary results of the comparison of energy efficiency between a TR system and direct transmission without TR.

Defining energy efficiency (in bits/Joule) of a system as the spectral efficiency (sum-rate in bits/channel use) divided by the transmit power expended (in Joules/channel use), and using real-world channel measurements in a typical indoor environment, we compare the energy efficiency of a TR system with that of a direct transmission system without TR. The results are shown in FIG. 20. It can be seen that with TR, the energy efficiency can be improved by up to 7 dB. Note that a wide bandwidth is generally required for a TR system to resolve the rich multipaths and fully harvest energy from the environment. As 5G technology is expected to be able to support larger bandwidths, the benefits and unique advantages of TR due to the temporal and spatial focusing effects in a rich-scattering environment promise a great potential for achieving high energy-efficiency in next-generation networks.

Figure 21B:
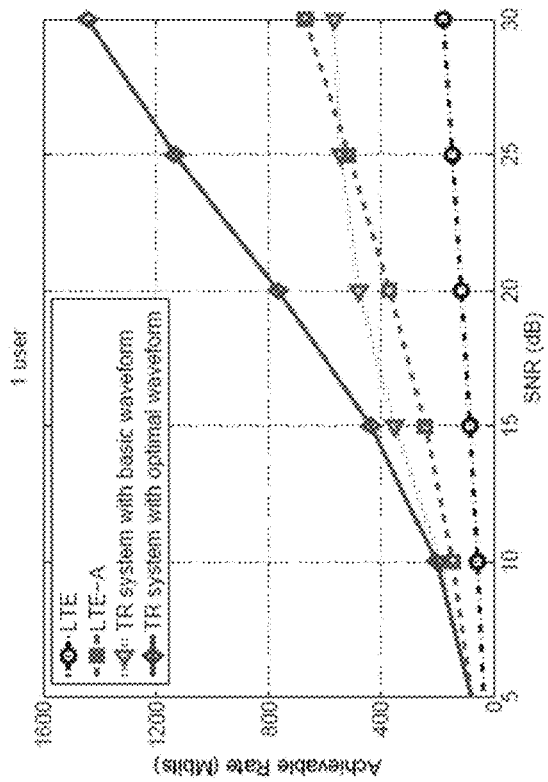
FIGS. 21A and 21B are graphs showing the exemplary results of the achievable rate comparison between a TR system and LTE-based system in a 1-user case and 10-user case, respectively.
Figure 21A:
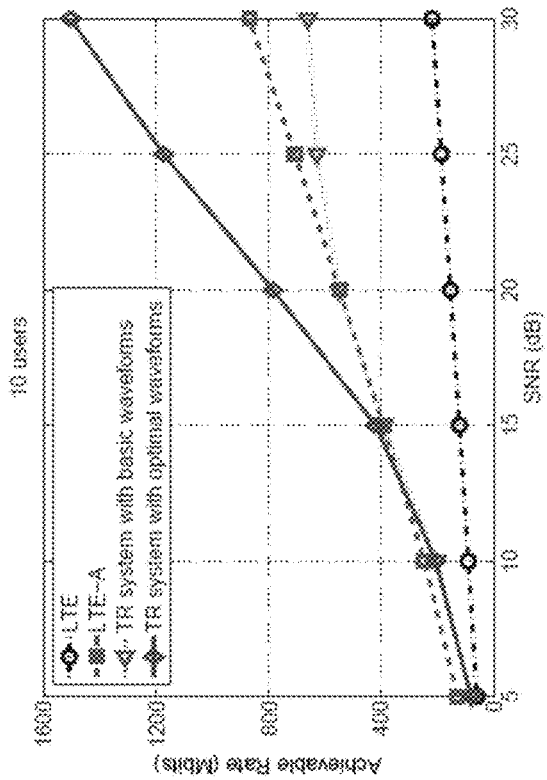

In addition, TR communication can achieve high capacity when bandwidth is available. By utilizing spatial focusing, a TR access point (AP) can communicate with multiple users simultaneously within the same spectrum, i.e., the spectrum is fully reused by different users. Such a full spectrum reuse feature, together with wide bandwidth, have the potential to provide high capacity. This is validated in FIGS. 21A and 21B, where we show the performance comparison in terms of achievable rate between the TR system and two OFDM systems.

It can be seen that for the one-user case, even with basic TR waveform, the TR scheme can achieve much better performance than long-term evolution (LTE) in all SNR regions and better performance than LTE-advanced (LTE-A) in most SNR regions. With optimal waveform that maximizes the sum rate of all users, the performance of the TR system can be further improved. An example of optima waveform is described in U.S. application Ser. No. 13/706, 342, filed on Dec. 5, 2012, the contents of which are incorporated herein by reference. When there are ten users, due to the selectivity among different users, the achievable rate of LTE and LTE-A can be enhanced, and LTE-A can achieve comparable and even slightly better performance than the TR system with basic TR waveform. Nevertheless, with optimal waveform, the TR system can still outperform LTE and LTE-A in most SNR regions, which demonstrates that the TR system can achieve higher capacity than OFDM systems when the bandwidth is wide enough. Note that there is a large amount of spectrum at millimeter-wave frequencies that can be utilized by TR.

In addition, the TR system can be easily scalable for extreme network densification. With a high capacity, a single TR AP has the potential to serve many users while creating little interference to other wireless users. However, in some scenarios, the density of users may be so high that one single AP is insufficient to support all of them. We will show that the TR system is highly scalable and extra APs can be added with simple reconfiguration.

In conventional wireless communication systems, a mechanism is needed to prevent or alleviate the interference introduced by adding more APs due to the near-far effect. This near-far effect is solely the result of the distance between the AP and the users. In the TR system, however, different users have different resonances, which are the result of location-specific channel impulse responses instead of the distance only. With such a strong-weak focusing effect, there is no clear definition of cell boundaries. Thus, the TR system has a simple reconfiguration property, allowing the easy addition of new APs to the system. The newly added APs in the TR system help pick up users and reuse the same spectrum without incurring much interference, while in conventional systems, intercell radio resource management is needed to coordinate resource allocation between different cells and to limit the intercell interference. Such a self-configuring feature provides native support for machine-to-machine (M2M) and D2D communications where multiple pairs of machines/devices can coexist and share the spectrum without complicated transmission coordination strategies.

Figure 22:
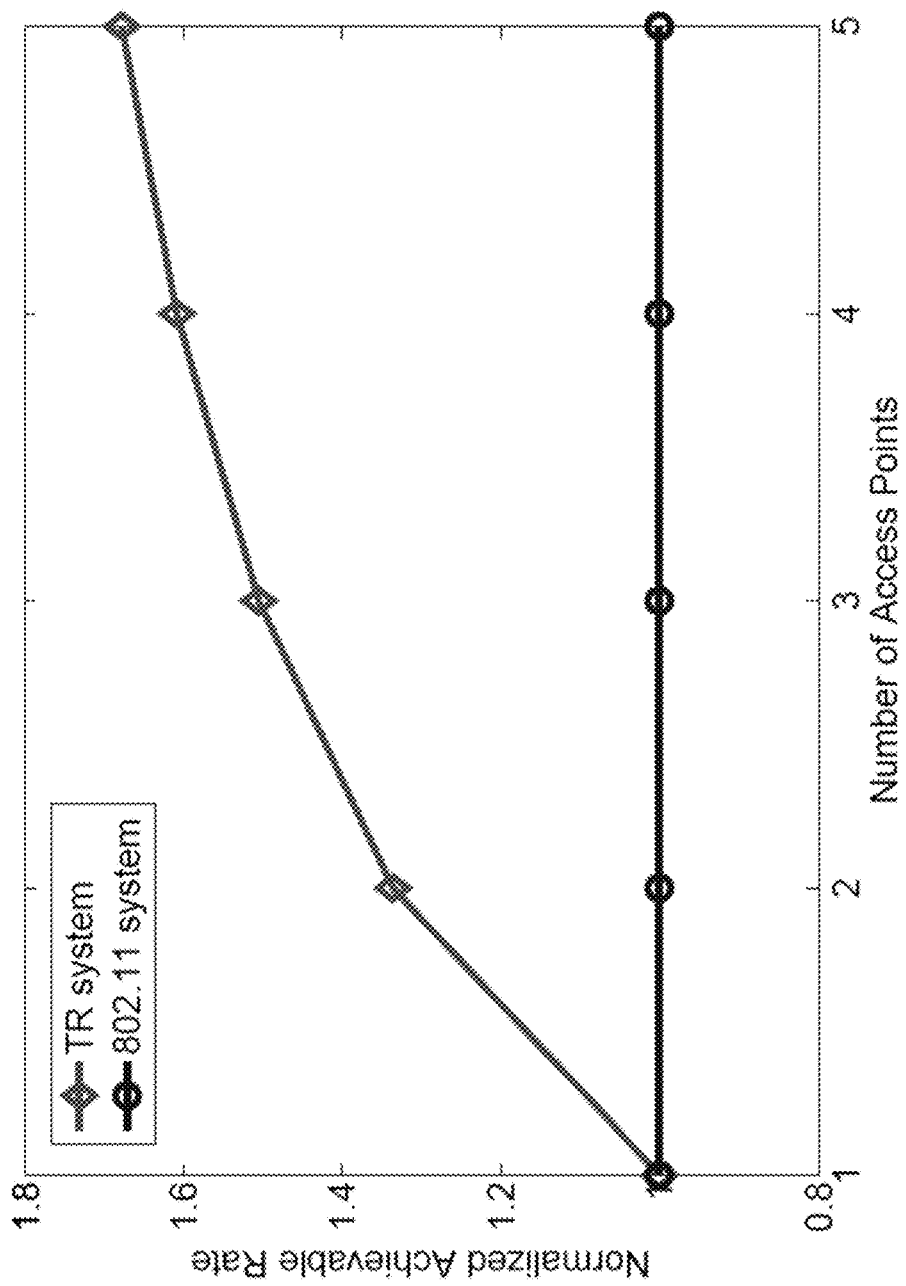
FIG. 22 is a graph showing the exemplary results of the normalized achievable rate comparison between a TR system and an 802.11 system.

FIG. 22 shows the performance comparison in terms of normalized achievable rate versus the number of APs, where the normalization is performed over the achievable rate of the single AP case. It can be seen that the normalized achievable rate of conventional systems remains unchanged regardless of the increase of the number of APs. This is because neighboring APs cannot use the same resource in conventional systems due to the interference. On the other hand, with the TR system, by utilizing the spatial focusing effect, all APs use the same spectrum and thus the normalized achievable rate increases as the number of APs increases. In the example of FIG. 22, the APs are placed near each other, and the experiment is based on the assumption that the APs are within the interference range of one another. Note that although different APs share the same spectrum, they are nearly orthogonal with each other. In traditional systems, such orthogonality can only be achieved by applying additional techniques, such as time, code, or frequency division multiplexing. In the TR system, this near-orthogonality is achieved naturally by utilizing the large number of multipath components in the wireless channel.

Figure 23B:
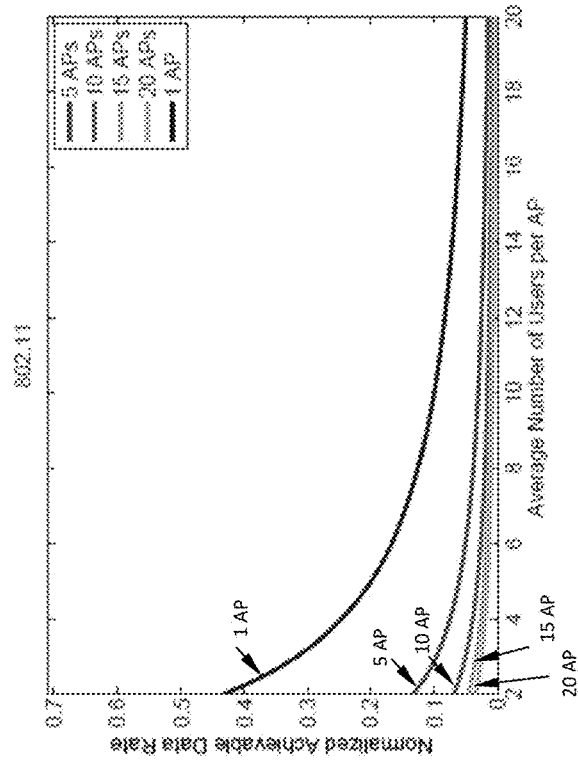
FIGS. 23A and 23B are graphs showing the exemplary results of the comparison between a TR system and an 802.11 system (a) graceful performance degradation of TR, and (b) performance degradation of 802.11, respectively.
Figure 23A:
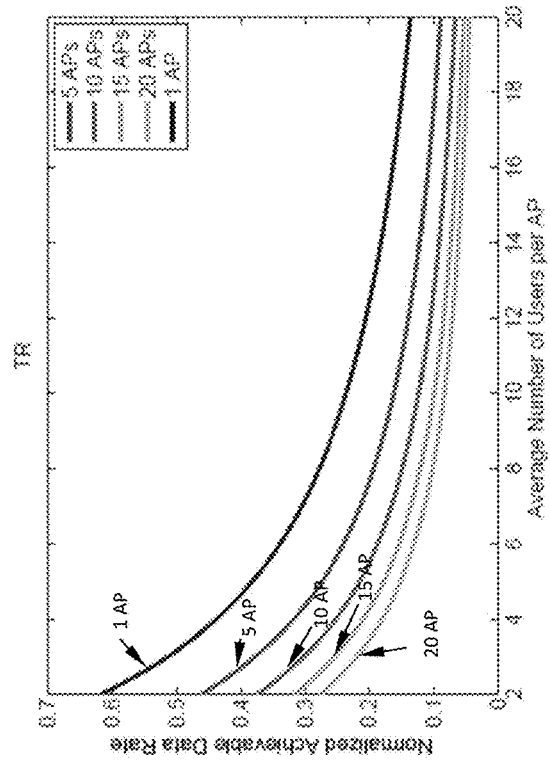

The performance degradation of each individual user is shown in FIGS. 23A and 23B, where the normalization is over the point-to-point link capacity. It can be seen that the performance degradation of the IEEE 802.11 system is much more severe than the TR system. This is because, in IEEE 802.11 each link requires an exclusive use of the channel, which is inefficient if there are many users/APs close to each other. On the contrary, the TR system can tolerate interference through the interference mitigation effect of TR so that multiple users/APs can share the same spectrum. Therefore, the performance degradation is more graceful, and each user is more robust against the interference from nearby users/APs.

Figure 24A:
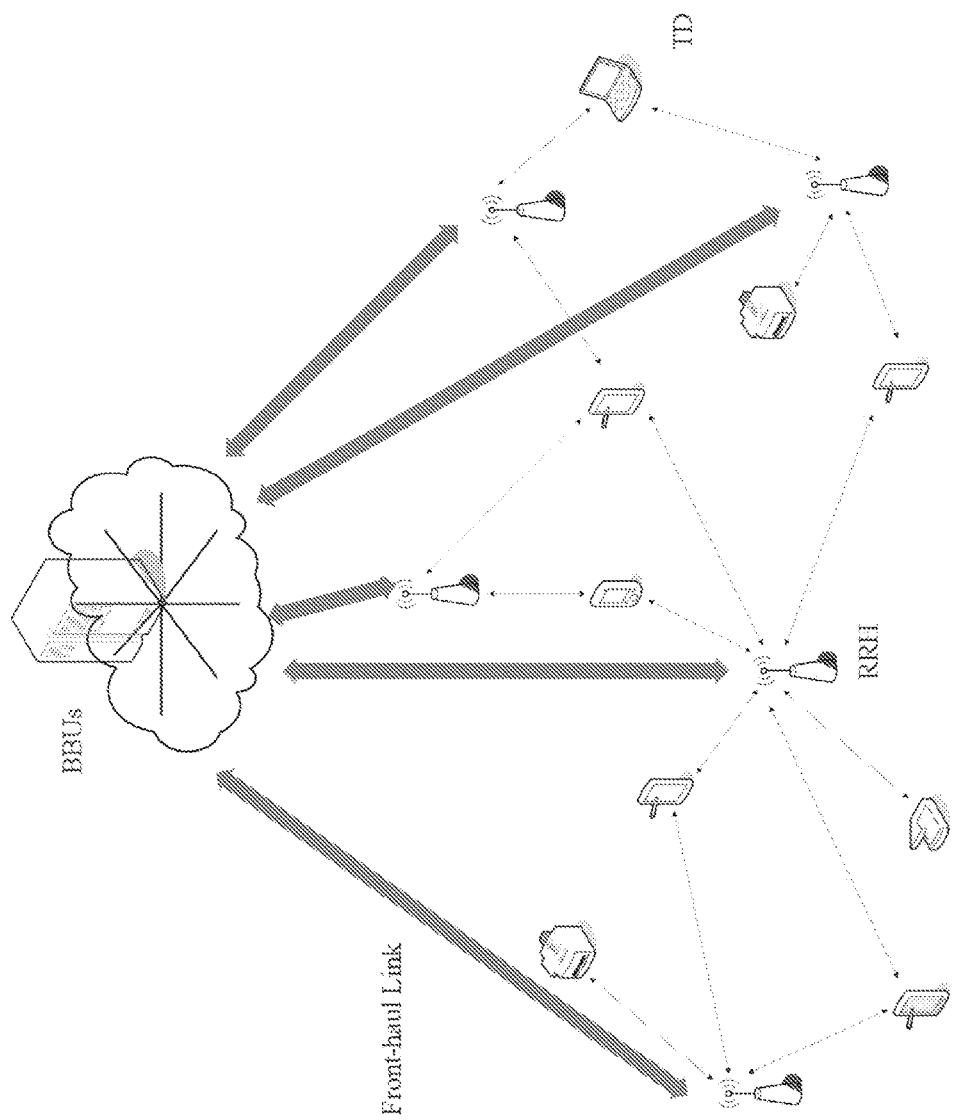
FIG. 24A is a graph showing an exemplary architecture of a cloud radio access network.
Figure 24B:
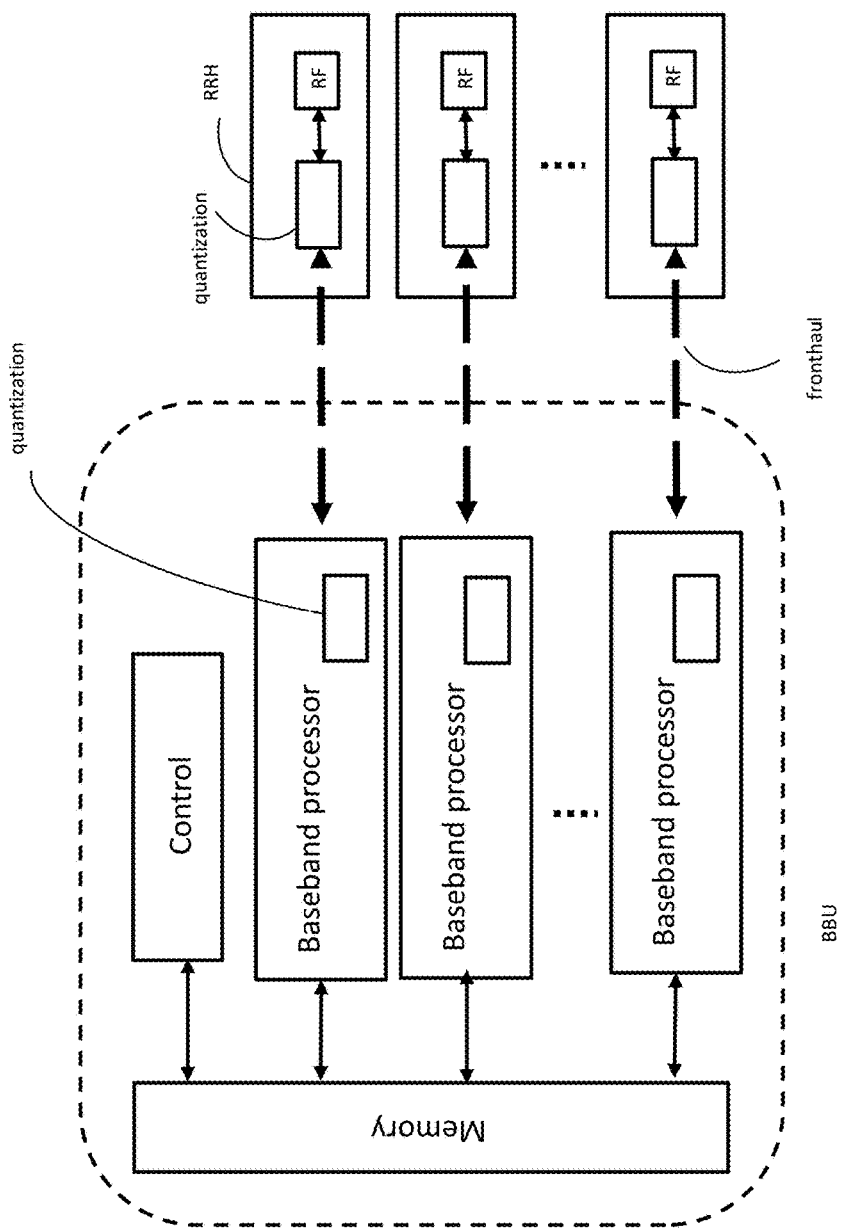
FIG. 24B is a diagram showing the two exemplary steps in the downlink data transmission phase of a time-reversal based cloud radio access network.

Referring to FIG. 24A, the TR technology is useful for cloud-based networking. FIG. 24A shows exemplary components of a cloud based radio access network (C-RAN), which is a novel type of RAN architecture and includes one or more base band units (BBUs), a plurality of remote radio heads (RRHs), and back-haul links between the remote radio heads and the base band units. There are various types of connections between the BBUs and RRHs. For example, optical fiber links can have bandwidths reaching several Gb/s. Other types of connections, such as Ethernet cable and wireless connections, can be used when the required capacity is lower. FIG. 24B is a diagram of RRHs and a BBU, in which an RF module can include, e.g., VCO, analog bandpass filter, power amplifier, ADC, DAC, and RF antenna, as described in U.S. patent application Ser. No. 15/268,477, filed on Sep. 16, 2016, the contents of which are herein incorporated by reference. Note that digital data are transmitted in the front-haul links.

In most of the current C-RAN structures as shown in FIG. 24A, the fronthaul link capacity between the baseband units (BBUs) and the distributed remote radio heads (RRHs) often becomes a bottleneck when there is a large number of users/terminal devices (TDs) in the network. Several solutions have been proposed to tackle this challenge, such as signal compression and sparse beamforming. However, in these schemes, the data transmitted in the fronthaul is proportional to the aggregated traffic of all TDs, and the fronthaul link capacity can still be a bottleneck in a very dense network.

On the other hand, if TR technology is used as the air interface in C-RAN, due to its unique spatial and temporal separation effects, all TDs are naturally separated by the location-specific signatures in both downlink and uplink, and the baseband signals for all TDs can be efficiently combined and transmitted. This unique feature of TR technology can be leveraged to create in essence a tunneling effect between the BBUs and the RRHs to alleviate the traffic load in the fronthaul link of C-RAN.

We assume a multi-path Rayleigh fading channel and the channel impulse response (CIR) of the communication link between the m-th antenna of the i-th RRH and the j-th TD is modeled as $$h_{i,j}^{(m)}[k] = \sum_{l=0}^{L-1} h_{i,j}^{(m),(l)} \cdot \delta[k-l], \tag{38}$$

where $h_{i,j}^{(m),(l)}$ is the complex amplitude of the l-th tap of the CIR with length L, $h_{i,j}^{(m)}[k]$ is the k-th tap of the CIR. For each link, we model the $h_{i,j}^{(m)}[k]$'s as independent circular symmetric complex Gaussian random variables with zero mean and variance $$E[|h_{i,j}^{(m)}[k]|^2] = e^{-\frac{kT_S}{\delta_T}}, 0 \le k \le L-1, \quad (39)$$

where $T_S$ is the sampling period of the TD such that $$\frac{1}{T_S}$$

equals to the bandwidth B used by the TD and $\delta_T$ is the delay spread of the channel.

In the C-RAN, all the RRHs work together to serve the TDs in downlink and uplink. To achieve this, the BBUs first need to gather all the necessary information of all the TDs. In the TR-based communication, the TDs are separated naturally by their CIR's as the location-specific signature. Therefore, the BBUs need to collect the CIR information of all the TDs before all the TDs can be served. We propose the channel probing phase in the C-RAN where the BBUs get the channel information $h_{i,j}^{(m)}$'s from all the RRHs to the TDs. In the following, we will first introduce the channel probing phase which is common and necessary for both downlink and uplink transmissions, after which we describe in details the downlink and uplink transmission phases respectively.

Let R denote the set of indices of all the RRHs, T the set of indices of all the TDs, $T_i$ the set of indices of all the TDs subscribed to the RRH i, and $R_j$ the set of the indices of all the RRHs that the j-th TD is subscribed to. Note that we have $T_i \subseteq T$, $R_j \subseteq R$.

In the channel probing phase, the N TDs first take turns to transmit a channel probing signal to all the RRHs, and the RRHs quantizes the received channel probing signal and transmit the quantized channel probing signal through the fronthaul links to the BBUs where the channel information is extracted. The channel probing signal can be an impulse signal or a pre-defined pseudo random code known by the BBUs beforehand. Since all the RRHs work in the same band, the channel probing signal transmitted by user j can be received by all the corresponding RRHs simultaneously, and the BBUs can extract the channel information between each TD and all its corresponding RRHs using various estimation methods, for instance the mean-square estimation. At the end of the channel probing phase, the BBUs have the channel knowledge between all the TDs and their corresponding RRHs.

An implicit feature of the proposed channel probing phase is that each TD is only subscribed to the RRHs close enough to it. The RRHs far away from the TD j could not get the channel probing signal and would not add it to the subscription list. The searching range of the TD j can be adjusted by tuning the power of the channel probing signal. Increasing the power would extend the searching range so that the TD can possibly subscribe to more RRHs. On the RRH side if an RRH is far away from all the active TDs, using this RRH to serve the TDs might not be power efficient. In the proposed method, this RRH does not get any channel probing signal and does not use any power to transmit data to the TDs, and the TDs are better served by other RRHs closer to them.

After the channel probing phase, the BBUs start to utilize the collected channel information to serve the downlink and uplink data transmissions. In the downlink transmission, as shown in FIGS. 25A and 25B, there are two steps: in step (1), the transmitted signals are calculated at the BBUs and quantized before they are transmitted through the fronthaul to the RRH; in step (2), the RRH converts the baseband signals to the RF signals and transmits them to the TDs through the multi-path channel. As shown in FIG. 25A, the intended symbol sequence $X_j[k]$ for the j-th TD transmitted from the m-th antenna of the i-th RRH is first up-sampled by the back-off factor D in order to alleviate the inter-symbol interference (ISI) and then convolved with the signature $g_{i,j}^{(m)}[k]$ of the channel $h_{i,j}^{(m)}[k]$, which is $$g_{i,j}^{(m)}[k] = \frac{h_{i,j}^{(m)*}[L-1-k]}{\sqrt{\sum_{t \in T_i} \sum_{m=1}^{M_T} \sum_{l=0}^{L-1} |h_{i,j}^{(m)}[l]|^2}}, k = 0, 1, \ldots, L-1. \quad (40)$$

where $h_{i,j}^{(m)}[L-1-k]$ denotes the conjugate of $h_{i,j}^{(m)}[L-1-k]$.

After that, the intended signals for all the subscribed TDs at the m-th antenna of RRH i are combined as $$S_i^{(m)}[k] = \Sigma_{j \in T_i}(X_j^{[D]} * g_{i,j}^{(m)})[k]. \quad (41)$$

where $(X_j^{[D]} * g_{i,j}^{(m)})[k]$ denotes the convolution of $X_j^{[D]}[k]$ and $g_{i,j}^{(m)}[k]$.

The average power of the baseband signal $S_i^{(m)}[k]$ can be calculated as $$E[|S_i^{(m)}[k]|^2] = \frac{\theta}{D} \quad (42)$$

where $\theta = E[||X_j[k]||^2]$.

Then the $S_i^{(m)}$ is quantized and the BBUs transmit the quantized $\tilde{S}_i^{(m)}[k]$ through the front-haul with a limited capacity. The quantization of $S_i^{(m)}$ can be modeled as $$\tilde{S}_i^{(m)}[k] = S_i^{(m)}[k] + q_i^{(m)}[k], \quad (43)$$

where $q_i^{(m)}[k]$ is the quantization noise at the m-th antenna of RRH i. By equation $$(S_i^{(m)}[k] = \Sigma_{j \in T_i}(X_j^{[D]} * g_{i,j}^{(m)})[k]. \quad (41),$$

$S_i^{(m)}[k]$ is a summation of multiple independent variables and can be approximated as a complex Gaussian random variable by the law of large numbers, and $q_i^{(m)}[k]$ can be approximated as a complex random variable whose real and imaginary parts are uniformly distributed in the range $$\left(-\frac{Q_i^{(m)}}{2}, \frac{Q_i^{(m)}}{2}\right)$$

where $$Q_i^{(m)} = \frac{2K_i^{(m)}}{2^{B_i^{(m)}}}$$

is the quantization level of the baseband signal at the m-th antenna of i-th AP, $B_i^{(m)}$ is the number of bits used to represent the real/imaginary part of $S_i^{(m)}[k]$, and $[-K_i^{(m)}, K_i^{(m)}]$ is the dynamic range of the real/imaginary part of $S_i^{(m)}[k]$.

In step (2), each RRH i transmits the baseband signal $\tilde{S}_i^{(m)}[k]$ via the m-th antenna over the air to all the subscribed TDs for m=1, 2, ..., $M_T$, and each subscribed TD would receive the signal from all the corresponding RRHs. The received signal is a combination of the intended signal and the interference contaminated by noise. The TD j then first amplifies the received signal with $a_j$ and then down-samples it with the factor D, obtaining the received sequence $Y_j$. The noise is assumed to be zero-mean additive white gaussian noise with variance $E[|n_j[k]|^2]=\sigma^2$, $\forall j, k$.

Figures 25C, 25D:
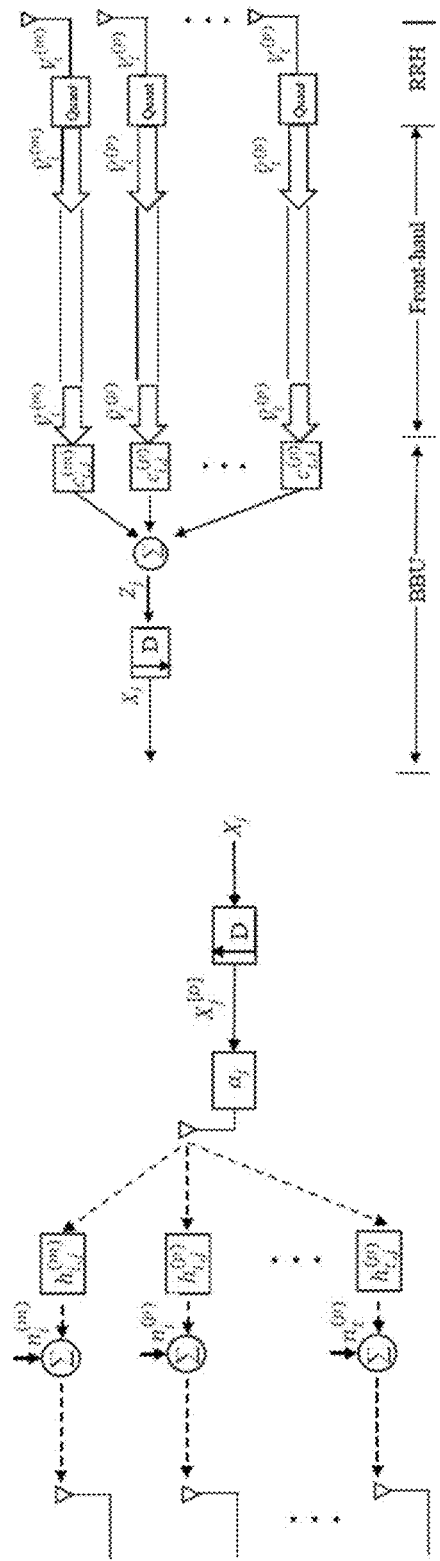
FIGS. 25C and 25D are diagrams showing the two exemplary steps in the uplink data transmission phase of a time-reversal based cloud radio access network.

In the uplink transmission, as shown in FIGS. 25C and 25D, there are two similar steps in the opposite direction: in step (1), the TDs simultaneously transmit the data through the multi-path channels to the corresponding RRHs; in step (2), the RRHs convert the RF signal into baseband signal, and quantize them before they are transmitted via the front-haul to the BBUs. The BBUs jointly process the received baseband signal to extract the uplink data.

In step 1, all the TDs simultaneously transmit the symbol sequences over the air to the corresponding RRHs. The intended symbol sequence $X_j[k]$ from the j-th TD is first up-sampled by the back-off factor D in order to alleviate the ISI and then scaled by the factor $\alpha_j$ before transmitted through the multi-path channel to all the corresponding RRHs. The purpose of the scaling factor $\alpha_j$ is to implement the power control. It is assumed that the values of $\alpha_j$'s are calculated by the BBUs and signaled to the TDs through the feedback/control channel. The signal received at the m-th antenna of RRH i is a combination of the signals from all the TDs that could reach RRH i and contaminated by the white Gaussian noise upon receiving, $$V_i^{(m)}[k]=\Sigma_{j\in T_i}\alpha_j(X_j^{[D]}*h_{i,j}^{(m)})[k]+n_i^{(m)}[k] \quad (44)$$

where $n_i^{(m)}[k]$ is the AWGN with variance $E[|n_i^{(m)}[k]|^2]=\sigma^2$, $\forall i, k$.

The average power of the baseband signal $V_i^{(m)}[k]$ can be calculated as $$E\left[\|V_i^{(m)}[k]\|^2\right] = \frac{\theta \cdot \sum_{j\in T_i}\alpha_j^2 \sum_{l=0}^{L-1}\|h_{i,j}^{(m)}[l]\|^2}{D} + \sigma^2 \quad (45)$$

The signal received at the RRH is then quantized and transmitted to the BBU pool through the front-haul, which can be represented as $$\tilde{V}_i^{(m)}[k]=V_i^{(m)}[k]+q_i^{(m)}[k] \quad (46)$$

where $q_i^{(m)}[k]$ is the quantization noise. Similar to the downlink case, $q_i^{(m)}[k]$ can be approximated as a complex random variable whose real and imaginary parts are uniformly distributed in the range $$\left(-\frac{Q_i^{(m)}}{2}, \frac{Q_i^{(m)}}{2}\right).$$

Note that although we used the same notation for the downlink and uplink quantization noise, they can be different due to distinction in the signal dynamic range and number of bits used.

Upon receiving the transmitted baseband signals from all the RRHs, the BBUs work together to extract the data of each TD. As shown in FIG. 25D, the data of TD j is extracted by combining the baseband signals from all the antennas of all the corresponding RRHs. The signal from m-th antenna of the i-th RRH is first convolved with $c_{i,j}^{(m)}$ where $$c_{i,j}^{(m)}[k] = \frac{h_{i,j}^{(m)*}[L-1-k]}{\sqrt{\sum_{l=0}^{L-1}\|h_{i,j}^{(m)*}[l]\|^2}}, k=0, 1, \ldots, L-1. \quad (47)$$

After that, the processed signal from all the antennas of all the corresponding RRHs are combined as $$Z_j[k] = \sum_{i\in R_j}\sum_{m=1}^{M_T} c_{i,j}^{(m)} * \hat{V}_i^{(m)}[k]. \quad (48)$$

We analyze the performance of the proposed system from two perspectives, the spectral efficiency and the data rate in the front-haul. The spectral efficiency indicates how efficiently the proposed system uses the available spectrum, and the data rate in the front-haul evaluates how much capacity is necessary to deploy the system.

Since all the RRHs and TDs work in the same spectrum, the signal received by each TD is a mix of the intended signal, interference and noise. The signal received by TD j can be represented as $$Y_j[k] = a_j\sum_{i\in R_j}\sum_{m=1}^{M_T}\tilde{S}_i^{(m)} * h_{i,j}^{(m)}[k] + a_j n_j[k] = \quad (49)$$

$$a_j\sum_{i\in R_j}\sum_{m=1}^{M_T}\sum_{t\in T_i} X_t^{[D]} * g_{i,t}^{(m)} * h_{i,j}^{(m)}[k] +$$

$$a_j\sum_{i\in R_j}\sum_{m=1}^{M_T} q_i^{(m)} * h_{i,j}^{(m)}[k] + a_j n_j[k],$$

where, in the last equality, the first term is the intended signal combined with the interference, the second term is the received quantization noise, and the third term is the white Gaussian noise. In the following, we will analyze the first and second term subsequently.

The first term can be further written as $$a_j\sum_{i\in R_j}\sum_{m=1}^{M_T}\sum_{t\in T_i} X_t^{[D]} * g_{i,t}^{(m)} * h_{i,j}^{(m)}[k] = a_j\sum_{i\in R_j}\sum_{m=1}^{M_T} X_j^{[D]} * g_{i,j}^{(m)} * h_{i,j}^{(m)}[k] + \quad (50)$$

$$\sum_{i\in R_j}\sum_{m=1}^{M_T}\sum_{\substack{l=0 \\ l\neq \frac{L-1}{D}}}^{\frac{2L-2}{D}} X_j\left[k+\frac{L-1}{D}-l\right]\cdot g_{i,j}^{(m)} * h_{i,j}^{(m)}[Dl] +$$

$$\sum_{i\in R_j}\sum_{m=1}^{M_T}\sum_{\substack{t\in T_i \\ t\neq j}}\sum_{l=0}^{\frac{2L-2}{D}} X_t\left[k+\frac{L-1}{D}-l\right] * g_{i,t}^{(m)} * h_{i,j}^{(m)}[Dl].$$

The first term is the intended signal for TD j, the second term is the ISI, and the third term is the inter-user interference (IUI). Note that by the channel reciprocity in the channel probing phase, for any RRH u with $u \notin R_j$, TD j and RRH u could not reach each other and therefore TD j does not suffer from the interference from RRH u.

Since the one-tap gain $a_j$ does not affect the SINR, we assume it as $a_j=1$ in the subsequent analysis, without loss of generality. The signal power in the downlink can be written as $$P_{sig}^{(dl)} = E_X \left[ \left\| \sum_{i \in R_j} \sum_{m=1}^{M_T} X_j[k] \cdot g_{i,j}^{(m)} * h_{i,j}^{(m)}[L-1] \right\|^2 \right] = \quad (51)$$

$$\theta \left\| \sum_{i \in R_j} \sum_{m=1}^{M_T} g_{i,j}^{(m)} * h_{i,j}^{(m)}[L-1] \right\|^2.$$

Accordingly, the ISI and IUI power can be written as $$P_{isi}^{(dl)} = E_X \left[ \left\| \sum_{i \in R_j} \sum_{m=1}^{M_T} \sum_{\substack{l=0 \\ l \neq \frac{L-1}{D}}}^{\frac{2L-2}{D}} X_j\left[k + \frac{L-1}{D} - l\right] \cdot g_{i,j}^{(m)} * h_{i,j}^{(m)}[Dl] \right\|^2 \right] = \quad (52)$$

$$\theta \sum_{\substack{l=0 \\ l \neq \frac{L-1}{D}}}^{\frac{2L-2}{D}} \left\| \sum_{i \in R_j} \sum_{m=1}^{M_T} g_{i,j}^{(m)} * h_{i,j}^{(m)}[Dl] \right\|^2,$$

and $$P_{iui}^{(dl)} = E_X \left[ \left\| \sum_{i \in R_j} \sum_{m=1}^{M_T} \sum_{\substack{t \in T_i \\ t \neq j}} \sum_{l=0}^{\frac{2L-2}{D}} X_t\left[k + \frac{L-1}{D} - l\right] \cdot g_{i,t}^{(m)} * h_{i,j}^{(m)}[Dl] \right\|^2 \right] = \quad (53)$$

$$\theta \sum_{l=0}^{\frac{2L-2}{D}} \left\| \sum_{i \in R_j} \sum_{m=1}^{M_T} \sum_{\substack{t \in T_i \\ t \neq j}} g_{i,t}^{(m)} * h_{i,j}^{(m)}[Dl] \right\|^2,$$

Next, we analyze the quantization noise in the received signal. We can have the quantization noise power as $$\sigma_{q,(dl)}^2 = \quad (54)$$

$$E\left[ \left\| \sum_{i \in R_j} \sum_{m=1}^{M_T} q_i^{(m)} * h_{i,j}^{(m)}[k] \right\|^2 \right] = E\left[ \sum_{i \in R_j} \sum_{m=1}^{M_T} \left\| \sum_{l=0}^{L-1} h_{i,j}^{(m)} \cdot q_i^{(m)}[l-l] \right\|^2 \right] =$$

$$\sum_{i \in R_j} \sum_{m=1}^{M_T} \sum_{l=0}^{L-1} \|h_{i,j}^{(m)}[l]\|^2 \cdot E[\|q_i^{(m)}[k]\|^2],$$

since we assume that $q_i^{(m)}$ is independent of $h_{i,j}^{(m)}$. By quantization theory, we have $$E[\|q_i^{(m)}[k]\|^2] = \frac{(Q_i^{(m)})^2}{12} + \frac{(Q_i^{(m)})^2}{12} = \frac{(Q_i^{(m)})^2}{6} \quad (55)$$

which is the summation of the quantization noise power in the real and imaginary parts.

The spectral efficiency of the TD j can be defined as $$r_j^{(dl)} = \log_2\left(1 + \frac{P_{sig}^{(dl)}}{P_{isi}^{(dl)} + P_{iui}^{(dl)} + \sigma_{q,(dl)}^2 + \sigma^2}\right)/D \quad (56)$$

As shown in FIG. 25A, in the downlink mode, the quantized signal $\tilde{S}_i^{(m)}[k]$ is transmitted from the BBUs to the RRH through the front-haul. The data rate in the front-haul connecting the BBUs and the i-th RRH can be expressed as $$R_{fh,i} = 2 \cdot W \cdot \sum_{m=1}^{M_T} B_i^{(m)} \quad (57)$$

where W is the bandwidth of the system. It can be seen that $R_{fh,i}$ is solely dependent on the number of bits used for each symbol given the bandwidth of the system and the number of transmitting antennas. If $B_i^{(m)}$ is large, the power of the quantization noise goes down while the data rate in the front-haul increases, and vice versa if $B_i^{(m)}$ is small. By equation (55), if the dynamic range $K_i^{(m)}$ of the signal grows, it needs to increase $B_i^{(m)}$ to keep the same quantization noise level. In simulation results, we will show that $K_i^{(m)}$ does not change much as the number of TDs in the system grows, and therefore the proposed system has a "tunneling" effect such that the front-haul rate keeps almost constant while serving more TDs.

Similarly, in uplink, the combined signal can be written as $$Z_j[k] = \sum_{i \in R_j} \sum_{m=1}^{M_T} \tilde{V}_i^{(m)} * c_{i,j}^{(m)}[k] = \sum_{i \in R_j} \sum_{m=1}^{M_T} \sum_{t \in T_i} \alpha_t X_t^{[D]} * h_{i,t}^{(m)} * c_{i,j}^{(m)}[k] + \quad (58)$$

$$\sum_{i \in R_j} \sum_{m=1}^{M_T} q_i^{(m)} * c_{i,j}^{(m)}[k] + \sum_{i \in R_j} \sum_{m=1}^{M_T} n_i^{(m)} * c_{i,j}^{(m)}[k]$$

where the first term is the mixture of the intended signal and interference for TD j, the second term is caused by the quantization noise and the third term is caused by the white Gaussian noise. In the following, we will analyze them subsequently.

The first term can be further written as $$\sum_{i \in R_j} \sum_{m=1}^{M_T} \sum_{t \in T_i} \alpha_t X_t^{[D]} * h_{i,t}^{(m)} * c_{i,j}^{(m)}[k] = \sum_{i \in R_j} \sum_{m=1}^{M_T} \alpha_j X_j^{[D]} * h_{i,j}^{(m)} * c_{i,j}^{(m)}[k] + \quad (59)$$

$$\sum_{i \in R_j} \sum_{m=1}^{M_T} \sum_{\substack{l=0 \\ l \neq \frac{L-1}{D}}}^{\frac{2L-2}{D}} \alpha_j X_j\left[k + \frac{L-1}{D} - l\right] \cdot h_{i,j}^{(m)} * c_{i,j}^{(m)}[Dl] +$$

$$\sum_{i \in R_j} \sum_{m=1}^{M_T} \sum_{\substack{t \in T_i \\ t \neq j}} \sum_{l=0}^{\frac{2L-2}{D}} \alpha_t X_t\left[k + \frac{L-1}{D} - l\right] * h_{i,t}^{(m)} * c_{i,j}^{(m)}[Dl].$$

The first term in is the intended signal from TD j, the second term is the ISI, and the third term is the IUI.

The signal power in the uplink can be written as $$P_{sig}^{(ul)} = E_X\left[\left\|\sum_{i\in R_j}\sum_{m=1}^{M_T}\alpha_j X_j[k]\cdot h_{i,j}^{(m)}*c_{i,j}^{(m)}[L=1]\right\|^2\right] = \quad (60)$$

$$|\alpha_j|^2\theta\left\|\sum_{i\in R_j}\sum_{m=1}^{M_T}h_{i,j}^{(m)}*c_{i,j}^{(m)}[L-1]\right\|^2,$$

where $\theta=E[\|X_j[k]\|^2]$. Accordingly, the ISI and IUI power can be written as $$P_{isi}^{(ul)} = E_X\left[\left\|\sum_{i\in R_j}\sum_{m=1}^{M_T}\sum_{\substack{l=0\\l\neq\frac{L-1}{D}}}^{\frac{2L-2}{D}}\alpha_j X_j\left[k+\frac{L-1}{D}-l\right]\cdot h_{i,j}^{(m)}*c_{i,j}^{(m)}[Dl]\right\|^2\right] = \quad (61)$$

$$|\alpha_j|^2\sum_{\substack{l=0\\l\neq\frac{L-1}{D}}}^{\frac{2L-2}{D}}\left\|\sum_{i\in R_j}\sum_{m=1}^{M_T}h_{i,j}^{(m)}*c_{i,j}^{(m)}[Dl]\right\|^2,$$

and $$P_{iui}^{(ul)} = E_X\left[\left\|\sum_{i\in R_j}\sum_{m=1}^{M_T}\sum_{\substack{t\in T_j\\t\neq j}}\sum_{l=0}^{\frac{2L-2}{D}}\alpha_t X_t\left[k+\frac{L-1}{D}-l\right]*h_{i,t}^{(m)}*c_{i,j}^{(m)}[Dl]\right\|^2\right] = \quad (62)$$

$$\theta\sum_{l=0}^{\frac{2L-2}{D}}\left\|\sum_{i\in R_j}\sum_{m=1}^{M_T}\sum_{\substack{t\in T_j\\t\neq j}}\alpha_t\cdot h_{i,t}^{(m)}*c_{i,j}^{(m)}[Dl]\right\|^2.$$

Here, we assume the $\alpha_j$ is chosen as $$\alpha_j = \frac{\eta}{\sum_{i\in R_j}\sum_{m=1}^{M_T}h_{i,j}^{(m)}*c_{i,j}^{(m)}[L-1]} \quad (63)$$

where $\eta$ is a scalar common for all the TDs. In this way, $$\alpha_j\cdot\sum_{i\in R_j}\sum_{m=1}^{M_T}h_{i,j}^{(m)}*c_{i,j}^{(m)}[L-1]$$

is common for all the TDs, which ensures that the signal power for all the TDs are the same. The parameter $\eta$ can be adjusted according to the maximum transmitting power allowed at each TD.

Next, we analyze the quantization noise in the received signal. We can have the quantization noise power as $$\alpha_{q,(ul)}^2 = E\left[\left\|\sum_{i\in R_j}\sum_{m=1}^{M_T}q_i^{(m)}*c_{i,j}^{(m)}[k]\right\|^2\right] = \quad (64)$$

$$E\left[\sum_{i\in R_j}\sum_{m=1}^{M_T}\left\|\sum_{l=0}^{L-1}c_{i,j}^{(m)}[l]\cdot q_i^{(m)}[k-l]\right\|^2\right] =$$

$$\sum_{i\in R_j}\sum_{m=1}^{M_T}\sum_{l=0}^{L-1}\|c_{i,j}^{(m)}[l]\|^2\cdot E[\|q_i^{(m)}[k]\|^2],$$

since we can assume that $q_i^{(m)}$ is independent of $c_{i,j}^{(m)}$. Similar to the downlink scenario, we have $$E[\|q_i^{(m)}[k]\|^2] = \frac{(Q_i^{(m)})^2}{12} + \frac{(Q_i^{(m)})^2}{12} = \frac{(Q_i^{(m)})^2}{6}. \quad (65)$$

The last term is the AWGN collected from all the corresponding antennas of TD j. Its power can be calculated by $$\sigma_{n,(ul)}^2 = E\left[\left\|\sum_{i\in R_j}\sum_{m=1}^{M_T}n_i^{(m)}*c_{i,j}^{(m)}[k]\right\|^2\right] = |R_j|*M_T*\sigma^2 \quad (66)$$

where $|R_j|$ stands for the cardinality of the set $R_j$. We can see that the AWGN functions differently in the downlink and uplink. In the downlink, since the AWGN affects the TD when the TD receives the signal, it does not depend on the number of corresponding antennas. On the other hand, in the uplink, since the AWGN is gathered when each of the corresponding antennas receives the signal, the noise power scales up with the number of corresponding antennas.

The spectral efficiency of the TD j in the uplink can be defined as $$r_j^{(ul)} = \log_2\left(1 + \frac{P_{sig}^{(ul)}}{P_{isi}^{(ul)} + P_{iui}^{(ul)} + \sigma_{q,(ul)}^2 + \sigma_{n,(ul)}^2}\right)\bigg/D. \quad (67)$$

We analyze the front-haul rate in the system in the uplink mode as follows. As shown in FIG. 25, in the uplink mode, the quantized signal $\tilde{V}_i[k]$ is transmitted from the RRH to the BBU through the front-haul. Similar to the downlink case, the data rate in the front-haul can be expressed as $$R_{fh,i} = 2\cdot W\cdot\sum_{m=1}^{M_T}B_i^{(m)}. \quad (68)$$

Similar to the downlink mode, $R_{fh,i}$ is solely dependent on the number of bits used for each symbol given the bandwidth of the system and the number of transmitting antennas. If $B_i^{(m)}$ is large, the power of the quantization noise goes down while the data rate in the front-haul increases, and vice versa if $B_i^{(m)}$ is small.

By equation (65), if the dynamic range $K_i^{(m)}$ of the signal grows, it needs to increase $B_i^{(m)}$ to keep the same quantization noise level. In the uplink, the total baseband signal power is dependent on the number of TDs, which is different from the downlink scenario. Therefore, when the number of TDs increases in the system, the dynamic range $K_i^{(m)}$ grows, where more bits are needed to keep the same quantization noise level.

In the following, we show the unique features of the TR-based CRAN system in the downlink through numerical results. We first show that the front-haul rate keeps almost constant independent of the number of TDs in the system, which is a highly desirable feature that makes the entire system more scalable. Then we show the achievable data rate of the system under various settings in deployment and load.

Figure 26A:
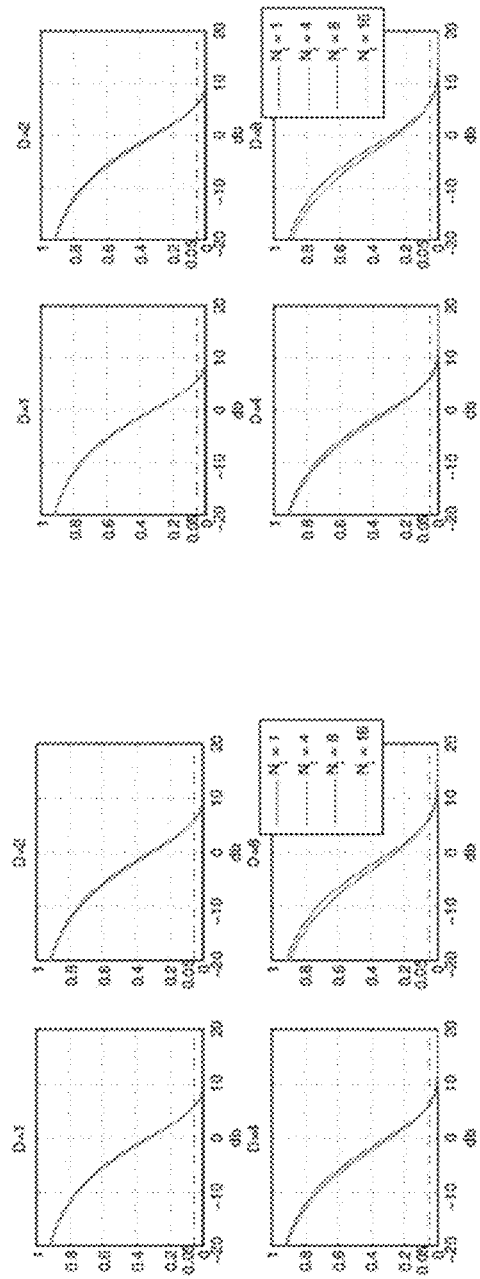
FIGS. 26A to 26E are graphs showing the exemplary results of the performance comparison in terms of normalized total transmitted data versus the number of terminal devices.

In FIG. 26A, we show the complementary cumulative distribution function (CCDF) of the peak to average power ratio (PAPR) of the signal $S_i^{(m)}[k]$ in-band (I) and quadrature (Q) parts under various conditions. The $X_j[k]$'s are QPSK modulated. Let $N_i=\|T_i\|$ denote the number of TDs subscribed to RRH i, and it is shown that the PAPR of the $S_i^{(m)}[k]$ does not change much with $N_i$. For example, if we look at the dotted line at CCDF=0.05, it always crosses the curves around 6 db. It means that if we would like to maintain the 5% overflow rate in the quantization, the peak power of $S_i^{(m)}[k]$ is always around 4 times the average power of $S_i^{(m)}[k]$. By definition, the average power of $S_i^{(m)}[k]$ is only dependent on θ and D. Therefore, the dynamic range $[-K_i^{(m)}, K_i^{(m)}]$ of $S_i^{(m)}[k]$ changes very little for different $N_i$'s, where some $B_i^{(m)}$ can be used to always maintain the same level of quantization noise power. As a result, the data rate in each front-haul link is constant.

Figure 26B:
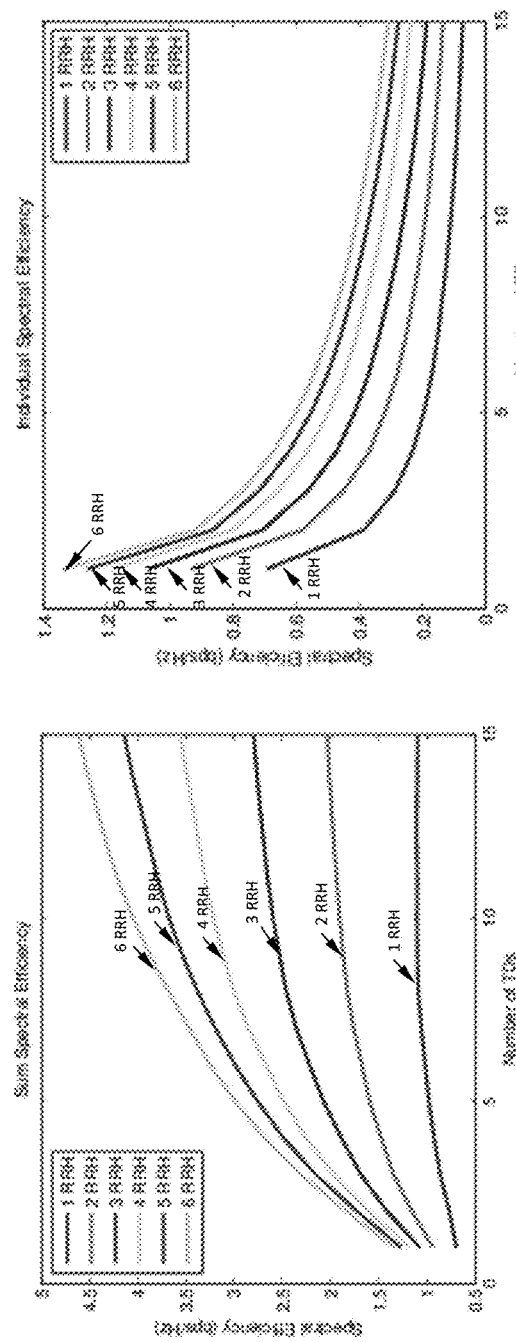

Next, we evaluate the spectral efficiency of the system with different number of RRHs and TDs. For each single channel realization, the $P_{sig}^{(dl)}$, $P_{isi}^{(dl)}$, $P_{iui}^{(dl)}$, and $\sigma_{q,(dl)}^2$ can be calculated. By inserting them into equation (19), the spectral efficiency of each individual TD can be calculated. By averaging over all the channel realizations, we show the average and sum spectral efficiency in FIG. 26B, with D=4. As shown in the figures, for each given number of RRHs in this system, the individual spectral efficiency decreases with more TDs in the system, while the sum spectral efficiency increases with more TDs in the system. Note that by previous analysis, the data rate in the front-haul keeps constant. It means that more information can be transmitted in the front-haul link with the same amount of bits and energy consumed. The reason is that by using TR-based air interface, multiple TDs are naturally separated by the location-specific signatures. Therefore, even though the baseband signals for multiple TDs are mixed together in the front-haul link, they can still be separated when transmitted through the air interface. In other words, with the TR-based air interface, we are able to create a "tunnel" in the front-haul link such that the baseband signals can be efficiently combined to alleviate the traffic in front-haul.

Figure 26C:
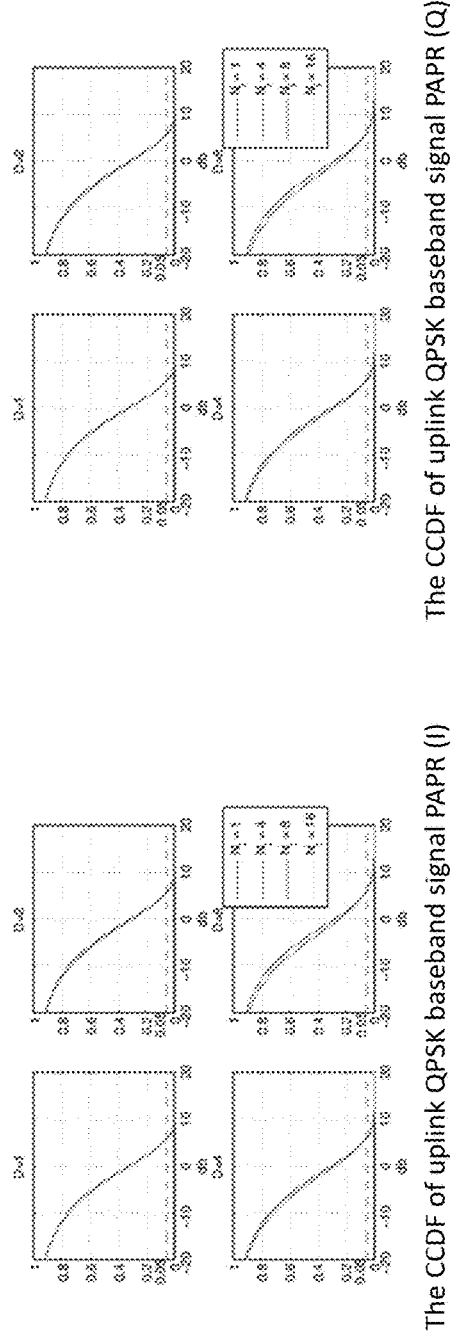

In FIG. 26C, we show the CCDF of the PAPR of both I and Q parts of the signal $V_i^{(m)}[k]$ in uplink transmission under various conditions. The $X_j[k]$'s are QPSK modulated. It is shown that the PAPR of $V_i^{(m)}[k]$ does not change much with the number of TDs subscribed to the RRH i. Similarly, the CCDF=0.05 line always crosses the CCDF curves around 6 db. It means that if we would like to maintain the 5% overflow rate in the quantization, the peak power of $V_i^{(m)}[k]$ is always around 4 times the average power of $V_i^{(m)}[k]$. By plugging (26) into (8), the average power of $V_i^{(m)}[k]$ can be calculated as $$E[\|V_i^{(m)}[k]\|^2] = \frac{\eta^2 \theta}{D} \cdot \sum_{j \in T_i} \frac{\sum_{l=0}^{L-1} \|h_{i,j}^{(m)}\|^2}{\left(\sum_{t \in R_j} \sum_{m=1}^{M_T} h_{t,j}^{(m)} * c_{t,j}^{(m)}[L-1]\right)^2} + \sigma^2, \quad (69)$$

which grows approximately linearly with $N_i$. Therefore, the dynamic range $[-K_i^{(m)}, K_i^{(m)}]$ of $V_i^{(m)}[k]$ increases linearly with $\sqrt{N_i}$. In order to maintain the same level of quantization noise power, more bits are needed to represent $V_i^{(m)}[k]$. However, since $$Q_i^{(m)} = \frac{2K_i^{(m)}}{2^{B_i^{(m)}}},$$

in order to maintain the same level of quantization noise power, $B_i^{(m)}$ grows to the order of $\log_2(K_i^{(m)})$ and thus $\log_2(\sqrt{N_i})$. For example, $E[\|q_i^{(m)}[k]\|^2]$ is the same for $B_i^{(m)}=12$, $N_i=1$ and $B_i^{(m)}=14$, $N_i=16$. In other words, when there are more TDs in the system, it is necessary to use slightly more bits in the front-haul link, which is much less significant compared to the increase of the number of TDs.

Figure 26D:
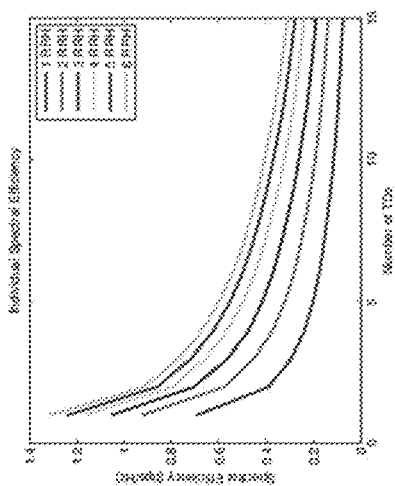

Similar to the downlink scenario, we evaluate the spectral efficiency of uplink by averaging over all the channel realizations. We slightly increase $B_i^{(m)}$ when it is necessary to keep the same level of quantization noise power. We show the average and sum spectral efficiencies under various conditions in FIG. 26D with D=4 and observe similar trends as in downlink. Similar to the downlink scenario, the "tunneling" effect is also observed in the uplink case. When there are more TDs in the system, with using almost the same amount of bits in the front-haul link, more information can be extracted at the BBU side.

To illustrate the advantage of the TR "tunneling" effect in the C-RAN, we compare the proposed system with LTE based C-RAN in multiple scenarios. Suppose we have a certain number of RRHs distributed in an area where there are N TDs and each of them has f bits of data to be transmitted. We first consider the downlink. In the LTE based C-RAN, all the RRHs work in separate bands, and each of the RRHs is responsible for serving part of the TDs. Since each RRH serves multiple TDs by dividing the time and/or frequency resource, the baseband signals for multiple TDs cannot be mixed together. As a result, the total amount of baseband signal is proportional to N×Ω, which can be approximated by $\phi_N^{(dl)}=N\times\Omega\times\lambda^{(dl)}$ where $\lambda^{(dl)}$ is some constant accounting for the modulation and channel coding. On the other hand, in the TR based C-RAN, the data for multiple TDs can be efficiently combined without increasing the traffic in the front-haul. As a result, the total amount of baseband signal transmitted in the front-haul link is constant independent of N, which can be approximated by $\phi_N^{(dl)}=\Omega\times\mu^{(dl)}$ where $\mu^{(dl)}$ is some constant accounting for the modulation and channel coding. We define $$\tau_N^{(dl)} = \frac{\phi_N^{(dl)}}{\phi_1^{(dl)}}$$

and $$v_N^{(dl)} = \frac{\varphi_N^{(dl)}}{\varphi_1^{(dl)}}$$

to characterize the grow of data transmitted in the front-haul caused by increasing the number of TDs.

In the uplink, the LTE works by single-carrier frequency division multiple access (SC-FDMA), where multiple TDs are separated by the division of the frequency resource. As a result, the aggregate data transmitted in the front-haul is also proportional to N×Ω, and $\tau_N^{(ul)}$ is the same as the $\tau_N^{(dl)}$. On the other hand, in the TR based C-RAN, the data transmitted in the front-haul only increases slightly. We define $\phi_N^{(ul)} = \Omega \times B_N^{(ul)} \times \mu^{(ul)}$ where $B_N^{(ul)}$ is the average number of bits to represent a baseband signal symbol when there are N TDs, and similarly $$v_N^{(ul)} = \frac{\phi_N^{(ul)}}{\phi_1^{(ul)}}.$$

In this experiment, we have $B_1^{(ul)}=12$ and $B_N^{(ul)}$ is increased when necessary.

Figure 26E:
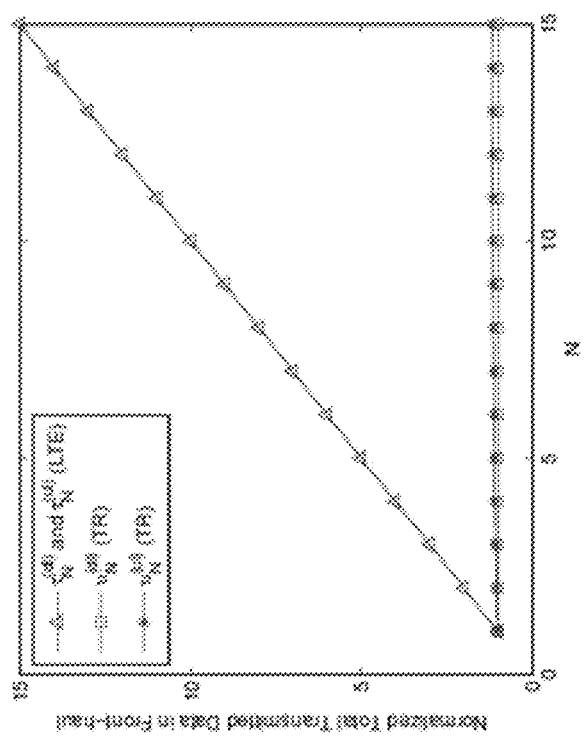

In FIG. 26E, we show the $\tau_N^{(dl)}$, $\tau_N^{(ul)}$, $v_N^{(dl)}$ and $\mu_N^{(ul)}$ with different N's. It is illustrated that in both downlink and uplink, the total amount of data transmitted in the front-haul of LTE based C-RAN increases linearly with the number of TDs. In contrast, the total amount of data transmitted in the front-haul of TR based C-RAN keeps constant in the downlink regardless of the number of TDs, while only slightly increases in the uplink. It is due to the unique "tunneling" effect such that more information can be transmitted with nearly the same amount of bits consumed in the front-haul.

In addition, the TR technology results in low complexity. Since TR systems essentially treat the rich-multipath environment as a computing machine that facilitates matched filtering, the receiver can perform a simple one-tap detection and thus the complexity of TR systems can be significantly reduced—essentially, the environment is doing the analog signal processing. By convolving the signal sequences with the TR signature waveforms, a TR system can concentrate most of the computational complexity at the more powerful AP-side while keeping the complexity of TDs at a minimal level, i.e., the TR system exhibits a unique asymmetric architecture. This desirable feature can provide less complexity and thus lower the cost of the TDs, which is ideal for supporting the Internet of Things.

Using time-reversal technology for the communication between the terminal devices and the remote radio heads has several advantages over other convention communication methods, such as code-division-multiple-access (CDMA) technology. If CDMA is used, the terminal device will have to apply the assigned code sequence in both downlink and uplink, which would increase the complexity and cost of the terminal device. By contrast, when time-reversal technology is used, because the downlink signals converge and focus at the terminal devices due to spatial filtering of the multipath channel, the terminal device can be made with lower complexity at a lower cost. Moreover, because a single terminal device can be served by multiple remote radio heads, if CDMA is used, the terminal device has to coordinate the spread spectrum sequence with several of the remote radio heads sequentially, which may result in significant latency.

In contrast, when using time-reversal technology, the channel probing of a single terminal device can be done at one time.

The major difference is in the TD side. If CDMA was used, the TD has to apply the assigned sequence in both downlink and uplink, and would increase the cost. Moreover, since a single TD can be served by multiple RRHs, it has to coordinate the spread spectrum sequence with all the RRHs sequentially, which might result in significant latency. In contrast, when using TR, the channel probing of a single TD can be done at one time.

In addition to the features previously discussed, there are many other features when operating TR systems in a rich-scattering environment. For example, the unique spatial focusing effect can be used to significantly improve the resolution of indoor positioning systems. This can be achieved by utilizing the location-specific characteristic of multipaths. That is, for each physical geographical location, there is a unique logical location in the multipath space. By matching the multipath profile with those in the database, the physical location can be identified. Real-world experiments show that the TR-based indoor positioning system can achieve 1-2 cm localization accuracy with a single AP working in the ISM band with a bandwidth of 125 MHz under the non-line-of-sight condition.

Moreover, the unique location-specific multipath profile can be exploited to enhance the system security at the physical layer, where the user at the intended location can receive better SINR than all other ineligible users at different locations.

The performance of TR systems depends highly on the degrees of freedom in the environment, i.e., the number of multipaths. The larger the number of multipaths, the higher the TR focusing gain and thus the better the performance. When the number of multipaths varies from place to place, one may want to ensure the same performance.

One implicit assumption of TR systems is that the channel is stationary. In a dynamic environment, the estimated channel in the channel probing phase may not be consistent with the real channel in the data transmission phase so that the focusing gain may be reduced, causing performance degradation. Measurements from experiments in real world conditions indicate that the channel is quite stable as long as there is no severe disturbance of the environment. When the environment is highly dynamic, one may need to probe the channel more frequently.

The benefit from the focusing effect of TR relies on accurate channel estimation. If the transmitter and/or receiver become mobile, the channels are no longer reciprocal when the speed is faster than what the channel coherent time can handle, and the focusing gain may be reduced due to outdated channel estimate. Therefore, the channel needs to be re-probed in a mobile TR system, and the re-probing will be more challenging if there are many TDs or the TDs are moving at a high speed.

It is useful to find the right timing of the focusing peak to facilitate the TR system operation. This can be resolved through oversampling and performing synchronization in the oversampled domain, which, however, will increase the cost of analog-to-digital converters and digital-to-analog converters.

Combating Strong-Weak Focusing Effect in TR Uplink Communication

As mentioned previously, the main reason causing the near-far problem in the CDMA uplink systems is that the distances from different transmitters to the same receiver differ a lot and the signals from the farther transmitters have lower SNR according to the inverse square law. Unlike the CDMA near-far problem resulted solely from distance, the TRDMA uplink systems suffer from the strong-weak focusing effect among different users mainly due to the different resonances resulted from location-specific multipath environments. The performance of each link depends on the corresponding signal-to-interference-noise ratio (SINR). To guarantee the performance, we need to combat the strong-weak focusing effect and to balance the SINRs among all links.

According to the system model of TRDMA uplink communications with K users, the uplink SINR for user i is given as $$SINR_i^{UL}(G, p) = \frac{p(i)g_i^H R_i^{(0)} g_i}{p(i)g_i^H \bar{R}_i g_i + \sum_{j \neq i} p(j) g_i^H R_j g_i + \sigma^2},$$

where $G=[g_1, \ldots, g_K]$ is the signature matrix, $p=[p(1), \ldots, p(K)]^T$ is the power allocation vector, $R_i^{(0)} = H_i^{(L)H} H_i^{(L)}$ with $H_i^{(l)}$ being the $l^{th}$ row of $H_i$ the $(2L-1) \times L$ Toeplitz matrix with each column being the shifted version of the channel response $h_i$, $R_j = \tilde{H}_j^H \tilde{H}_j$, $\tilde{H}_j$ being the upsampled version of $H_j$ with factor $D_j$ and sampling center located at $H_j^{(L)}$, and $\bar{R}_i = R_i - R_i^{(0)}$. The first two terms in the denominator represent ISI and IUI respectively.

Define a crosstalk matrix $\Phi$ for the TRDMA uplink system whose elements correspond to the ISI and IUI terms in the uplink SINR as $$[\Phi]_{ij} = \begin{cases} g_j^H R_i g_j, & i \neq j \\ g_i^H \bar{R}_i g_i, & i = j \end{cases}.$$

The matrix $\Phi$ is of all positive components, and $\Phi_i$ is its $i^{th}$ column. Define D as a diagonal matrix with $[D]_{ii} = \gamma_i / g_i^H R_i^{(0)} g_i$, where $\gamma_i$ is the SINR weighted factor for the $i^{th}$ user. Then we have $$SINR_i^{UL}(G, p)/\gamma_i = \frac{p(i)}{[D]_{ii}(\Phi_i^T p + \sigma^2)}.$$

In order to ensure fairness among all users and to boost the system performance we jointly design the signature matrix $G=[g_1, \ldots, g_K]$ and power allocation vector $p=[p(1), \ldots, p(K)]^T$. The max-min fairness is adopted here as $$\max_{G,p} \min_j \frac{p(j)}{[D]_{jj}(\Phi_j^T p + \sigma^2)} \quad (70)$$

subject to $p \geq 0$, $p \leq p_{max}$, $\|g_i\|_2 = 1$, $i = 1, \ldots, K$, where $p_{max}$ denotes the vector of individual maximal transmit power, and 0 is an all-zero vector with K elements. An iterative algorithm is proposed in Algorithm 1 to jointly optimize the signature matrix and the power assignment.

---

Algorithm 1 Iterative SINR balancing algorithm under total power constraint

1. Initialize: given $\{\gamma_i\}_{i=1}^K$, $\sigma^2$, $R_i$, and $R_i^0$, $\forall i$, $p_{max}$. Pick $\epsilon > 0$ as the stop criterion or tolerance, $P_{total} \leftarrow 1^T p_{max}$, $p^{(0)} \leftarrow \frac{P_{total}}{K} 1$, $\lambda_{max}^{(0)} \leftarrow \infty$.

2. Loop $n \Leftarrow n + 1$
   a. Calculate the minimum mean square error (MNISE) signature $g_i^{(n)}$, $\forall i$ under $p^{(n-1)}$, and normalize it to make $\|g_i\|_2 = 1$, $\forall i$.
   b. Build the couple matrix $$\Lambda(G, P_{total}) = \begin{pmatrix} D\Phi^T & D\sigma \\ \frac{1}{P_{total}} 1^T D\Phi^T & \frac{1}{P_{total}} 1^T D\sigma \end{pmatrix}.$$

c. Solve the Perron Frobenius eigenpair problem to get $\lambda_{max}^{(n)}$ and its corresponding $\tilde{p}^{(n)}$ with $\tilde{p}^{(n)}(K+1) = 1$. $\tilde{p}^{(n)} \leftarrow \{\tilde{p}^{(n)}\}_1^K$
3. End loop if $\lambda_{max}^{(n-1)} - \lambda_{max}^{(n)} < \epsilon$ or reach the maximal number of iterations.

---

The optimal solution is equivalent to the MMSE beamforming vector, $$g_i^* = \alpha_1 \left( \sum_{j=1}^K p_{ary}(j) R_j + \sigma^2 I \right)^{-1} H_i^{(L)H},$$

$\forall i$, where $\alpha_i$ is a normalized factor, and $p_{ary}(J)$ is the j-th entry of a given vector $p_{ary}$. For any fixed total power constraint $P_{total}$, there only exists one pair of optimal signature matrix and power assignment vector.

The original problem with individual power constraints has a more tightened feasible set and we need to gradually shrink the relaxed feasible set until the optimal solution to the original problem is reached. The two-stage adaptive algorithm is summarized in Algorithm 2. In stage I, the original optimization problem is relaxed into an eigenvalue optimization problem and the corresponding optimum is obtained through the proposed iterative algorithm shown in Algorithm 1. In stage II, based on the solution in stage I, the relaxed feasible set is modified by updating the total power constraint using the gradient descent method against the worst case. Before converging to the global optimum, stages I and II work alternatively and iteratively.

---

Algorithm 2 Two-stage adaptive algorithm for SINR balancing problem under individual power constraint 1. Initialize: given $\{\gamma_i\}_{i=1}^K$, $\sigma^2$, $R_i$, and $R_i^0$, $\forall i$, $p_{max}$, Pick $\epsilon > 0$,
   as the stop criterion or tolerance and $0 < \eta$, $\mu < 0$ as stepsizes. $P_{total}^{(0)} \leftarrow 1^T p_{max}$, update $p^{(0)}$ by Algorithm 1 under $P_{total}^{(0)}$, $\delta p^{(0)} \leftarrow p_{max} - p^{(0)}$, [index, $\delta^{(0)}$] $\leftarrow \min(\delta p^{(0)})$.
2. Loop $n \Leftarrow n + 1$
   a. $p \leftarrow$ Algorithm 1 with $\mu P_{total}^{(n-1)}$, slope $\leftarrow (p^{(n-1)}(\text{index}) - p(\text{index}))/(1 - \mu) P_{total}^{(n-1)}$.
   b. $$\delta P_{total} \leftarrow \frac{\delta^{(n-1)}}{\text{slope}},$$
      $P_{total}^{(n)} \leftarrow P_{total}^{(n-1)} \delta P_{total}$.
   c. Update $p^{(n)}$ under $p_{total}^{(n)}$, $\delta p^{(n)}$, and [index, $\delta^{(n)}$] $\leftarrow \min(\delta p^{(n)})$.

Algorithm 2 Two-stage adaptive algorithm for SINR balancing
problem under individual power constraint d. While $\delta^{(n)} > \epsilon$, do
 i. $\delta P_{total} \leftarrow \eta \times \delta P_{total}$, $P_{total}^{(n)} \leftarrow P_{total}^{(n-1)} + \delta P_{total}$
 ii. Update $p^{(n)}$, $\delta p^{(n)}$ and [index, $\delta^{(n)}$]
e. End while We compare the multiuser uplink performance of our proposed algorithm and other two schemes: basic TR and MMSE TR. In Basic TR scheme, each user transmits with its maximal power and the signature filter $g_i$ is the normalized time-reversal conjugate version of its channel response. In MMSE TR, each user also transmits in the maximal power but its signature is the MMSE signature that can be calculated by independently maximizing its own SINR. On the other hand, in our SINR balancing scheme, AP which has all channel information controls the transmit power of each user and designs the signature filter based on the optimal power assignment. We simulate a highly crowded network where one AP serves 20 users. We assume the 20 users are divided into 3 groups according to the strengths of their focusing effects. The channel gain of each user is set to be ⅓, ⅔, or 1, and the back-off rate is D=16. Simulations are conducted to compare the BER performances, achievable sum rates, network-level energy efficiencies and user-level energy-efficiencies among basic TR scheme, MMSE TR scheme, and the proposed scheme.

Figure 27:
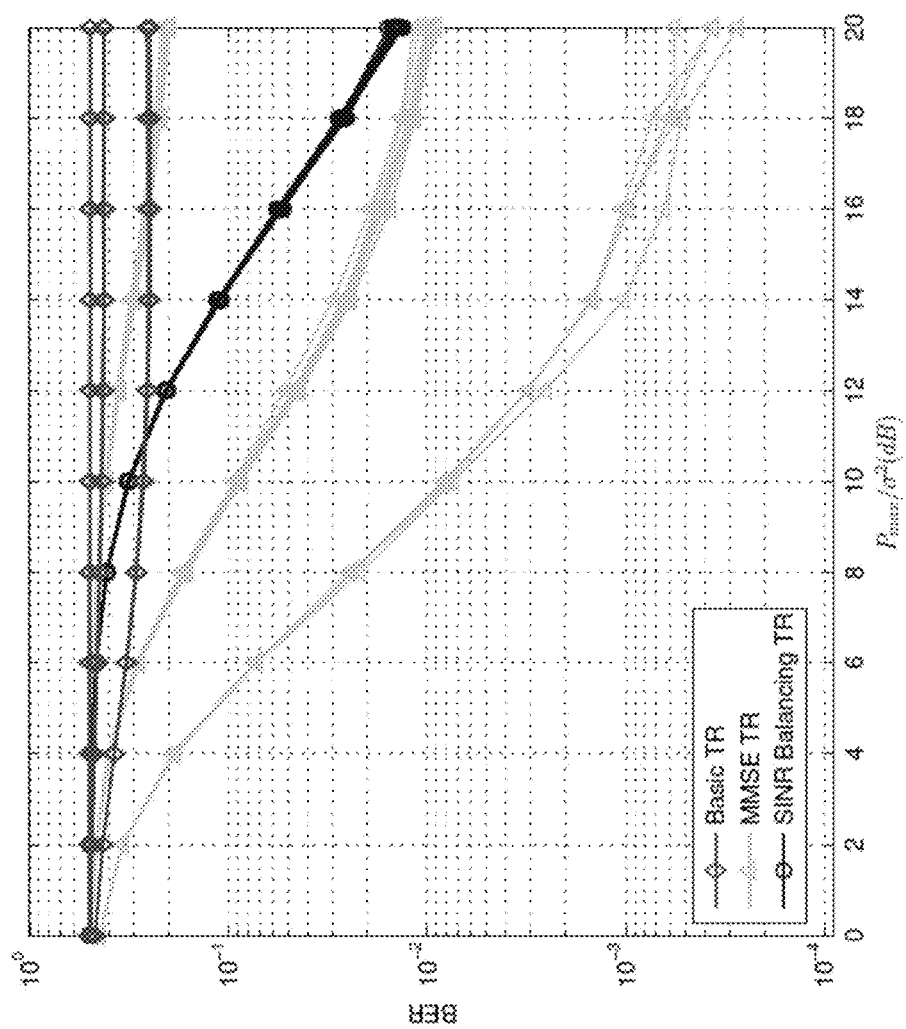
FIG. 27 is a graph showing the exemplary results of the BER performance comparison using the proposed SINR balancing based scheme, a scheme using basic time reversal signature, and a scheme using minimum mean square error (MMSE) signature.

In FIG. 27, we can see the BER performances of the aforementioned three schemes in a highly crowded network. All users in basic TR scheme have such a high BER that the whole system fails to work properly. With MMSE TR, some of the users whose channel degradation is severe will have a poor BER performance that is close to the basic TR BER curves. Thus, even when they are active and transmitting in full power, those users are blocked from getting service due to the low SINRs. Moreover, these blocked users bring high interference to other active users which degrades the whole network's performance. On the other hand, when applying our proposed algorithm to this crowded network, as SINRs are balanced, all users will have almost the same rational BER performance such that all of them can be detected. This indicates that the proposed algorithm can support all users, no matter whether their focusing effect is strong or weak and no matter how crowded the network is.

Figure 28:
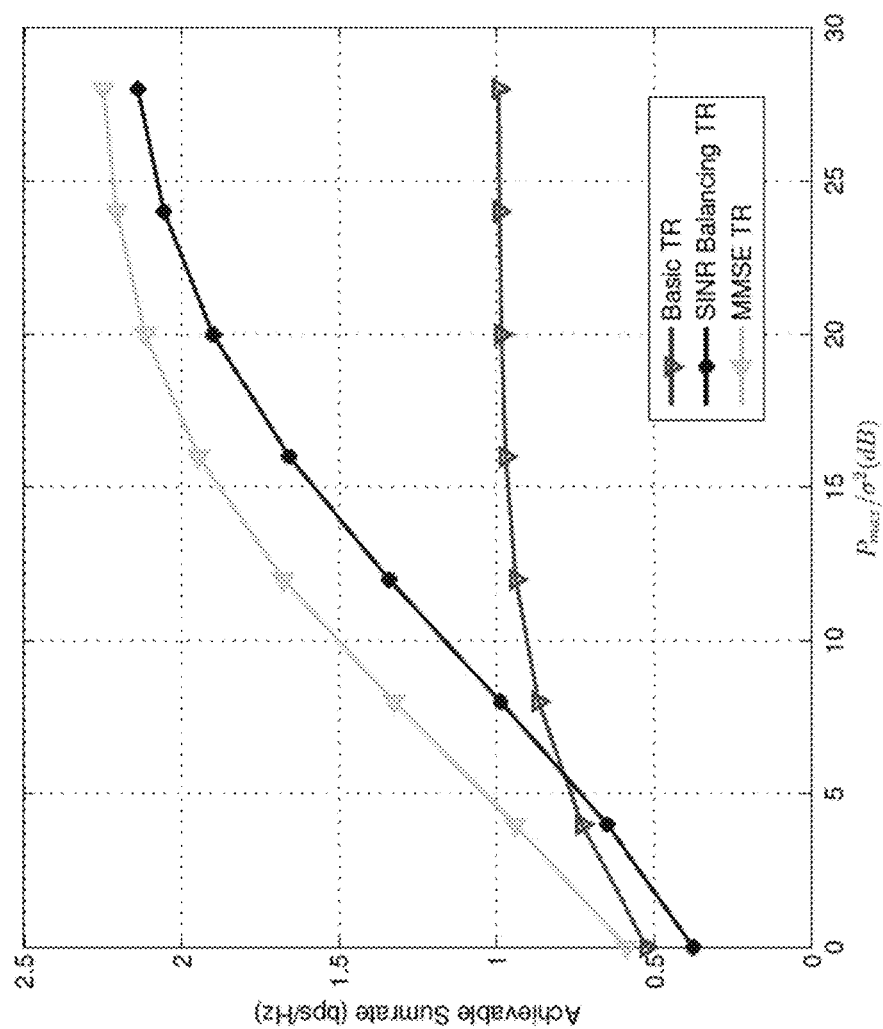
FIG. 28 is a graph showing the exemplary results of the achievable sum rate versus the maximal power constraint using the SINR balancing based scheme.

FIG. 28 shows the curves of achievable sum rate versus the maximal power constraint. Here, the achievable sum rate is normalized by 1/D which represents the spectral efficiency. Since basic TR is aimed to maximize the received signal power regardless of interference, it saturates at a lower rate. In this case, because the interference of other users become the dominant factor in individual SINRs and the channels become more correlated as the number of users is large, even with maximal power basic TR fails to support the system with a high quality of service. In MMSE TR scenario, as everyone transmits in maximal power and MMSE signature is applied at the AP to extract information, the SINR is boosted remarkably. As a result, even though the network is highly dense and the interference is large, the MMSE signature can suppress the interference and the MMSE TR system obtains a higher achievable rate than the basic TR system. In the SNR balancing scheme, users with a better focusing effect has to sacrifice to achieve the balance, leading to a reduction in the sum rate compared to the MMSE TR. However, the gap between the sum rate of the MMSE TR system and the SINR balancing TR system diminishes in the high SNR range.

Figure 29:
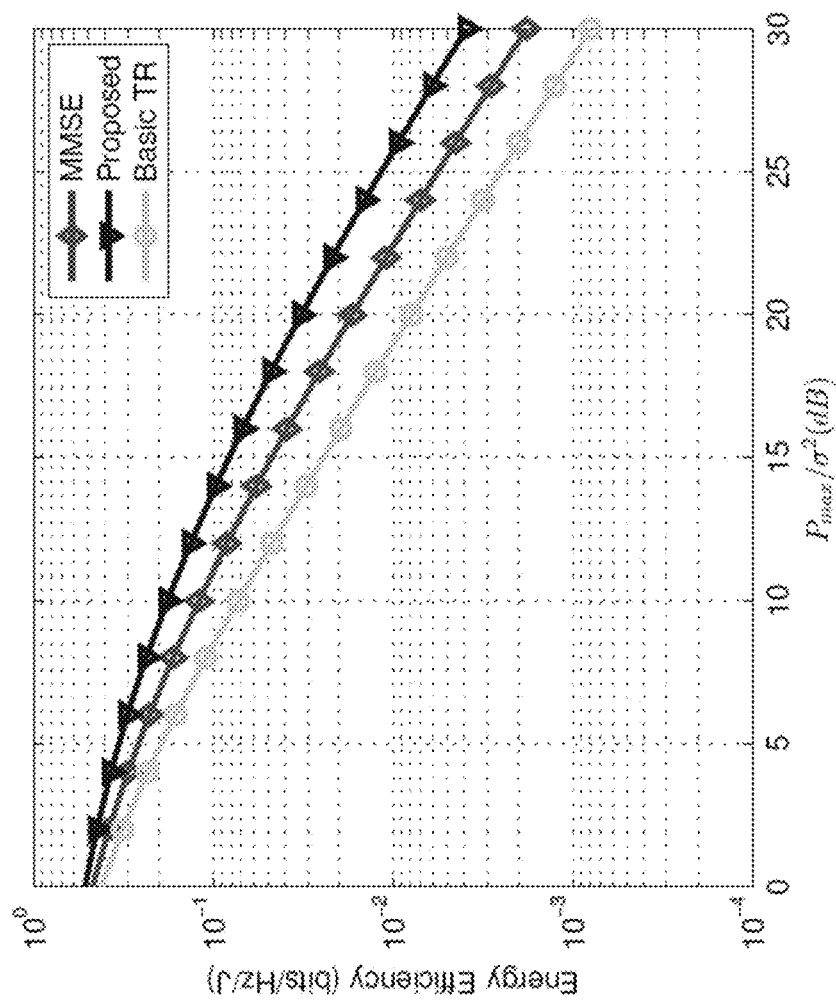
FIG. 29 is a graph showing the exemplary results of the network-level energy efficiency using the proposed SINR balancing based scheme, a scheme using basic time reversal signature, and a scheme using MMSE signature.
Figure 30:
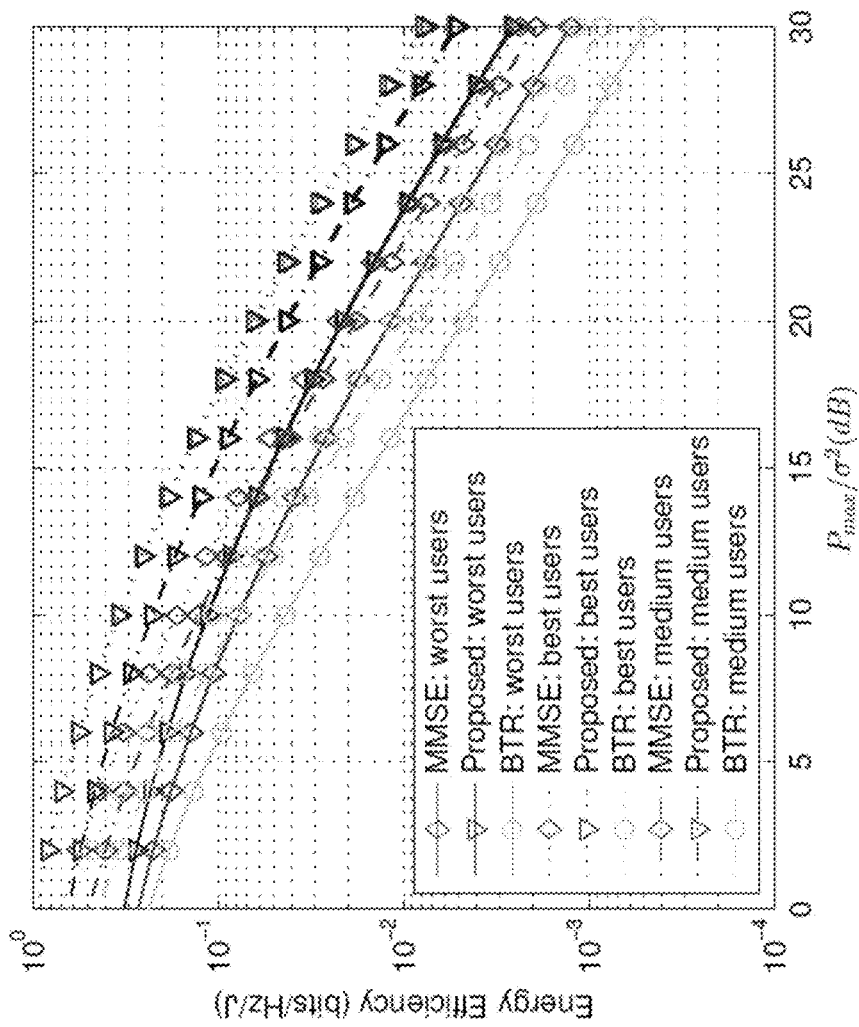
FIG. 30 is a graph showing the exemplary results of the user-level energy efficiency defined using the proposed SINR balancing based scheme, a scheme using basic time reversal signature, and a scheme using MMSE signature.

FIGS. 29 and 30 show graphs that further illustrate the energy-efficiency feature of the SINR balancing TR system. In FIG. 29, the network-level energy efficiency of different schemes are plotted versus the individual power constraints. Here, we define the network-level energy-efficiency as the ratio between achievable spectral efficiency and the total transmit power: Energy-Efficiency (bits/Hz/J)=Achievable spectral efficiency (bps/Hz)/Total power consumed in the network (W). Under the same condition, the network-level energy-efficiency of the SINR balancing TR system is higher than those of the MMSE TR system and the basic TR system. However, in the MMSE TR and the basic TR systems, most of the energy are wasted to generate interference, and thus the network performances are degraded. That is because in the SINR balancing TR system, by using joint signature matrix and power allocation optimization, the interferences between users are well managed and the resources are assigned efficiently.

The SINR balancing TR system has a better user-level energy efficiency, which is defined as the ratio of per-user throughput to power consumption of the user. Referring to FIG. 30, under the same individual power constraints, the user-level energy-efficiency obtained by the SINR balancing TR system is superior to that of the MMSE TR system and the basic TR system, for all users. In the SINR balancing TR system, with joint signature design and power allocation, the interference between users is well managed and the resource is utilized most efficiently with a guarantee on quality-of-service (QoS) fairness.

As shown in FIGS. 29 and 30, under the same power constraints, both the network-level energy-efficiency and user-level energy-efficiency are improved by using the SINR balancing TR system, compared with the MMSE TR system and the basic TR system. The reason is that by using the joint signature design and the power allocation optimization, the severe interference between users is alleviated and the weak focusing effect is also compensated. Moreover, the goal of the SINR balancing TR system is to balance the weighted uplink SINRs among all users. When equal weighted factors are adopted, the SINR balancing TR system achieves the same uplink SINR for all users which provides a fair QoS guarantee. On the other hand, heterogeneous QoS requirements can be achieved by selecting different weighted factors. Hence, the SINR balancing TR system is energy-efficient and guarantees the QoS in multiuser TRDMA uplinks.

Interference Control in TR D2D Uplinks

The time reversal (TR) based signal transmission technique treats each path of a multi-path channel in a rich scattering environment as a distributed virtual antenna. It creates a high-resolution spatial and time focusing effect via simply transmitting back a time-reversed conjugate version of the channel impulse response (CIR). As a result, TR effectively eliminates the inter-user interference (IUI) in a single-carrier multiuser communication network. Meanwhile, the signal-to-noise ratio (SNR) of the received signal is boosted due to the inherent nature of TR that more fully collects energy from signals that propagate through the multi-paths. This feature makes TR a good candidate for network densification, e.g., in D2D communications.

We propose a novel D2D communication framework incorporating the TR technique, where all D2D pairs and primary users (PUs) transmit within the same frequency band and time slot. Because of its unique time and space focusing effect, TR together with the rich-scattering environment brings in a natural way to suppress the IUIs and inter-tier interference (ITI) between D2D pairs and PUs (or access points (APs)). In the TR-based hybrid D2D networks, the interference is managed by using TR focusing strength control.

In order to jointly optimize the resources utilized by PUs and D2D users (DUs), we formulate our problem as a D2D throughput maximization problem with a service protection to the PUs. Given the weight $\alpha_m$, individual PU power constraints $P_{max}^{PU}$, D2D power constraints $P_{max}^{DU}$, and SINR threshold for PUs $\gamma_{PU}^{th}$, the maximization problem can be written as $$\max_{P_{PU}, P_{DU}} \sum_{m=1}^{M} \alpha_m \log_2(1 + \gamma_m^{DU}) \quad (71)$$

$$\text{s.t.} \quad P_{PU} \geq 0, P_{PU} \leq P_{max}^{PU}, \gamma_i^{PU} \geq \gamma_{PU}^{th}, \forall i$$

$$P_{DU} \geq 0, P_{DU} \leq P_{max}^{DU},$$

where $\gamma_m^{DU}$ denotes the uplink SINR for the m-th D2D pair and is a function of $P_{PU}$ and $P_{DU}$.

The optimization problem can be decomposed into a two stage problem. The first subproblem is a feasibility problem for PUs in uplink where we want to maximize the minimum among all the received SINR $\gamma_i^{PU}$, i.e., $$\max_{P_{PU}} \min_{i=1,\ldots,N} \gamma_i^{PU} \quad (72)$$

$$\text{s.t.} \quad P_{PU} \geq 0, P_{PU} \leq P_{max}^{PU}$$

Let $P_o$ denote the power vector for PUs to achieve $\gamma_{PU}^{th}$ without considering D2D pairs, and matrix F denote the power-boost matrix introduced by the interference of D2D pairs. As D2D users join in the network, they will bring in interference to primary users in the course of transmission. The matrix F contains the information of how each primary user should increase his/her power according to each unit of D2D transmit power, i.e. $FP_{DU}$ is the amount of power of primary users to increase given the transmit power of D2D users $P_{DU}$. In order to maintain the same level of SINRs, primary users have to adjust their power accordingly. Once the first subproblem is feasible, we can obtain a meaningful pair of $P_o$ and F to address the second-stage problem that is defined as a D2D throughput maximization, which can be expressed as $$\max_{P_{DU}} \sum_{m=1}^{M} \alpha_m \log_2(1 + \gamma_m^{DU}) \quad (73)$$

$$\text{s.t.} \quad P_{DU} \geq 0, P_{DU} \leq P_{max}^{DU},$$

$$P_o + FP_{DU} \geq 0, P_o + FP_{DU} \leq P_{max}^{PU}$$

The objective function is not concave with many inequality constraints which make the searching space for optimal $P_{DU}$ too complicated. To address the non-convexity we convert the problem into an equivalent D2D SINR allocation problem and solve the problem using a Stackelberg game. In the algorithm described here, the AP acts as the leader that decides the price. Each D2D pair independently chooses a best response that maximizes their utilities with the price from AP.

The problem for AP is to find a best price given the D2D users' service requests $\gamma_m^{DU}$ that maximizes his utility as:

$$\max_c \sum_{m=1}^{M} \gamma_m^{DU} \quad (74)$$

$$\text{s.t.} \quad P_{DU}(\gamma^{DU}) \geq 0, P_{DU}(\gamma^{DU}) \leq P_{max}^{DU},$$

$$P_o + FP_{DU}(\gamma^{DU}) \geq 0, P_o + FP_{DU}(\gamma^{DU}) \leq P_{max}^{PU}$$

With the price from AP, each D2D pair independently selects its best strategy that maximizes its own utility:

$$\max_{\gamma_m^{DU}} \alpha_m \log_2(1 + \gamma_m^{DU}) - c \gamma_m^{DU} \quad (75)$$

$$\text{s.t.} \quad \gamma_m^{DU} \geq 0$$

$$s \cdot t \gamma_m^{DU} \geq 0 \quad (75)$$

The best strategy for the D2D pair is $$\gamma_m^{DU*} = \left(\frac{\alpha_m}{c * \ln(2)} - 1\right)^+$$

given a price c from AP, whereas the best price for AP can be obtained through the optimal price search algorithm given the knowledge of the best strategies of D2D users. The total gain, i.e. welfare of the optimal pricing has the same form of the sum of weighted sum rate of all D2D pairs. However, since every D2D pair is optimized independently, the objective of the optimal pricing is usually smaller than the global optimum of the original problem.

Figure 31:
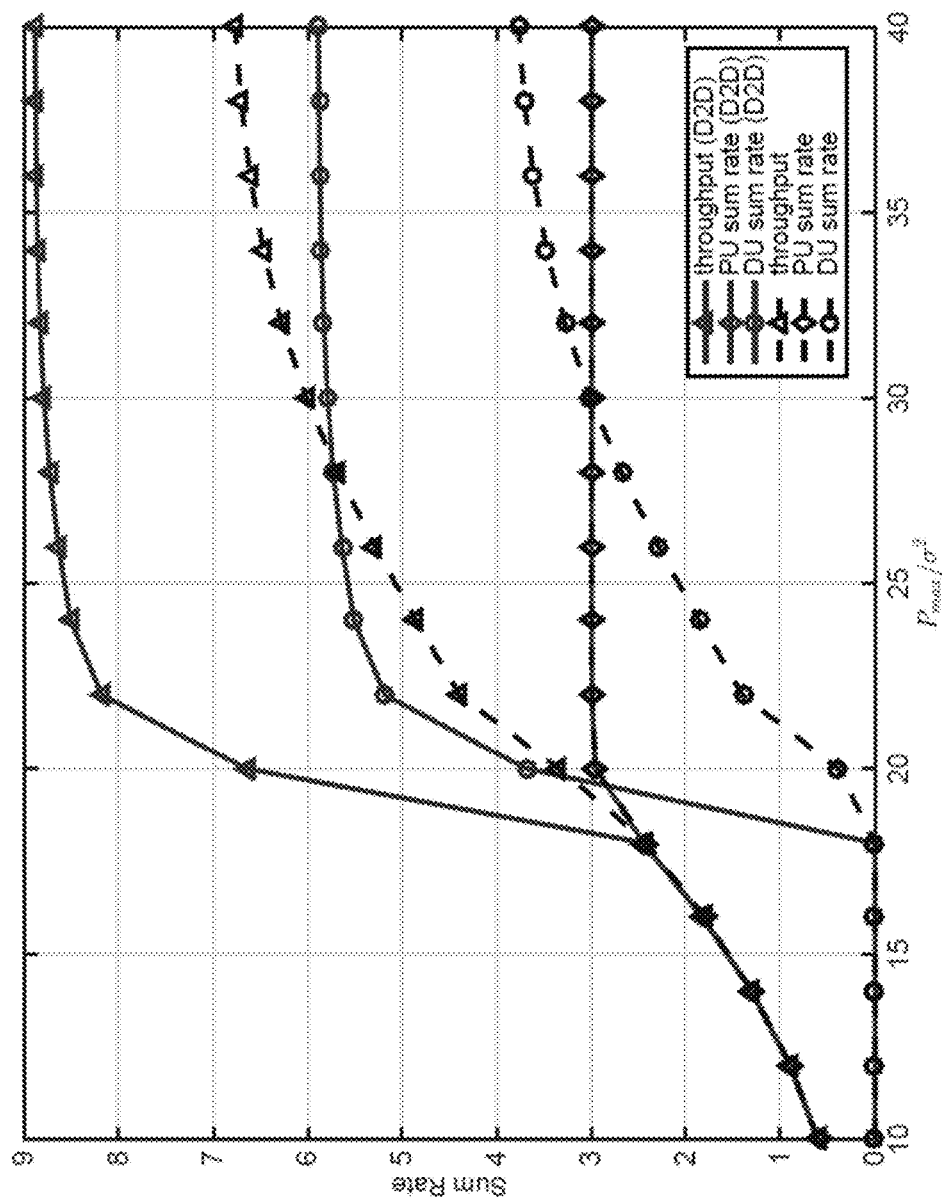
FIG. 31 is a graph showing the exemplary results of throughput comparison between the TR-based D2D hybrid network and conventional homogeneous TR communication network.

The uplink performance comparison between conventional homogeneous TR communication network and the TR-based D2D hybrid network is implemented. Here, we consider a network with 3 PUs and 2 pairs of D2D communicators. During the uplink, PUs in both networks transmit directly to the AP with an individual power constraint $p_{max}$ and a higher priority. In the homogeneous TR network, the D2D senders act similar to PUs but with a lower priority, whereas in the TR-based D2D hybrid network, the D2D senders directly communicate with the receivers with a power constraint $0.2 p_{max}$. The TR-based D2D hybrid network work in the proposed optimal pricing algorithm. In the TR-based D2D hybrid network, the AP adopts the proposed optimal pricing algorithm to determine the best power allocation scheme for both primary users and D2D users. As shown in FIG. 31, because of the same QoS priority for PUs in both networks, the two curves denoted as "◊" overlap. However, as D2D communication takes advantages of proximity, they can achieve a much higher sum rate with a lower power requirement as shown by the curves denoted as "o". Consequently, the overall system performance of the TR-based D2D hybrid network is superior in both throughput denoted as "A" and energy efficiency.

Waveform Design for C-RAN

In TR communication, when the symbol duration is shorter than the delay spread of the multipath channel in high rate transmissions, the ISI may limit the performance of the system. Moreover, with network densification, e.g., in a C-RAN that needs to support a massive number of TDs, the severe IUI becomes the limiting factor that impairs both the spectral and energy efficiency. Therefore, it is important to design effective interference management schemes to improve the spectral and power efficiency in TR communication systems.

Figure 32:
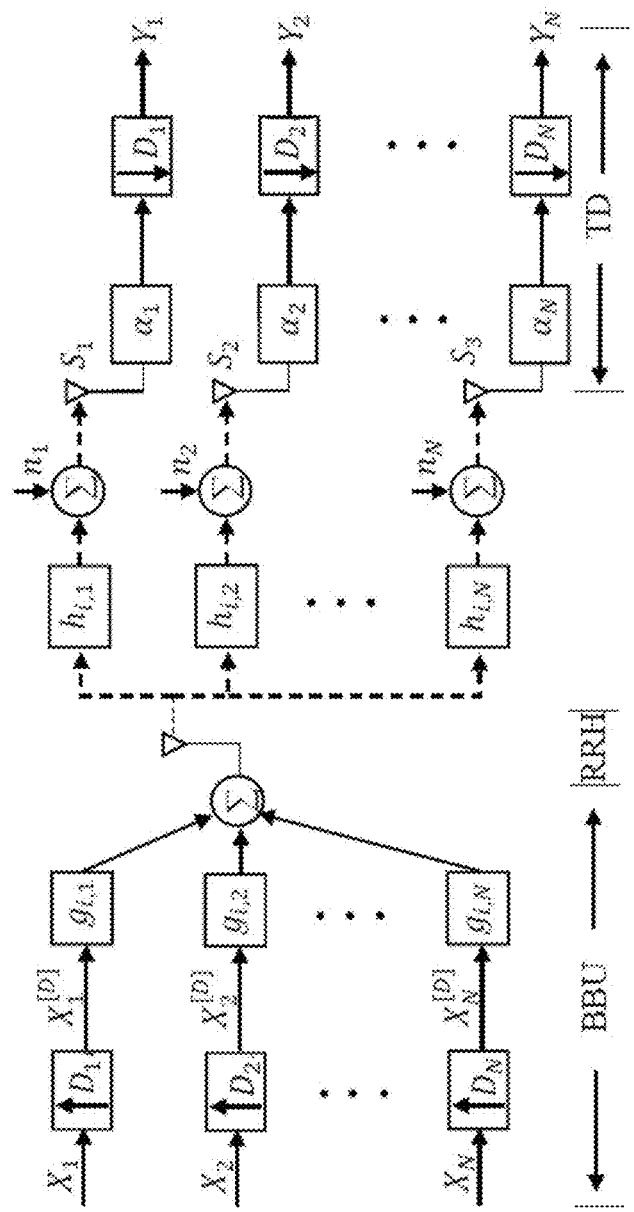
FIG. 32 is a diagram showing the exemplary downlink data transmission of a time-reversal based cloud radio access network.

In the following, we describe a content-aware waveform design process that leverages all the available information and computing power at the BBUs to better manage the interference so that the transmissions in the TR based C-RAN become more reliable and efficient. In the downlink, since the instantaneous CIRs as well as the intended symbols of all the TDs are available at the BBUs, such information can be used by the content-aware waveform design process to optimally determine the power allocation and transmitting waveforms to minimize the mean square error (MSE) of the signal received by the TDs. More specifically, as shown in the downlink transmission diagram in FIG. 32, let $h_{i,k}$ denote the multipath channel between the i-th RRH and the k-th TD, which is a vector of length L with L being the maximum channel length of all the N TDs. Let $X_k$ and $g_{i,k}$ denote the information symbols and the transmit waveform for user k at RRH i. $g_{i,k}$ can be basic TR waveform or more advanced waveform, and then the length of $g_{i,k}$ is also L. We consider the frame-based transmission and reception schemes. The frame of symbols for TD k is denoted by $X_k=[x_{k,1}, x_{k,2}, \ldots, x_{k,F_k}]$ where $F_k$ is the frame length of TD k. At RRH i, the $X_k$ will be first upsampled by the backoff factor $D_k$ for inter-symbol interference (ISI) alleviation. The upsampled symbol frame is denoted as $X_k^{[D_k]}$. After that, a blank sub-frame is appended to the end of the up-sampled signal to prevent the interference between frames. The length of the sub-frame is no less than L. Then, the entire frame is convolved with the downlink transmission waveform $g_{i,k}$, after which the convoluted signal for all the TDs are summed up together and transmitted over the air to multiple TDs. The signal received at TD k can be represented as $$S_k = h_{i,k} * \sum_{v=1}^{N} g_{i,v} * X_v^{[D_v]} + n_k, \quad (76)$$

where $n_k$ is the noise vector. Without loss of generality, we assume $E[\|n_k[j]\|^2]=\sigma^2, \forall k,j$.

The k-th TD will first amplify the $S_k$ with $\alpha_k$ and then down-sample it with the backoff factor $D_k$, obtaining the received sequence $Y_k$, based on which it will try to detect $X_k$. The received sequence $Y_k$ can be represented as $$Y_k = \alpha_k M_k \cdot h_{i,k} * \sum_{v=1}^{N} g_{i,v} * X_v^{[D_v]} + \alpha_k M_k n_k, \quad (77)$$

where $M_k$ is a masking matrix for TD k since only the sampled taps of the received signal are considered. More specifically, $$M_k = [e_L; e_{L+D_k}; \ldots e_{L+(F_k-1)D_k}], \quad (78)$$

where $e_i$ denotes the i-th row of the $(2L-1+(F_k-1)D_k) \times (2L-1+(F_k-1)D_k)$ identity matrix.

We define $H_{i,k}$ as the Toeplitz matrix of size $(2L-1) \times L$ with the first column being $[h_{i,k}^T 0_{1 \times (L-1)}]$, then $Y_k$ can be further written as $$Y_k = \alpha_k \cdot \tilde{B}_{i,k} g_i + \alpha_k \cdot M_k n_k, \quad (79)$$

where $$g_i = \begin{pmatrix} g_{i,1} \\ g_{i,2} \\ \vdots \\ g_{i,N} \end{pmatrix} \quad (80)$$

is the aggregation of all the downlink transmission signature $g_{i,k}$'s of the RRH i. $\tilde{B}_{i,k}$ is the equivalent channel matrix combining both the channel information $h_{i,k}$'s and traffic information $X_k$'s. More specifically, $$\tilde{B}_{i,k} = M_k[\tilde{B}_{i,k}^{(1)} \tilde{B}_{i,k}^{(2)} \ldots \tilde{B}_{i,k}^{(N)}], \quad (81)$$

where $$\tilde{B}_{i,k}^{(t)} = \sum_{j=1}^{F_k} X_t[j] \cdot H_{i,k}^{(j)}, \quad (82)$$

and $$H_{i,k}^{(j)} = \begin{pmatrix} 0_{(j-1)D_k \times L} \\ H_{i,k} \\ 0_{(F_k-j)D_k \times L} \end{pmatrix} \quad (83)$$

is the augmented matrix of $H_{i,k}$ with size $(2L-1+(F_k-1)D_k) \times L$.

In the TR communication system, due to the asymmetric architecture, all the computation complexity are migrated to the BBUs and the TDs have low complexity. In other words, the TDs are unable to perform sophisticated signal processing to detect the transmitted symbols. Due to this constraint, we aim to make the received signal $Y_k$ close to $X_k$ so that TD k could directly get the transmitted information based on the received signal.

To achieve this, some sophisticated processing are needed at the BBU side. It can be seen in (4) that we combine the channel information $h_{i,k}$'s and the traffic information $X_k$'s in the matrix $\tilde{B}_{i,k}$, which are readily available at the BBUs, and the BBUs can instantaneously compute the $\tilde{B}_{i,k}$'s and utilize them to optimize the downlink data transmission. Since all the TDs simultaneously work at the same spectrum, each TD suffers from the inter-symbol interference (ISI) and the inter-user interference (IUI), which are significantly affected by the design of $g_i$. We aim to find the optimal $g_i$ and $\alpha=[\alpha_1, \alpha_2, \ldots \alpha_N]$ to minimize the mean square error (MSE) of the received signal without violating the transmitting power constraints. More specifically, the optimization problem becomes $$\min_{\alpha, g_i} \sum_{k=1}^{N} E[\|Y_k - X_k\|^2] \quad (84)$$

s.t. $g_i^* g_i \leq P_{max}^{(dl)}$, where $P_{max}^{(dl)}$ is the maximum transmitting power allowed for each RRH in the downlink transmission.

Figure 33:
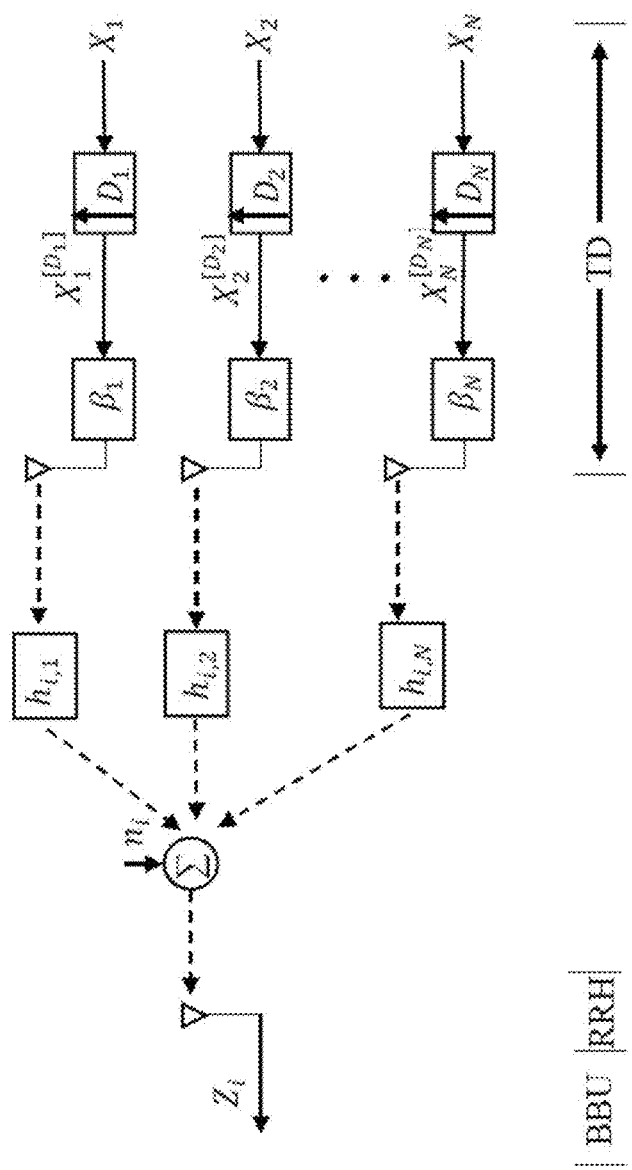
FIG. 33 is a diagram showing the exemplary uplink data transmission of a time-reversal based cloud radio access network.

In the uplink of the TR based C-RAN system, all the TDs simultaneously transmit the information through the RRHs to the BBUs. The BBUs collect the information received by all the RRHs and then detect the transmitted symbols by processing the received signal. We will first analyze the case that a single RRH serves multiple TDs. Similar to the downlink case, the uplink will also be using the frame based transmission. The frame of symbols of TD k is denoted by $X_k=[x_{k,1}, x_{k,2}, \ldots x_{k,F_k}]$ where $F_k$ is the frame length of TD k. As shown in FIG. 33, at TD k, the $X_k$ will be first upsampled by the backoff factor $D_k$ for ISI alleviation. After that, a blank sub-frame is appended to the end of the up-sampled signal to prevent the interference between frames. The length of the sub-frame is no less than L. Then, the entire frame is amplified element-wisely by $\beta_k=[\beta_{k,1}, \beta_{k,2}, \ldots, \beta_{k,F_k}]$ and then transmitted over the air to the RRH, i.e., the symbol $x_{k,j}$ is amplified by $\beta_{k,j}$. The signal received at the i-th RRH is the summation of the frame transmitted by each TD convoluted with its corresponding multipath channel. Similar to the downlink case, we use matrix notations to represent the received signal, which is $$Z_i = R_i \beta X + n_i, \qquad (85)$$

where $$X = \begin{pmatrix} X_1 \\ X_2 \\ \vdots \\ X_N \end{pmatrix} \qquad (86)$$

is the aggregation of the frames of all the TDs, $$R_i = (R_{i,1} R_{i,2} \ldots R_{i,N}), \qquad (87)$$

and $\beta$ is a diagonal matrix with the diagonal elements being $\beta_{1,1}, \ldots \beta_{1,F_1}, \beta_{2,1}, \ldots \beta_{2,F_2}, \ldots, \beta_{N,1}, \ldots \beta_{1,F_N}$. $R_{i,j}$ is the Toeplitz matrix of size $(D_j \cdot (F_j-1)+L) \times F_j$ with the j-th column being $[0_{(j-1)*D_j}; h_{i,j}^T; 0_{(F_j-j) \times D_j}]$.

It can be seen that the channel information $h_{i,k}$'s are combined in $R_i$, which are readily available at the BBUs in the uplink. Moreover, the BBUs are equipped with all the computation power so that they have the ability to process the received signal in sophisticated ways to extract the information transmitted by the TDs. In this invention, we aim to design the linear minimum mean square error (LMMSE) detector $W_i$ to detect the symbols transmitted by the TDs. Moreover, the BBUs need also determine the power control factor $\beta_{k,j}$'s in order to avoid the strong-weak effect. The problem can be formulated as $$\min_{\beta, W_i} E[\|W_i Z_i - X\|^2] \qquad (88)$$

$$\text{s.t. } \beta_{k,j}^2 E[\|x_{k,j}\|^2] \leq P_{max}^{(ul)}, \forall k, j,$$

where $P_{max}^{(ul)}$ is the maximum transmitting power allowed for each TD in the uplink transmission.

For the downlink waveform design, if there is a single RRH serving multiple TDs, the MSE of TD k can be expressed as $$MSE_k = E[\|\alpha_k \tilde{B}_{i,k} g_i + \alpha_k M_k n_k - X_k\|^2] = \|\alpha_k\|^2 g_{i'} \tilde{B}'_{i,k} \tilde{B}_{i,k} g_i - \alpha_{k'} g_{i'} \tilde{B}'_{i,k} X_k - \alpha_{k'} X'_k \tilde{B}_{i,k} g_i + \|\alpha_k\|^2 F_k \sigma^2 + X'_k X_k \qquad (89)$$

The total MSE can be represented as $$\sum_{k=1}^{N} MSE_k = g_{i'} \left( \sum_{k=1}^{N} \|\alpha_k\|^2 \tilde{B}'_{i,k} \tilde{B}_{i,k} \right) g_i - g_{i'} \left( \sum_{k=1}^{N} \alpha_{k'} \tilde{B}'_{i,k} X_k \right) - \qquad (90)$$

$$\left( \sum_{k=1}^{N} \alpha_k X_{k'} \tilde{B}_{i,k} \right) g_i + \sum_{k=1}^{N} X_{k'} X_k + \sum_{k=1}^{N} \|\alpha_k\|^2 F_k \sigma^2$$

The problem in equation (84) becomes $$\min_{\alpha, g_i} g_{i'} \left( \sum_{k=1}^{N} \|\alpha_k\|^2 \tilde{B}'_{i,k} \tilde{B}_{i,k} \right) g_i - \qquad (91)$$

$$g_{i'} \left( \sum_{k=1}^{N} \alpha_{k'} \tilde{B}'_{i,k} X_k \right) - \left( \sum_{k=1}^{N} \alpha_k X_{k'} \tilde{B}_{i,k} \right) g_i + \sum_{k=1}^{N} \|\alpha_k\|^2 F_k \sigma$$

$$\text{s.t. } g_{i'} g_i \leq P_{max}^{(dl)},$$

which is a non-convex optimization problem. Since each TD's optimal $g_{i,k}$ and $\alpha_k$ depend on those of other TDs, the closed form global optimal solution is difficult to find. In the following, we provide two algorithms that are guaranteed to converge to a local optimal point.

Alternating Optimization Algorithm

In the alternating optimization algorithm, we alternatively optimize one of $g_i$ and $\alpha$ given the other. The Lagrangian of the problem in equation (16) can be written as $$L(\alpha, g_i, \lambda) = g_{i'} \left( \sum_{k=1}^{N} \|\alpha_k\|^2 \tilde{B}'_{i,k} \tilde{B}_{i,k} \right) g_i - g_{i'} \left( \sum_{k=1}^{N} \alpha_{k'} \tilde{B}'_{i,k} X_k \right) - \qquad (92)$$

$$\left( \sum_{k=1}^{N} \alpha_k X_{k'} \tilde{B}_{i,k} \right) g_i + \sum_{k=1}^{N} \|\alpha_k\|^2 F_k \sigma^2 + \lambda(g_{i'} g_i - P_{max}^{(dl)}).$$

Given $g_i$, optimizing $\alpha$ is an unconstrained optimization problem, which can be solved by $$\frac{\partial L}{\partial \alpha_k} = 0 \Rightarrow \alpha_k = \left( F_k \sigma^2 + g_{i'} \tilde{B}'_{i,k} \tilde{B}_{i,k} g_i \right)^{-1} g_{i'} \tilde{B}'_{i,k} X_{k'}. \qquad (93)$$

Next, we will derive how to optimize $g_i$ given $\alpha$. We have $$\frac{\partial L}{\partial g_i} = 0 \Rightarrow g_i \left( \sum_{k=1}^{N} \|\alpha_k\|^2 \tilde{B}'_{i,k} \tilde{B}_{i,k} \right) - \sum_{k=1}^{N} \alpha_k X_{k'} \tilde{B}_{i,k} + \lambda g_{i'} = 0. \qquad (94)$$

From equation (94), we can derive that $$g_{i'} \left( \sum_{k=1}^{N} \|\alpha_k\|^2 \tilde{B}'_{i,k} \tilde{B}_{i,k} \right) g_i - \sum_{k=1}^{N} \alpha_k X_{k'} \tilde{B}_k g_i + \lambda g_{i'} g_i = 0. \qquad (95)$$

From equation (95), we can have $$g_{i'} \left( \sum_{k=1}^{N} \|\alpha_k\|^2 \tilde{B}'_{i,k} \tilde{B}_{i,k} \right) g_i - \sum_{k=1}^{N} \alpha_k X_{k'} \tilde{B}_{i,k} g_i + \sum_{k=1}^{N} \|\alpha_k\|^2 F_k \sigma^2 = 0. \qquad (96)$$

By comparing equations (95) and (96), we can have $$\lambda = \frac{\sum_{k=1}^{N} \|\alpha_k\|^2 F_k \sigma^2}{P_{max}^{(dl)}}. \tag{97}$$

Substituting equation (97) into equation (94), we can have $$g_i = \left( \sum_{k=1}^{N} \|\alpha_k\|^2 \tilde{B}'_{i,k} \tilde{B}_{i,k} + \frac{\sum_{k=1}^{N} \|\alpha_k\|^2 F_k \sigma^2}{P_{max}^{(dl)}} I \right)^{-1} \left( \sum_{k=1}^{N} \alpha_{k'} \tilde{B}'_{i,k} X_k \right). \tag{98}$$

The alternating optimization algorithm can be summarized in Algorithm 3.

Algorithm 3 Alternating Optimization Algorithm

1. Initialize $\alpha_k = 1$, $\forall k$
2. loop:
3. Calculate $g_i$ according to (98)
4. Calculate $\alpha_k$'s according to (93)
5. Until $g_i$ and $\alpha_k$'s converge or the maximum number of iterations is reached In the alternating optimization algorithm, the MSE is non-increasing each time we update $\alpha$ or $g_i$. As a result, the MSE is non-increasing as the iteration goes on. Since the MSE in equation (91) is lower bounded, the proposed algorithm is guaranteed to converge.

In addition to the alternating optimization algorithm, we can also use gradient algorithm to find the optimal waveform. The MSE of the k-th TD can be expressed as $$MSE_k = X_{k'} X_k - \frac{g_i \tilde{B}_{i,k'} X_k X_{k'} \tilde{B}_{i,k} g_i}{g_i \tilde{B}_{i,k'} \tilde{B}_{i,k} g_i + F_k \sigma^2}. \tag{99}$$

The total MSE of all the TDs can be represented as $$\sum_{k=1}^{N} MSE_k = \sum_{k=1}^{N} \left( X_k, X_k - \frac{g_i \tilde{B}_{i,k'} X_k X_{k'} \tilde{B}_{i,k} g_i}{g_i \tilde{B}_{i,k'} \tilde{B}_{i,k} g_i + F_k \sigma^2} \right). \tag{100}$$

The gradient can be calculated as $$\nabla g_i \triangleq \frac{\partial}{\partial g_i} \left( \sum_{k=1}^{N} MSE_k \right) = \tag{101}$$

$$\sum_{k=1}^{N} \left[ \frac{2 \tilde{B}_{i,k'} \tilde{B}_{i,k} g_i (g_i \tilde{B}_{i,k'} X_k X_{k'} \tilde{B}_{i,k} g_i)}{(g_i \tilde{B}_{i,k'} \tilde{B}_{i,k} g_i + F_k \sigma^2)^2} - \frac{2 \tilde{B}_{i,k'} X_k X_{k'} \tilde{B}_{i,k} g_i}{g_i \tilde{B}_{i,k'} \tilde{B}_{i,k} g_i + F_k \sigma^2} \right].$$

Once the gradient is calculated, we use it to update the waveform in order to minimize the MSE. Moreover, we project it to the constraint set $g_{i'} g_i = p_{max}^{(dl)}$ by normalization to comply with the transmitting power constraint. Specifically, $$g_i^{new} = g_i - \delta_n \cdot \nabla g_i \tag{102}$$

$$g_i^{new,p} = \frac{\sqrt{P_{max}^{(dl)}}}{\|g_i^{new}\|} \cdot g_i^{new}, \tag{103}$$

where the first equation is to determine the shape of the new waveform by line search. We choose the step size for the n-th iteration in line search as $$\delta_n = \frac{1}{n}$$

for its good convergence behavior. The second equation is to project the waveform into the space satisfying the transmitting power constraint. The gradient optimization algorithm can be summarized in Algorithm 4.

Algorithm 4 Gradient Optimization Algorithm

1. Initialize $g_i$ as the basic TR waveform
2. loop:
3. Calculate $\nabla g$ according to (101)
4. Set n = 1
5. Update $g_i^{new,p}$ according to (102) and (103)
6. if $MSE_{new} < MSE_{current}$
7. $g_i = g_i^{new,p}$
8. else
9. n = n + 1, go to step 5
10. until $g_i$ and $\alpha_k$'s converge or the maximum number of iterations is reached In this algorithm, $g_i$ is updated in step 7 only when the MSE is reduced by the update. Therefore, the MSE is non-increasing in this algorithm. Since the MSE is lower bounded, the gradient algorithm is guaranteed to converge.

The gradient algorithm can be extended to the multiple RRH case so that multiple RRHs are able to jointly determine the waveform for the downlink transmission so as to better focus the signal at the intended TDs.

First, we extend the problem in equation (9) to the multiple RRH case. When multiple RRHs work together to serve the TDs distributed in the area, each TD simultaneously receives and combines the signal transmitted by all the serving RRHs. Suppose there are totally M RRHs serving N TDs in the area. The signal received by TD k can be represented as $$Y_k = \alpha_k \sum_{i=1}^{M} \tilde{B}_{i,k} g_i + a_k \cdot M_k n_k = \alpha_k \cdot \tilde{B}_k g + \alpha_k \cdot M_k n_k, \tag{104}$$

where $$g = \begin{pmatrix} g_1 \\ g_2 \\ \vdots \\ g_M \end{pmatrix} \tag{105}$$

is the aggregation of all the downlink transmission signature $g_i$'s of the RRH i, and $$\tilde{B}_k = [\tilde{B}_{1,k} \tilde{B}_{2,k} \ldots \tilde{B}_{M,k}]. \tag{106}$$

Since the transmitting power at each of the RRHs cannot exceed $P_{max}^{(dl)}$, the problem in equation (84) becomes $$\min_{\alpha,g} g'\left(\sum_{k=1}^{N} \|\alpha_k\|^2 \tilde{B}'_{i,k} \tilde{B}_k\right) g - g'\left(\sum_{k=1}^{N} \alpha_k \tilde{B}_k X_k\right) - \tag{107}$$

$$\left(\sum_{k=1}^{N} \alpha_k X_k \tilde{B}_k\right) g + \sum_{k=1}^{N} \|\alpha_k\|^2 F_k \sigma^2 \text{ s.t. } g_i' g_i \leq P_{max}^{(dl)}, \forall i.$$

The gradient optimization algorithm proposed earlier can be modified to work in the multiple RRH case. Since each single RRH has only limited transmitting power, the projection in equation (103) is modified by normalizing the maximum transmitting power of all the RRHs to $P_{max}^{(dl)}$, while the transmitting power of all the other RRHs are scaled down accordingly. Specifically, the projection step is $$g^{new,p} = \frac{\sqrt{P_{max}^{(dl)}}}{\max_i \|g_i\|} \cdot g_{new}. \tag{108}$$

By solving equation (107), all the RRHs work together to determine the optimal g without violating the transmitting power constraint at each of the RRHs. As a result, the transmitted signal are better focused at the intended receivers with little leakage to the surroundings. It will be shown later in the numerical results that, compared with the single RRH case, multiple RRHs not only bring in extra power, but also additional degree of freedom so that the signal can be focused at the intended locations more sharply.

For the uplink joint power control and detector design in (88), we first analyze the single RRH case where RRH i determines the transmitting power of all the TDs and then processes the received signal to extract the uplink information. Suppose the RRH i collects the uplink signal transmitted by N TDs and forward it to the BBUs for further processing. The MSE in equation (88) can be written as $$E[\|W_i Z_i - X\|^2] = E[\|W_i R_i \beta X + W_i n_i - X\|^2]. \tag{109}$$

In this invention, we use the LMMSE detector to detect X, which can be written as $$W_i = \Sigma_x \beta' R_{i}'(R_i \beta \Sigma_x \beta' R_{i}' + \Sigma_e)^{-1}, \tag{110}$$

where $$\Sigma_x = E[XX']$$

$$\Sigma_e = E[n_i n_i']. \tag{111}$$

It can be seen that if $\beta$ is available, the LMMSE detector can be determined. The MSE can be written as $$MSE^{(ul)} = \text{trace}\left[\left(\beta' R_{i,} \sum_{e}^{-1} R_i \beta + \sum_{x}^{-1}\right)^{-1}\right], \tag{112}$$

which is affected by $\beta$. Moreover, $\beta$ is also limited by the transmitting power constraints of the TDs. Since the $R_i$, $\Sigma_x$ and $\Sigma_e$ are available at the BBUs, the BBUs are able to optimize over $\beta$ in order to further minimize the MSE, and signal them to the TDs through the control/feedback links. The problem becomes $$\min_{\beta} \text{trace}\left[\left(\beta' R_{i,} \sum_{e}^{-1} + \sum_{x}^{-1}\right)^{-1}\right] \tag{113}$$

$$\text{s.t. } \beta_{k,j} \leq \sqrt{\frac{P_{max}^{(ul)}}{E[\|x_{k,j}\|^2]}}, \forall k, j,$$

which is a non-convex problem. Since the global optimal solution is hard to find, in the following, we use a gradient algorithm to find the optimal $\beta$ to minimize the MSE while satisfying the transmission power constraint of each TD.

Let $$A \triangleq \sum_{e}^{-\frac{1}{2}} R_i.$$

Note that $\beta$ is a diagonal matrix, and we have $$\nabla \beta(s, s) \triangleq \tag{114}$$

$$\frac{\partial MSE^{(ul)}}{\partial \beta(s, s)} = -\text{trace}[(\beta' A' A \beta + \Sigma_x)^{-2}(\psi_s' A' A \beta + \beta' A' A \psi_s)],$$

where $\psi_s$ is a matrix the same size with $\beta$. All elements in $\psi_s$ are zeros except that $\psi_s(s,s)=1$. We define $\nabla \beta$ to be the diagonal matrix the same size with $\beta$, and the i-th item in the diagonal is $\nabla \beta$ (i,i), i.e., $$\nabla \beta = \begin{pmatrix} \nabla \beta(1, 1) & 0 & \ldots & 0 \\ 0 & \nabla \beta(2, 2) & \ddots & 0 \\ \vdots & \ddots & \ddots & \vdots \\ 0 & \ldots & 0 & \nabla \beta(U, U) \end{pmatrix}, \tag{115}$$

where $$U = \sum_{i=1}^{N} F_i.$$

After we obtain the gradient for each $\beta(s,s)$, we update each $\beta(s,s)$ by line search and projection similar to the downlink gradient algorithm. Specifically, $$\beta^{new} = \beta - \delta_n \cdot \nabla \beta, \tag{116}$$

$$\beta^{proj} = \frac{\sqrt{P_{max}^{(ul)}}}{\max_s \left(\beta^{new}(s, s)\sqrt{\Sigma_X(s, s)}\right)} \beta^{new}, \tag{117}$$

where we choose $$\delta_n = \frac{1}{n}.$$

The algorithm is summarized in Algorithm 5.

---

Algorithm 5 Gradient Optimization Algorithm for Optimal Power Control in Uplink

1. Initialize
$$\beta(s, s) = \sqrt{\frac{P_{max}^{(ul)}}{\Sigma(s, s)}}, \forall s$$

2. loop:
3. Calculate $\nabla\beta$ according to (114) and (115)
4. Set n = 1
5. Update $\beta^{proj}$ according to (116) and (117)
6. if $MSE_{new} < MSE_{current}$
7. $\beta = \beta^{proj}$
8. else
9. n = n + 1, go to step 5
10. until $\beta$ converges or the maximum number of iterations is reached

---

In this algorithm, $\beta$ is updated in step 5 only when the MSE is reduced by the update. Therefore, the MSE is non-increasing in this algorithm. Since the MSE is lower bounded, the gradient algorithm is guaranteed to converge.

In the C-RAN setting, usually more than one RRHs are available in a specific area. Compared to the single RRH case, extra RRHs can provide additional information about the signal transmitted by the TDs, which can be utilized to improve the accuracy in detecting the transmitted symbols. In this following, we extend the LMMSE detector design and power control algorithm to the multiple RRH case.

In the multiple RRH case, we assume the M RRHs simultaneously observe the transmitted signal from the N TDs and forward the collected signal to the BBUs for processing. The BBUs collect the aggregation of the signal received by all the RRHs, which can be represented as $$Z = R\beta X + n, \quad (118)$$

where $$Z = \begin{pmatrix} Z_1 \\ Z_2 \\ \vdots \\ Z_M \end{pmatrix}, \quad (119)$$

$$R = \begin{pmatrix} R_1 \\ R_2 \\ \vdots \\ R_M \end{pmatrix}, \quad (120)$$

and $$n = \begin{pmatrix} n_1 \\ n_2 \\ \vdots \\ n_M \end{pmatrix}, \quad (121)$$

The LMMSE detector design in (110) and the gradient power control algorithm can be readily extended to the multiple RRH case by replacing $R_i$ by R and $n_i$ by n, respectively.

Figure 34:
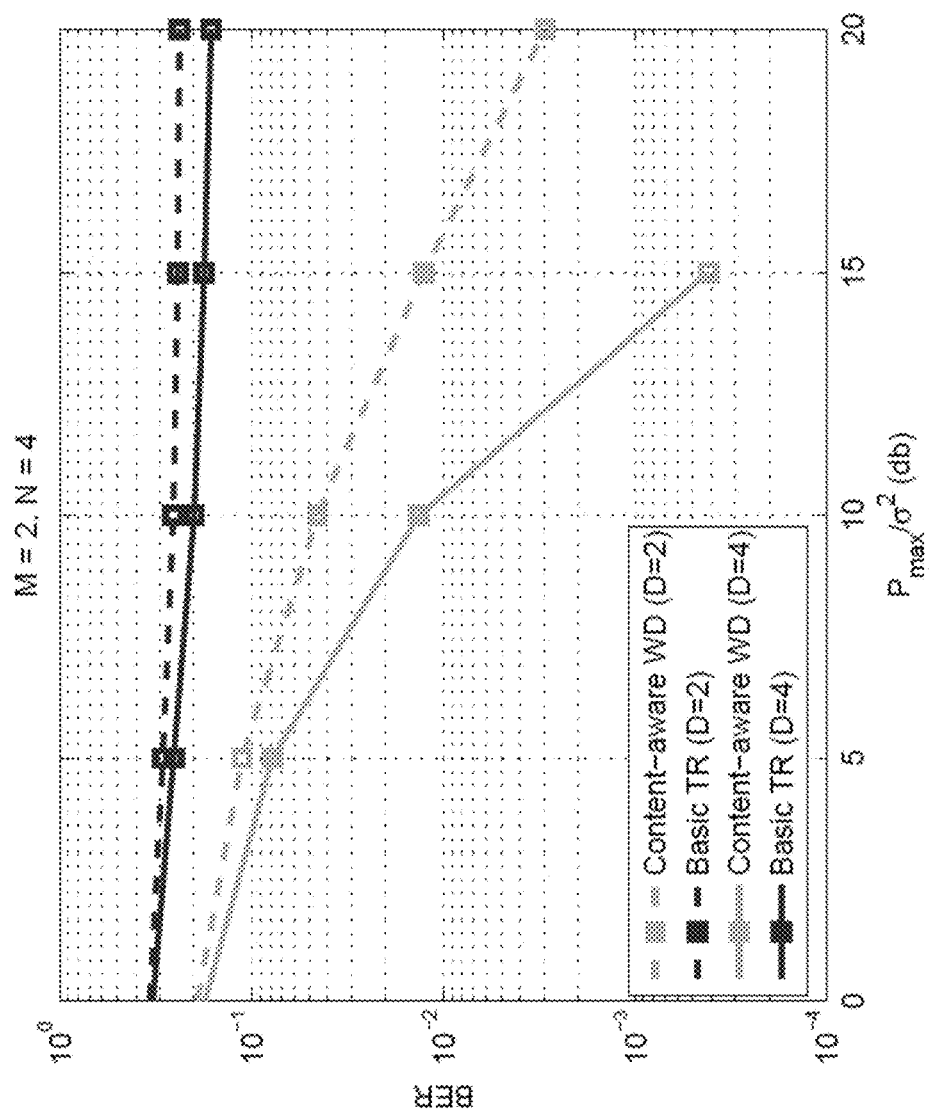
FIG. 34 is a graph showing the exemplary results of the BER performance of downlink transmission in a multiple RRH case.
Figure 35:
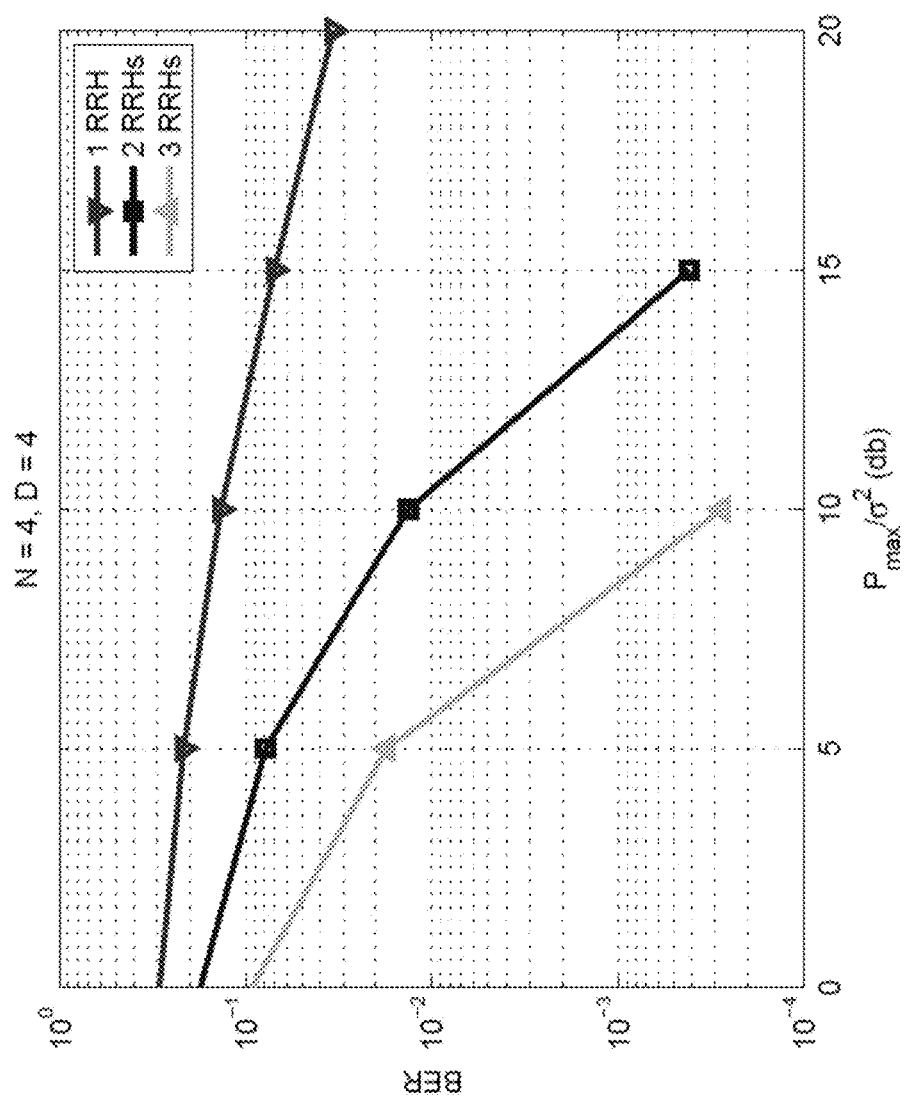
FIG. 35 is a graph showing the exemplary results of the improvement of BER by adding RRHs in downlink transmission in a time-reversal based cloud radio access network.

The TR system using the content-aware waveform design process described above can significantly reduce the BER of both downlink and uplink transmissions compared with using the basic TR waveforms. FIG. 34 is a graph that shows the downlink BER performance of the content-aware waveform design process for the multiple RRH settings. The BER of the basic TR waveform goes down very slowly with the increase of $P_{max}^{(dl)}/\sigma^2$. On the other hand, in the content-aware waveform design schemes, multiple RRHs work together to determine the transmitting power and waveforms and thus achieve good interference management. As a result, the extra RRHs not only provide more transmitting power, but also provide the additional degree of freedom that can be utilized to better focus the signal at the intended locations. As shown in FIG. 35, the average BER of the TDs decrease with more RRHs installed.

Figure 36:
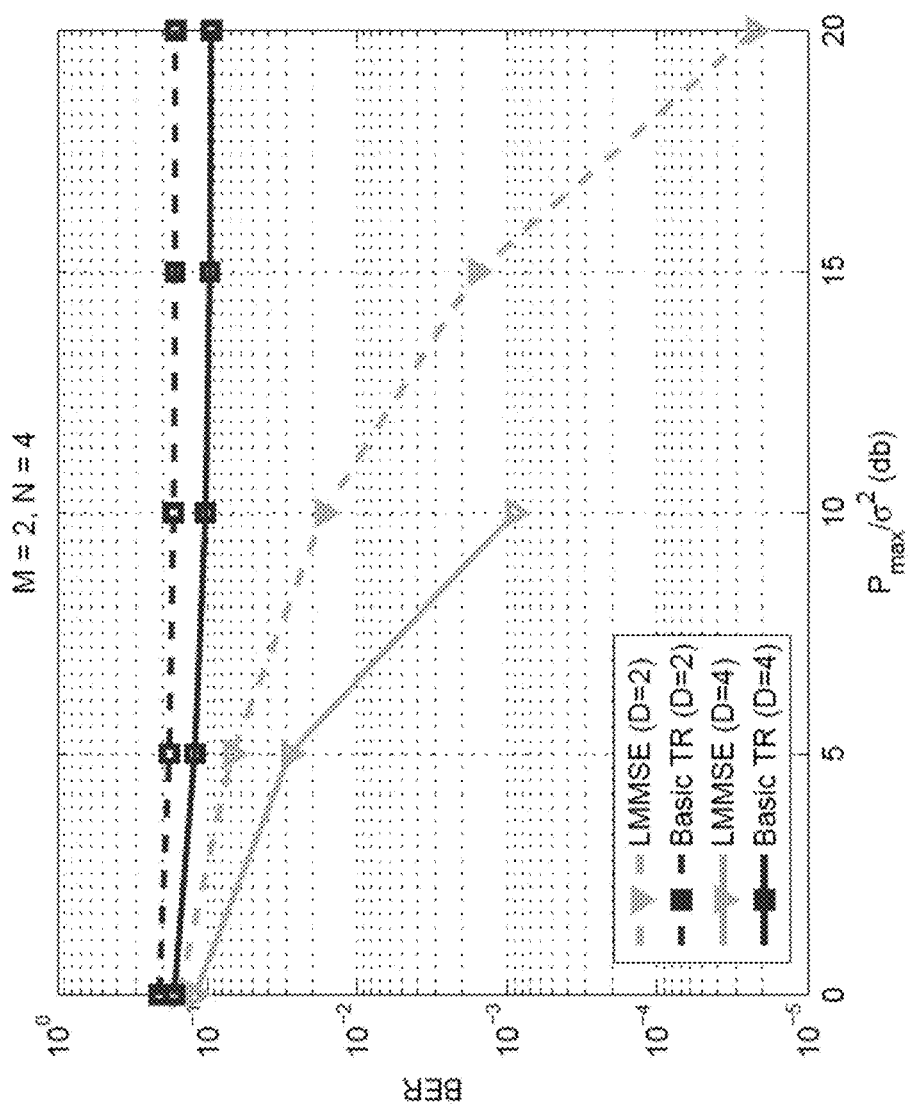
FIG. 36 is a graph showing the exemplary results of the BER performance of uplink transmission in a multiple-RRH case in a time-reversal based cloud radio access network.
Figure 37:
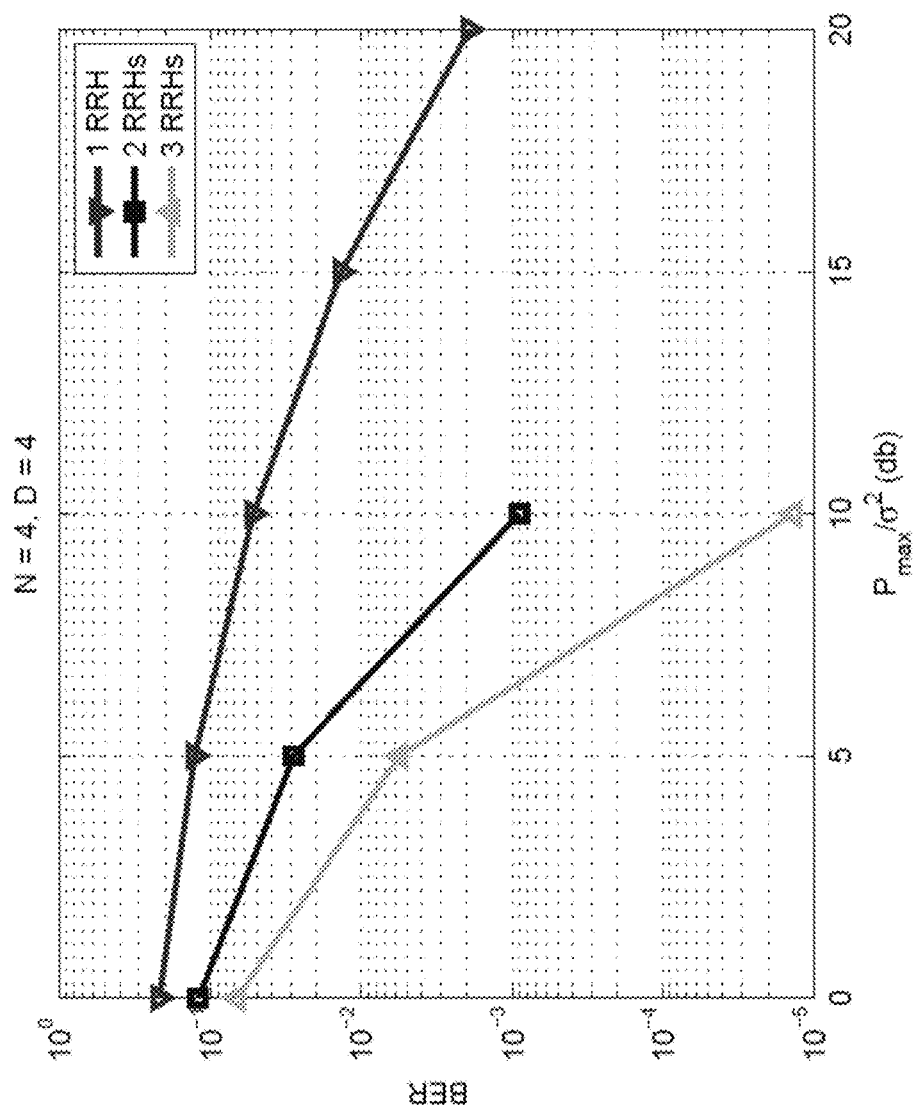
FIG. 37 is a graph showing the exemplary results of the improvement of BER by adding RRHs in uplink transmission in a time-reversal based cloud radio access network.

For the uplink case, we show the BER performance of the content-aware waveform design process in the multiple RRH setting. The curves labeled "LMMSE" represent the performances of the LMMSE estimator design, and the curves labeled "TR" represent the performances of the basic TR waveforms. As shown in FIG. 36, the BER of the basic TR waveform goes down very slowly as $P_{max}^{(ul)}/\sigma^2$ increases. On the other hand, by using the content-aware waveform design process, the observations from multiple RRHs are gathered and processed to detect the symbols transmitted by the TDs. Additional RRHs provide extra observations of the symbols transmitted by the TDs, which can be utilized to improve the accuracy of the detection. As shown in FIG. 37, the average BER of the TD decreases when more RRHs are installed.

TR CDMA Systems

The ability of the TR transmission scheme to separate multiple users can be boosted by adding CDMA-like code spreading and de-spreading to the TR wireless communication system. This will further improve the communication session's robustness. The basic idea is to add another transmitter/receiver layer to the "traditional" TR wireless communication system, resulting in two transmitter/receiver layers: the inner transceiver, which is the traditional (basic) TR scheme, and the outer transceiver layer, which applies CDMA-like spreading/de-spreading to the sent/received information signal.

This system can be a low-complexity alternative to multi-user waveform design as it uses pre-computed spreading sequences (similar to pre-computed signature waveforms) and it does not require on-the-fly inversion of large complex matrices.

Figure 38:
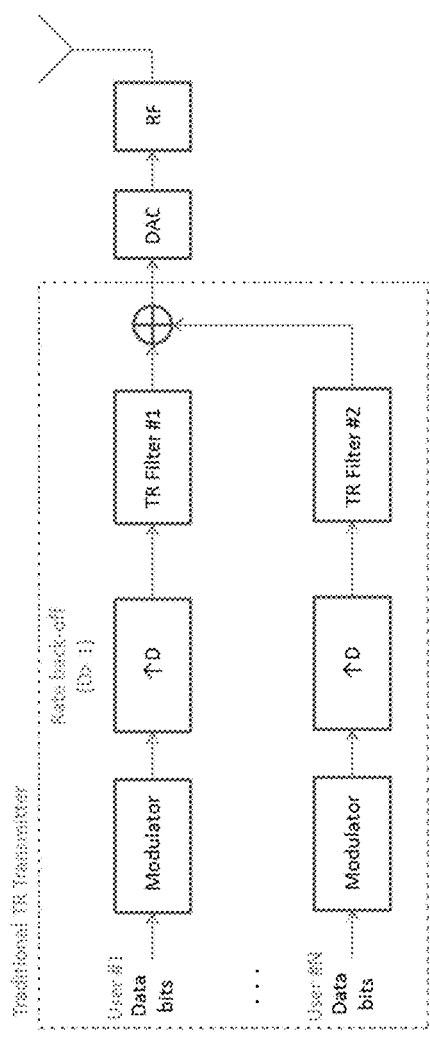
FIG. 38 is a diagram showing the structure of an exemplary TR transmitter.

FIG. 38 shows a block diagram of an exemplary TR wireless communication system operating in the down-link direction (from AP to TD). The incoming data bits for each user, or each distinct physical channel, are mapped to complex symbols by the modulator. Then, rate back-off is applied to these symbols by inserting a number of zero symbols between the information-carrying complex symbols. The resulting signal stream is filtered by the TR filter, whose impulse response is generated based on the wireless channel information between the transmitter (AP) and the receiver (TD). The output of the TR filters for each user is added together, and this aggregate signal is fed into the DAC. The analog signal generated by the DAC enters the RF stage of the transmitter, where it is up-converted to pass-band, amplified and sent out on the transmit antenna(s).

Figure 39A:
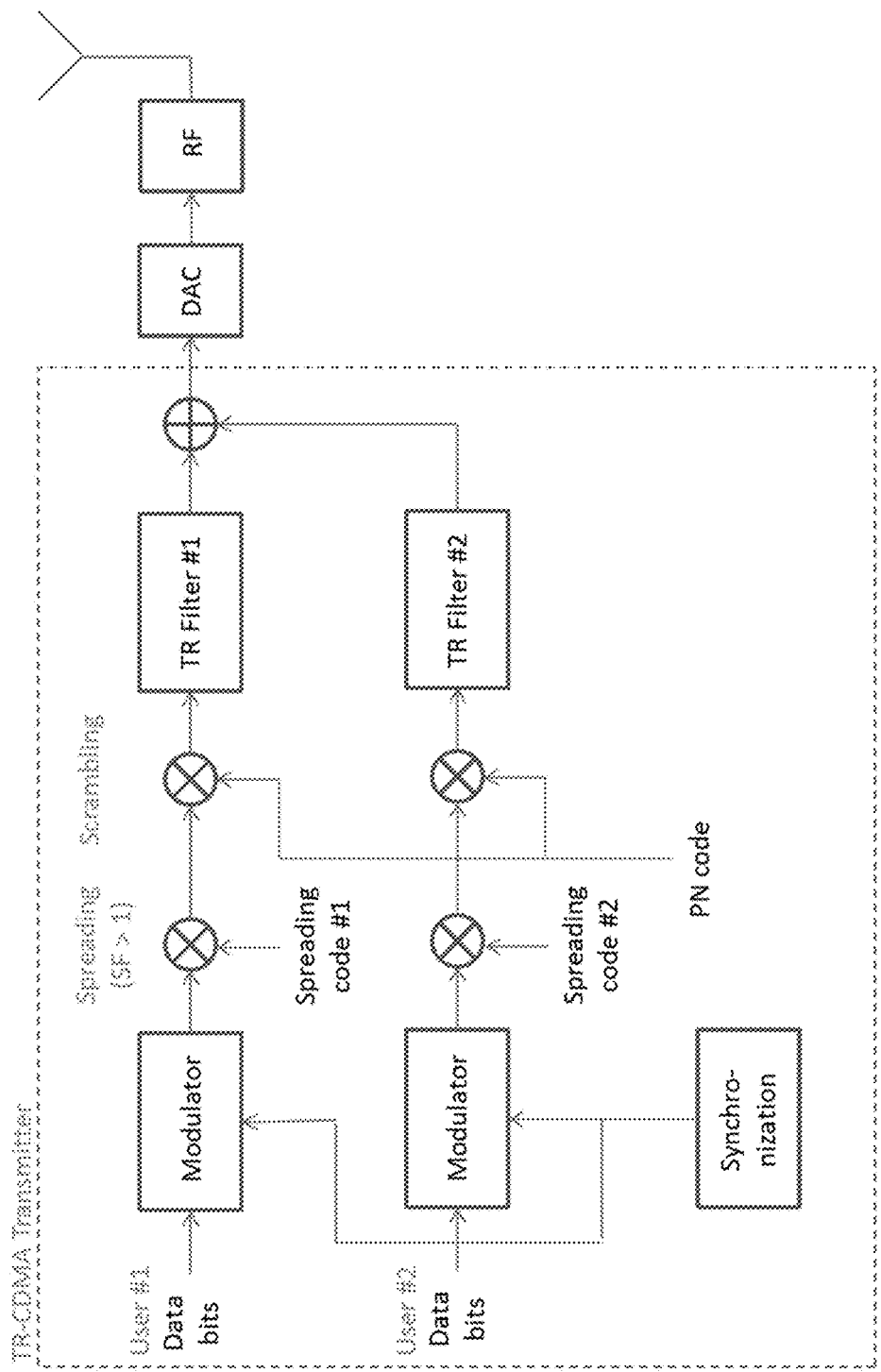
FIGS. 39A and 39B are diagrams showing the structures of exemplary TR-CDMA transmitters.
Figure 39B:
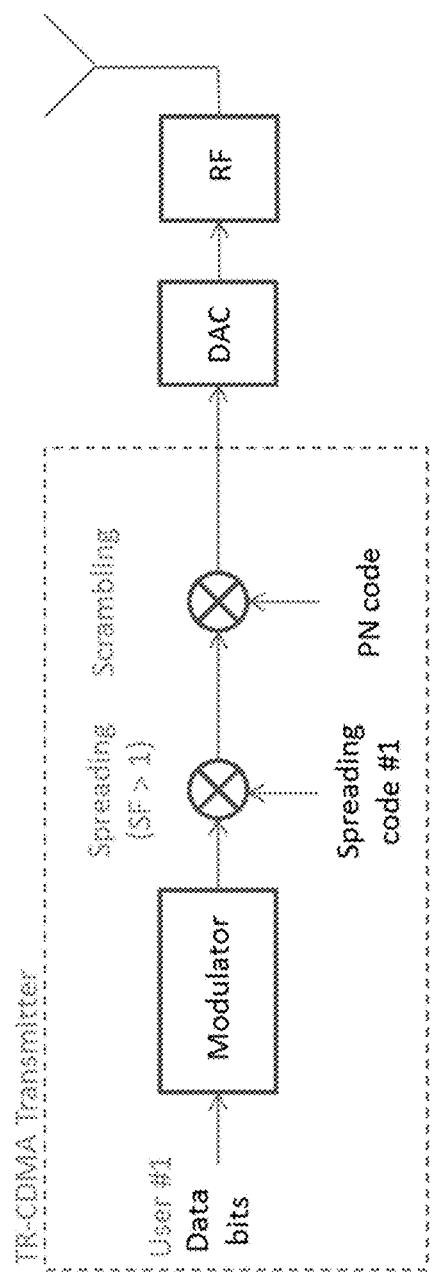

FIGS. 39A and 39B show block diagrams of TR-CDMA transmitters. The main difference between the TR transmitter and the TR-CDMA transmitter is that the rate back-off operation is replaced by CDMA code spreading operation. Each user, or each distinct physical channel, is assigned a unique spreading code. The spreading code includes a sequence of complex elementary code symbols, called chips. Each modulated complex symbol is multiplied by a number of code chips, producing an information signal that has the properties of both the spreading code and the modulated symbols. Since the chip rate is larger than the modulated symbol rate (the number of code chips per modulated symbol is given by the quantity called the spreading factor, SF), this results in "spreading" the modulated symbols in the frequency domain. This spread signal may optionally be scrambled with an AP-specific complex PN sequence (long PN code), but this component is not always necessary. The spread and possibly scrambled signal will be the input to the TR filter, and the rest of the transmission will take place similarly to the "traditional" TR transmission scenario.

Figure 40A:
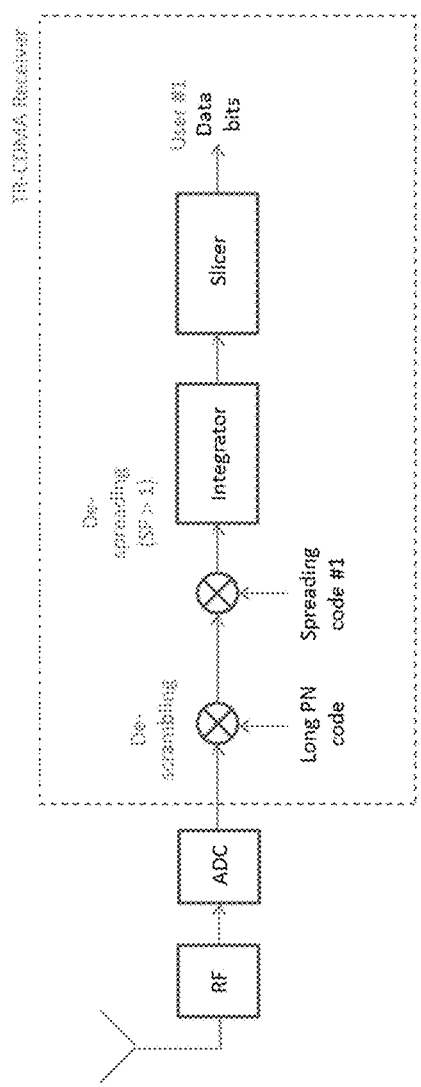
FIGS. 40A and 40B are diagrams showing the structures of exemplary TR-CDMA receivers.
Figure 40B:
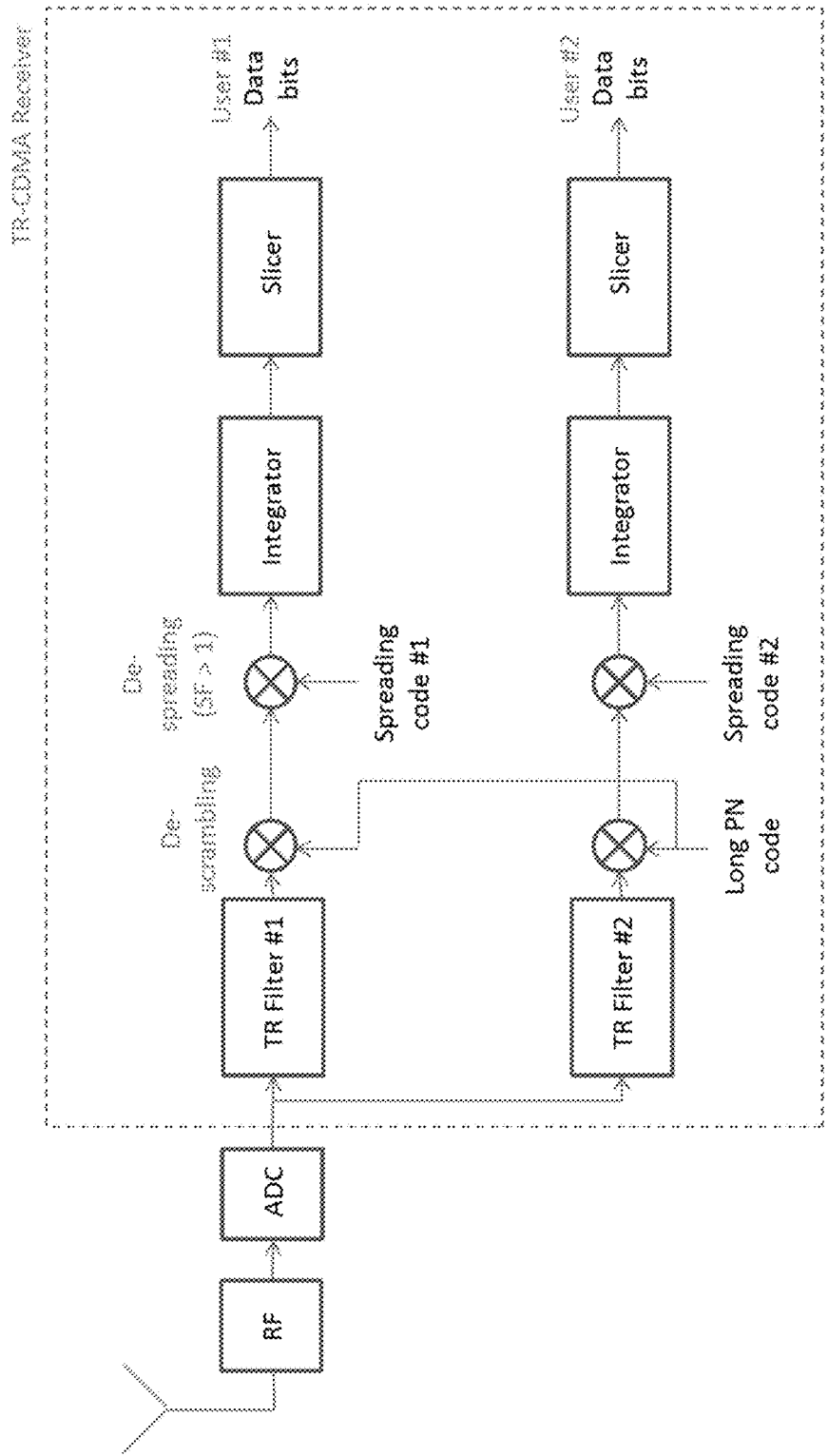

FIGS. 40A and 40B depict the architectures of the TR-CDMA receivers. The received electromagnetic waves generate current variations in the receiver's RF stage, which are down-converted to base-band. The analog signal variations are converted to a sequence of digital samples by the ADC. The received digital signal is then (optionally) de-scrambled with the complex conjugate of the PN sequence applied the transmitter side. Then, the de-spreading operation follows, which consist of a) multiplying the received samples by the complex conjugate of the appropriate code chips applied at the transmitter, and b) adding/integrating the resulting samples that are associated with the same modulated data symbol. The multiplication of the received signal with the spreading code and the addition/integration operation essentially performs a cross-correlation calculation by projecting the received signal to the one-dimensional vector space spanned by the user's code vector. Finally, the slicer/demodulator reconstructs the originally sent data bits from the received modulated symbol sequence. This operation maps the projected received signal onto one of the possible constellation points, mapping the received signal to digital bits.

The uplink version of the TR-CDMA system can be observed in FIGS. 39B and 40B. The idea is similar, except that the TR-specific functionality is implemented in the receiver, and not in the transmitter. Thus, most of the system complexity is moved to the Base Station/Access Point, allowing the Mobile/Terminal Device/Client to have a simple HW and SW implementation.

Figure 41:
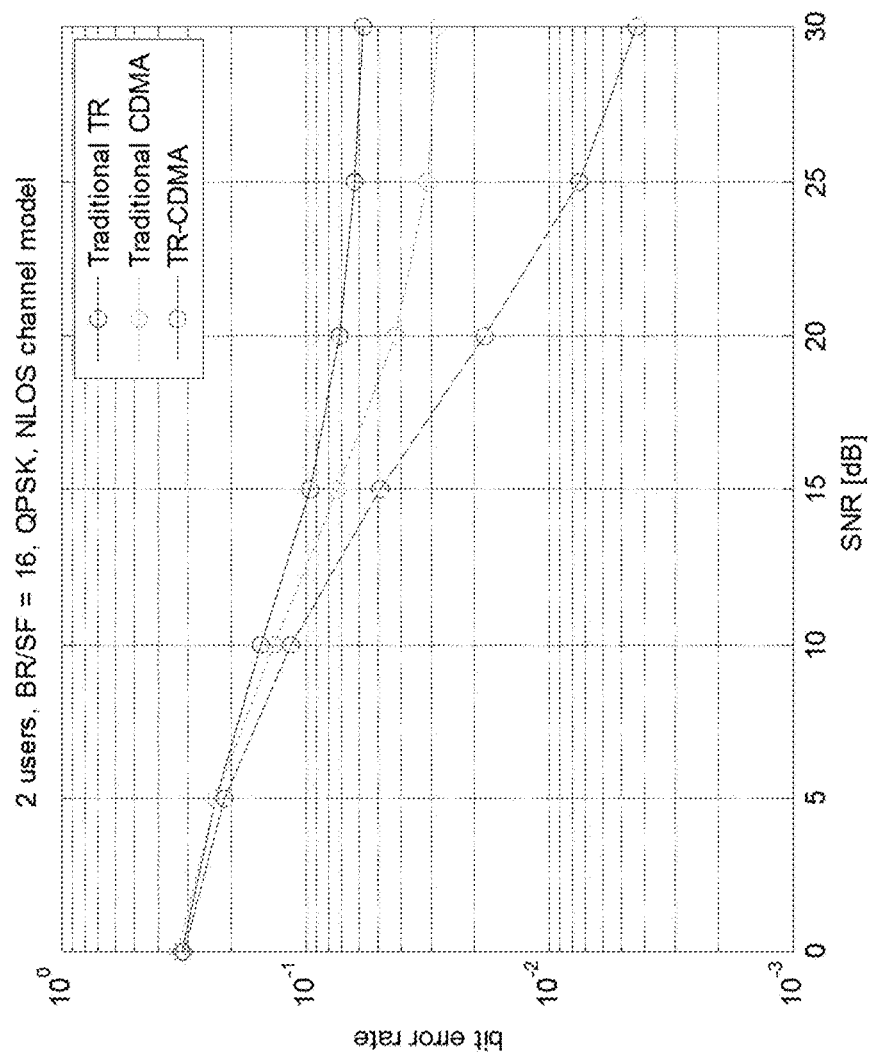
FIG. 41 is a graph showing a performance comparison between TR, CDMA, and TR-CDMA systems.

As shown in FIG. 41, the proposed TR-CDMA system can outperform both traditional CDMA and traditional TR systems in certain circumstances. The figure shows the bit error rate (BER) vs. signal-to-noise ratio (SNR) for a 2-user scenario, the first user being the victim of interference from the second user (and vice versa). QPSK modulation was used with a rate backoff/spreading factor of 16, the system bandwidth was 150 MHz, and the channel had exponential power-delay-profile with RMS delay spread of 10 ns. Typically, traditional CDMA transmission would have worse performance than TR-CDMA in case high-delay spread channels, as it fails to take advantage of the TR focusing effect. On the other hand, traditional TR transmission would have worse performance than TR-CDMA in line-of-sight transmission scenarios or when the correlation between different users' channels is high, so the wireless channel by itself is not able to separate the users successfully.

Figure 42A:
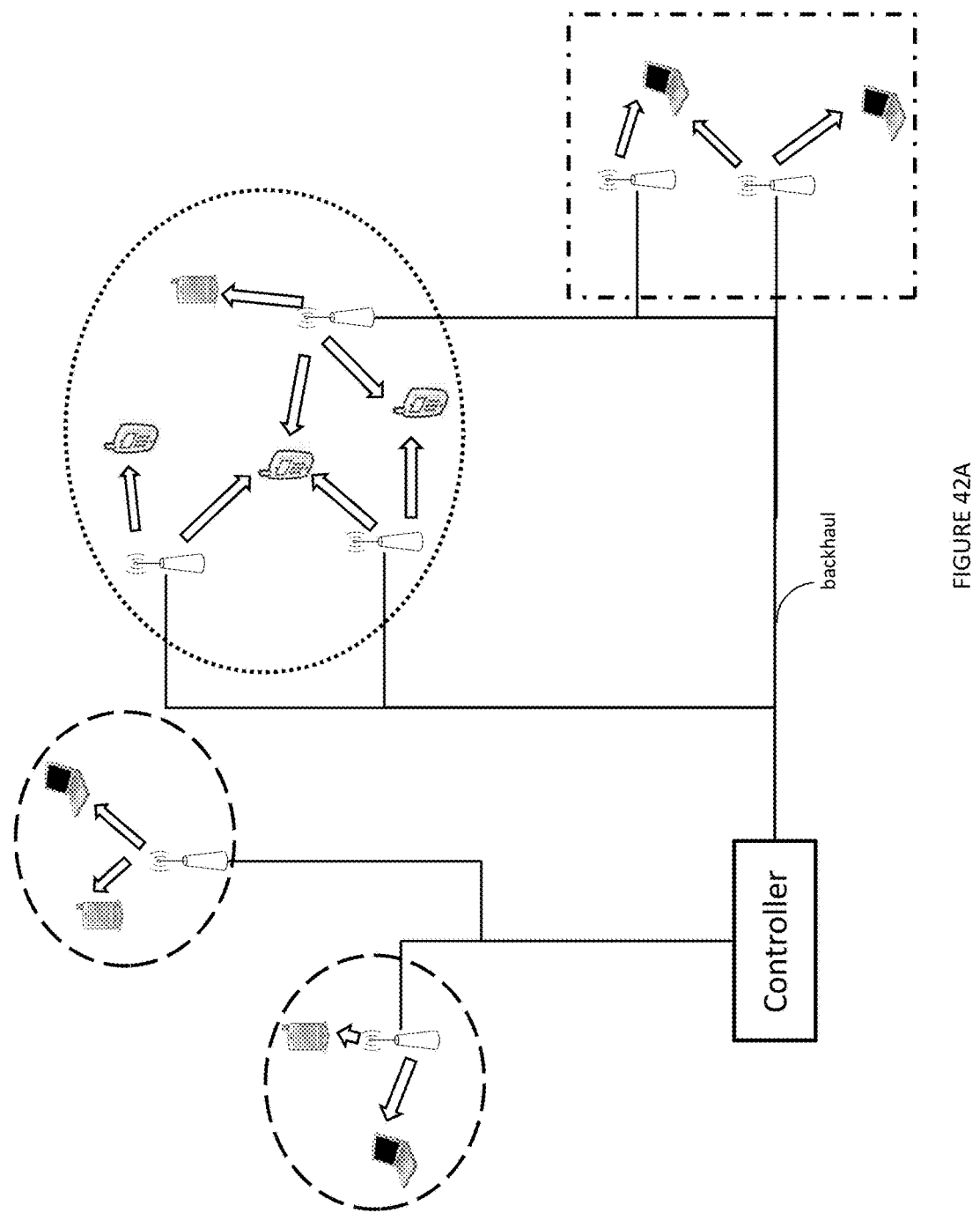
FIG. 42A is a diagram showing an exemplary distributed antenna system (DAS).

TR-Based Distributed Antenna System for Downlink Data Transmission and Broadcasting A distributed antenna system (DAS) is a network of spatially separated antenna nodes connected to a common source via a transport medium that provides wireless service within a geographic area or structure. Referring to FIG. 42A, in an exemplary DAS downlink system, the antennas are distributed in a wide range to provide wireless coverage to the users in this area. Each user is served by one or more antenna nodes. Each antenna node can be either serving some users or idle. While this system has many potential advantages such as high energy and spectrum efficiency, the system also has several problems.

The first problem is the system capacity. Since the limited wireless spectrum is shared by all the users through division in time and/or the frequency domain, the capacity of the system is limited. The throughput of each single user may degrade seriously if the number of users in this system grows significantly;

The second problem is the flexibility. The DAS is usually carefully planned to suit the site, i.e., a particular building. The planning usually involves selecting the locations of the antenna nodes, assigning spectrum as well as designing the beam-forming. However, the planning is inflexible such that the entire system may need to be re-planned if just small portion of the nodes are changed.

The third problem is the complexity. In a traditional DAS, there are several optimization mechanisms that require real-time computing, such as power allocation and beam-forming. These mechanisms are sensitive to the number of users. The central controller might be unable to complete the real-time optimization if the users are dense in the system.

The last problem is the overhead. In the traditional DAS, several optimization mechanisms are handled in the central controller which requires channel and/or distance information of the user. However, due to the nature of the traditional wireless communication, this kind of information is usually obtained at the user side rather than the controller side therefore some communication resource is reserved to transmit the information back to the controller. However, this overhead may become a dominant part of resource use as the number of users grows.

The TR wireless communication technology has the nature of spatial and temporal focusing effect and low complexity such that it is an ideal candidate to replace the traditional air-interfaces to promote the system performance. The following describes how the TR technology is applied to the DAS for the purposes of both downlink data transmission and downlink broadcasting.

In TR-DAS for downlink data transmission, there are three working phases: the channel probing (CP) phase, the user-antenna association (UAA) phase, and the data transmission (DT) phase.

The CP phase enables the DAS to gain knowledge of the wireless channel between the antennas and users. In the beginning of the CP phase, the users transmit the CP signal to the antennas. Upon receiving the CP signal, the controller uses the received CP signals to estimate the channel impulse responses (CIR) of the channels from each user to all its reachable antennas. Referring to FIG. 42A, in some examples, all users take turns to broadcast the CP signal. The central controller takes the signal received by each antenna to estimate the CIR from the user to the antenna. Let the users be indexed from 1 to $N_u$ and the antennas be indexed from 1 to $N_a$. Let $h_{ij}$ denote the CIR from the j-th user to the i-th antenna and $f_{ij}$ denote the CIR from the i-th antenna to the j-th user. Since the user and the antenna work in the same band, we have $$h_{ij}[k]=f_{ij}[k], 1 \le k \le L \tag{122}$$

The UAA phase associates each user to one or more serving antennas that would be responsible for transmitting the intended data to it. In the TR-DAS of FIG. 42A, let $M_T$ be the maximum number of antennas that each single user is allowed to associate with. The central controller would associate each single user to no more than $M_T$ antennas that obtain the strongest CIRs from the user, indicating that the channels from the user to the selected antennas are good. By the channel reciprocity, the channels from those selected antennas to the user are also good. Let the indexes of all the antennas be denoted as I and the indexes of the antennas associated with the j-th user be denoted as $IA_j$, then $IA_j$ can be represented by $$IA_j \subset I$$

$$|IA_j| \le M_T$$

$$\forall t \notin IA_j, \forall s \in IA_j, \|h_{tj}\|_2 \le \|h_{sj}\|_2 \tag{123}$$

Upon completing the association, the DAS central controller would use $h_{ij}$ to design the corresponding signature waveforms for the user indexed j from all the associating antennas. Let $g_{ij}$ denote the signature waveform from the i-th antenna to the j-th user. The design of $g_{ij}$ can be of various forms. For example, it can be the basic time-reversed version of the CIR as $$g_{ij}[k]=h_{ij}^*[L-k] \tag{124}$$

where L is the channel length.

The DT phase follows the UAA phase. In the DT phase, each antenna transmits the corresponding sequences to the users that are associated with it. Denote the sequence for the j-th user as $X_j$, let $X_j^u$ denote the upsampled version of $X_j$, which is expressed as $$X_j^u[k] = \begin{cases} X_j\left[\dfrac{k}{D_j}\right], & \text{if } k \bmod D_j = 0 \\ 0, & \text{if } k \bmod D_j \ne 0 \end{cases} \tag{125}$$

where $D_j$ is the backoff factor of user j.

Then the signal transmitted by the i-th antenna is the combination of all the $X_j^u$'s embedded with the signatures. For example, if there are $N_i$ users associated with the i-th antenna, denote their indices by $IU_{i,1}, IU_{i,2}, \ldots, IU_{i,M_i}$ and the set $IU_i = \{IU_{i,1}, IU_{i,2}, \ldots, IU_{i,M_i}\}$. Then the signal transmitted by the i-th antenna can be expressed as $$T_i = \Sigma_{s \in IU_i} X_s^u * g_{is} \tag{126}$$

On the user side, each user would receive the combination of the intended sequence and the sequences for other users transmitted by the associated antennas. For the user indexed j, denote the indices of the associated antennas by $E_{1,j}, E_{2,j}, \ldots, E_{k,j}$ and the set $IA_j = \{E_{1,j}, E_{2,j}, \ldots, E_{k,j}\}$. The received signal can be expressed by $$R_j = \sum_{t \in IA_j} T_t * h_{tj} = \sum_{t \in IA_j} \sum_{s \in U_t} X_s^u * g_{ts} * h_{tj} = \tag{127}$$

-continued
$$\sum_{t \in IA_j} X_j^u * g_{tj} * h_{tj} + \sum_{t \in IA_j} \sum_{s \in U_t, s \ne j} X_s^u * g_{ts} * h_{tj}$$

The first term $\Sigma_{t \in IA_j} X_j^u * g_{tj} * h_{tj}$ is the useful signal for user j while the second term $\Sigma_{t \in IA_j} \Sigma_{s \in U_t, s \ne j} X_s^u * g_{ts} * h_{tj}$ is considered as the inter-user interference (IUI). Due to the spatial focusing effect of TR communication, the interference is suppressed and is weak compared with the useful signal.

Due to the temporal focusing effect, as shown in FIG. 4A, $g_{tj} * h_{tj}[k] \approx \gamma_{tj} \cdot \delta[k-L+1]$ if L is big enough where $\gamma_{tj}$ is the focusing gain of the channel from the t-th antenna and the j-th user. In other words, $g_{tj} * h_{tj}[k]$ is approximately a $\delta$-function. Therefore, the received useful signal $\Sigma_{t \in IA_j} X_j^u * g_{tj} * h_{tj} \approx (\Sigma_{t \in IA_j} \gamma_{tj}) \cdot X_j^u$ is approximately a scaled version of $X_j^u$ with a minor inter-symbol interference (ISI). It means the intended sequence can be obtained at the receiver by directly sampling the received signal without complex decoding or channel equalization.

An advantage of the TR-DAS of FIG. 42A is that it is easy to change the structure of the system. If new antenna nodes need to be added to the system, we only need to plug it into the connected antenna network and register it with the central controller. No changes on the other antennas nodes are needed. Moreover, this process is transparent to the users. No changes are needed at the user side. If some antenna nodes need to be removed from the system, they can just cancel their registrations with the central controller. It is not necessary to make changes at the other antenna nodes or the users.

The TR-DAS is of low complexity if it uses the basic TR version waveform. The waveform for each user is just the time-reversed version of the CIR, so no complex waveform design is needed. Moreover, since the signal transmitted by the antenna node i is $T_i = \Sigma_{s \in IU_i} X_s^u * g_{is}$, and the users associated with stronger channels automatically get more power, whereas the uses associated with weaker channels get less power. Other types of waveform can also be used to optimize the performance at the cost of increased complexity.

The TR-DAS tracks the users automatically. If users are far away from a specific antenna node I, the received CP signal is weak and thus the signal transmitted by the specific antenna is minimal. On the other hand, the antenna nodes near the users will be using more transmitting power because of the stronger CP signal received. Therefore, the TR-DAS automatically tracks the users by serving them using nearby antennas while turning down the far-away antennas.

Figure 42B:
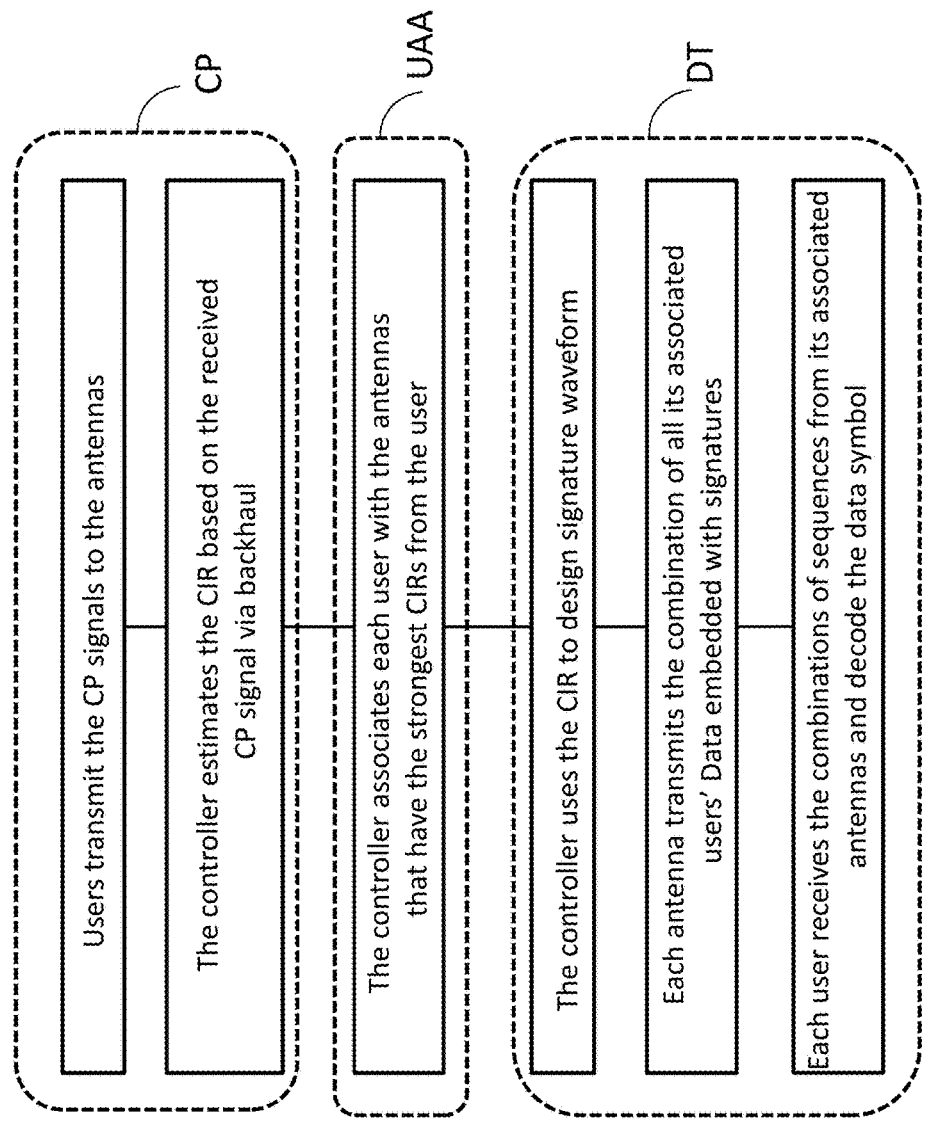
FIGS. 42B and 42C are flow diagrams of processes used in the DAS.
Figure 42C:
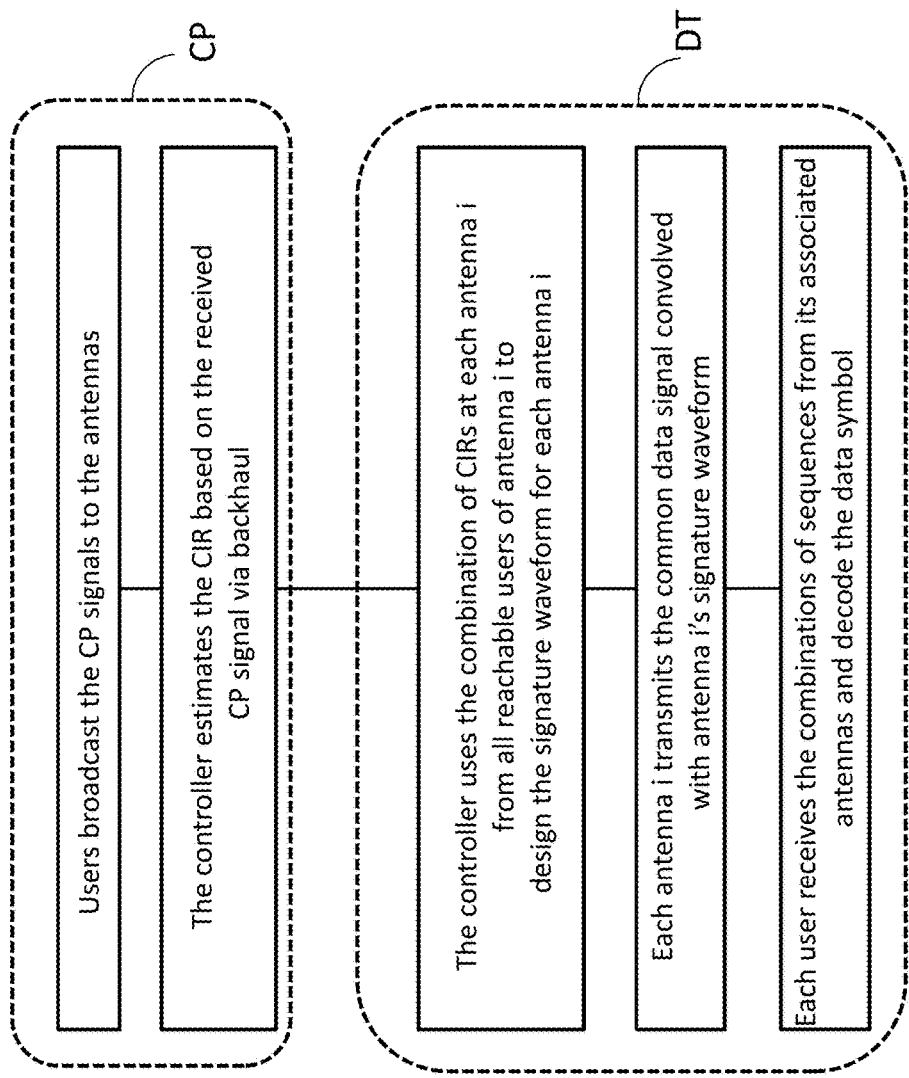
Figure 42D:
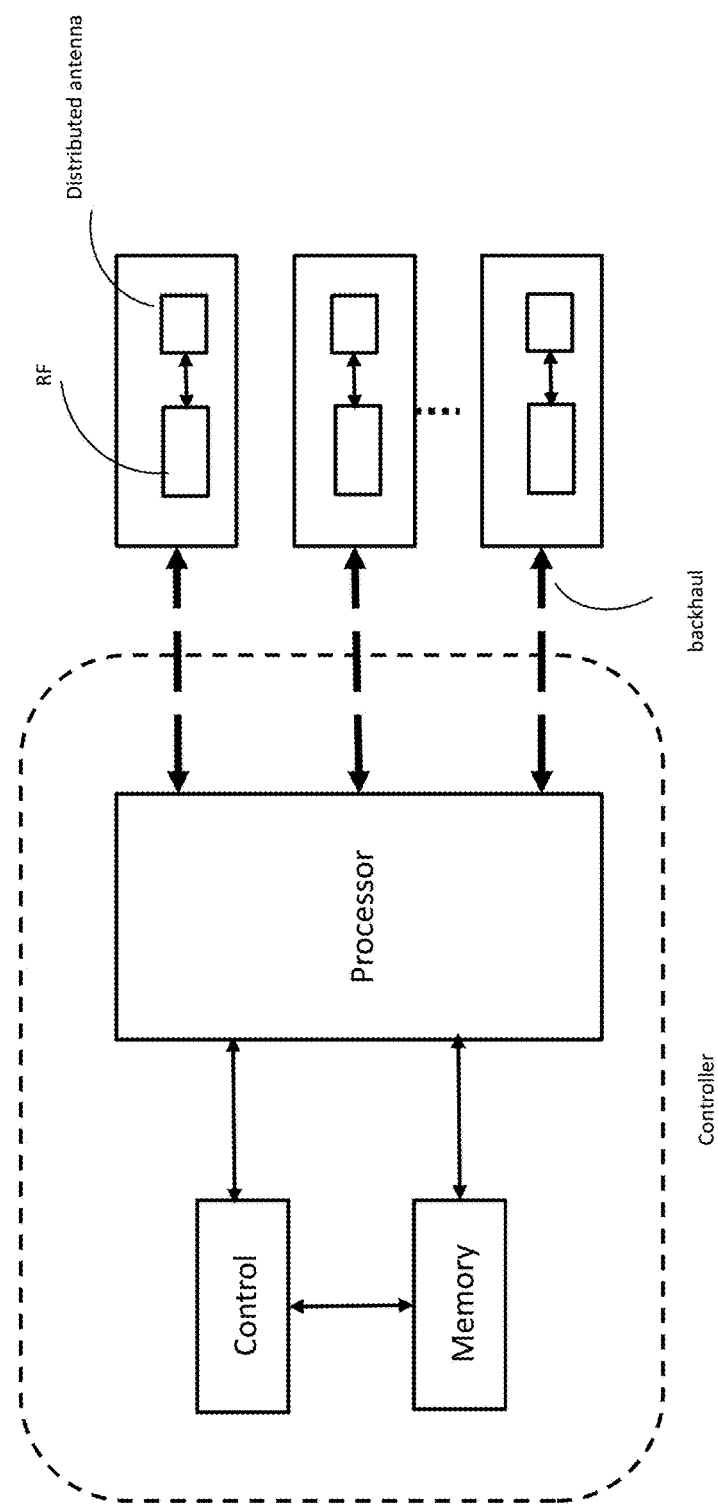
FIG. 42D is a diagram of controller and distributed antennas.

In a TR-DAS for broadcasting, there are two working phases: the CP phase and the DT phase. The CP phase enables each antenna node to gain knowledge about the channel to its reachable users. There are several ways to do this. For example, as shown in FIG. 42A, different users can take turns to broadcast the CP signal. Another method is to let different users simultaneously broadcast an impulse signal to all the antennas, as shown in FIG. 42B. The signal received by the i-th antenna is the combination of the CIRs to all the reachable users, which can be expressed as $$cp_i = \sum_{j=1}^{N_U} h_{ij} \tag{128}$$

where $h_{ij}$ is the CIR from the j-th user to the i-th antenna.

The DT phase follows the CP phase. In the broadcasting application, all the users have identical intended data. Therefore, the antennas do not distinguish the users but just broadcast the same signal. The signal broadcasted by the i-th antenna can be expressed by $$s_i = \sum_{j=1}^{N_U} X^u * g_{ij},$$

and $$X^u[k] = \begin{cases} X\left[\dfrac{k}{D_j}\right], & \text{if } k \bmod D = 0 \\ 0, & \text{if } k \bmod D \neq 0 \end{cases} \quad (129)$$

where $g_{ij}$ is the designed waveform from antenna i to user j. For example, it can be simply the basic time-reversed version of the CIR as $g_{ij}[k]=h_{ij}*[L-k]$. In this case, the signal broadcasted by the i-th antenna can be expressed by $$s_i = \sum_{j=1}^{N_U} X^u * g_{ij} = X^u * g_i \quad (130)$$

where $g_i[k]=cp_i*[L-1-k]$. It can be seen that the signal transmitted by the i-th antenna is the common sequence for all users embedded with the conjugate time-reversed version of the signal $cp_i$ received in the CP phase. Due to the broadcasting nature, it is possible to control the transmit power of user j by adding a weight factor on $g_{ij}$. When a user moves and thus the CIR changes, the user will need to re-transmit the CP signal and the controller can update the signature waveform using the newly received CP signal.

Although the antennas broadcast the undistinguished signal for all users, due to the spatial focusing effect of the time-reversal communication, the right signature will be amplified at the right user, which will help to amplify the intended sequence. The $s_t$ received by the t-th user is expressed by $$r_t = s_i * h_{it} = \sum_{j=1}^{N_U} X^u * g_{ij} * h_{ij} = X * g_{it} * h_{it} + \sum_{j=1,j\neq t}^{N_U} X^u * g_{ij} * h_{ij} \quad (131)$$

Figure 44:
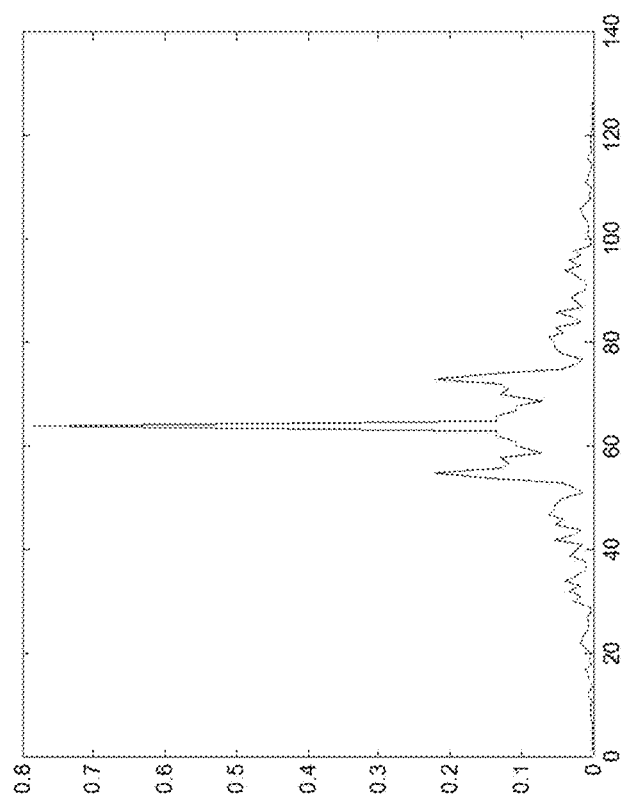
FIG. 44 is a graph showing an exemplary realization of $g_{tj}*h_{tj}[k]$.

The signal from all the antennas received by the t-th user is $$R_t = \sum_{i=1}^{M} s_i * h_{it} = \sum_{i=1}^{M} X^u * g_{it} * h_{it} + \sum_{i=1}^{M} \sum_{j=1,j\neq t}^{N_U} X^u * g_{ij} * h_{ij} \quad (132)$$

where the first term is the useful signal and the second term is the inter-user interference (IUI). M is the number of antennas. Due to the spatial focusing effect, the IUI is suppressed. Moreover, due to the time-focusing effect, $g_{it}*h_{it}[k]\sqrt{\gamma_{it}}\cdot\delta[k-L+1]$ if L is big enough where $\gamma_{it}$ is the focusing gain of the channel from the i-th antenna and the t-th user, as shown in FIG. 44. In other words, $g_{it}*h_{it}[k]$ is approximately a δ-function. Therefore, the received useful signal $\Sigma_{t\in A_j} X^u * g_{it} * h_{it} \approx (\Sigma_i \gamma_{it})\cdot X^u$ is approximately a scaled version of $X^u$ with minor inter-symbol interference (ISI). It means the intended sequence X can be obtained at the receiver by directly sampling the received signal without complex decoding or channel equalization.

An advantage of the TR-DAS for broadcasting is that it is easy to change the structure of the system. If new antenna nodes need to be added to the system, we only need to plug them into the connected antenna network and register them with the central controller. No changes on the other antennas nodes are needed. Moreover, this process is transparent to the users. No changes are needed at the user side. If some antenna nodes need to be removed from the system, they can just cancel their registrations with the central controller. No changes on the other antenna nodes or the users are needed.

The TR-DAS for broadcast can have a low complexity if it uses the basic TR version waveform. The waveform for each user is just the time-reversed version of the CIR, thus no complex waveform design is needed.

The TR-DAS automatically tracks users. If users are far away from a specific antenna node i, the received CP signal is weak and thus the signal transmitted by the specific antenna is minimal. On the other hand, the antenna nodes near the users will use more transmitting power because of the stronger CP signal received. Therefore, the system automatically tracks the users by serving them with nearby antennas while turning down the far-away antennas.

Figure 45A:
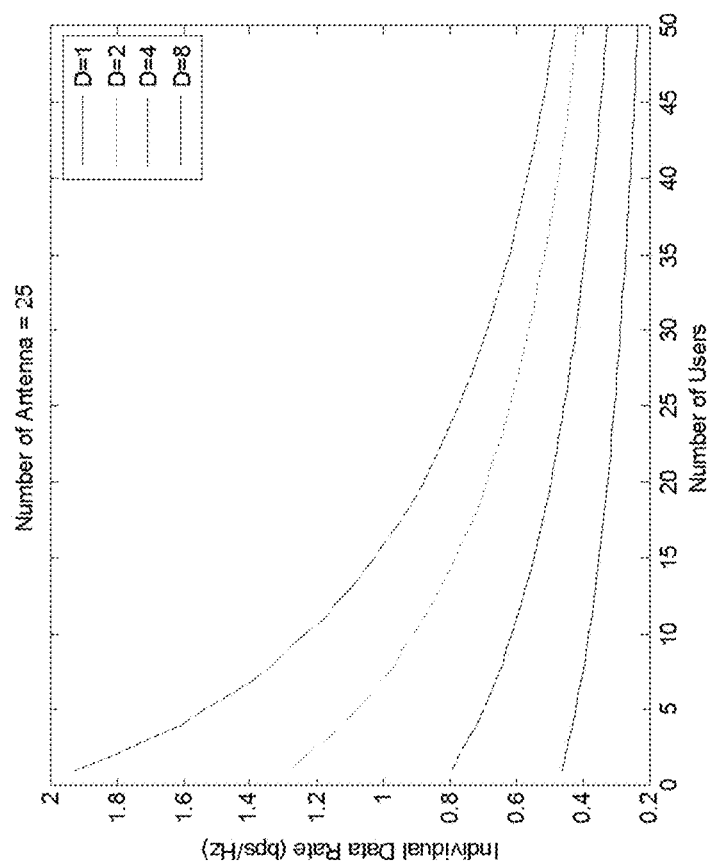
FIGS. 45A and 45B are graphs showing the exemplary results of the individual data rate and the maximum sum data rate supported by TR-DAS for broadcasting.
Figure 45B:
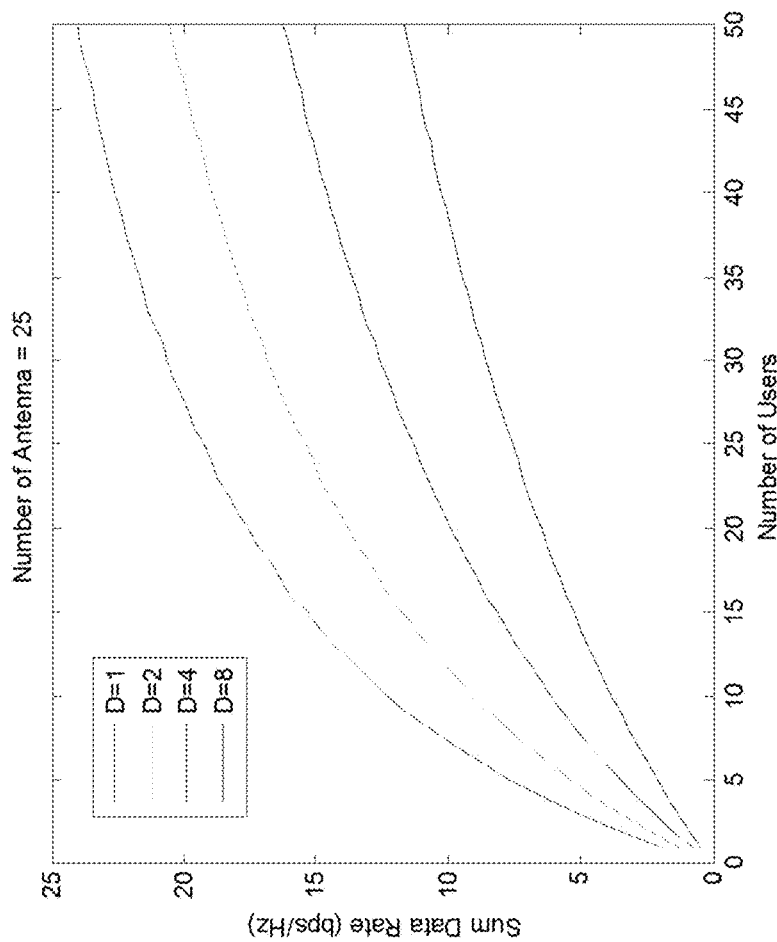

The effectiveness of the TR-DAS for downlink data transmission and the TR-DAS for broadcasting is shown by numerical results. One instance is shown that an area of size 10*10 is covered by 25 distributed antenna nodes. While we vary the number of users in the system, it is shown in FIG. 45A that the system is able to support a lot of users while each of them has a reasonable data rate. On the other hand, if the total number of users in the system is low, each of them could have a relatively high data rate. In FIG. 45B, it is shown that the total data rate of the system increases with the number of users.

The base stations, base band units, access points, remote radio heads, terminal devices, or other modules that process data as described above can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java, Perl, Python), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims. For example, the devices that communicate with the base station can be different from those shown in the figures, and can include many more objects. In the time-reversal wireless communication system, a transmitter and a receiver need to obtain information about the overall system, e.g., information about the communication channel and information about time synchronization. In some implementations, such information is obtained in a channel probing (CP) phase and a data transmission (DT) phase of a time-reversal communication system. In the channel probing phase, the transmitter acquires channel information to realize the focusing effects, while in the data transmission phase, the receiver acquires timing information to synchronize and sample relevant signals. The process of obtaining channel information in the channel probing phase and obtaining synchronization in the data transmission phase is referred to as time-reversal handshaking. Techniques for time-reversal handshaking is described in U.S. Pat. No. 9,313,020, titled "Handshaking Protocol For Time-Reversal System," the contents of which are incorporated by reference in their entirety.

What is claimed is:

1. A time reversal division multiple access (TRDMA) communication system comprising:
   a memory communicatively coupled to at least one processor; and
   the at least one processor configured to:
      receive a first signal that comprises a preamble sent at a first sampling rate with a first modulation through a channel and a data frame sent at a second sampling rate with a second modulation through the channel, wherein the preamble comprises a received code sequence, and the data frame comprises a plurality of data symbols,
      compute a second signal that represents an estimate of an equivalent channel response using at least one of a known code sequence and the received first signal, wherein the received code sequence in the preamble sent at the first sampling rate with the first modulation through the channel is based on the known code sequence,
      down-sample the second signal at the plurality of candidate timing offsets to generate a plurality of sub-signals,
      compute signal-to-interference-plus-noise ratios at a plurality of candidate timing offsets based on the plurality of sub-signals,
      determine a largest computed signal-to-interference-plus-noise ratio among the signal-to-interference-plus-noise ratios computed at the plurality of candidate timing offsets,
      determine a symbol timing based on a particular timing offset associated with the largest computed signal-to-interference-plus-noise ratio, and
      determine the data symbols in the data frame sent at the second sampling rate with the second modulation through the channel based on the determined symbol timing,
   wherein the second signal to comprise N samples,
   wherein the second signal is down-sampled by a factor of R×D, and
   wherein R and D are integers not smaller than 1.

2. The communication system of claim 1 wherein the known code sequence comprises a pseudo-random sequence.

3. The communication system of claim 1:
   wherein at least part of the preamble in the received first signal is generated by up-sampling a second preamble, and
   wherein at least part of the plurality of data symbols in the data frame in the received first signal is generated by up-sampling a plurality of second data symbols.

4. The communication system of claim 3:
   wherein the second preamble is up-sampled by a factor of R, with R being an integer not smaller than 1, and wherein the second data symbols are up-sampled by a factor of R×D, with D being another integer not smaller than 1.

5. The communication system of claim 1:
wherein each of the sub-signals comprises approximately N/(R×D) samples, and
wherein the plurality of sub-signals generated by down-sampling the second signal at the plurality of candidate timing offsets comprise R×D sub-signals.

6. The communication system of claim 1:
wherein the computing of the signal-to-interference-plus-noise ratios for each of the plurality of sub-signals comprises, for each sub-signal,
computing a signal power for each sample in the sub-signal,
identifying a sample having a maximum signal power among all samples in the sub-signal,
determining an inter-symbol interference power of the sub-signal, and
determining the signal-to-interference-plus-noise ratio based on the maximum signal power, the inter-symbol interference power, and an estimated noise power.

7. The communication system of claim 6 wherein the at least one processor is configured to:
determine a timing offset ($i_{opt}$) associated with a particular sub-signal that has the largest computed signal-to-interference-plus-noise ratio among the plurality of sub-signals,
determine a second offset ($sync_{i_{opt}}$) associated with a particular sample with largest signal power within the particular sub-signal, and
determine the symbol timing (sync) based on the timing offset and the second offset according to sync=$sync_{i_{opt}}$×R×D+$i_{opt}$.

8. The communication system of claim 1:
wherein the second signal is computed by solving a least-square estimation using the received first signal and the known code sequence as inputs.

9. The communication system of claim 1:
wherein the second signal is computed based on a cross-correlation between the received first sequence and a processed version of the known code sequence.

10. The communication system of claim 1:
wherein the second signal is computed based on a cross-correlation between the received first sequence and an up-sampled version of the known code sequence.

11. The communication system of claim 10:
wherein the data symbols in the data frame of the first signal is up-sampled by an up-sampling factor at a transmitter, and
wherein the known code sequence is up-sampled by another factor that is substantially the same as the up-sampling factor used at the transmitter to generate the data symbols in the data frame of the first signal.

12. The communication system of claim 1:
wherein the equivalent channel response is obtained by convolution of an up-sampled location-specific signature waveform and a second equivalent channel response.

13. The communication system of claim 12:
wherein the second equivalent channel response is obtained by convolutions of a first filter, a channel response, and a second filter.

14. An apparatus for use in a time reversal division multiple access (TRDMA) communication system, the apparatus comprising:
a memory communicatively coupled to at least one processor; and
the at least one processor configured to:
receive a first signal that comprises:
a preamble sent at a first sampling rate with a first modulation through a channel and
a data frame sent at a second sampling rate with a second modulation through the channel,
wherein the preamble comprises a first up-sampled version of a known code sequence, and
wherein the data frame comprises a second up-sampled version of a plurality of data symbols,
compute a second signal that represents an estimate of an equivalent channel response using the received first signal and the first up-sampled version of the known code sequence,
wherein the second signal to comprise N samples,
down-sample the second signal at the plurality of candidate timing offsets to generate a plurality of sub-signals,
compute values of a parameter based on information about signal power and interference power at a plurality of candidate timing offsets based on the plurality of sub-signals,
determine a largest computed value of the parameter among the values of the parameter computed at the plurality of candidate timing offsets, and
determine a symbol timing based on a particular timing offset associated with the largest computed value of the parameter,
wherein the second signal is down-sampled by a factor of R×D, and
wherein R and D are integers not smaller than 1.

15. The apparatus of claim 14 wherein the at least one processor is configured to determine the data symbols in the data frame based on the determined symbol timing.

16. A method for operating a time reversal division multiple access (TRDMA) communication system, the method comprising:
receiving a first signal that comprises a preamble sent at a first sampling rate with a first modulation through a channel and a data frame sent at a second sampling rate with a second modulation through the channel,
wherein the preamble comprises a known pseudo-random sequence, and the data frame comprises a plurality of data symbols;
computing a second signal that represents an estimate of an equivalent channel response using the received first signal and the known pseudo-random sequence;
down-sampling the second signal, and
computing signal-to-interference-plus-noise ratios at a plurality of candidate timing offsets;
determining a largest computed signal-to-interference-plus-noise ratio among the computed signal-to-interference-plus-noise ratio at the plurality of candidate timing offsets; and
determining a symbol timing based on a particular timing offset associated with the largest computed signal-to-interference-plus-noise ratio,
wherein the second signal to comprise N samples,
wherein the second signal is down-sampled by a factor of R×D, and
wherein R and D are integers not smaller than 1.

17. The method of claim 16, further comprising:
using a first processor to compute the second signal, and
using a second processor to down-sample the second signal and to compute the signal-to-interference-plus-noise ratios.

18. The method of claim 16 in which the computing of the second signal comprises solving a least-square estimation problem using the received first signal and the known pseudo-random sequence as inputs.

19. The method of claim 16 in which the computing of the second signal comprises computing a cross-correlation between the received first signal and the known pseudo-random sequence.

\* \* \* \* \*